(12) United States Patent
Uken et al.

(10) Patent No.: US 11,697,373 B2
(45) Date of Patent: Jul. 11, 2023

(54) VEHICULAR EXTERIOR REARVIEW MIRROR ASSEMBLY

(71) Applicant: MAGNA MIRRORS OF AMERICA, INC., Holland, MI (US)

(72) Inventors: John T. Uken, Jenison, MI (US); Darryl P. De Wind, West Olive, MI (US); Keith D. Foote, Caledonia, MI (US); Joseph M. Mambourg, Spring Lake, MI (US); Rodney K. Blank, Zeeland, MI (US); Mark L. Larson, Grand Haven, MI (US); Niall R. Lynam, Holland, MI (US)

( * ) Notice: Subject to any disclaimer, the term of this patent is extended or adjusted under 35 U.S.C. 154(b) by 0 days.

(21) Appl. No.: 18/054,960

(22) Filed: Nov. 14, 2022

(65) Prior Publication Data
US 2023/0076687 A1     Mar. 9, 2023

Related U.S. Application Data

(63) Continuation of application No. 17/248,625, filed on Feb. 1, 2021, now Pat. No. 11,498,486, which is a
(Continued)

(51) Int. Cl.
*B60R 1/072* (2006.01)
*B60R 1/08* (2006.01)
(Continued)

(52) U.S. Cl.
CPC .............. *B60R 1/072* (2013.01); *B60R 1/088* (2013.01); *B60R 25/252* (2013.01); *G02B 7/182* (2013.01);
(Continued)

(58) Field of Classification Search
CPC ....... G02B 7/182; G06F 3/0446; G06F 3/047; G06F 3/04883; G06F 2203/0338;
(Continued)

(56) References Cited

U.S. PATENT DOCUMENTS 1,096,452 A   5/1914  Perrin
1,114,559 A   10/1914 Weed
(Continued)

FOREIGN PATENT DOCUMENTS

CA   2028461 A1   8/1991
DE   1530861 A1   6/1969
(Continued)

OTHER PUBLICATIONS

International Search Report and Written Opinion dated Mar. 19, 2013 for corresponding PCT Application No. PCT/US2012/064398.
(Continued)

*Primary Examiner* — Jack Dinh
(74) *Attorney, Agent, or Firm* — Honigman LLP

(57) ABSTRACT

A vehicular exterior rearview mirror assembly includes a mounting arm and a mirror head at one end of the mounting arm distal from an attachment portion of the mounting arm that is configured for attachment at a vehicle. A mirror reflective element is fixedly attached at the mirror head. An innermost side of the mirror reflective element is attached at a front side of an attachment plate. The mirror reflective element moves in tandem with movement of the mirror head relative to the mounting arm when the driver of the vehicle operates an electrically-operable actuator. The attachment plate includes wall structure that extends from the front side of the attachment plate and circumscribes and spans the perimeter circumferential edge of the glass substrate and does not encroach onto and does not overlap the front surface of the glass substrate of the exterior mirror reflective element.

20 Claims, 74 Drawing Sheets

Related U.S. Application Data continuation of application No. 16/384,060, filed on Apr. 15, 2019, now Pat. No. 10,906,467, which is a continuation of application No. 15/161,708, filed on May 23, 2016, now Pat. No. 10,261,648, which is a continuation of application No. 14/357,025, filed as application No. PCT/US2012/064398 on Nov. 9, 2012, now Pat. No. 9,346,403, said application No. 14/357,025 is a continuation-in-part of application No. 13/879,481, filed as application No. PCT/US2011/056295 on Oct. 14, 2011, now Pat. No. 9,598,016, said application No. 14/357,025 is a continuation-in-part of application No. 13/498,597, filed as application No. PCT/US2010/051741 on Oct. 7, 2010, now Pat. No. 8,730,553.

(60) Provisional application No. 61/705,876, filed on Sep. 26, 2012, provisional application No. 61/697,554, filed on Sep. 6, 2012, provisional application No. 61/665,509, filed on Jun. 28, 2012, provisional application No. 61/664,438, filed on Jun. 26, 2012, provisional application No. 61/647,179, filed on May 15, 2012, provisional application No. 61/614,877, filed on Mar. 23, 2012, provisional application No. 61/601,756, filed on Feb. 22, 2012, provisional application No. 61/590,578, filed on Jan. 25, 2012, provisional application No. 61/565,541, filed on Dec. 1, 2011, provisional application No. 61/558,623, provisional application No. 61/490,375, filed on May 26, 2011, provisional application No. 61/490,375, filed on May 26, 2011, provisional application No. 61/452,789, filed on Mar. 15, 2011, provisional application No. 61/452,789, filed on Mar. 15, 2011, provisional application No. 61/449,364, filed on Mar. 4, 2011, provisional application No. 61/449,364, filed on Mar. 4, 2011, provisional application No. 61/448,916, filed on Mar. 3, 2011, provisional application No. 61/448,916, filed on Mar. 3, 2011, provisional application No. 61/409,346, filed on Nov. 2, 2010, provisional application No. 61/409,346, filed on Nov. 2, 2010, provisional application No. 61/393,407, filed on Oct. 15, 2010, provisional application No. 61/393,407, provisional application No. 61/261,839, filed on Nov. 17, 2009, provisional application No. 61/261,839, filed on Nov. 17, 2009, provisional application No. 61/249,300, filed on Oct. 7, 2009, provisional application No. 61/249,300, filed on Oct. 7, 2009.

(51) Int. Cl.

| | | |
|---|---|---|
| *G02B 7/182* | (2021.01) | |
| *G06F 3/047* | (2006.01) | |
| *B60R 25/25* | (2013.01) | |
| *G06F 3/0488* | (2022.01) | |
| *G06F 3/04883* | (2022.01) | |
| *B60R 1/12* | (2006.01) | |
| *G06F 3/044* | (2006.01) | |

(52) U.S. Cl.
CPC .......... *G06F 3/047* (2013.01); *G06F 3/04883* (2013.01); *B60R 2001/1223* (2013.01); *B60R 2001/1253* (2013.01); *G06F 3/0446* (2019.05); *G06F 2203/0338* (2013.01)

(58) Field of Classification Search
CPC ....... B60R 1/072; B60R 1/088; B60R 25/252; B60R 2001/1223; B60R 2001/1253
See application file for complete search history.

(56) References Cited

U.S. PATENT DOCUMENTS

| | | | |
|---|---|---|---|
| 1,563,258 | A | 11/1925 | Cunningham |
| 1,949,138 | A | 2/1934 | Bell |
| 2,307,568 | A | 1/1943 | Colbert |
| 2,457,348 | A | 12/1948 | Chambers |
| 2,552,074 | A | 5/1951 | Thompson |
| 2,561,582 | A | 7/1951 | Marbel |
| 2,616,335 | A | 11/1952 | Mazur |
| 2,839,965 | A | 6/1958 | Budreck |
| 2,962,933 | A | 12/1960 | Hezler, Jr. |
| 2,969,715 | A | 1/1961 | Mosby |
| 3,119,591 | A | 1/1964 | Malecki |
| 3,280,701 | A | 10/1966 | Donnelly et al. |
| 3,407,684 | A | 10/1968 | Van Noord |
| 3,459,470 | A | 8/1969 | Hahn |
| 3,549,243 | A | 12/1970 | Horwitt et al. |
| 3,575,496 | A | 4/1971 | Pollock et al. |
| 3,711,179 | A | 1/1973 | Takeda |
| 3,837,129 | A | 9/1974 | Losell |
| 3,887,788 | A | 6/1975 | Seibel et al. |
| 4,274,078 | A | 6/1981 | Isobe et al. |
| 4,435,042 | A | 3/1984 | Wood et al. |
| 4,436,371 | A | 3/1984 | Wood et al. |
| 4,470,323 | A | 9/1984 | Manzoni |
| 4,477,149 | A | 10/1984 | Crespy |
| 4,512,633 | A | 4/1985 | Manzoni |
| 4,530,571 | A | 7/1985 | Connor |
| 4,558,930 | A | 12/1985 | Deedreek |
| 4,699,024 | A | 10/1987 | Iida et al. |
| 4,712,879 | A | 12/1987 | Lynam et al. |
| 4,733,335 | A | 3/1988 | Serizawa et al. |
| 4,803,599 | A | 2/1989 | Trine et al. |
| 4,826,289 | A | 5/1989 | Vandenbrink et al. |
| 4,832,477 | A | 5/1989 | Torii et al. |
| 4,902,108 | A | 2/1990 | Byker |
| 4,931,627 | A | 6/1990 | Watts |
| 4,936,533 | A | 6/1990 | Adams et al. |
| 4,936,670 | A | 6/1990 | Yoo |
| 4,940,321 | A | 7/1990 | Yoshida |
| 4,948,242 | A | 8/1990 | Desmond et al. |
| 4,991,950 | A | 2/1991 | Lang et al. |
| 5,005,797 | A | 4/1991 | Maekawa et al. |
| 5,014,167 | A | 5/1991 | Roberts |
| 5,016,996 | A | 5/1991 | Ueno |
| 5,017,903 | A | 5/1991 | Krippelz, Sr. |
| 5,052,163 | A | 10/1991 | Czekala |
| 5,059,015 | A | 10/1991 | Tran |
| 5,066,112 | A | 11/1991 | Lynam et al. |
| 5,069,535 | A | 12/1991 | Baucke et al. |
| 5,073,012 | A | 12/1991 | Lynam |
| 5,076,673 | A | 12/1991 | Lynam et al. |
| 5,100,095 | A | 3/1992 | Haan et al. |
| 5,115,346 | A | 5/1992 | Lynam |
| 5,140,455 | A | 8/1992 | Varaprasad et al. |
| 5,142,407 | A | 8/1992 | Varaprasad et al. |
| 5,151,816 | A | 9/1992 | Varaprasad et al. |
| 5,151,824 | A | 9/1992 | O'Farrell |
| 5,158,638 | A | 10/1992 | Osanami et al. |
| 5,179,471 | A | 1/1993 | Caskey et al. |
| 5,190,499 | A | 3/1993 | Mori et al. |
| 5,207,492 | A | 5/1993 | Roberts |
| 5,210,651 | A | 5/1993 | Shibuya et al. |
| 5,253,109 | A | 10/1993 | O'Farrell et al. |
| 5,313,335 | A | 5/1994 | Gray et al. |
| 5,327,288 | A | 7/1994 | Wellington et al. |
| 5,343,333 | A | 8/1994 | Nagayama et al. |
| 5,355,284 | A | 10/1994 | Roberts |
| 5,361,190 | A | 11/1994 | Roberts et al. |
| 5,371,659 | A | 12/1994 | Pastrick et al. |
| 5,379,146 | A | 1/1995 | Defendini |

(56) References Cited

U.S. PATENT DOCUMENTS

| | | |
|---|---|---|
| 5,402,103 A | 3/1995 | Tashiro |
| 5,421,940 A | 6/1995 | Cornils et al. |
| 5,424,898 A | 6/1995 | Larson et al. |
| 5,436,741 A | 7/1995 | Crandall |
| 5,448,397 A | 9/1995 | Tonar |
| 5,455,716 A | 10/1995 | Suman et al. |
| D363,920 S | 11/1995 | Roberts et al. |
| 5,473,476 A | 12/1995 | Fujita |
| 5,477,390 A | 12/1995 | Boddy et al. |
| 5,481,409 A | 1/1996 | Roberts |
| 5,489,080 A | 2/1996 | Allen |
| 5,497,305 A | 3/1996 | Pastrick et al. |
| 5,497,306 A | 3/1996 | Pastrick |
| 5,513,048 A | 4/1996 | Chen |
| 5,525,264 A | 6/1996 | Cronin et al. |
| 5,528,422 A | 6/1996 | Roberts |
| 5,530,240 A | 6/1996 | Larson et al. |
| 5,546,239 A | 8/1996 | Lewis |
| 5,550,677 A | 8/1996 | Schofield et al. |
| 5,552,094 A | 9/1996 | Kubota |
| 5,555,136 A | 9/1996 | Waldmann et al. |
| 5,572,376 A | 11/1996 | Pace |
| 5,575,552 A | 11/1996 | Faloon et al. |
| 5,579,178 A | 11/1996 | Mochizuki |
| 5,582,383 A | 12/1996 | Mertens et al. |
| 5,587,699 A | 12/1996 | Faloon et al. |
| 5,610,756 A | 3/1997 | Lynam et al. |
| 5,619,374 A | 4/1997 | Roberts |
| 5,619,375 A | 4/1997 | Roberts |
| 5,624,176 A | 4/1997 | O'Farrell et al. |
| 5,632,551 A | 5/1997 | Roney et al. |
| 5,649,756 A | 7/1997 | Adams et al. |
| 5,659,423 A | 8/1997 | Schierbeek et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,671,996 A | 9/1997 | Bos et al. |
| 5,680,263 A | 10/1997 | Zimmermann et al. |
| 5,703,731 A | 12/1997 | Boddy et al. |
| 5,724,187 A | 3/1998 | Varaprasad et al. |
| D394,833 S | 6/1998 | Muth |
| 5,786,772 A | 7/1998 | Schofield et al. |
| 5,788,357 A | 8/1998 | Muth et al. |
| 5,790,298 A | 8/1998 | Tonar |
| 5,796,094 A | 8/1998 | Schofield et al. |
| 5,796,176 A | 8/1998 | Kramer et al. |
| 5,798,575 A | 8/1998 | O'Farrell et al. |
| 5,808,778 A | 9/1998 | Bauer et al. |
| 5,818,625 A | 10/1998 | Forgette et al. |
| 5,820,097 A | 10/1998 | Spooner |
| 5,823,054 A | 10/1998 | Brouwer |
| 5,823,654 A | 10/1998 | Pastrick et al. |
| 5,825,527 A | 10/1998 | Forgette et al. |
| 5,863,116 A | 1/1999 | Pastrick et al. |
| 5,864,435 A | 1/1999 | Toyama |
| 5,877,897 A | 3/1999 | Schofield et al. |
| 5,879,074 A | 3/1999 | Pastrick |
| D409,540 S | 5/1999 | Muth |
| 5,900,999 A | 5/1999 | Huizenga et al. |
| 5,903,402 A | 5/1999 | Hoek |
| 5,910,854 A | 6/1999 | Varaprasad et al. |
| 5,923,457 A | 7/1999 | Byker et al. |
| 5,929,786 A | 7/1999 | Schofield et al. |
| 5,938,320 A | 8/1999 | Crandall |
| 5,949,591 A | 9/1999 | Whitehead |
| 5,959,367 A | 9/1999 | O'Farrell et al. |
| 5,969,890 A | 10/1999 | Whitehead |
| 5,984,482 A | 11/1999 | Rumsey et al. |
| 5,986,364 A | 11/1999 | Bingle et al. |
| 6,002,511 A | 12/1999 | Varaprasad et al. |
| 6,005,724 A | 12/1999 | Todd |
| 6,007,222 A | 12/1999 | Thau |
| 6,045,243 A | 4/2000 | Muth et al. |
| D425,466 S | 5/2000 | Todd et al. |
| 6,064,508 A | 5/2000 | Forgette et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,074,077 A | 6/2000 | Pastrick et al. |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,099,155 A | 8/2000 | Pastrick et al. |
| 6,102,546 A | 8/2000 | Carter |
| 6,111,683 A | 8/2000 | Cammenga et al. |
| 6,111,684 A | 8/2000 | Forgette et al. |
| 6,124,886 A | 9/2000 | DeLine et al. |
| 6,142,656 A | 11/2000 | Kurth |
| 6,146,003 A | 11/2000 | Thau |
| 6,149,287 A | 11/2000 | Pastrick et al. |
| 6,152,590 A | 11/2000 | Furst et al. |
| 6,154,306 A | 11/2000 | Varaprasad et al. |
| 6,163,083 A | 12/2000 | Kramer et al. |
| 6,166,848 A | 12/2000 | Cammenga et al. |
| 6,170,956 B1 | 1/2001 | Rumsey et al. |
| 6,170,957 B1 | 1/2001 | Kaspar |
| 6,175,164 B1 | 1/2001 | O'Farrell et al. |
| 6,176,602 B1 | 1/2001 | Pastrick et al. |
| 6,178,034 B1 | 1/2001 | Allemand et al. |
| 6,193,379 B1 | 2/2001 | Tonar et al. |
| 6,195,194 B1 | 2/2001 | Roberts et al. |
| 6,198,409 B1 | 3/2001 | Schofield et al. |
| 6,213,612 B1 | 4/2001 | Schnell et al. |
| 6,227,675 B1 | 5/2001 | Mertens et al. |
| 6,227,689 B1 | 5/2001 | Miller |
| 6,229,226 B1 | 5/2001 | Kramer et al. |
| 6,239,899 B1 | 5/2001 | DeVries et al. |
| 6,239,928 B1 | 5/2001 | Whitehead et al. |
| 6,243,218 B1 | 6/2001 | Whitehead |
| 6,244,716 B1 | 6/2001 | Steenwyk et al. |
| 6,249,369 B1 | 6/2001 | Theiste et al. |
| 6,257,746 B1 | 7/2001 | Todd et al. |
| 6,264,353 B1 | 7/2001 | Caraher et al. |
| 6,270,227 B1 | 8/2001 | Tsuyama |
| 6,276,821 B1 | 8/2001 | Pastrick et al. |
| 6,280,069 B1 | 8/2001 | Pastrick et al. |
| 6,296,379 B1 | 10/2001 | Pastrick |
| 6,299,333 B1 | 10/2001 | Pastrick et al. |
| 6,312,135 B1 | 11/2001 | Polzer |
| 6,315,421 B1 | 11/2001 | Apfelbeck et al. |
| 6,317,248 B1 | 11/2001 | Agrawal et al. |
| 6,318,870 B1 | 11/2001 | Spooner et al. |
| 6,325,518 B1 | 12/2001 | Whitehead et al. |
| 6,329,925 B1 | 12/2001 | Skiver et al. |
| 6,331,066 B1 | 12/2001 | Desmond et al. |
| 6,336,737 B1 | 1/2002 | Thau |
| 6,340,849 B1 | 1/2002 | Kramer et al. |
| 6,340,850 B2 | 1/2002 | O'Farrell et al. |
| 6,347,880 B1 | 2/2002 | Furst et al. |
| 6,356,376 B1 | 3/2002 | Tonar et al. |
| 6,362,548 B1 | 3/2002 | Bingle et al. |
| 6,369,804 B1 | 4/2002 | Sandbach |
| 6,396,397 B1 | 5/2002 | Bos et al. |
| 6,407,468 B1 | 6/2002 | LeVesque et al. |
| 6,407,847 B1 | 6/2002 | Poll et al. |
| 6,416,208 B2 | 7/2002 | Pastrick et al. |
| 6,426,485 B1 | 7/2002 | Bulgajewski et al. |
| 6,439,755 B1 | 8/2002 | Fant, Jr. et al. |
| 6,441,943 B1 | 8/2002 | Roberts et al. |
| 6,452,479 B1 | 9/2002 | Sandbach |
| 6,467,920 B2 | 10/2002 | Schnell et al. |
| 6,476,358 B1 | 11/2002 | Lang et al. |
| 6,481,878 B2 | 11/2002 | Thau |
| 6,483,438 B2 | 11/2002 | DeLine et al. |
| 6,499,850 B2 | 12/2002 | Waldmann |
| 6,501,387 B2 | 12/2002 | Skiver et al. |

(56) References Cited

U.S. PATENT DOCUMENTS

| | | |
|---|---|---|
| 6,502,970 B1 | 1/2003 | Anderson et al. |
| 6,522,451 B1 | 2/2003 | Lynam |
| 6,535,126 B2 | 3/2003 | Lin et al. |
| 6,540,193 B1 | 4/2003 | DeLine |
| 6,565,221 B2 | 5/2003 | Guttenberger et al. |
| 6,582,109 B2 | 6/2003 | Miller |
| 6,593,565 B2 | 7/2003 | Heslin et al. |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,657,767 B2 | 12/2003 | Bonardi et al. |
| 6,672,731 B2 | 1/2004 | Schnell et al. |
| 6,682,200 B2 | 1/2004 | Tsuyama et al. |
| 6,685,864 B2 | 2/2004 | Bingle et al. |
| 6,690,268 B2 | 2/2004 | Schofield et al. |
| 6,698,905 B1 | 3/2004 | Whitehead |
| 6,717,109 B1 | 4/2004 | Macher et al. |
| 6,717,712 B2 | 4/2004 | Lynam et al. |
| 6,755,544 B2 | 6/2004 | Schnell et al. |
| D493,131 S | 7/2004 | Lawlor et al. |
| D493,394 S | 7/2004 | Lawlor et al. |
| 6,774,810 B2 | 8/2004 | DeLine et al. |
| 6,781,738 B2 | 8/2004 | Kikuchi et al. |
| 6,832,848 B2 | 12/2004 | Pastrick |
| 6,847,288 B1 | 1/2005 | Baschnagel, III |
| 6,870,656 B2 | 3/2005 | Tonar et al. |
| 6,871,970 B2 | 3/2005 | Georges |
| 6,877,709 B2 | 4/2005 | March et al. |
| 6,882,287 B2 | 4/2005 | Schofield |
| 6,916,100 B2 | 7/2005 | Pavao |
| 6,932,497 B1 | 8/2005 | Huang |
| 6,981,774 B2 | 1/2006 | Dumont et al. |
| 7,004,593 B2 | 2/2006 | Weller et al. |
| 7,012,729 B2 | 3/2006 | Tonazzi et al. |
| 7,035,678 B2 | 4/2006 | Lynam et al. |
| 7,038,577 B2 | 5/2006 | Pawlicki et al. |
| 7,042,616 B2 | 5/2006 | Tonar et al. |
| 7,064,882 B2 | 6/2006 | Tonar et al. |
| 7,070,287 B2 | 7/2006 | Foote et al. |
| 7,073,914 B2 | 7/2006 | Pavao |
| 7,080,914 B1 | 7/2006 | Boddy |
| 7,083,312 B2 | 8/2006 | Pastrick et al. |
| 7,093,946 B2 | 8/2006 | Barve et al. |
| 7,093,965 B2 | 8/2006 | Veldman |
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,178,925 B1 | 2/2007 | Tidwell |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,267,449 B1 | 9/2007 | Boddy et al. |
| 7,274,501 B2 | 9/2007 | McCabe et al. |
| 7,287,867 B2 | 10/2007 | Wellington et al. |
| 7,287,868 B2 | 10/2007 | Carter et al. |
| 7,289,037 B2 | 10/2007 | Uken et al. |
| 7,314,285 B2 | 1/2008 | Ruse et al. |
| 7,322,710 B2 | 1/2008 | Foote et al. |
| 7,324,261 B2 | 1/2008 | Fonar et al. |
| 7,334,922 B2 | 2/2008 | Bonardi et al. |
| 7,338,177 B2 | 3/2008 | Lynam |
| 7,342,707 B2 | 3/2008 | Roberts et al. |
| 7,360,932 B2 | 4/2008 | Uken et al. |
| 7,370,983 B2 | 5/2008 | DeWind et al. |
| 7,370,985 B2 | 5/2008 | Boddy et al. |
| 7,372,611 B2 | 5/2008 | Tonar et al. |
| 7,420,756 B2 | 9/2008 | Lynam |
| 7,492,281 B2 | 2/2009 | Lynam et al. |
| 7,510,311 B2 | 3/2009 | Romas et al. |
| 7,526,367 B2 | 4/2009 | Schofield et al. |
| 7,532,149 B2 | 5/2009 | Banko et al. |
| 7,542,193 B2 | 6/2009 | McCabe et al. |
| 7,570,413 B2 | 8/2009 | Fonar et al. |
| 7,581,859 B2 | 9/2009 | Lynam |
| 7,599,108 B2 | 10/2009 | Lawlor et al. |
| 7,602,542 B2 | 10/2009 | Tonar et al. |
| 7,612,929 B2 | 11/2009 | Tonar et al. |
| 7,626,749 B2 | 12/2009 | Baur et al. |
| 7,690,800 B2 | 4/2010 | Fukai et al. |
| 7,706,046 B2 | 4/2010 | Bauer et al. |
| 7,710,631 B2 | 5/2010 | McCabe et al. |
| 7,719,750 B2 | 5/2010 | Tonar et al. |
| 7,720,580 B2 | 5/2010 | Higgins-Luthman |
| 7,722,199 B2 | 5/2010 | DeWard et al. |
| 7,748,856 B2 | 7/2010 | Zhao |
| 7,777,611 B2 | 8/2010 | Desai |
| 7,817,020 B2 | 10/2010 | Turnbull et al. |
| 7,821,697 B2 | 10/2010 | Varaprasad et al. |
| 7,826,123 B2 | 11/2010 | McCabe et al. |
| 7,855,755 B2 | 12/2010 | Weller et al. |
| 7,864,399 B2 | 1/2011 | McCabe et al. |
| D633,019 S | 2/2011 | De Wind |
| D633,423 S | 3/2011 | De Wind |
| 7,922,199 B2 | 4/2011 | Webber et al. |
| 7,926,960 B2 | 4/2011 | Skiver et al. |
| D638,761 S | 5/2011 | De Wind |
| 7,944,371 B2 | 5/2011 | Foote et al. |
| 7,978,094 B2 | 7/2011 | Uken et al. |
| 7,980,711 B2 | 7/2011 | Takayanagi et al. |
| 3,004,741 A1 | 8/2011 | Tonar et al. |
| 8,018,440 B2 | 9/2011 | Townsend et al. |
| D647,017 S | 10/2011 | De Wind |
| 8,047,667 B2 | 11/2011 | Weller et al. |
| 8,048,085 B2 | 11/2011 | Peterson et al. |
| 8,049,640 B2 | 11/2011 | Uken et al. |
| 8,050,551 B2 | 11/2011 | Peterson et al. |
| 8,154,418 B2 | 4/2012 | Peterson et al. |
| D660,208 S | 5/2012 | De Wind |
| 8,169,684 B2 | 5/2012 | Bugno et al. |
| 8,179,586 B2 | 5/2012 | Schofield et al. |
| D661,234 S | 6/2012 | De Wind |
| 8,194,133 B2 | 6/2012 | DeWind et al. |
| 8,237,909 B2 | 8/2012 | Ostreko et al. |
| 8,262,240 B2 | 9/2012 | Negel |
| 8,277,059 B2 | 10/2012 | McCabe et al. |
| 8,287,164 B2 | 10/2012 | Fehn et al. |
| 8,339,526 B2 | 12/2012 | Minikey, Jr. et al. |
| 8,366,285 B2 | 2/2013 | Reedman et al. |
| 8,465,161 B2 | 6/2013 | DeWind et al. |
| 8,508,831 B2 | 8/2013 | De Wind et al. |
| 8,730,553 B2 | 5/2014 | De Wind et al. |
| 8,764,256 B2 | 7/2014 | Foote et al. |
| 8,915,601 B2 | 12/2014 | Foote et al. |
| 8,922,867 B2 | 12/2014 | De Wind et al. |
| 8,976,439 B2 | 3/2015 | De Wind et al. |
| 9,067,541 B2 | 6/2015 | Sobecki et al. |
| 9,174,578 B2 | 11/2015 | Uken et al. |
| 9,346,403 B2 | 5/2016 | Uken et al. |
| 9,827,913 B2 | 11/2017 | De Wind et al. |
| 9,969,334 B2 | 5/2018 | De Wind et al. |
| 10,099,618 B2 | 10/2018 | Foote et al. |
| 10,261,648 B2 | 4/2019 | Uken et al. |
| 10,790,481 B2 | 9/2020 | Muraki et al. |
| 10,906,467 B2 | 2/2021 | Uken et al. |
| 11,498,486 B2 | 11/2022 | Uken et al. |
| 2001/0015862 A1 | 8/2001 | Lynam et al. |
| 2002/0057494 A1 | 5/2002 | Lang |
| 2002/0063978 A1 | 5/2002 | Guttenberger et al. |
| 2002/0141085 A1 | 10/2002 | Whitehead et al. |
| 2003/0001301 A1 | 1/2003 | Duroux et al. |
| 2003/0007261 A1 | 1/2003 | Hutzel et al. |
| 2003/0202263 A1 | 10/2003 | Georges |
| 2004/0196578 A1 | 10/2004 | Dumont et al. |
| 2005/0111121 A1 | 5/2005 | Barve et al. |
| 2005/0195488 A1 | 9/2005 | McCabe et al. |
| 2005/0243449 A1 | 11/2005 | Pavao |
| 2005/0281043 A1 | 12/2005 | Eisenbraun |
| 2006/0050018 A1 | 3/2006 | Hutzel et al. |

(56) References Cited

U.S. PATENT DOCUMENTS

| | | |
|---|---|---|
| 2006/0061008 A1 | 3/2006 | Karner et al. |
| 2006/0164230 A1 | 7/2006 | DeWind et al. |
| 2006/0285254 A1 | 12/2006 | Ruse et al. |
| 2007/0002477 A1 | 1/2007 | Whitehead |
| 2007/0058257 A1 | 3/2007 | Lynam |
| 2007/0081350 A1 | 4/2007 | Huang |
| 2007/0139751 A1 | 6/2007 | Kuiper et al. |
| 2007/0285812 A1 | 12/2007 | Foote et al. |
| 2008/0042938 A1 | 2/2008 | Cok |
| 2008/0043354 A1 | 2/2008 | Fukai et al. |
| 2008/0087797 A1 | 4/2008 | Turnbull et al. |
| 2008/0304170 A1 | 12/2008 | Zhao |
| 2009/0015736 A1 | 1/2009 | Weller et al. |
| 2009/0040306 A1 | 2/2009 | Foote et al. |
| 2009/0161379 A1 | 6/2009 | Liesener |
| 2009/0213480 A1 | 8/2009 | Li |
| 2009/0237820 A1 | 9/2009 | McCabe et al. |
| 2009/0237821 A1 | 9/2009 | Li |
| 2009/0243824 A1 | 10/2009 | Peterson et al. |
| 2009/0251785 A1 | 10/2009 | Bruhnke et al. |
| 2009/0251913 A1 | 10/2009 | Bruhnke et al. |
| 2010/0067131 A1 | 3/2010 | Negel |
| 2010/0177413 A1 | 7/2010 | Lee et al. |
| 2010/0182143 A1 | 7/2010 | Lynam |
| 2010/0238570 A1 | 9/2010 | Reedman et al. |
| 2010/0290141 A1 | 11/2010 | Huang |
| 2010/0321758 A1 | 12/2010 | Bugno et al. |
| 2011/0096427 A1 | 4/2011 | Uken et al. |
| 2011/0176323 A1 | 7/2011 | Skiver et al. |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2012/0026616 A1 | 2/2012 | Rawlings |
| 2012/0038964 A1 | 2/2012 | De Wind et al. |
| 2012/0236388 A1 | 9/2012 | De Wind et al. |
| 2013/0088884 A1 | 4/2013 | Brummel et al. |
| 2014/0022390 A1 | 1/2014 | Blank et al. |
| 2014/0133044 A1 | 5/2014 | Mambourg |
| 2014/0285666 A1 | 9/2014 | O'Connell et al. |
| 2014/0376119 A1 | 12/2014 | Sobecki et al. |
| 2015/0085337 A1 | 3/2015 | Lee et al. |
| 2015/0097955 A1 | 4/2015 | De Wind et al. |
| 2015/0224930 A1 | 8/2015 | Foote et al. |
| 2017/0267179 A1 | 9/2017 | Herrmann et al. |
| 2017/0355312 A1 | 12/2017 | Habibi et al. |
| 2018/0001823 A1 | 1/2018 | Bhaskar |
| 2018/0134218 A1 | 5/2018 | Lettis et al. |
| 2018/0194287 A1 | 7/2018 | Arndt et al. |
| 2018/0257571 A1 | 9/2018 | De Wind et al. |
| 2018/0265006 A1 | 9/2018 | Tseng |
| 2019/0039522 A1 | 2/2019 | Foote et al. |
| 2019/0243492 A1 | 8/2019 | Uken et al. |

FOREIGN PATENT DOCUMENTS

| | | |
|---|---|---|
| DE | 1815368 B | 4/1970 |
| DE | 1755577 B1 | 5/1972 |
| DE | 2254511 A1 | 5/1974 |
| DE | 2362191 A1 | 6/1975 |
| DE | 3049169 A1 | 7/1982 |
| DE | 1141657 A1 | 7/1992 |
| DE | 19538770 A1 | 4/1997 |
| DE | 19601429 C1 | 4/1997 |
| DE | 102008026039 A1 | 12/2009 |
| DE | 202010005203 U1 | 9/2010 |
| DE | 102009031809 A1 | 1/2011 |
| EP | 0064421 A1 | 11/1982 |
| EP | 0314839 A1 | 5/1989 |
| EP | 0450162 A1 | 10/1991 |
| EP | 0744321 A2 | 11/1996 |
| EP | 0780266 A2 | 6/1997 |
| EP | 1000807 A2 | 5/2000 |
| EP | 1103420 A2 | 5/2001 |
| EP | 1188616 A2 | 3/2002 |
| EP | 1300289 A2 | 4/2003 |
| EP | 1345071 A1 | 9/2003 |
| EP | 1755923 A1 | 2/2007 |
| EP | 2017127 A1 | 1/2009 |
| EP | 2106970 A1 | 10/2009 |
| EP | 2112022 A1 | 10/2009 |
| EP | 2165886 A1 | 3/2010 |
| EP | 2492144 A1 | 8/2012 |
| EP | 2492145 A1 | 8/2012 |
| EP | 3321132 A1 | 5/2018 |
| FR | 1525709 A | 5/1968 |
| FR | 2503647 A1 | 10/1982 |
| FR | 2605567 A1 | 4/1988 |
| GB | 2161440 A | 1/1986 |
| GB | 2197829 A | 6/1988 |
| GB | 2244965 A | 12/1991 |
| JP | 6-81836 | 3/1997 |
| WO | 2001001192 A1 | 1/2001 |
| WO | 2003004245 A1 | 1/2003 |
| WO | 2004026633 A2 | 4/2004 |
| WO | 2004031840 A2 | 4/2004 |
| WO | 2004042457 A2 | 5/2004 |
| WO | 2005096069 A1 | 10/2005 |
| WO | 2008013499 A1 | 1/2008 |
| WO | 2010124064 A1 | 10/2010 |
| WO | 2011044312 A1 | 4/2011 |
| WO | 2012051500 A1 | 4/2012 |
| WO | 2013071070 A1 | 5/2013 |
| WO | 2013126719 A2 | 8/2013 |
| WO | 2017135361 A1 | 8/2017 |

OTHER PUBLICATIONS

International Search Report and Written Opinion dated May 13, 2013 for corresponding PCT application No. PCT/US2013/027346.
Yi Zhang et al., Basic Kinematics of Constrained Rigid Bodies, in Introduction to Mechanisms, Carnegie Mellon University, https://www.cs.cmu.edu/~rapidproto/mechanisms/chpt4.html.
IPR Proceeding No. IPR2020-00777, filed Mar. 31, 2020, re U.S. Pat. No. 10,261,648.
UN Regulation No. 46, Revision 3, "Uniform provisions concerning the approval of devices for indirect vision and of motor vehicles with regard to the installation of these devices." (Year: 2009).

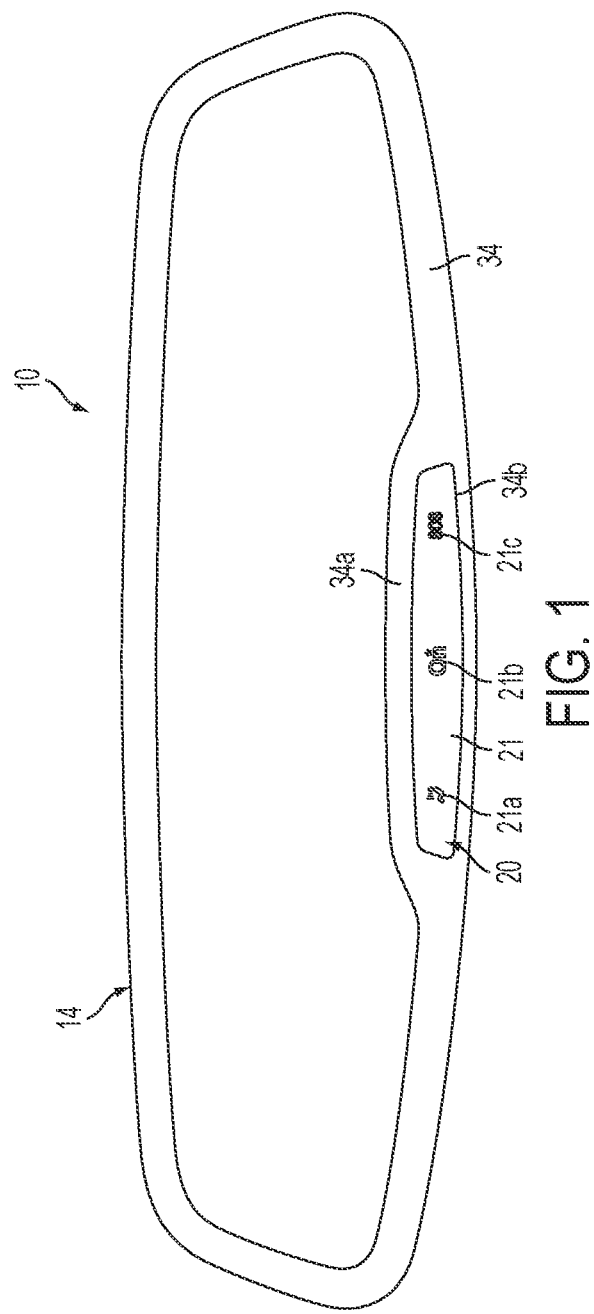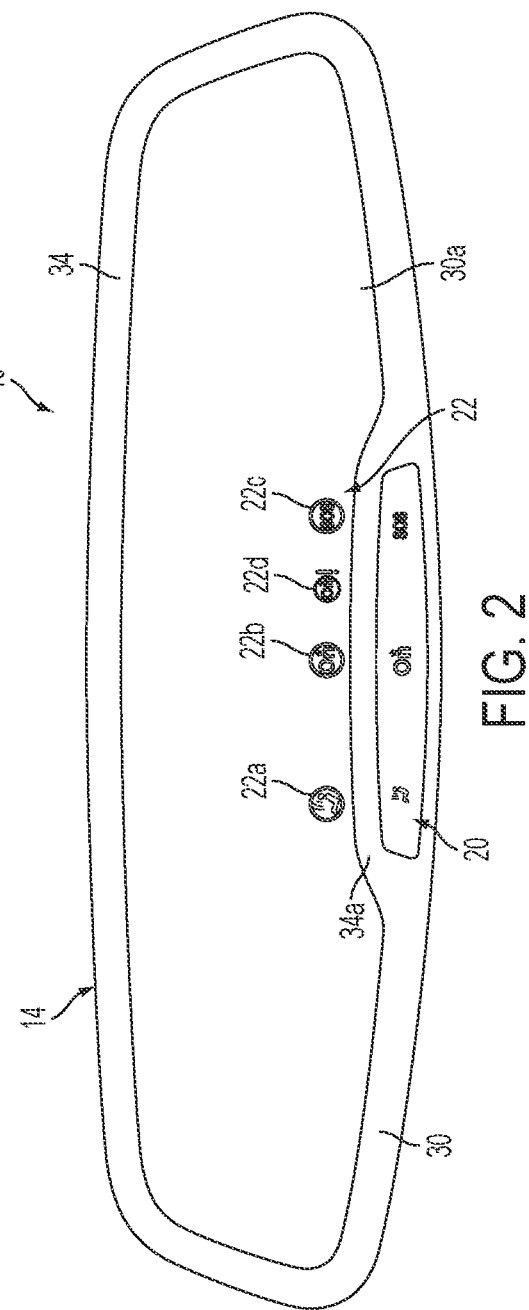

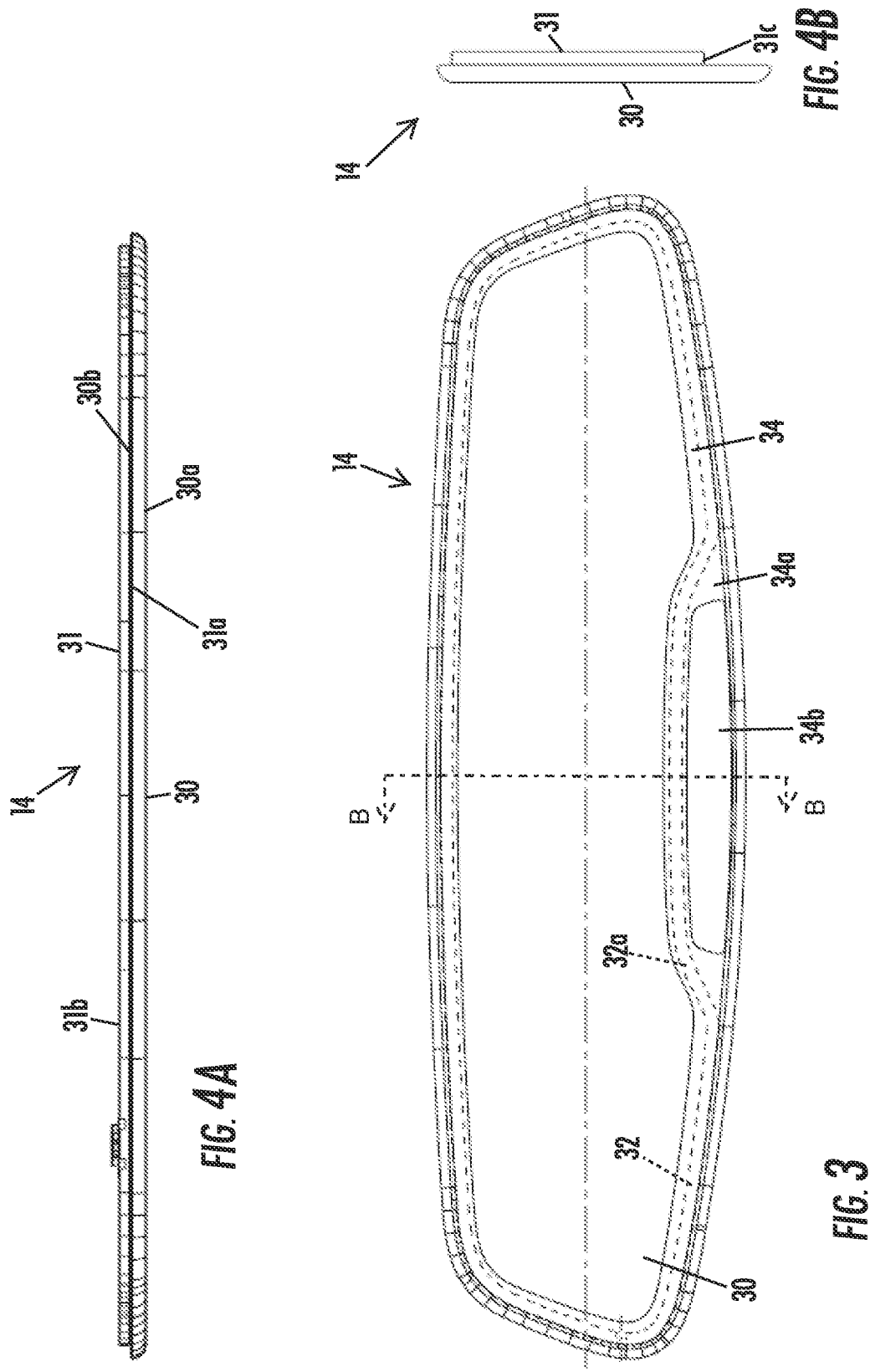

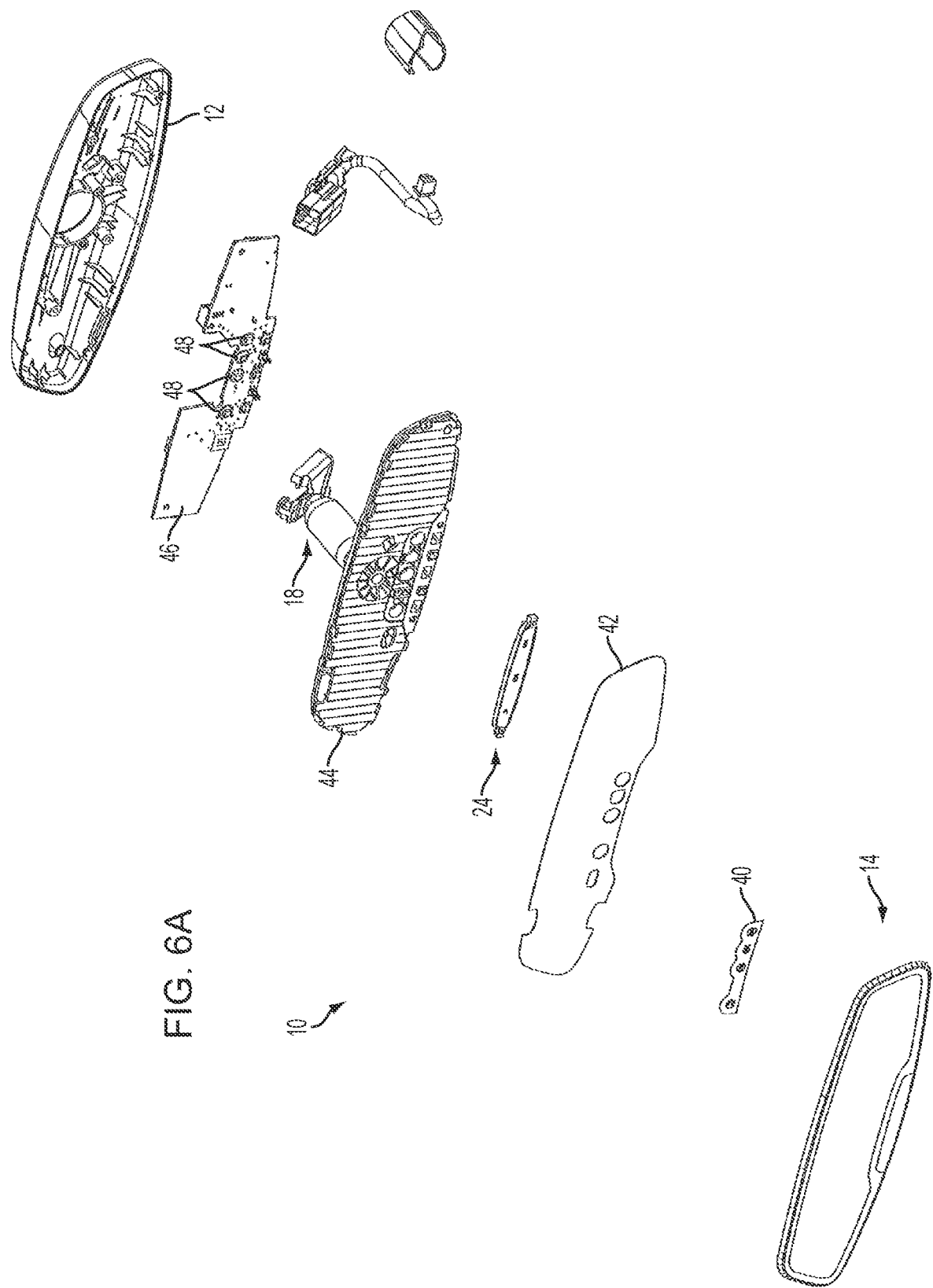

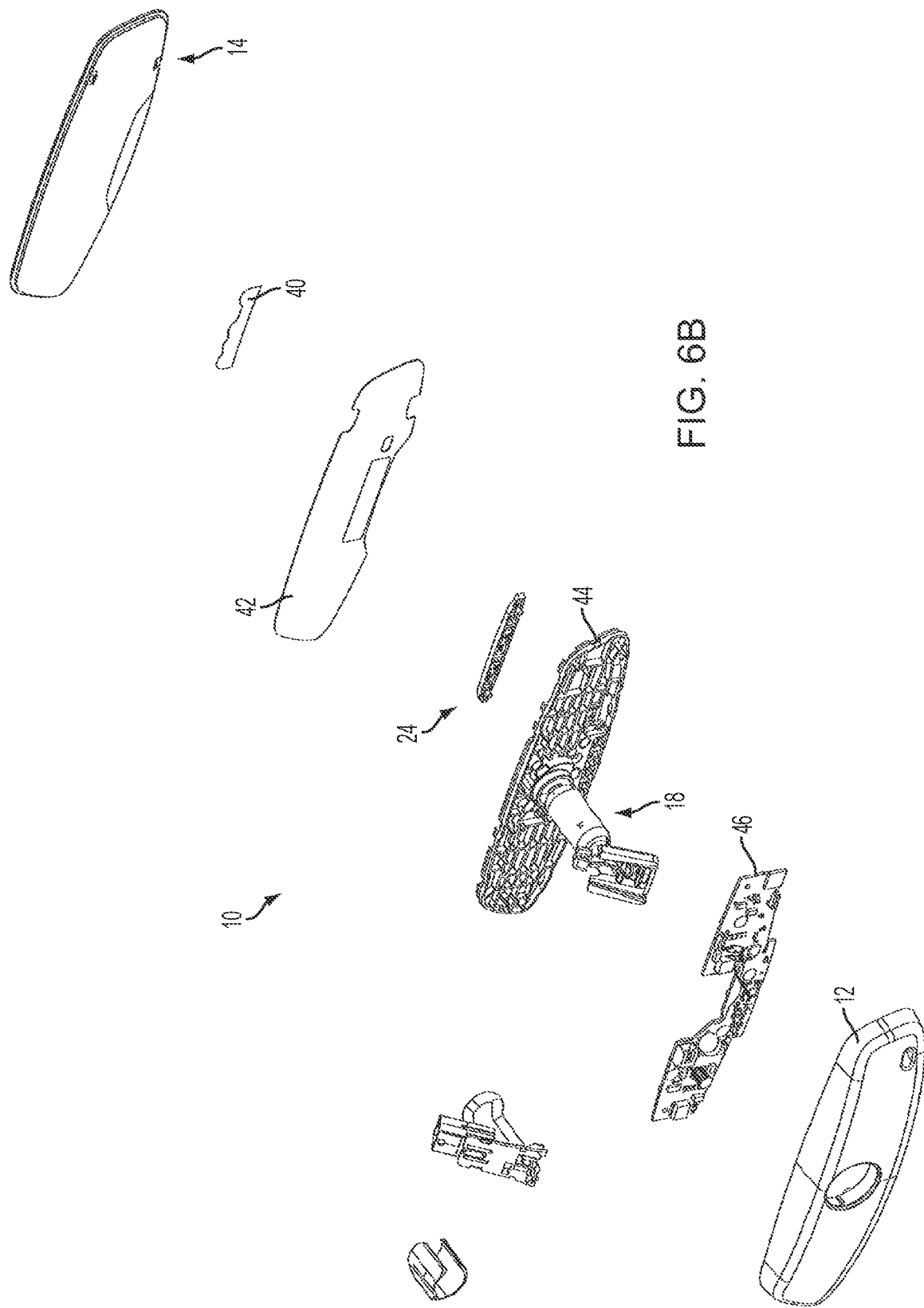

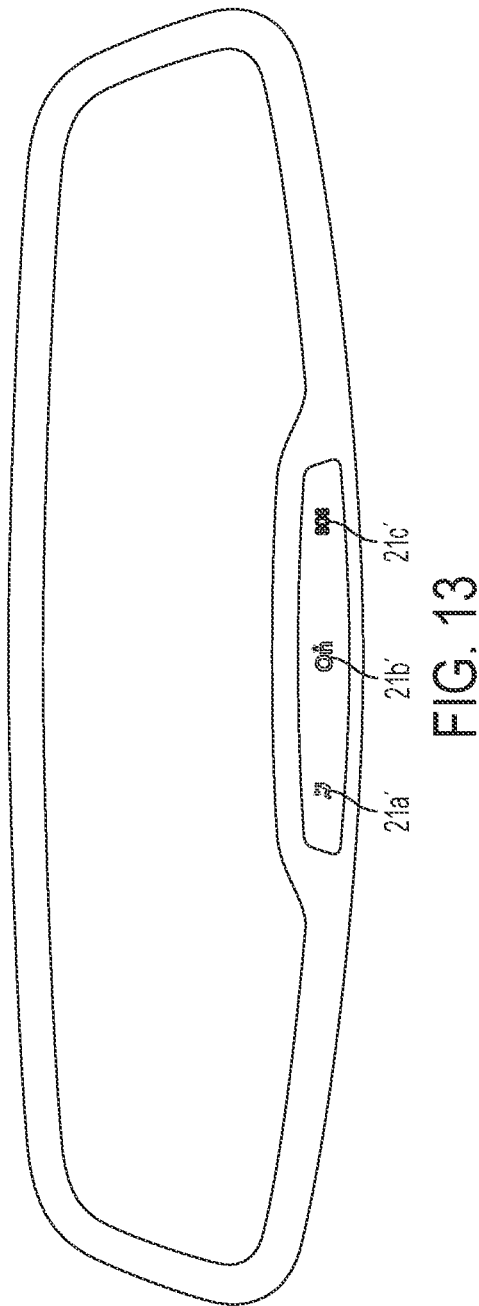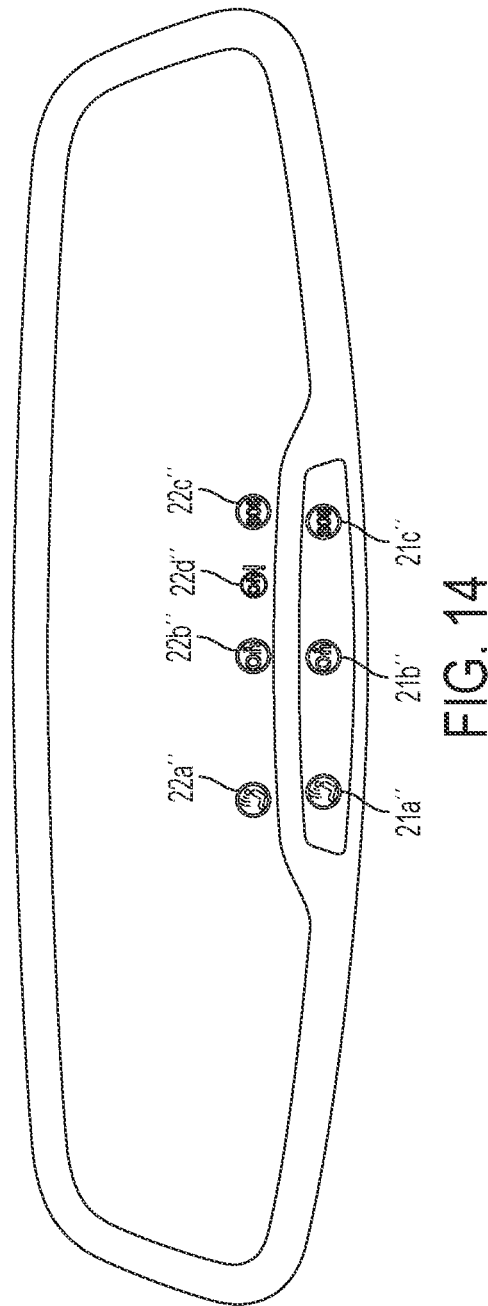

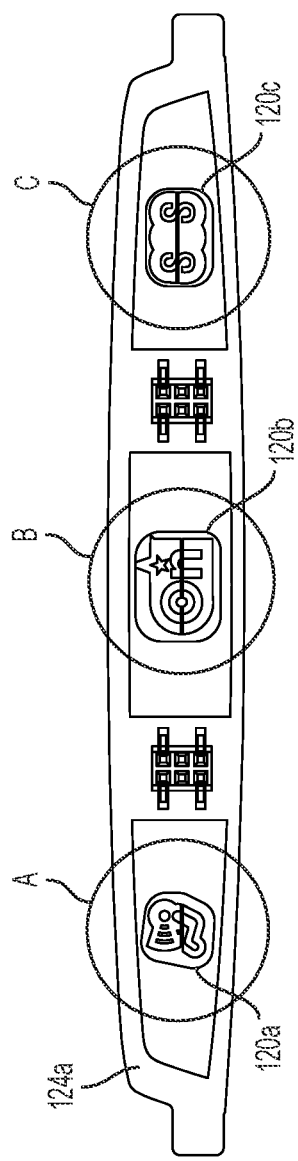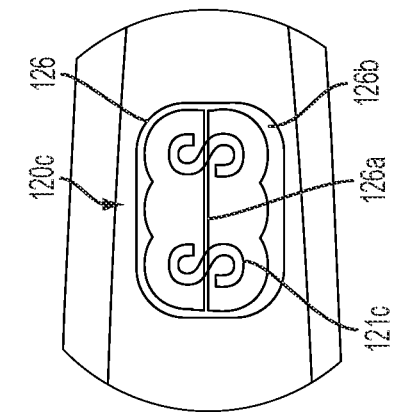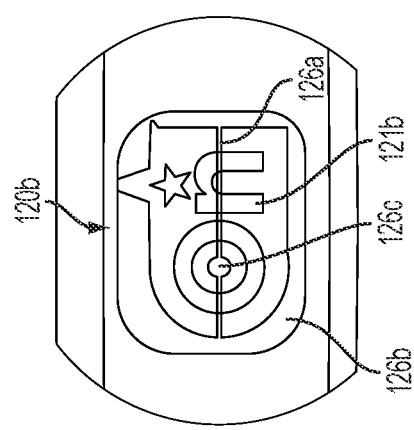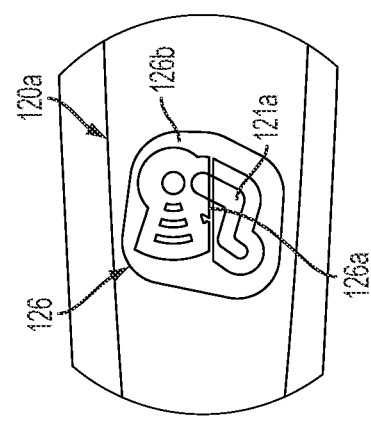

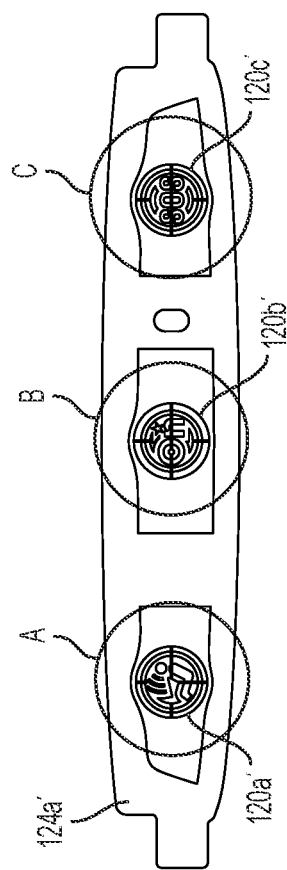
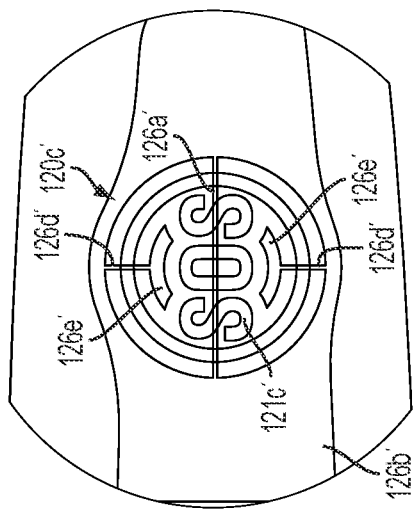
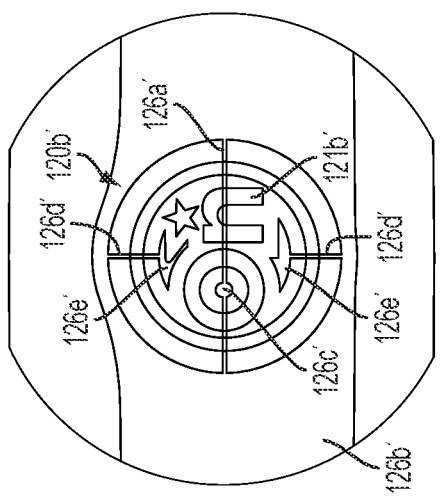
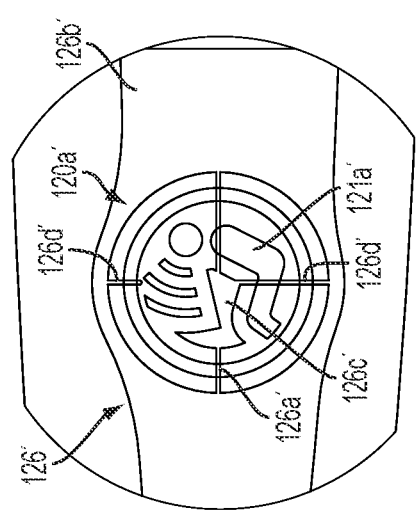

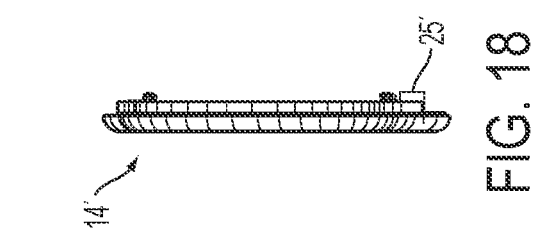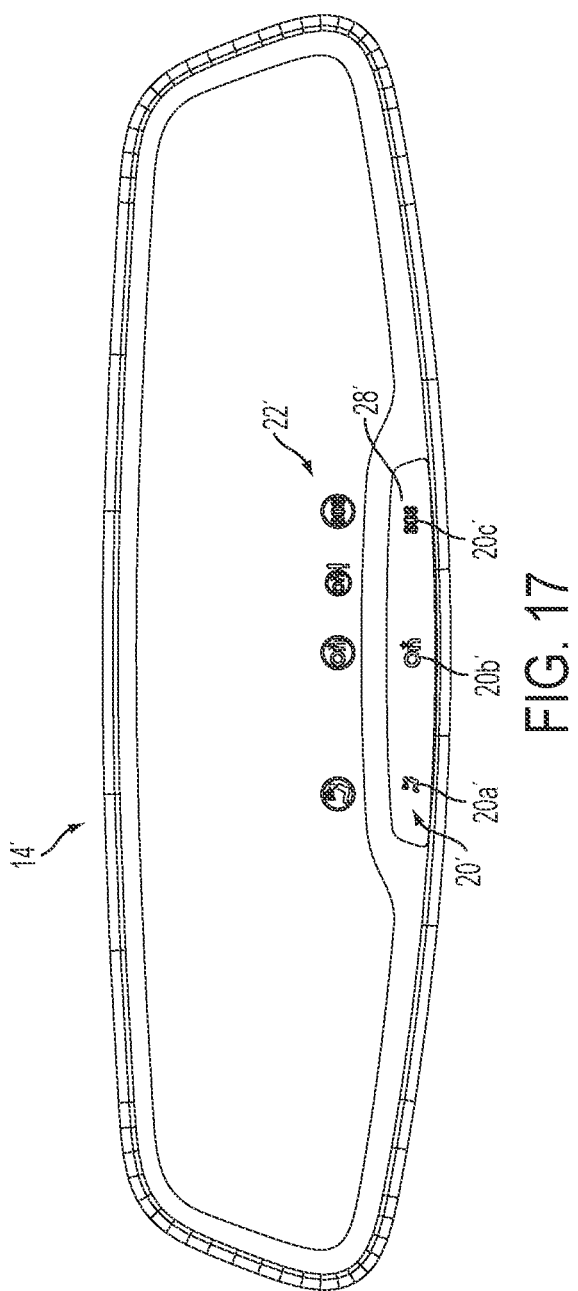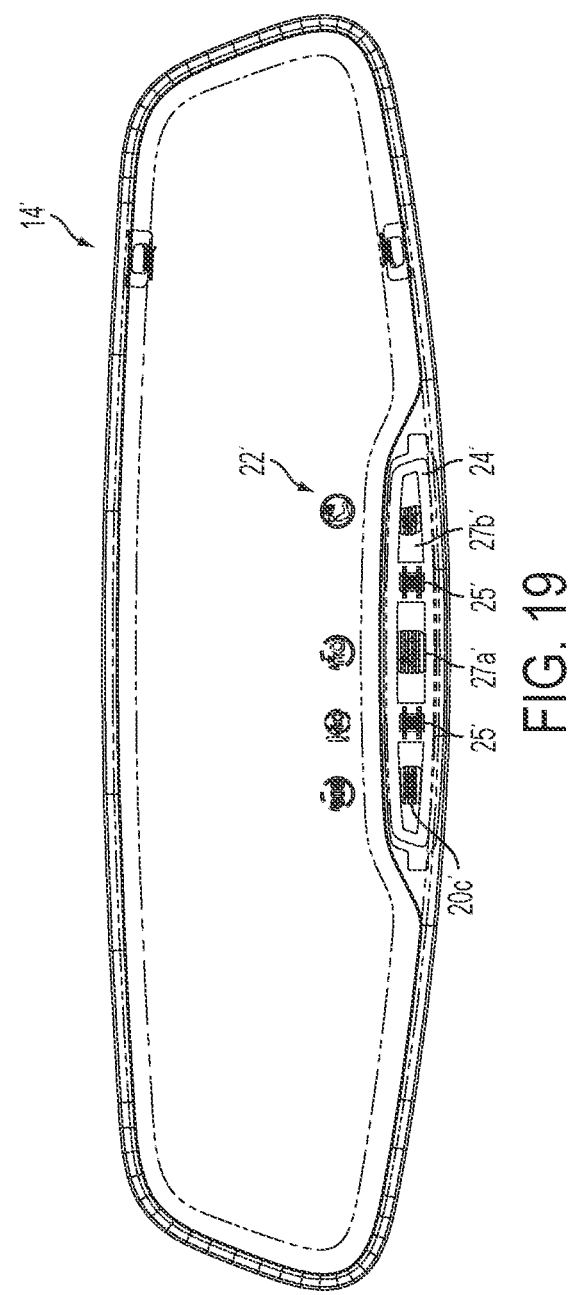

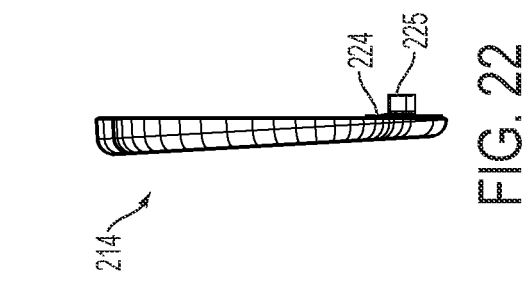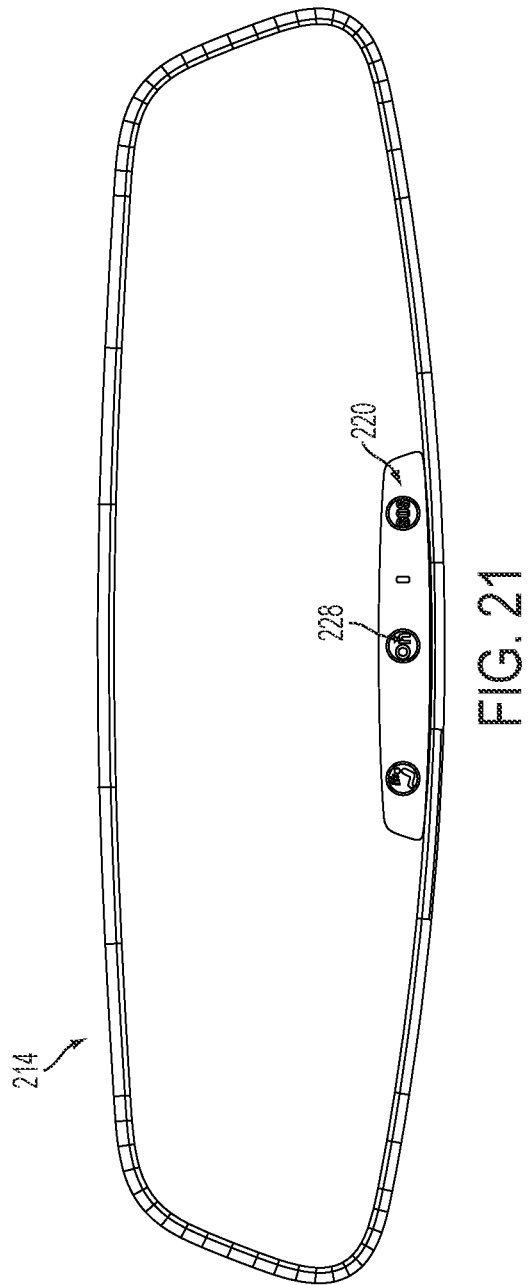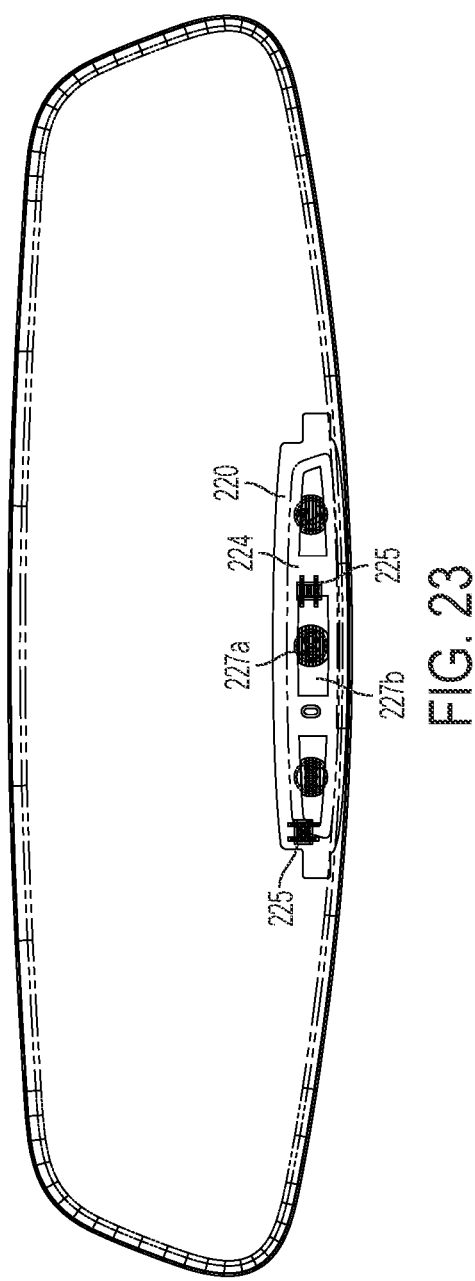

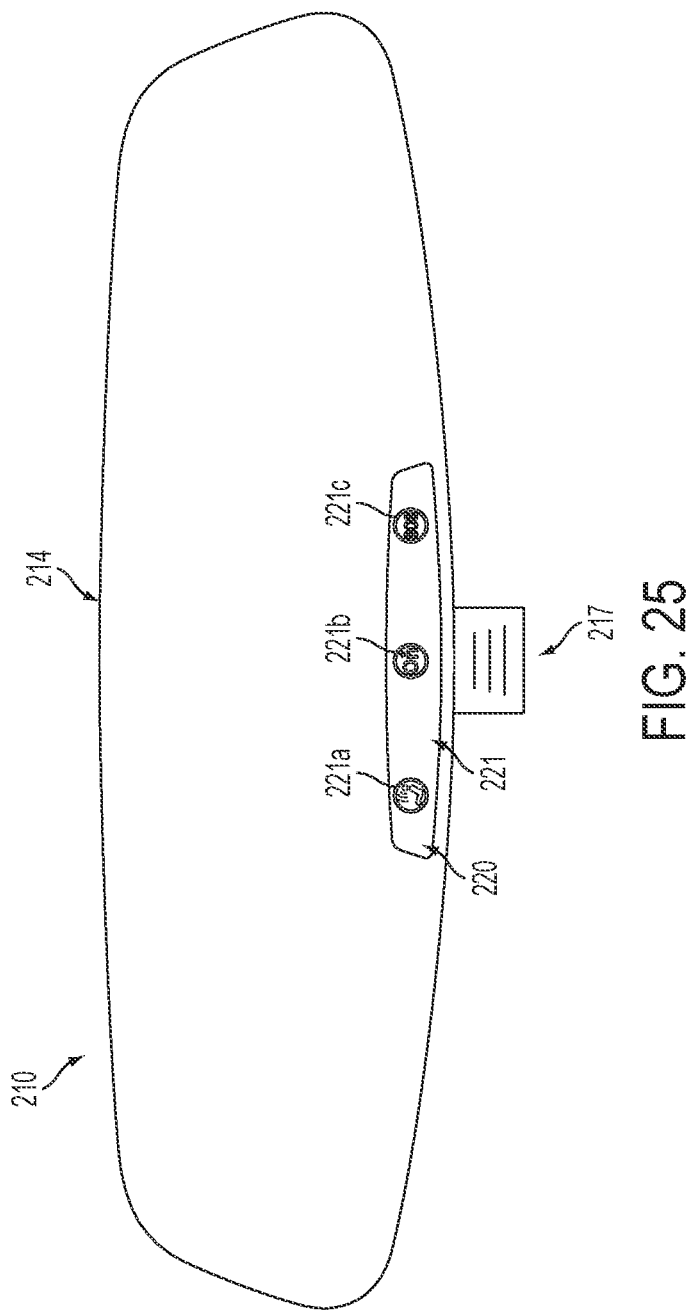

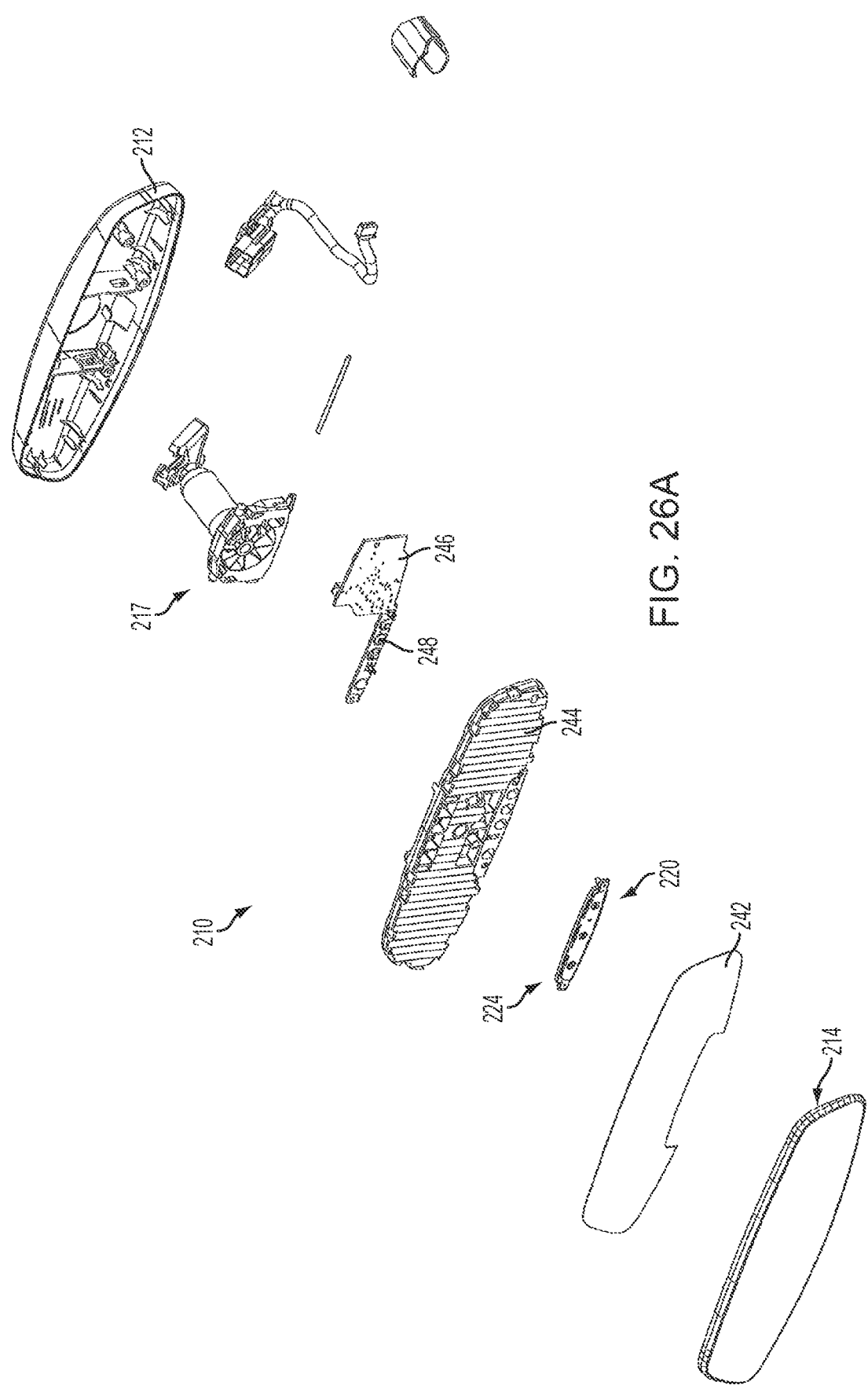

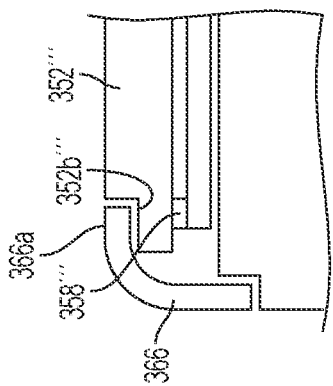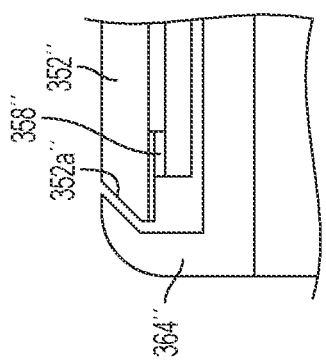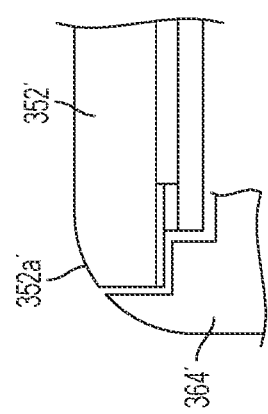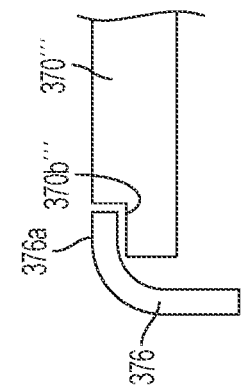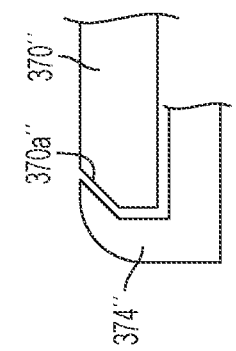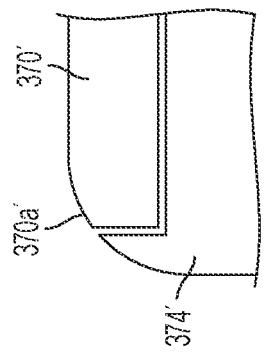

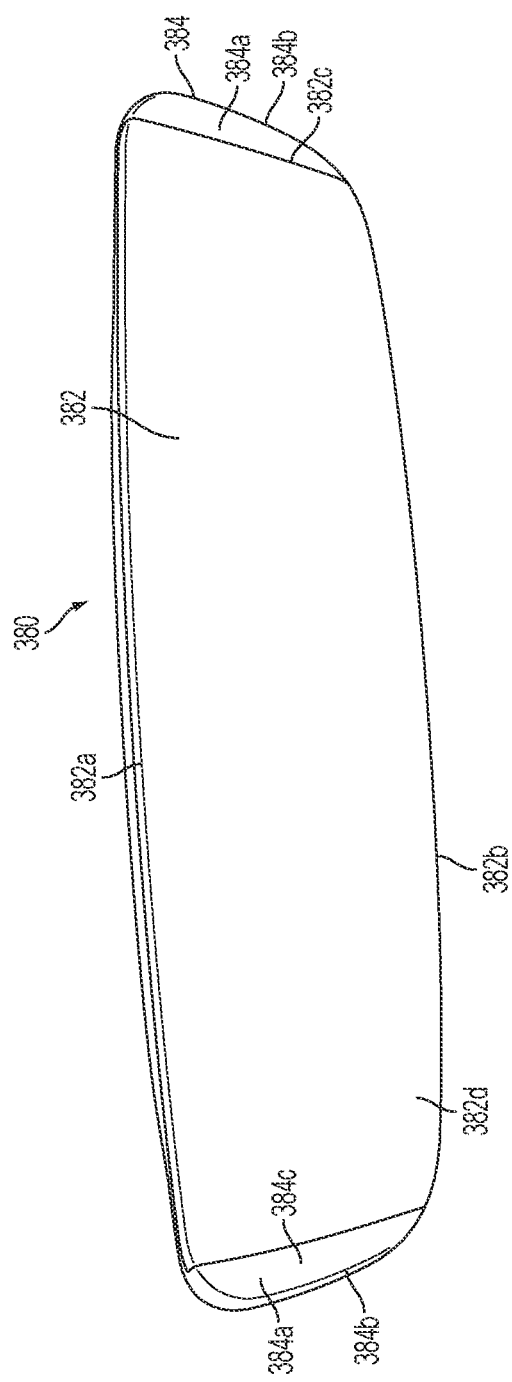
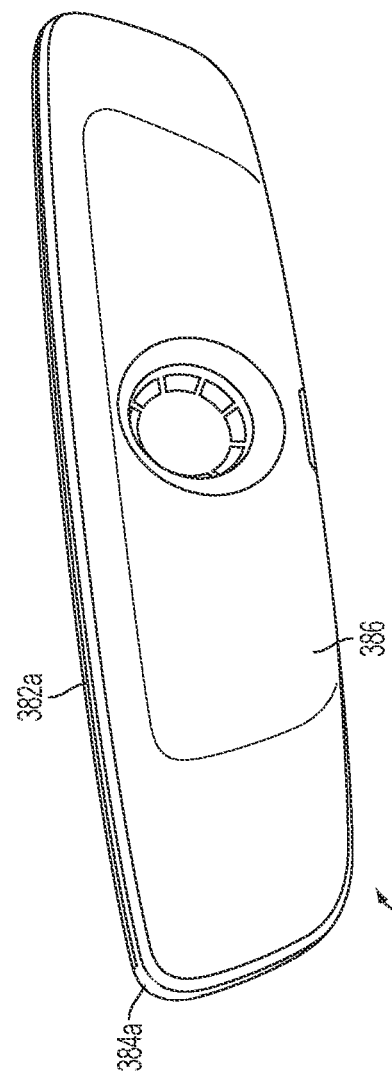
FIG. 41A
FIG. 41B

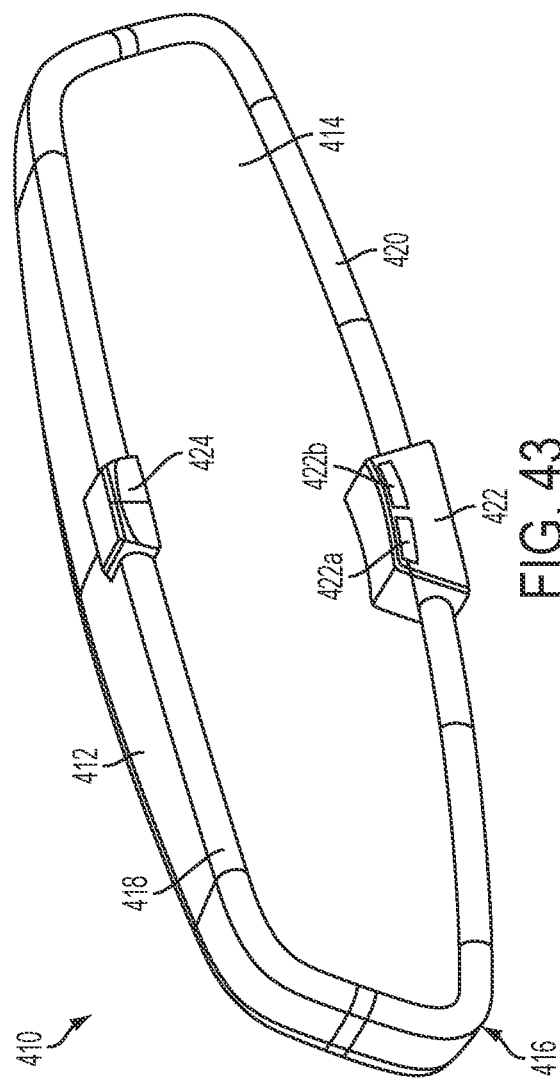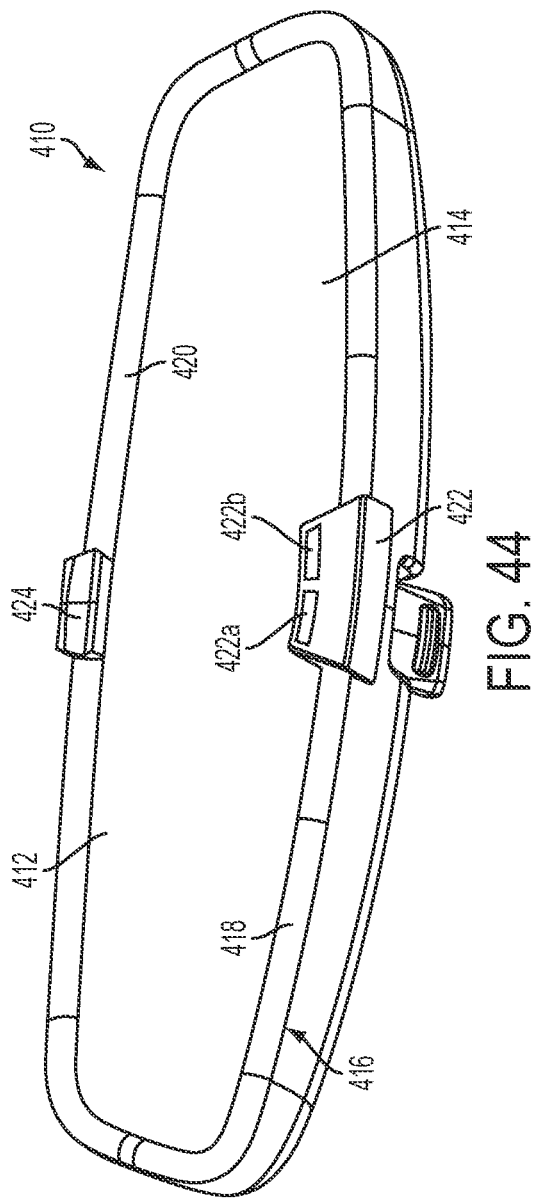

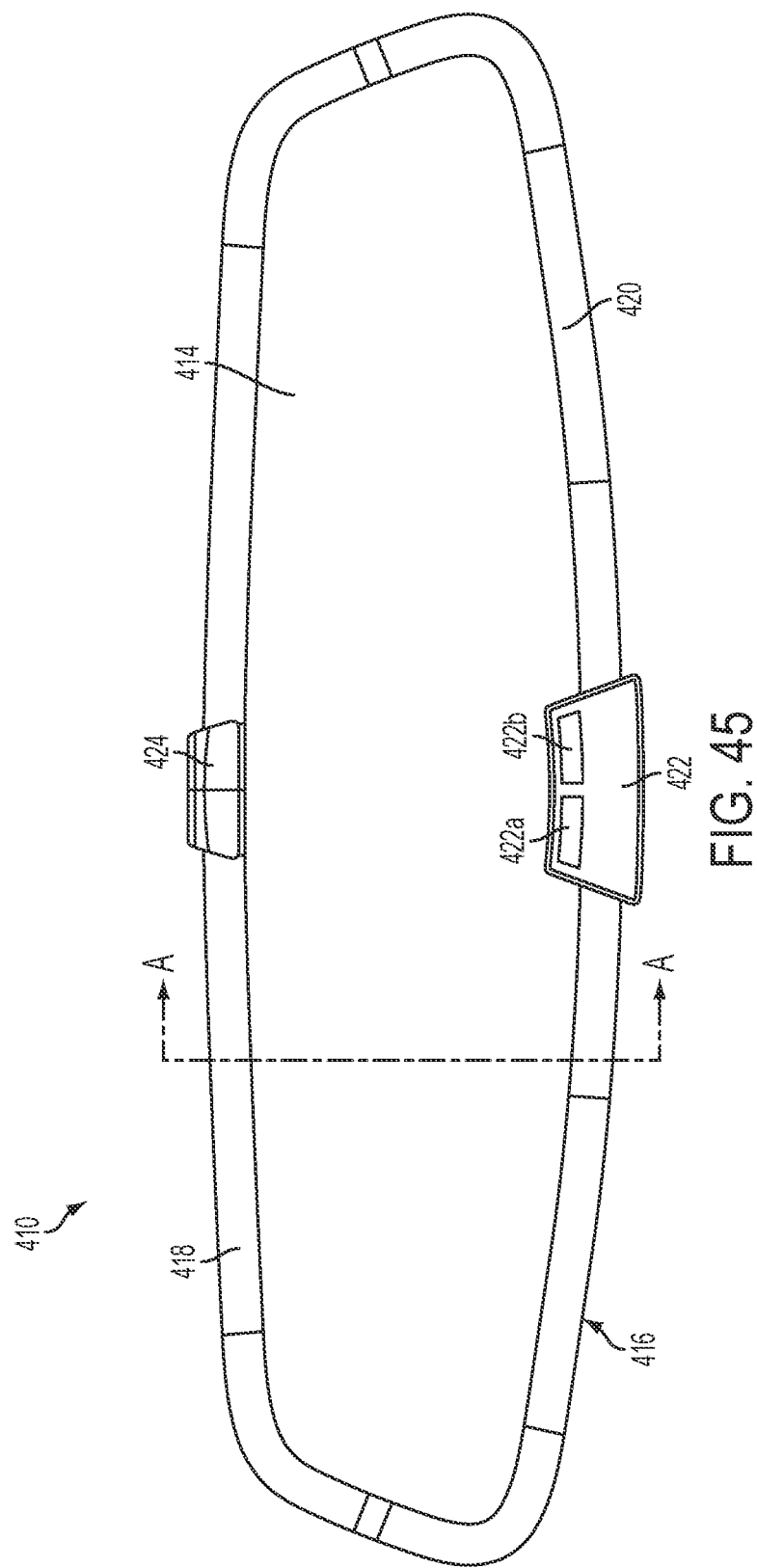

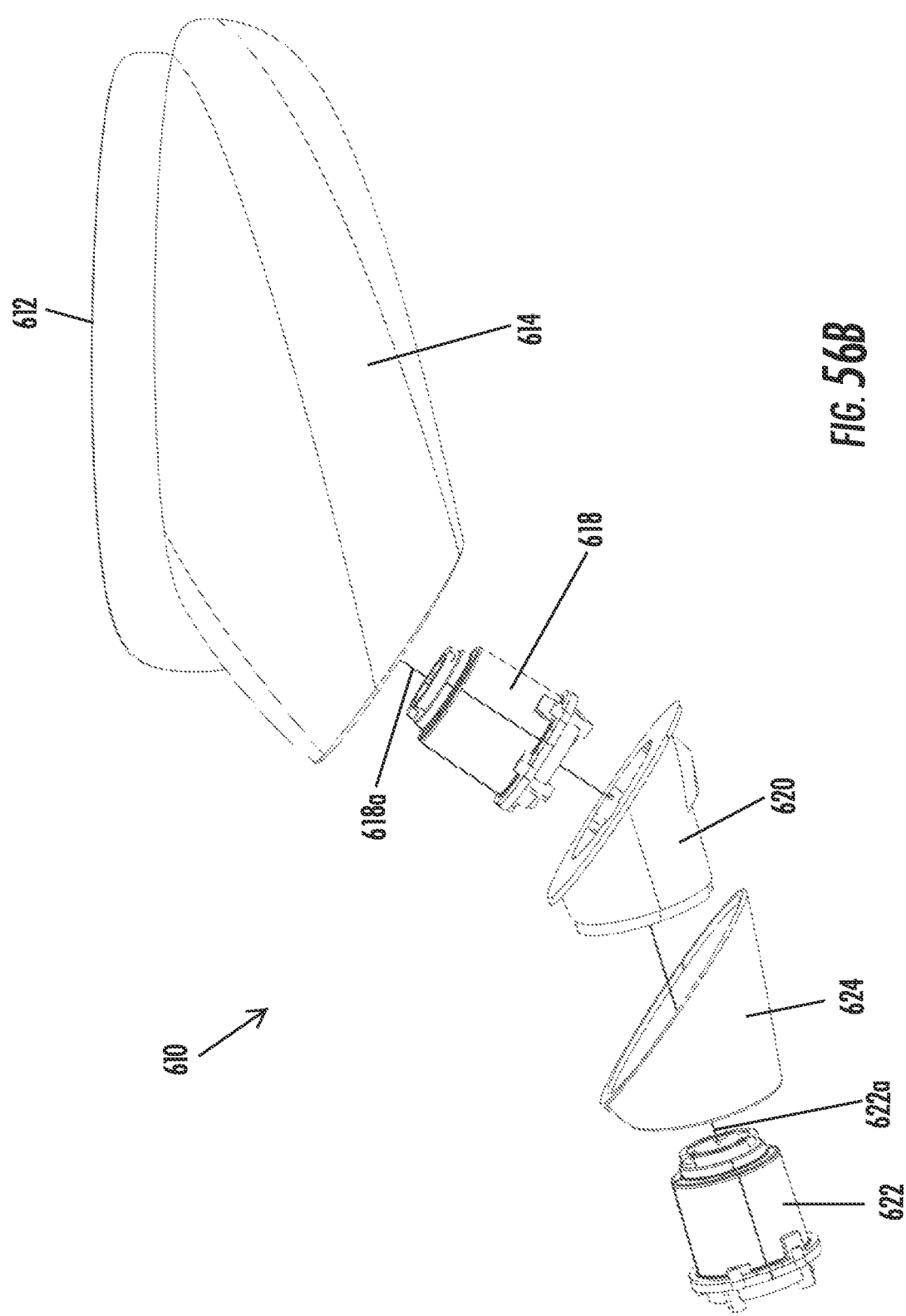

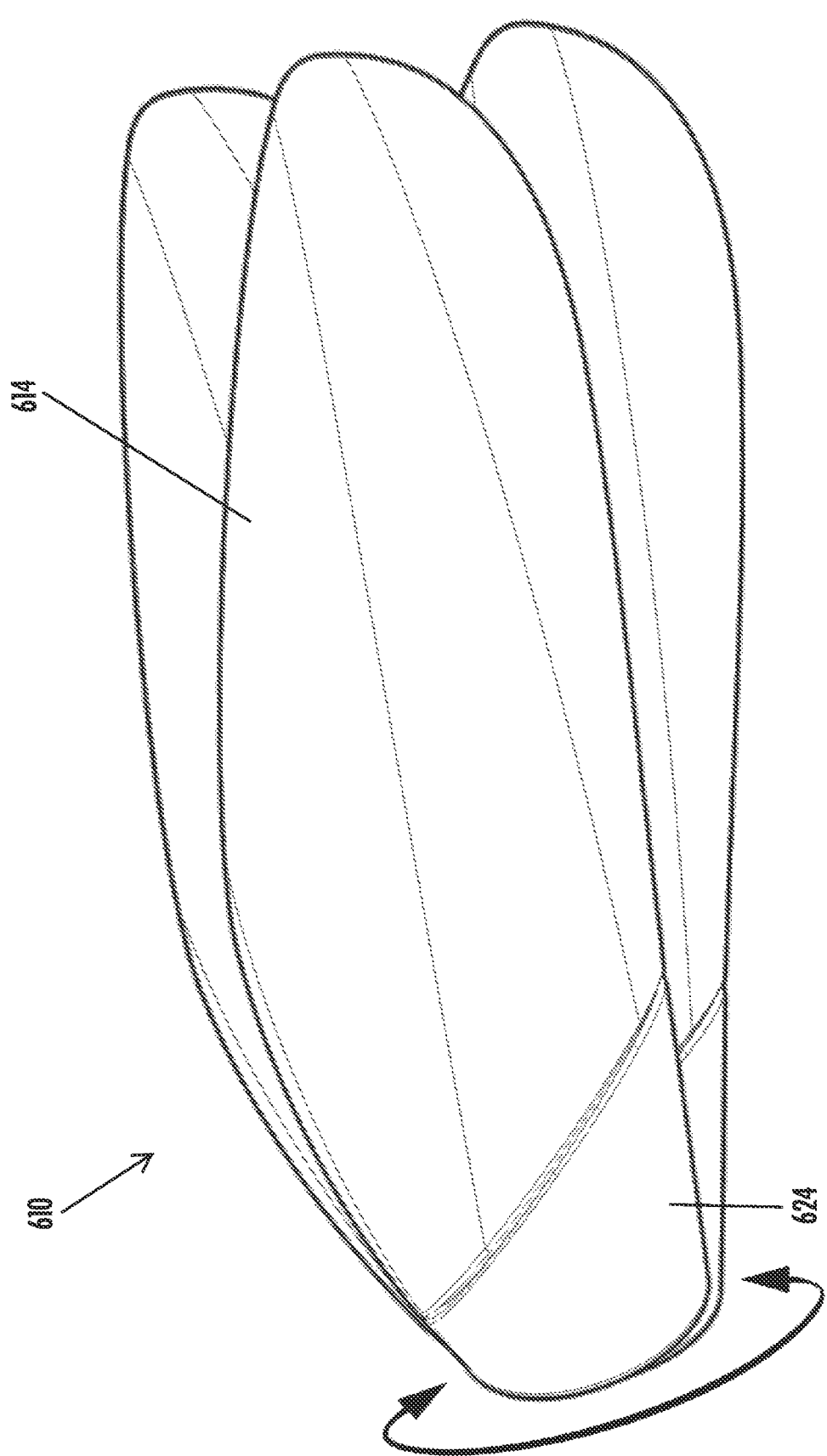
FIG. 57 +/-15 degree tip (only tip actuator required)

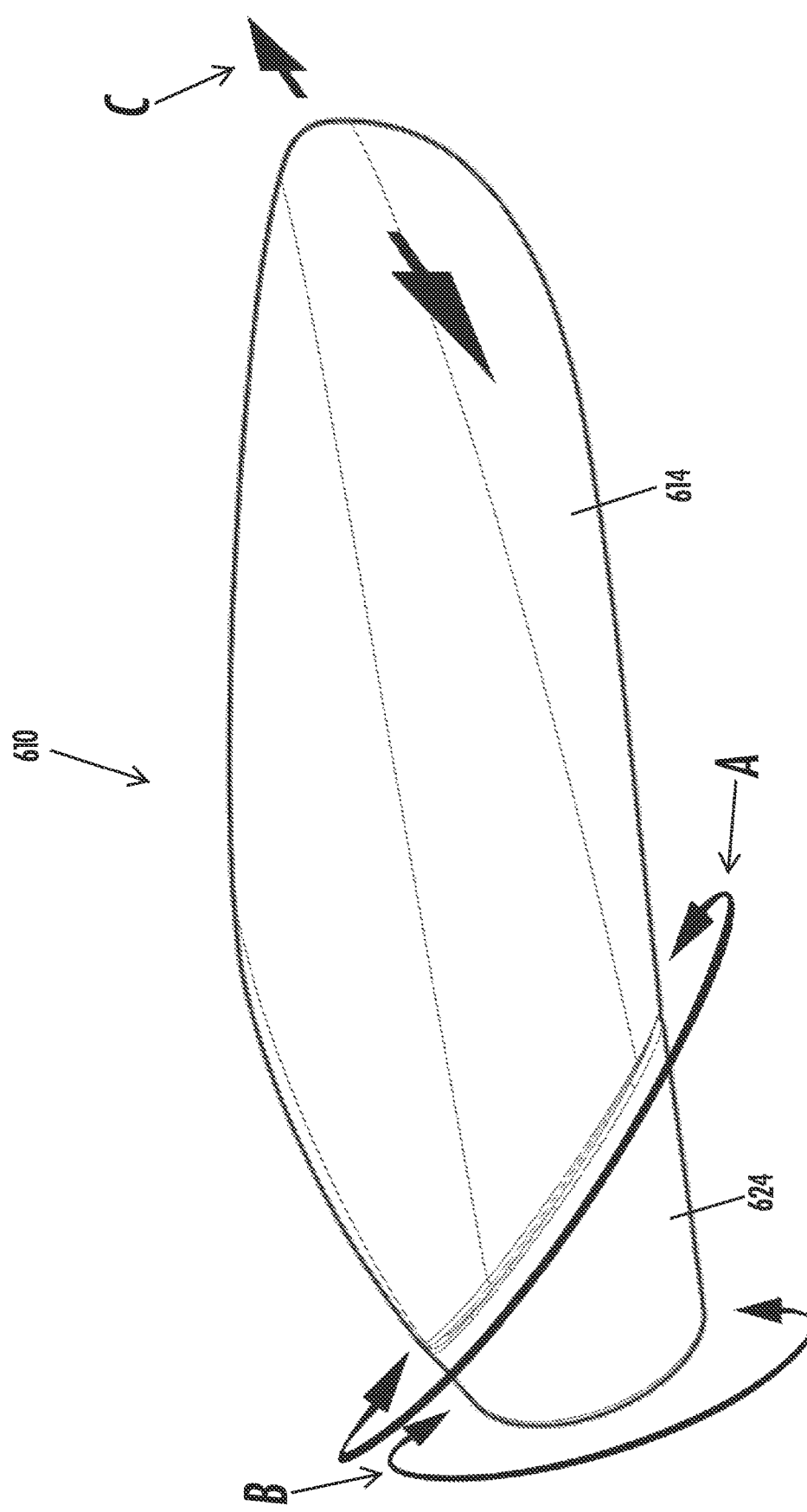
FIG. 58B Horizontal Adjustment - both actuators function together at different speeds to maintain constant tip angle.

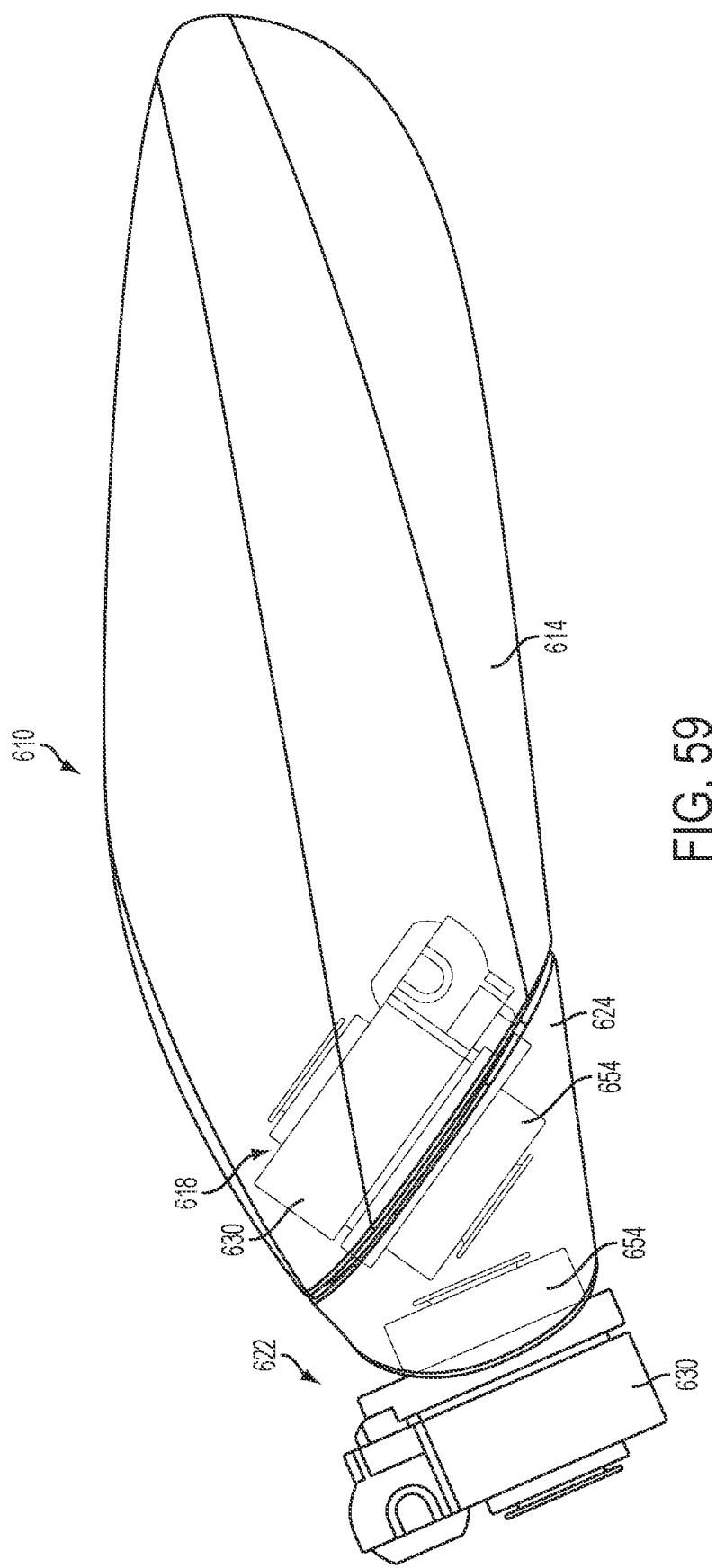

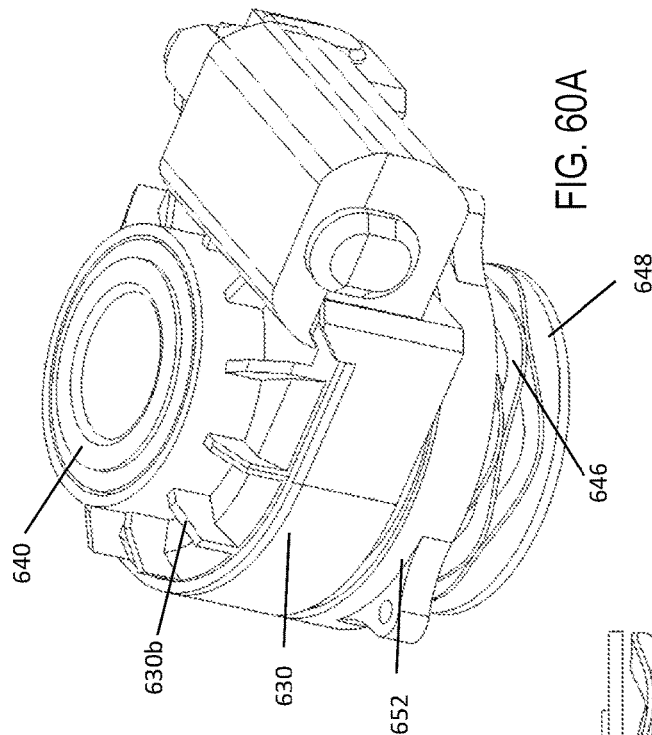
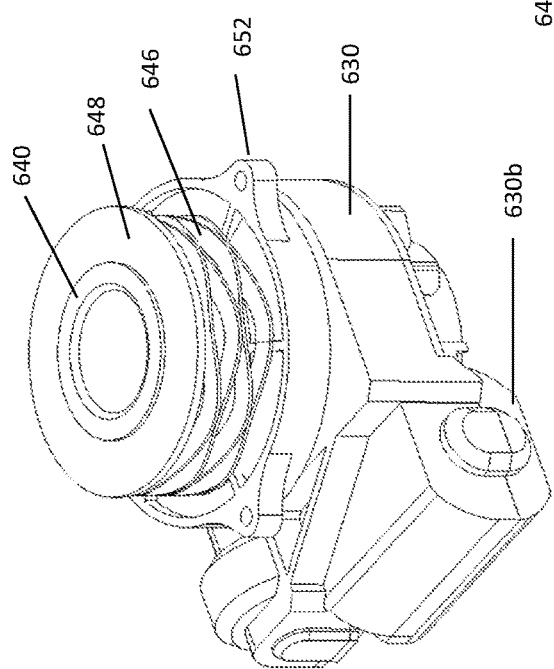
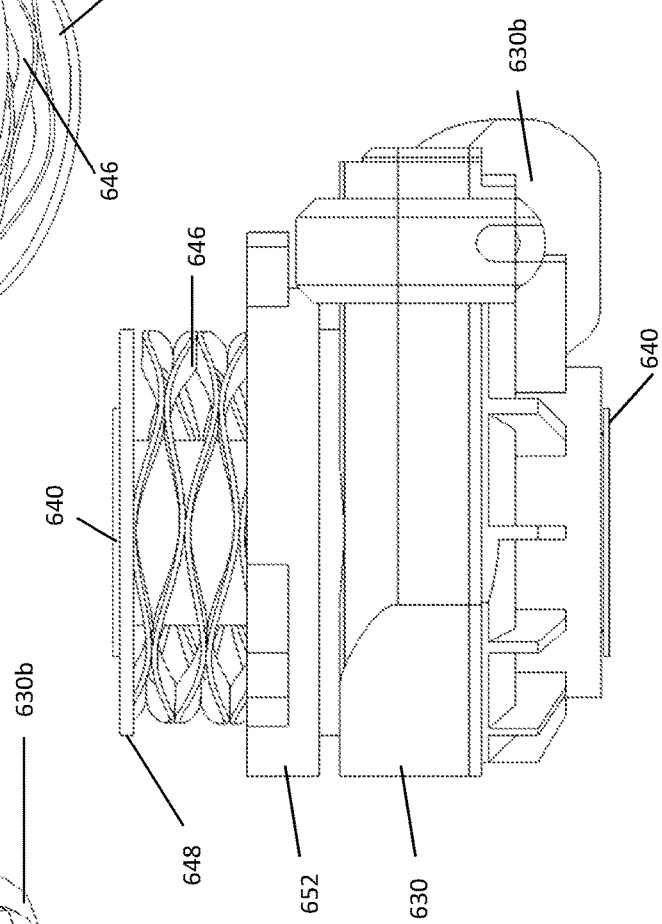
FIG. 60A
FIG. 60B
FIG. 60C

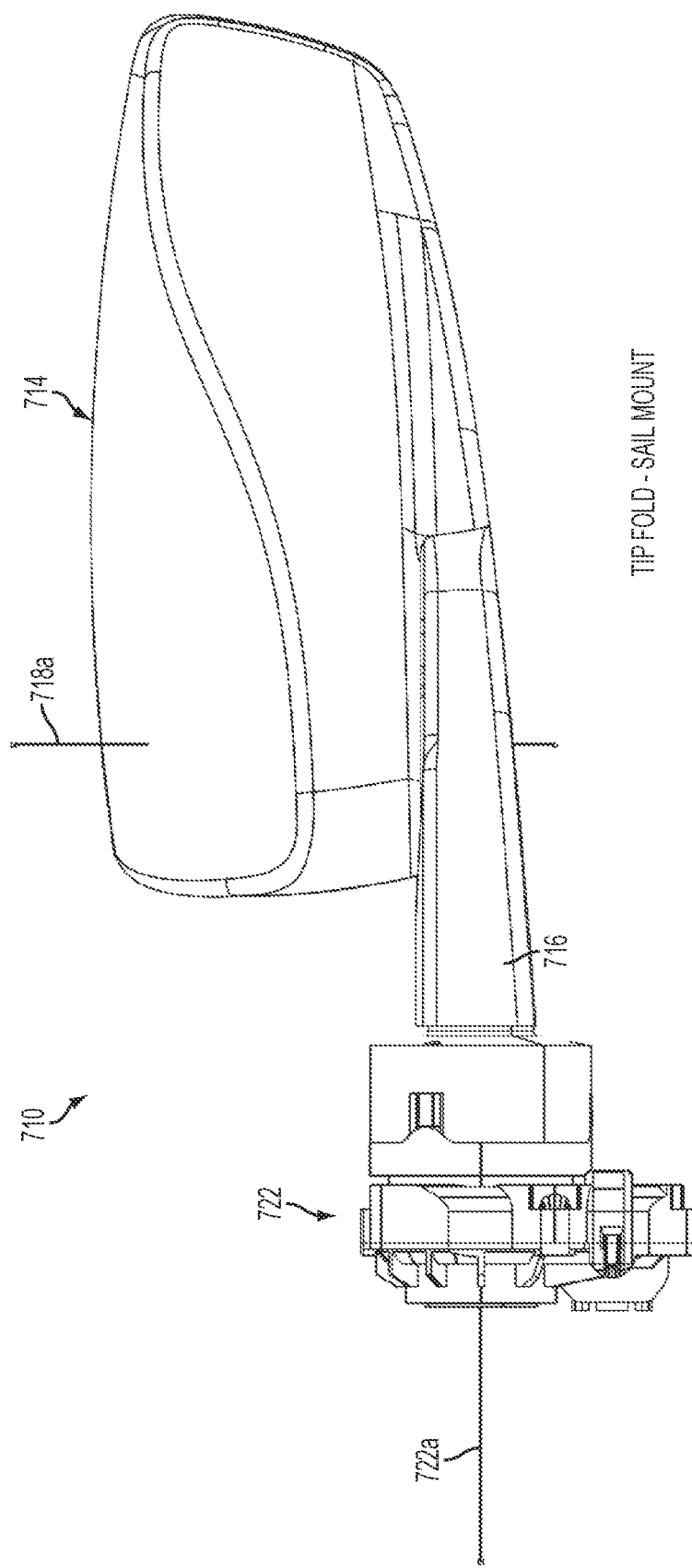

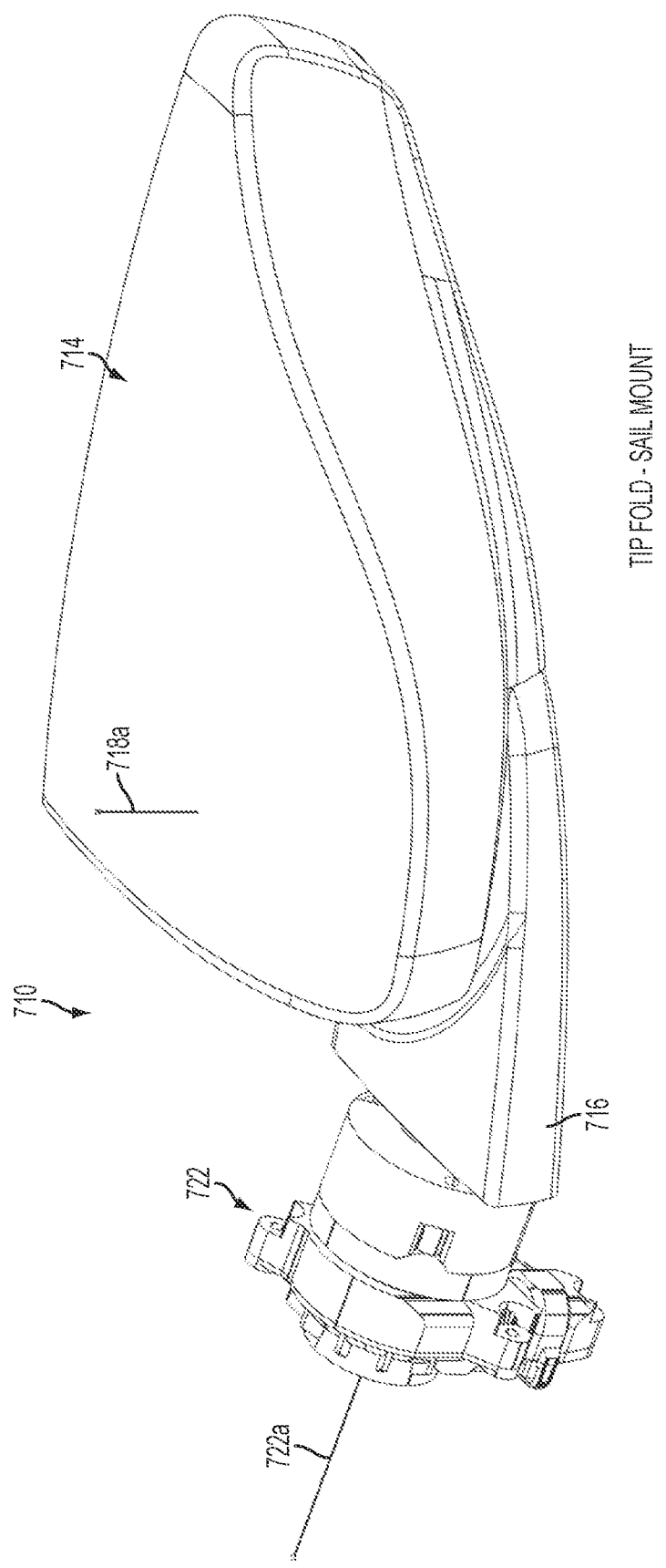

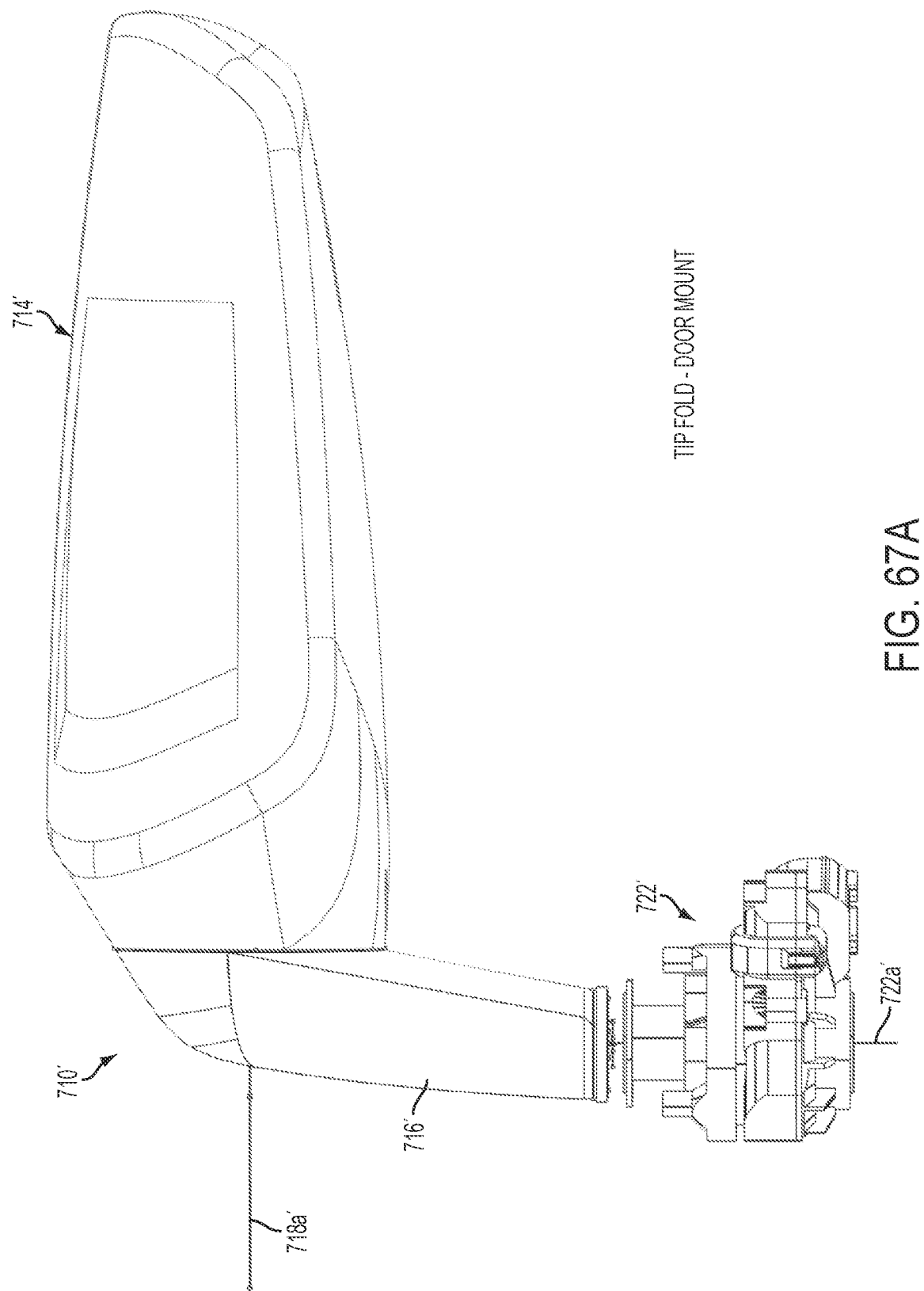

TIP FOLD - DOOR MOUNT

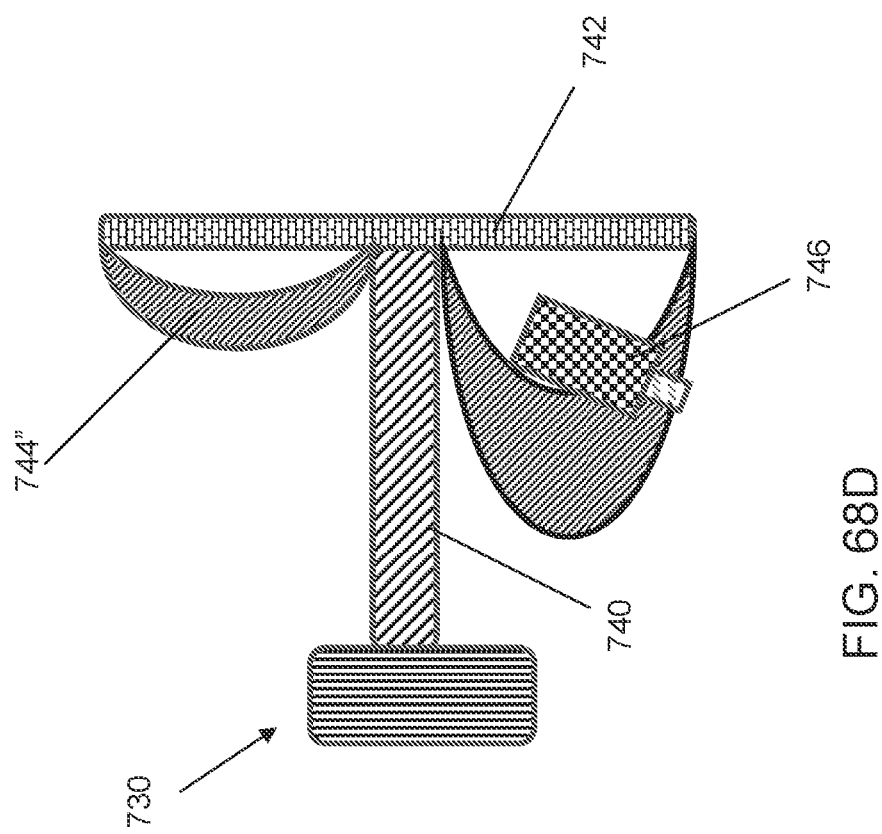

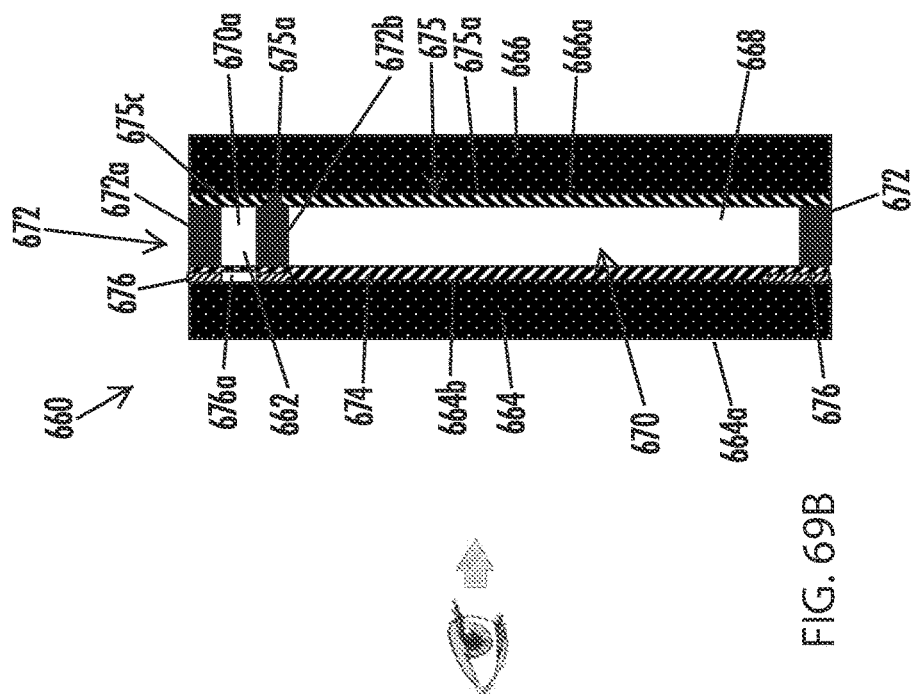
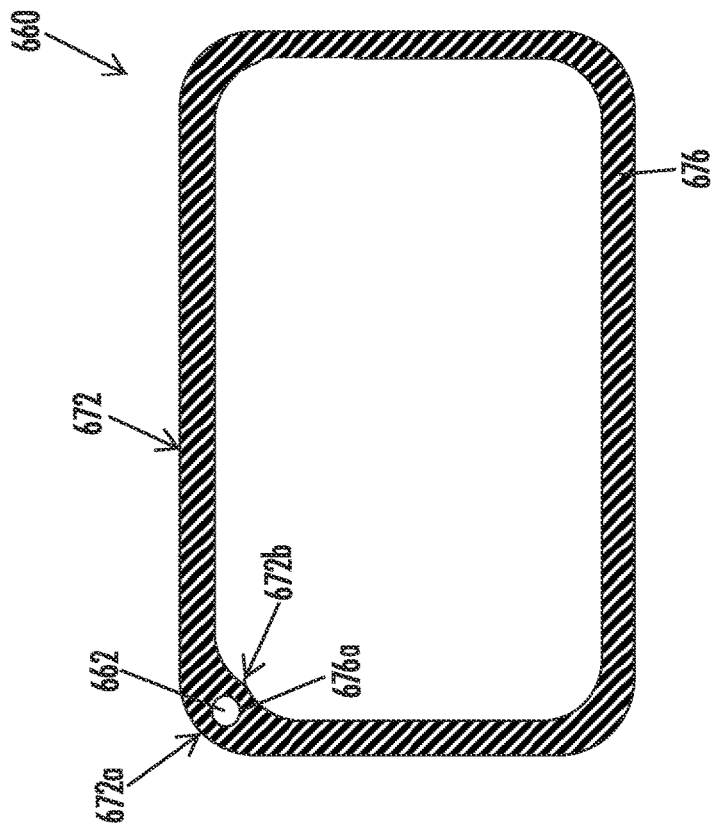
FIG. 69B
FIG. 69A

Test Setup:
- Instron Tensile Tester
- 2 glass supports spaced as shown
- Force applied at midpoint at 30mm/min speed until glass breaks
- Peak force (N) recorded

Test Samples:
- Rear Glass Substrates
- Ground = fully hand seamed (using seaming belt) and ground button area
- Raw = no edge treatment, just cut glass.

Test Data:

| Sample ID | Ground / Raw | Front (3rd) | Back (4th) |
|---|---|---|---|
| GF1 | Ground | 188.2 | |
| GF2 | Ground | 151.0 | |
| GF3 | Ground | 160.5 | |
| GF4 | Ground | 148.1 | |
| GF5 | Ground | 143.9 | |
| GB6 | Ground | | 110.9 |
| GB7 | Ground | | 97.1 |
| GB8 | Ground | | 95.3 |
| GB9 | Ground | | 91.3 |
| GB10 | Ground | | 94.9 |
| RF1 | Raw | 226.6 | |
| RF2 | Raw | 376.0 | |
| RF3 | Raw | 287.7 | |
| RF4 | Raw | 359.5 | |
| RF5 | Raw | 169.1 | |
| RB6 | Raw | | 77.7 |
| RB7 | Raw | | 84.8 |
| RB8 | Raw | | 86.7 |
| RB9 | Raw | | 76.4 |
| RB10 | Raw | | 85.2 |

| Ground / Raw | Scribe position | |
|---|---|---|
| | Front (3rd) | Back (4th) |
| Ground | 158.3 N | 97.9 N |
| Raw | 283.8 N | 82.2 N |

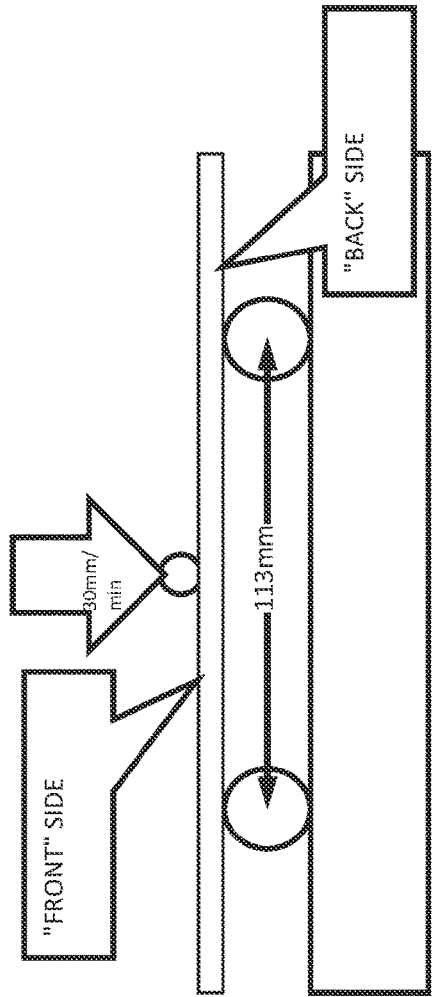

Conclusions:
1. Bend strength is much higher with Raw glass
2. Bend strength is much higher with scribe on Front (3rd surface) side.
3. Seaming increases the strength of the scribed side when on back (4th surface)

FIG. 73

VEHICULAR EXTERIOR REARVIEW MIRROR ASSEMBLY

CROSS REFERENCE TO RELATED APPLICATIONS

The present application is a continuation of U.S. patent application Ser. No. 17/248,625, filed Feb. 1, 2021, now U.S. Pat. No. 11,498,486, which is a continuation of U.S. patent application Ser. No. 16/384,060, filed Apr. 15, 2019, now U.S. Pat. No. 10,906,467, which is a continuation of U.S. patent application Ser. No. 15/161,708, filed May 23, 2016, now U.S. Pat. No. 10,261,648, which is a continuation of U.S. patent application Ser. No. 14/357,025, filed May 8, 2014, now U.S. Pat. No. 9,346,403, which is a 371 national phase filing of PCT Application No. PCT/US2012/064398, filed Nov. 9, 2012, which claims the filing benefit of U.S. provisional applications, Ser. No. 61/705,876, filed Sep. 26, 2012, Ser. No. 61/697,554, filed Sep. 6, 2012, Ser. No. 61/665,509, filed Jun. 28, 2012, Ser. No. 61/664,438, filed Jun. 26, 2012, Ser. No. 61/647,179, filed May 15, 2012, Ser. No. 61/614,877, filed Mar. 23, 2012, Ser. No. 61/601,756, filed Feb. 22, 2012, Ser. No. 61/590,578, filed Jan. 25, 2012, Ser. No. 61/565,541, filed Dec. 1, 2011, and/or Ser. No. 61/558,623, filed Nov. 11, 2011, which are hereby incorporated herein by reference in their entireties. And U.S. patent application Ser. No. 14/357,025 is a continuation-in-part of U.S. patent application Ser. No. 13/879,481, filed Apr. 15, 2013, which is a 371 national phase entry of PCT Application No. PCT/US2011/056295, filed Oct. 14, 2011, which claims the filing benefits of U.S. provisional applications, Ser. No. 61/490,375, filed May 26, 2011, Ser. No. 61/452,789, filed Mar. 15, 2011, Ser. No. 61/449,364, filed Mar. 4, 2011, Ser. No. 61/448,916, filed Mar. 3, 2011, Ser. No. 61/409,346, filed Nov. 2, 2010, and Ser. No. 61/393,407, filed Oct. 15, 2010. And U.S. patent application Ser. No. 14/357,025 is a continuation-in-part of U.S. patent application Ser. No. 13/498,597, filed Mar. 28, 2012, now U.S. Pat. No. 8,730,553, which is a 371 national phase application of PCT Application No. PCT/US2010/051741, filed Oct. 7, 2010, which claims the benefit of U.S. provisional applications, Ser. No. 61/261,839, filed Nov. 17, 2009, and Ser. No. 61/249,300, filed Oct. 7, 2009.

FIELD OF THE INVENTION

The present invention relates generally to the field of rearview mirror assemblies for vehicles and, more particularly, to an interior rearview mirror assembly that has user inputs, such as for a telematics system or the like.

BACKGROUND OF THE INVENTION

Typically, an interior rearview mirror assembly may include user inputs, such as buttons or the like, at a mirror bezel portion of the mirror casing, whereby actuation of the user inputs activates or adjusts or controls a telematics feature, such as a hands free telephone feature or the like.

SUMMARY OF THE INVENTION

The present invention provides an interior rearview mirror assembly that includes user inputs or touch or proximity sensors disposed behind the reflective element of the mirror assembly and operable to sense the presence of a user's finger at or near the front surface of the reflective element and in the vicinity of the touch or proximity sensor. The touch sensor comprises a backlit sensor element that comprises a plurality of electrically conductive traces disposed or established at a transparent or translucent substrate, with the electrically conductive traces being established as a pattern that allows for light emanating from the backlighting device or element to pass through the sensor for backlighting an icon established in front of the sensor for viewing through the reflective element by a person viewing the mirror assembly when the mirror assembly is normally mounted in a vehicle.

According to an aspect of the present invention, an interior rearview mirror assembly for a vehicle includes a mirror reflective element comprising at least one glass substrate and a mirror reflector established at a surface of the glass substrate. A touch sensor is disposed behind the mirror reflective element and is operable to sense the presence of a person's finger at a touch zone at the front surface of the mirror reflective element and proximate to the touch sensor. An iconistic element or appliqué is disposed in front of the touch sensor and between the touch sensor and the glass substrate of the mirror reflective element. A backlighting device is operable to backlight the touch sensor and the appliqué, and, when backlit, the touch sensor transmits light through a touch sensing element of the touch sensor to backlight the appliqué so that an icon established at the appliqué is backlit and is viewable through the mirror reflective element by a driver of the vehicle when the interior rearview mirror assembly is normally mounted in the vehicle. The touch sensor is substantially light transmissive at least at the touch sensing element.

Optionally, the touch sensing element may comprise a substantially non-light-transmissive electrically conductive trace established at a generally transparent or translucent substrate, with the electrically conductive trace established at the substrate in a manner that allows light emanating from the backlighting device to pass through the substrate and the touch sensing element. For example, the touch sensing element may comprise a patterned electrically conductive trace comprising multiple spaced apart traces and wherein light emanating from the backlighting device passes through gaps between the spaced apart traces to backlight the icons established at the appliqué.

According to another aspect of the present invention, an exterior rearview mirror assembly configured for mounting at an exterior portion of a vehicle includes a base configured for attachment at an exterior portion of a vehicle and a mirror head attached at the base and pivotable relative to the base. The mirror head includes a mirror reflective element. A first actuator is operable to pivot the base relative to the exterior portion of the vehicle about a first pivot axis, and a second actuator operable to pivot the mirror head relative to the base about a second pivot axis. The first and second actuators are cooperatively operable to pivot the base about the first pivot axis and to pivot the mirror head about the second pivot axis to adjust the mirror reflective element relative to the exterior portion of the vehicle to adjust the rearward field of view of a driver of the vehicle. The first and second actuators may be operable at different rotational speeds to adjust the rearward field of view of the driver of the vehicle. The first and second pivot axes may be angled relative to one another at an angle of between about 15 degrees and about 90 degrees.

These and other objects, advantages, purposes and features of the present invention will become apparent upon review of the following specification in conjunction with the drawings.

BRIEF DESCRIPTION OF THE DRAWINGS

FIG. 1 is a front elevation of a mirror reflective element assembly in accordance with the present invention;

FIG. 2 is another front elevation of the mirror reflective element assembly of FIG. 1;

FIG. 3 is a front elevation of a mirror reflective element assembly of the present invention, showing the perimeter seal in phantom;

FIG. 4A is a side elevation of the mirror reflective element assembly of FIG. 3;

FIG. 4B is a sectional view of the mirror reflective element assembly taken along the line B-B in FIG. 3;

FIG. 6A is an exploded perspective view of a mirror assembly of the present invention;

FIG. 6B is another exploded perspective view of the mirror assembly of FIG. 6A;

FIG. 13 is a front elevation of another mirror reflective element assembly in accordance with the present invention;

FIG. 14 is another front elevation of the mirror reflective element assembly of the present invention, shown with the icons and sensors backlit;

FIG. 15 is a plan view of another touch sensor circuit of the present invention;

FIGS. 15A, 15B and 15C are enlarged plan views of the respective areas A, B and C of FIG. 15;

FIG. 16 is a plan view of another touch sensor circuit of the present invention;

FIGS. 16A, 16B and 16C are enlarged plan views of the respective areas A, B and C of FIG. 16;

FIGS. 17-19 are front, side and rear elevations of another electrochromic reflective element assembly of the present invention;

FIGS. 21-23 are front, side and rear elevations of another prismatic reflective element assembly of the present invention;

FIG. 25 is a front elevation of a prismatic mirror reflective element assembly in accordance with the present invention;

FIG. 26A is an exploded perspective view of a prismatic mirror assembly having the prismatic mirror reflective element assembly of FIG. 25;

FIGS. 30-39 are sectional views of mirror assemblies showing beveled glass and/or bezels at the perimeter of the reflective elements in accordance with the present invention;

FIG. 41A is a front perspective view of an interior rearview mirror assembly with an attachment element that is exposed at side regions of the reflective element in accordance with the present invention;

FIG. 41B is a rear perspective view of the mirror assembly of FIG. 41A;

FIG. 43 is a perspective view of another interior rearview mirror assembly, shown with a perimeter lighting feature in accordance with the present invention;

FIG. 44 is another perspective view of the mirror assembly of FIG. 43;

FIG. 45 a front elevation of the mirror assembly of FIG. 43;

FIGS. 56A and 56B are exploded perspective views of the exterior rearview mirror assembly of FIG. 56;

FIG. 57 is a rear perspective view of the exterior rearview mirror assembly of FIG. 56, showing the tip/tilt of the mirror head via pivotal movement about a second pivot axis of the mirror assembly;

FIG. 58B is a rear perspective view of the exterior rearview mirror assembly of FIG. 56, showing the rotation of the mirror head via pivotal movement about the first and second pivot axes of the mirror assembly, in order to laterally adjust the rearward field of view of the mirror reflective element while limiting vertical adjustment of the rearward field of view of the mirror reflective element;

FIG. 59 is a plan view of an exterior rearview mirror assembly that incorporates two actuators in accordance with the present invention;

FIGS. 60A-C are perspective views of an actuator for the exterior rearview mirror assembly of FIG. 59;

FIGS. 66A-D are views of another exterior rearview mirror assembly in accordance with the present invention;

FIGS. 67A-D are views of another exterior rearview mirror assembly in accordance with the present invention;

FIG. 68D is a side view schematic of another exterior rearview mirror system of the present invention;

FIG. 69A is a plan view of an exterior rearview mirror assembly with an indicator established thereat in accordance with the present invention;

FIG. 69B is a sectional view of the exterior rearview mirror assembly of FIG. 69A;

FIG. 73 is a table and diagram of a bend strength test and test results of such testing on mirror substrates formed in accordance with the present invention;

DESCRIPTION OF THE PREFERRED EMBODIMENTS

Figure 5:
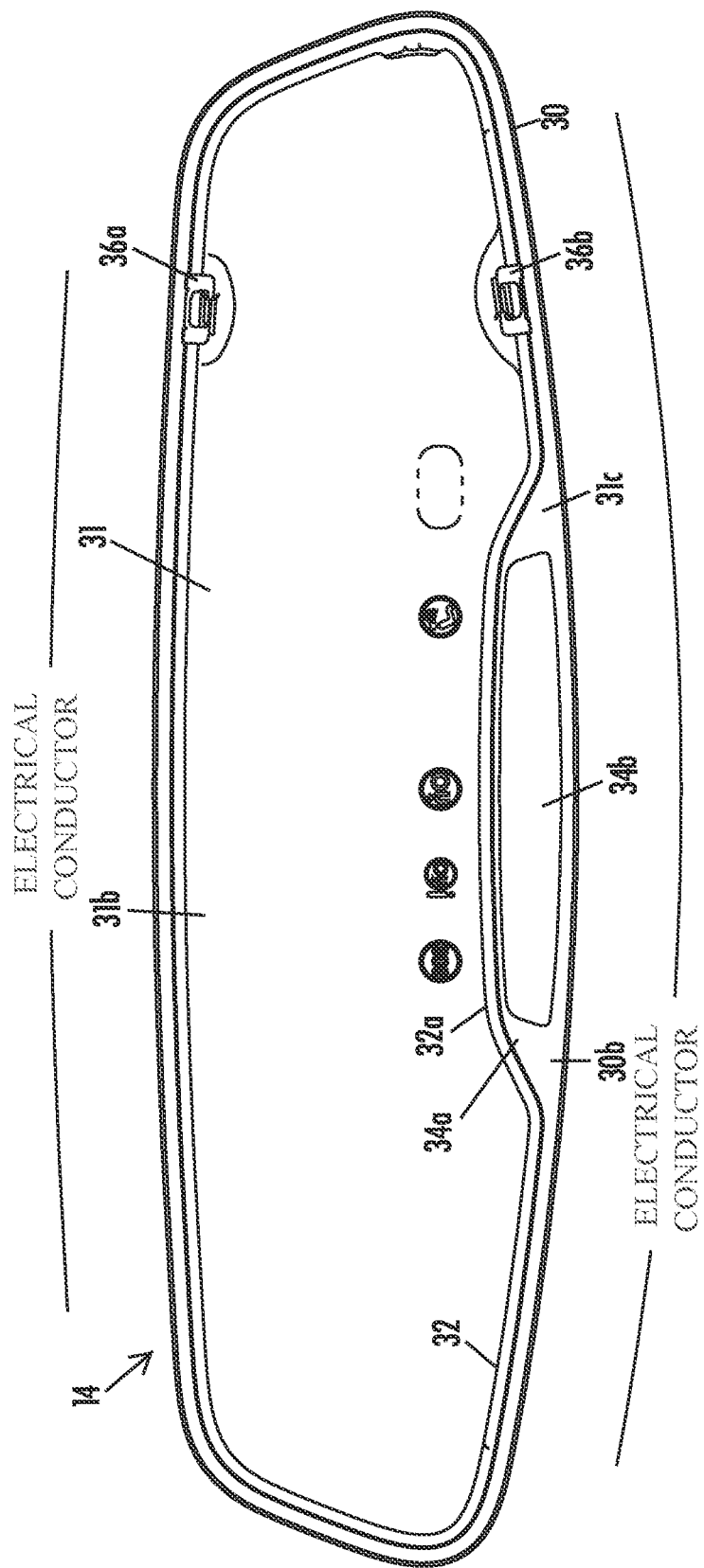
FIG. 5 is a rear elevation of the mirror reflective element assembly of FIG. 3.

Referring now to the drawings and the illustrative embodiments depicted therein, an interior rearview mirror assembly 10 for a vehicle includes a reflective element 14 positioned at a front portion of a mirror housing or casing 12 (FIGS. 1-6). Mirror assembly 10 is adjustably mounted to an interior portion of a vehicle (such as to an interior surface of a vehicle windshield or a headliner of a vehicle or the like) via a mounting structure or mounting configuration or assembly 18. The mirror assembly 10 includes touch or proximity sensitive user inputs 20 and associated icons or the like so a user can readily identify the purpose or function of the user inputs and actuate the appropriate or desired or selected user input. In the illustrated embodiment, the user inputs 20 are disposed at a lower region of the mirror reflective element 14, with indicators or icons 22 at an area above the respective inputs (and at the principal reflecting portion of the reflective element), so that, when a user touches or actuates one of the user inputs 20, the respective icon 22 is backlit so as to be illuminated for viewing by the user through the reflective element to confirm to the user that the input was actuated (optionally, the mirror assembly may provide a haptic feedback, such as a vibration or the like, to indicate to the user that a user input was touched or activated). The reflective element assembly and user inputs and icons may utilize aspects of the mirror assemblies shown and/or described in U.S. Des. Pat. Nos. D633,423; D633,019; D638,761 and/or D647,017, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. Pat. Nos. 7,253,723 and/or 8,154,418, which are hereby incorporated herein by reference in their entireties. As shown in FIGS. 6A-11, the user inputs 20 comprise a circuit pad 24 with substantially non-light-transmissive electrically conductive traces 26 established at the circuit pad for sensing a touch or proximity at the sensor or input. As shown in FIGS. 8-11, the electrically conductive traces 26 are established at each touch input area or region 21a, 21b, 21c in a manner that allows light to pass through the touch pad and touch sensor areas to backlight icons at an appliqué 28 disposed over or at or in front of the circuit pad 24, as discussed below.

In the illustrated embodiment, the user input circuit pad 24 is disposed at a lower region of the reflective element and is positioned or located at an area that is devoid of any metallic mirror reflector coatings or the like at the mirror substrate or substrates. In the illustrated embodiment, the reflective element 14 comprises an electro-optic reflective element, such as an electrochromic reflective element, and includes a front substrate 30 having a front or first surface 30a (the surface that generally faces the driver of a vehicle when the mirror assembly is normally mounted in the vehicle) and a rear or second surface 30b opposite the front surface 30a, and a rear substrate 31 having a front or third surface 31a and a rear or fourth surface 31b opposite the front surface 31a, with an electro-optic medium disposed between the second surface 30b and the third surface 31a and bounded by a perimeter seal 32 of the reflective element (such as is known in the electrochromic mirror art). The second surface 30a of front substrate 30 has a transparent electrically conductive coating established thereat, while the third surface 31a of rear substrate 31 has a metallic reflector coating established thereat. The mirror reflector may comprise any suitable coatings or layers, such as a transflective coating or layer, such as described in U.S. Pat. Nos. 7,626, 749; 7,274,501; 7,255,451; 7,195,381; 7,184,190; 6,690, 268; 5,140,455; 5,151,816; 6,178,034; 6,154,306; 6,002, 544; 5,567,360; 5,525,264; 5,610,756; 5,406,414; 5,253, 109; 5,076,673; 5,073,012; 5,117,346; 5,724,187; 5,668, 663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

For example, the coating may comprise ruthenium or chromium or aluminum or aluminum alloy materials or the like. Optionally, the coatings may be sputter deposited on the substrate surface via a target. Typically, when the targets are expended, ruthenium is repressed onto the target (to save recycling costs) rather than regrinding the expended base of the target. Optionally, the targets may comprise chromium bases instead of ruthenium bases to reduce the inventory carrying costs of the targets. Thus, the target may comprise a low cost base material (such as chromium or the like), with a higher cost material (such as ruthenium or the like) pressed onto the base, so that the target uses less of the high cost material and thus ties up a reduced amount of high cost material in the mirror manufacturer's inventory.

Figure 28:
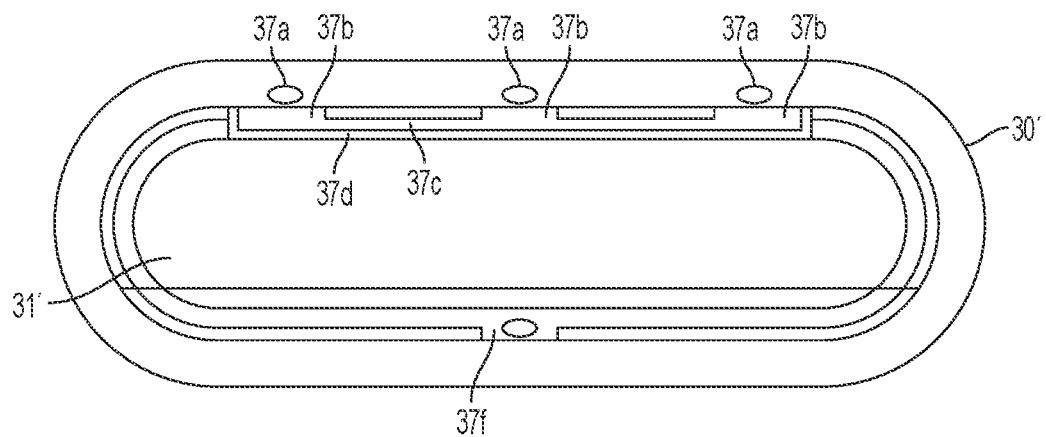
FIG. 28 is a plan view of another reflective element assembly of the present invention, showing an optional busbar configuration for electrically powering the second and third surface coatings.
Figure 29:
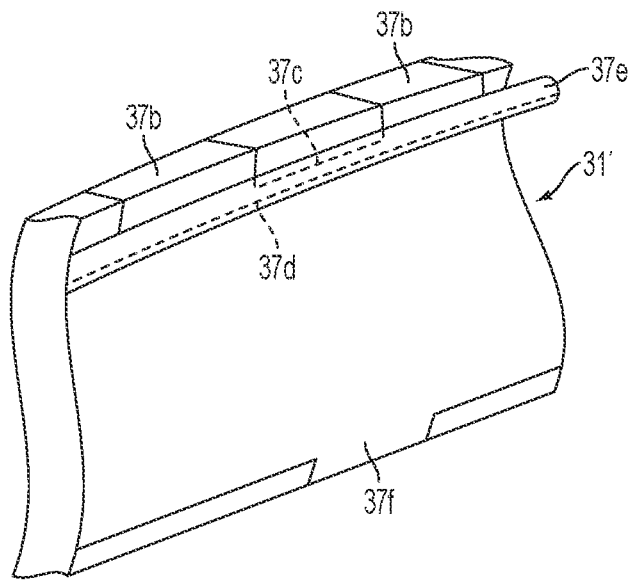
FIG. 29 is a perspective and partial sectional view of the reflective element assembly of FIG. 28.
Figure 31:
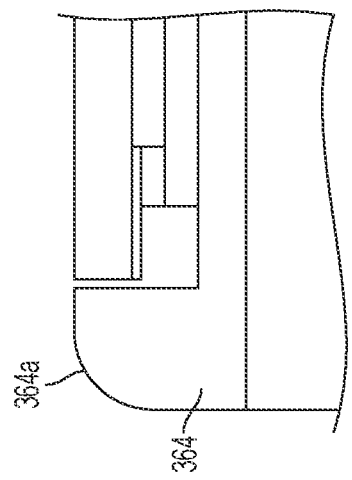
Figure 36:
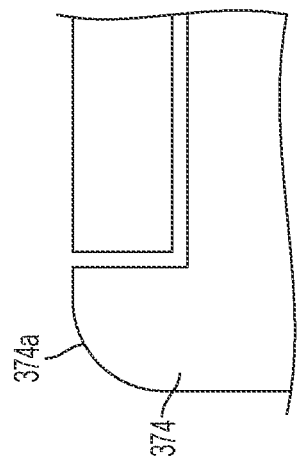

As shown in FIG. 5, electrical connections 36a, 36b may be established at connection areas to provide electrical connection to busbars or electrically conductive traces at a respective one of the front and rear substrates to provide electrical current to the electrically conductive coatings at the rear surface of the front substrate and the front surface of the rear substrate for powering and dimming or varying the reflectance of the reflective element. Optionally, for example, and with reference to FIGS. 28 and 29, two or more (such as three or more) conductive epoxy patches 37a may be disposed along an upper (or lower) perimeter region of the reflective element to facilitate connection of solderless clips to provide electrical power to the transparent conductive coating at the second surface (the rear surface of the front substrate 30') of the reflective element. The clips may be connected to tabs 37b established at a conductive busbar 37c at the rear substrate (such as by laser ablating an isolation line 37d through the conductive coating or coatings at the rear substrate, such as at the front or third surface of the rear substrate 31', and so that the isolation line is disposed at and along the perimeter seal 37e of the reflective element) so that the clips are spaced apart and electrically connected to an electrically conductive busbar 37c to provide electrical power to the second surface conductive coating and to reduce the conductive epoxy required to provide sufficient connectivity and conductivity at the second surface conductive coating. Optionally, another electrical connector or clip may be connected to a tab 37f of the third surface reflector coating to provide electrical power to the third surface conductive coatings at the front surface of the rear substrate.

As can be seen with reference to FIGS. 4B and 5, rear substrate 31 includes a cutout region 31c at its lower generally central region. As also shown in FIGS. 3 and 5, the perimeter seal 32 is established around a perimeter region of the rear substrate (and inboard of the perimeter region of the front substrate so that the front substrate overhangs the perimeter regions of the rear substrate around the reflective element, such as shown in FIGS. 4A and 4B), with a portion 32a of the seal 32 being disposed along the cutout region 31c of rear substrate 31 and thus around or along the upper boundary of the user input area 21 of the reflective element 14. The electro-optic medium thus is disposed within the principal reflecting region of the reflective element and is not disposed at the user input area 21 that is outboard of the perimeter seal. The reflective element 14 includes a perimeter hiding layer or band 34 (such as an opaque or substantially non-light-transmitting metallic layer or band or the like) that is disposed around the perimeter region of the front substrate 30 (such as at the rear surface of the front substrate) to hide or substantially conceal or render covert the perimeter seal 32 from a person viewing the perimeter seal through the front substrate when the reflective element and mirror assembly are normally mounted at a vehicle (such as by utilizing aspects of the mirror assemblies described in U.S. Pat. Nos. 5,066,112; 7,626,749; 7,360,932; 7,274,501; 7,184,190 and/or 7,255,451, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties).

The user input area 21 of the reflective element includes a window 34b established through the perimeter band 34 (such as at a wider or waisted portion 34a of the perimeter band or hiding layer 34) at the rear surface of the front substrate 30 so that the front substrate is substantially devoid of hiding layer or other conductive or metallic layers or coatings at the user input area. Likewise, the rear substrate 31 is cut-away at the user input area 21 so that the user input area is devoid of the rear glass substrate and thus devoid of the conductive mirror reflector coating or coatings. Thus, the user input area is substantially devoid of metallic and/or conductive coatings that may be present elsewhere at the front and rear substrates, such that the conductive coatings of the mirror reflective element are not at the user input area and do not interfere with the touch sensor or circuit pad 24 sensing a touch or presence of a person's finger at the front surface 30a of the front substrate 30 and at one or more of the user inputs 20a, 20b, 20c.

The user inputs or circuitry or switches are disposed behind the reflective element 14 and behind the touch zone 21 (having one or more individual inputs or touch sensors 20a, 20b, 20c disposed behind respective icons 21a, 21b, 21c of appliqué 28), with the user input circuitry or switches, such as touch or proximity sensing circuitry or capacitive switches (such as projection capacitance sensing circuitry or proximity sensing circuitry or capacitive switches or user inputs that utilize aspects of the mirror assemblies described in U.S. Pat. No. 8,154,418, and/or PCT Application No. PCT/US10/51741, filed Oct. 7, 2010 and published Apr. 14, 2011 as International Publication No. WO 2011/044312, which are hereby incorporated herein by reference in their entireties) disposed at a lower perimeter region and behind the reflective element and below or outboard of the perimeter seal and at a window area formed through the perimeter band (and at a wider or waisted or broadened portion of the perimeter band). The individual touch sensors thus comprise individual electrically isolated touch pads formed at the circuit element or substrate 24 (such as a generally rigid substrate and/or a flexible substrate, such as a Mylar material or the like) and comprise the sensing elements and/or circuitry and/or switches disposed at or behind the individual icons of the touch zone 21 (with the user input icons creating or providing a cognitive association between the icons and the individual touch pads at the respective icons). The front glass substrate of the mirror reflective element (behind which the sensing pads and sensing circuitry are disposed) typically may have a thickness of about 3.2 mm or thereabouts, such that the perimeter edge portions can have a full 2.8 mm radius of curvature to meet the requirements of at least a 2.5 mm minimum radius of curvature. It is also desirable that the front substrate is devoid of electrically conductive coatings at the touch zone or area 21 (and that the rear substrate is removed or cut-away at the touch zone or area).

Figure 6C:
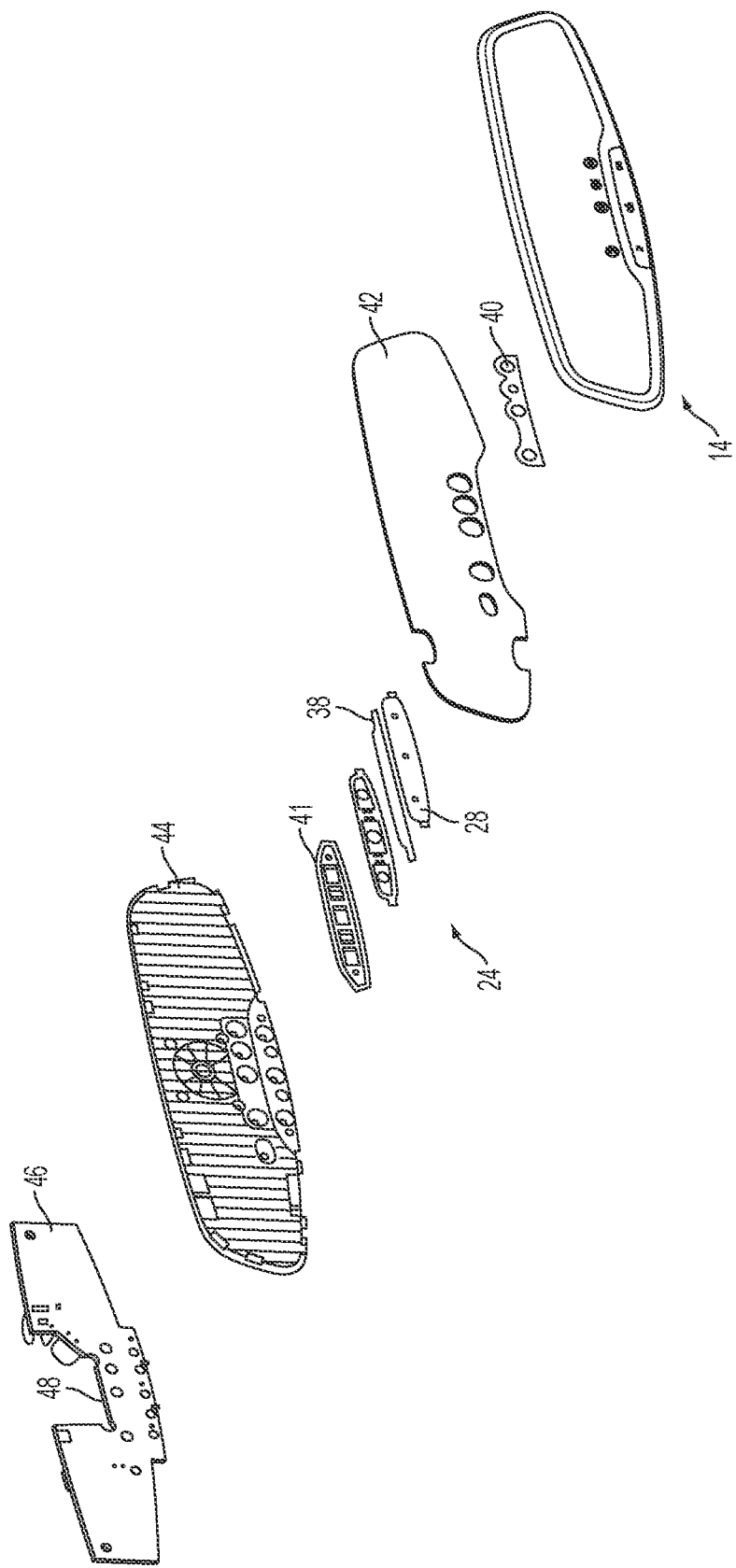
FIG. 6C is an enlarged exploded perspective view of the mirror assembly of FIGS. 6A and 6B, showing the components of the touch sensor.
Figure 7:
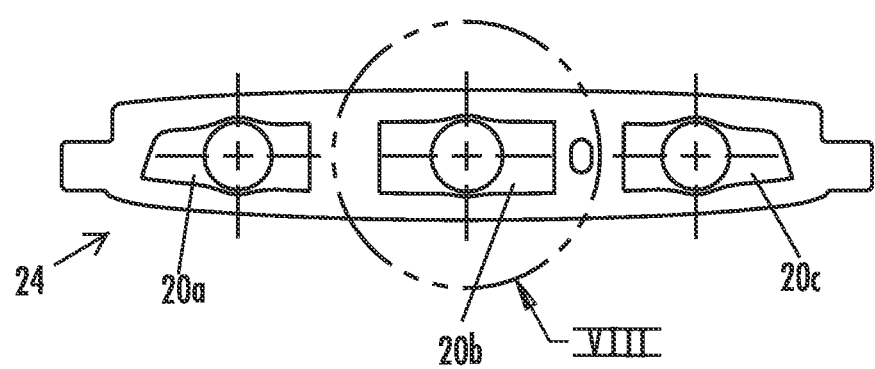
FIG. 7 is a plan view of a touch sensor circuit element for the mirror assembly of FIG. 6A.

As shown in FIG. 6C, touch sensor or circuit 24 has appliqué 28 disposed thereat (and optionally adhered thereto via an adhesive 38), with appliqué 28 providing an opaque or substantially opaque or non-light-transmitting layer with graphics established thereat to provide the desired appearance at the touch area or input area 21. Another appliqué 40 may be disposed at or near or above the input area 21 to provide icons 22 that, when backlit, are viewable through the reflective element and through the mirror reflector of the reflective element (such as responsive to a user touching a respective one of the user inputs 20a, 20b, 20c). The appliqué 40 may be disposed at the rear of the reflective element 14 and at a foam tape 42 adhered thereto or disposed thereat. As shown in FIGS. 6A-C, foam tape 42 includes a cutout region at the user input area 21 and includes apertures that generally correspond to the icons 22 of the appliqué 40. The touch sensor or circuit pad 24 and appliqué 28 are disposed at the cutout region of the foam tape 42 and an attachment plate 44 is attached at the rear of the reflective element via the foam tape 42, with a circuit board 46 disposed at the attachment plate and having circuitry for controlling functions (such as telematics functions and backlighting functions and the like) responsive to the user inputs detecting a touch or proximity at a respective input or touch pad (with the circuitry of the circuit board electrically connected to wiring or leads or circuitry of the sensor or sensor substrate when the mirror is assembled). Optionally, the attaching surface of the attachment plate 44 may be plasma treated to enhance the adhesion of the attachment plate at the rear surface of the mirror reflective element.

As can be seen in FIGS. 6A-C, the attachment plate 44 and/or the circuit board or element 46 include or support a plurality of illumination sources 48 (such as individual light emitting diodes established at the circuit board or element 46) that are arranged at and aligned with the apertures of the attachment plate 44 and apertures of the foam tape and with the icons established at the appliqué 40. Thus, when a user touches the touch area or input area 21, the circuitry determines a touch at one of the user inputs 20a, 20b, 20c and may actuate a respective illumination source 48 to backlight a respective one of the icons 22a, 22b, 22c of appliqué 40, such that the backlit respective icon is illuminated and viewable by the user to confirm to the user that the touch was detected and the selected feature or function was activated or adjusted accordingly. Optionally, a fourth icon 22d may be provided at appliqué 40 that is not associated with any touch pad or input and that may be illuminated or backlit to indicate that the mirror accessory (such as a telematics system) is not in use or a line of communication is unavailable or disconnected or the like.

As shown in FIG. 6C, mirror assembly 10 includes a rubber or silicone or elastomeric or resilient gasket or pad 41, which is disposed at the rear of the touch sensor 24 and between the touch sensor 24 and the attachment plate 44 when the mirror assembly is assembled together. The gasket 41 is formed with apertures that generally align with the illumination sources 48 and the user inputs 20a, 20b, 20c to allow light to pass therethrough. The gasket 41 also includes apertures that receive the electrical connectors 25 (the circuit pad of the touch sensor includes electrical circuitry and connectors at the rear surface of the substrate for electrically connecting to circuitry of and in the mirror assembly that supports the reflective element assembly, as discussed below with respect to FIG. 20). Thus, when the connectors 25 (such as a multi-pin socket type of connector) are received in the apertures of the gasket, electrical connection may be made (via insertion of pins or terminals at the circuit board 46 into the respective sockets of the connectors 25) as the touch sensor and reflective element are attached at the attachment plate. Thus, the mirror assembly provides a board-to-board connection between the touch circuit element and the mirror circuit element or board, such as when the reflective element is attached at the attachment plate or such as when the mirror circuit element is attached at the rear of the attachment element (with the reflective element and sensor and gasket already assembled to the attachment plate).

The gasket 41 comprises a compressible or resilient material that, when the reflective element and touch sensor are attached at the attachment plate, presses the appliqué 28 and sensor 24 against the rear glass surface of the front substrate of the reflective element so that the appliqué is substantially flat against the glass and there is reduced air at the appliqué and sensors. The gasket thus functions to provide a substantially uniform or constant pressure at the sensor and appliqué, thereby providing a flat appliqué for enhanced appearance and for providing enhanced performance of the touch sensors due to the reduced air at the sensor locations. Optionally, and less desirably, an optical adhesive may be disposed at the appliqué to couple the appliqué to the rear glass surface to provide a flat appliqué at the rear glass surface.

The user input icons and/or the display icons may comprise any suitable coloring and/or design and/or backlighting. It has been found that the color white for icons works well for viewing by the driver of the vehicle in high ambient lighting conditions, even and especially when using a transflective mirror reflective element. The white characters or icons (preferably displayed as white characters or icons through the transflective mirror reflector, to be viewed and seen by the driver of the vehicle as white characters or icons without a black background or surrounding display area) have been found to provide enhanced viewability and discernibility to a driver of the vehicle, particularly when viewing the displayed white characters or icons in high ambient lighting conditions, and such as described in PCT Application No. PCT/US2011/056295, filed Oct. 14, 2011 and published Apr. 19, 2012 as International Publication No. WO 2012/051500, which is hereby incorporated herein by reference in its entirety.

Referring now to FIGS. 7-11, the touch sensor or circuit pad 24 comprises a substrate 24a (such as a transparent or translucent substrate that allows light to pass therethrough) that has electrically conductive traces 26 established thereat. For example, the touch PCB substrate 24a may comprise a white substrate comprising an FR408 material or the like. Such a material is white or whitish in color and is conducive for backlighting and for generally white light passing therethrough for backlighting the icons of the appliqué (other non-white substrates may be yellow tinted or colored and may shift or affect the light passing therethrough). The substrate material preferably does not include UV blockers, with such UV blockers potentially causing the substrate to have a yellow hue, such that the substrate is substantially white and not yellowed or yellow tinted. Also, the substrate material may be non-UV effected (and/or the substrate may be disposed in the mirror assembly and not substantially exposed to UV light, so the substrate won't yellow or discolor over time and exposure to light throughout the life of the vehicle and mirror assembly.

As shown in FIGS. 8-11, the electrically conductive traces 26 include mesh traces or trace portions 26a that are established in a spaced apart mesh or grid or crossing pattern at the backlit portions of the respective touch pads or inputs 20a, 20b, 20c. The touch input trace 26 may have a substantially solid or continuous or non-meshed or less-meshed conductive trace 26b (such as a copper trace or the like) over a user input or touch sensitive area or touch pad, with patterned traces or trace portions 26a (made of the same material as the less-meshed or non-meshed trace, such as a copper trace or the like, and optionally established during the same screen printing process or the like) established at the touch sensors or inputs 20a, 20b, 20c and behind the respective icons of the appliqué 28, with the patterned traces 26a allowing for light emanating from the illumination sources of the circuit pad to pass through the substrate 24a and through the gaps between the patterned traces 26a to backlight or illuminate the respective icons of the appliqué 28. The pattern or thickness of the traces and thickness of the gaps between the traces is selected to provide sufficient light to pass therethrough for backlighting the icons of the appliqué while also providing sufficient conductivity and thus sensing sensitivity so as to be able to sense or detect a touch or proximity at the respective touch pad or input when a person's finger approaches and/or touches the appropriate location at the touch area 21 of the reflective element.

The appliqué 28 substantially hides the traces and the substrate from view by the driver of the vehicle, while the icons formed thereat may be backlit or illuminated by light emanating from the illumination source or sources and through the respective meshed trace regions. In the illustrated embodiment, the appliqué comprises a thin film or substrate that is disposed in front of the touch sensor substrate and behind the mirror reflective element substrate. Optionally, the appliqué may be established as a thin film or coating at the rear surface of the mirror reflective element substrate, such as via depositing a non-conductive opaque coating at the touch sensor region and establishing the desired icons thereat, such as via etching or masking the icons through the coating to provide light transmissive portions of the opaque coating at the touch zones and in the shape of the desired icons.

Figure 8:
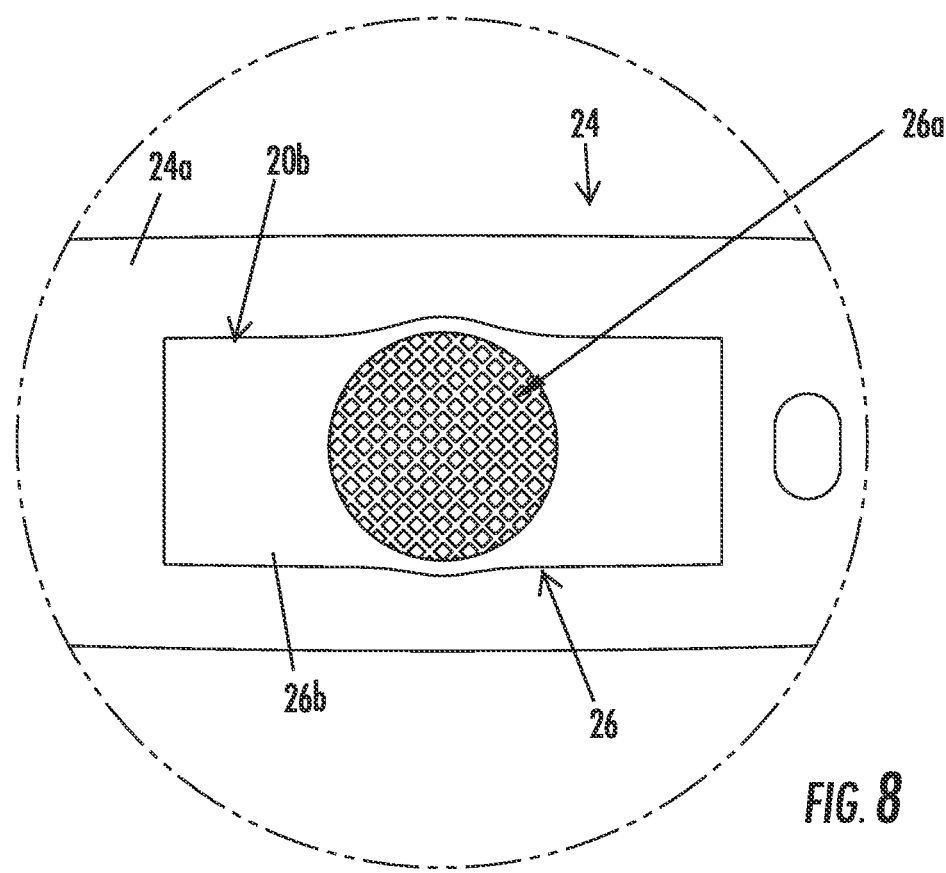
FIG. 8 is an enlarged plan view of the area VIII of FIG. 7.
Figure 9:
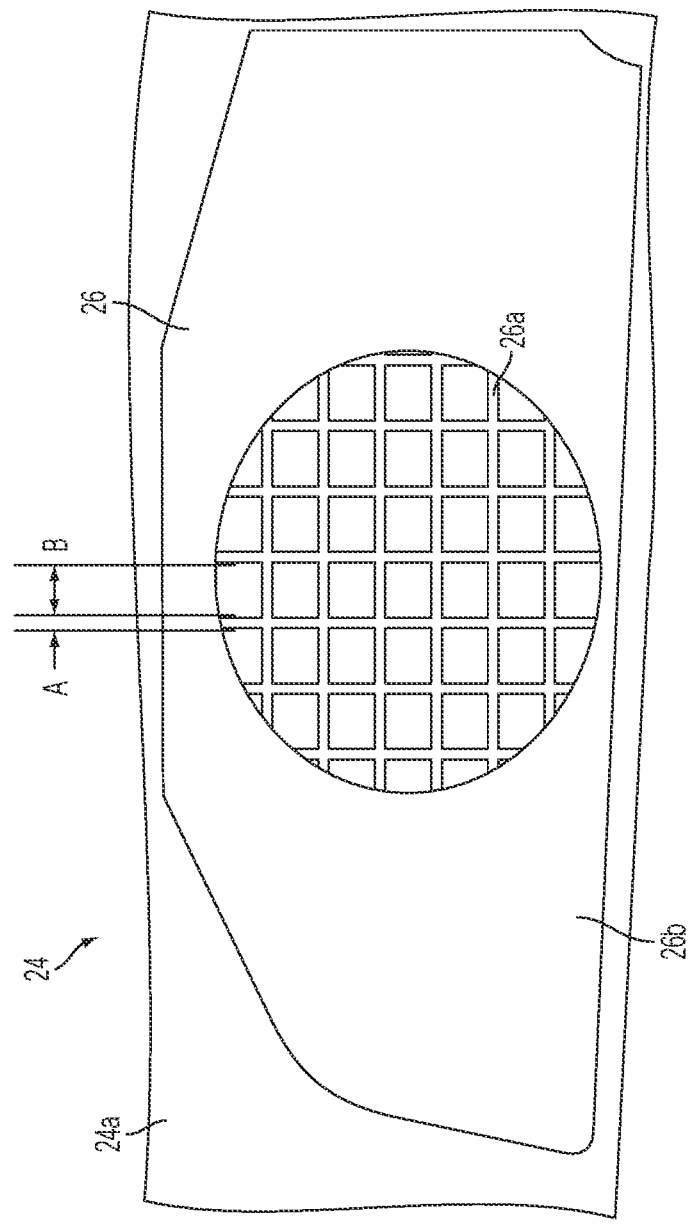
FIG. 9 is another enlarged plan view of a touch sensor circuit of the present invention.

In the illustrated embodiment of FIG. 8, the electrically conductive traces 26 are established as a mesh or grid pattern 26a on the substrate 24a as about 0.005 inch thick traces with about 0.010 inch gap between the parallel traces. However, other trace thicknesses and gap dimensions may be implemented depending on the particular application, with thicker or more densely disposed traces increasing the touch sensitivity of the touch pad while reducing the light-transmissivity of the touch pad. For example, and with reference to FIG. 9, the trace width "A" may be selected to be 0.005 inches, while the gap dimension "B" may be selected to be around 0.005 inches or 0.010 inches or 0.020 inches, depending on the desired or appropriate light transmissivity at the touch pads. Optionally, the trace width and gap dimensions may be otherwise selected, such that a user input or touch pad (such as a touch pad having a touch area of around 24 $mm^2$ or thereabouts) may have, for example, a fine trace pattern may have a trace width of about 0.13 mm (about 0.005 inches) and a gap dimension of about 0.25 mm (about 0.01 inches), or a medium trace pattern may have a trace width of about 0.2 mm (about 0.008 inches) and a gap dimension of about 0.4 mm (about 0.016 inches), or a coarse trace pattern may have a trace width of about 0.3 mm (about 0.012 inches) and a gap dimension of about 0.6 mm (about 0.024 inches), or other selections or combinations to provide the desired touch sensitivity and/or light transmissivity at the touch pads or inputs. Clearly, other trace widths and/or gap dimensions or pitches may be selected for the conductive traces of the touch pads or user inputs while remaining within the spirit and scope of the present invention. The selected dimensions may vary depending on the particular application and/or desired light passing through the traces for backlighting the icons. Optionally, the sheet resistance of the material (such as copper) of the conductive traces may be preferably less than about 10 ohms per square, more preferably less than about 5 ohms per square and more preferably less than about 1 ohm per square.

Figure 10:
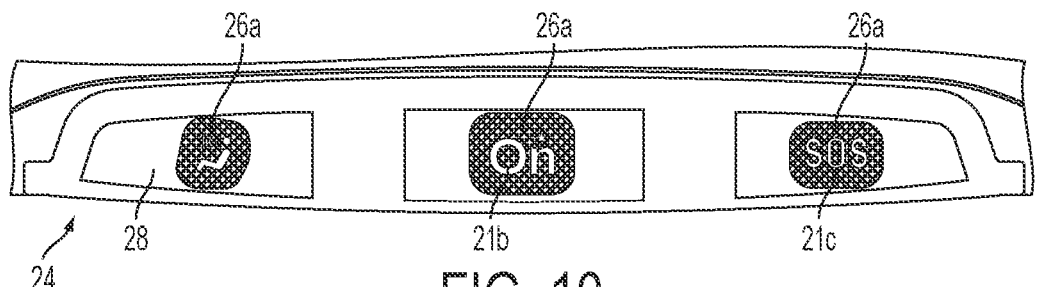
FIG. 10 is a plan view of the touch sensor circuit of FIG. 9, shown with an appliqué disposed thereat.
Figure 11:
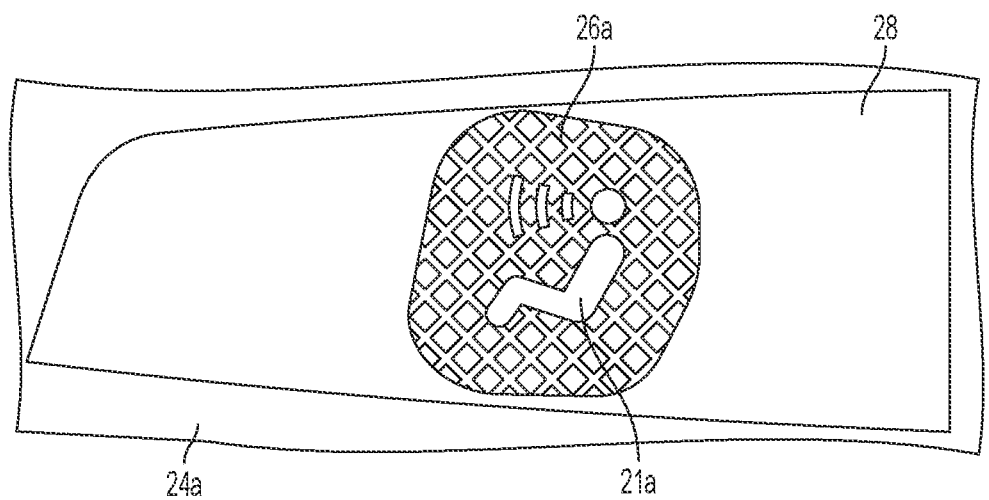
FIG. 11 is an enlarged plan view of a portion of the touch sensor circuit and appliqué of FIG. 10.
Figure 12:
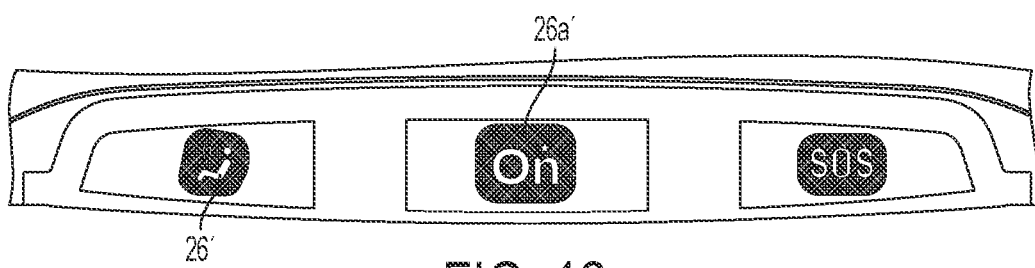
FIG. 12 is a plan view of another touch sensor circuit similar to FIG. 10, with finer conductive traces at the touch sensor areas.

For example, and with reference to FIGS. 10-12, the user input traces 26 (FIG. 10) may have a touch or input area of about 60 $mm^2$ to about 80 $mm^2$ or more (for the SOS or emergency input) and about 65 $mm^2$ to about 85 $mm^2$ or more (for the hands free calling input) and about 75 $mm^2$ to about 105 $mm^2$ or more (for the telematics or ONSTAR® input), with the patterned traces or trace portion 26a comprising a trace thickness or width of about 0.005 inches and a gap dimension of about 0.017 inches. Optionally, and as shown in FIG. 12, the user input traces 26' may have patterned trace portions 26a' that comprise a trace thickness or width of about 0.005 inches and a gap dimension of about 0.008 inches, thereby providing a finer mesh that allows less light to pass therethrough (as compared to patterned trace portions 26a of FIGS. 10 and 11), while providing increased touch sensing sensitivity at the touch pad or input. Other gap dimensions and trace widths may be implemented (for example, a larger gap dimension may be selected or provided that is up to about 0.023 inches or up to about 0.034 inches or thereabouts) depending on the particular application and desired backlighting and touch sensitivity, while remaining within the spirit and scope of the present invention. Although shown as a generally grid or square-crossing pattern, clearly the conductive traces may be established at the user inputs in any suitable pattern or mesh pattern that allows for light to pass therethrough to backlight or illuminate the icons 21a, 21b, 21c at the appliqué 28 and that provides the desired or suitable conductivity for suitable detection sensitivity, while remaining within the spirit and scope of the present invention.

The trace pattern may comprise any spaced or gapped trace pattern, which need not comprise evenly spaced traces or unevenly spaced traces or intersecting or crossing traces. Optionally, the trace pattern may comprise non-intersecting or non-crossing spaced apart traces which may or may not be custom shaped to best fit around an icon shape or the like. For example, and with reference to FIGS. 15 and 15A-C, the electrically conductive traces may comprise customized patterns to reduce light blockage while providing enhanced or sufficient or desired sensitivity at the center region of the touch area or input (which may enhance sensitivity at the touch input for smaller diameter fingers and the like). In the illustrated embodiment of FIGS. 15 and 15A-C, the conductive traces 126 include traces or trace portions 126a that are established across or partially across the backlit portions of the respective touch pads or inputs 120a, 120b, 120c and between opposite portions of the solid or continuous conductive trace 126 of the respective touch pads or inputs. Similar to the touch sensors discussed above, the touch input trace 126 has a substantially solid or continuous conductive trace 126b (such as a copper trace or the like) over a user input or touch sensitive area or touch pad, with the patterned traces or trace portions 126a established at the touch sensors or inputs 120a, 120b, 120c and behind the respective icons 121a, 121b, 121c of the appliqué, with the patterned traces 126a allowing for light emanating from the illumination sources of the circuit pad to pass through the substrate 124a and through the gaps between the patterned traces 126a to backlight or illuminate the respective icons of the appliqué. As can be seen in FIGS. 15A-C, the patterned traces 126a comprise generally horizontal traces that span the gap or opening established in the solid trace portion 126b, and may include an enlarged portion 126c (such as at the center of the "O" in the ONSTAR® icon or the SOS icon or the like) to further enhance the touch sensitivity of the sensors.

Optionally, and with reference to FIGS. 16 and 16A-C, the patterned electrically conductive traces comprise generally horizontal traces 126a' that span the gap or opening established in the solid trace portion 126b' at the substrate 124a' and generally vertical traces 126d' that may span or partially span the gap or opening established in the solid trace portion 126b' at the respective touch areas 120a', 120b', 120c'. As shown in FIGS. 16A-C, the horizontal traces 126a' may include an enlarged portion 126c' (such as at the center of the "O" in the ONSTAR® icon 121b' or at the telephone icon 121a' or the like), and/or the vertical traces 126d' may include an enlarged portion 126e' (such as above and/or below the ONSTAR® icon 121b' or above and below the emergency or "SOS" icon 121c' or the like) to further enhance the touch sensitivity of the sensors.

Figure 20:
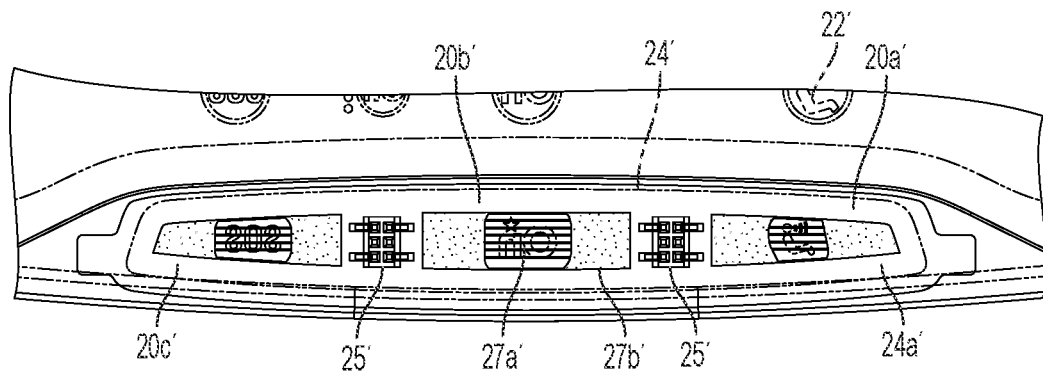
FIG. 20 is an enlarged rear view of the lower touch sensor area of the reflective element of FIG. 19.

Optionally, and with reference to FIGS. 17-20, an electrochromic reflective element 14' includes touch or proximity sensitive user inputs 20' and associated icons or the like so a user can readily identify the purpose or function of the user inputs and actuate the appropriate or desired or selected user input. In the illustrated embodiment, the user inputs 20' are disposed at a lower region of the mirror reflective element 14' (such as via a touch pad or sensor disposed at the rear of the front substrate at an area where the rear substrate is cut out or recessed), with indicators or icons 22' at an area above the respective inputs (and at the principal reflecting portion of the reflective element), so that, when a user touches or actuates one of the user inputs 20', the respective icon 22' is backlit so as to be illuminated for viewing by the user through the reflective element to confirm to the user that the input was actuated. As best shown in FIG. 20, the user inputs 20' comprise a circuit pad 24' with electrically conductive traces 27' established at the circuit pad for sensing a touch or proximity at the sensor or input. The conductive traces 27' are established at each touch input area or region 20a', 20b', 20c' in a manner that allows light to pass through the touch pad and touch sensor areas to backlight icons 28' at an appliqué disposed over or at or in front of the circuit pad 24', such as in a similar manner as discussed above.

Optionally, and as shown in FIG. 20, the patterned traces comprise generally horizontal traces or grid lines 27a' that span the gap or opening established in the solid trace portion 27b' at the substrate 24a' at the respective touch areas 20a', 20b', 20c'. The circuit pad 24' includes electrical circuitry and connectors 25' at the rear surface of the substrate 24a' for electrically connecting to circuitry of and in the mirror assembly that supports the reflective element assembly 10'. The reflective element assembly and user inputs may be otherwise similar to the reflective element assemblies and user inputs discussed above, such that a detailed discussion of the reflective element assemblies and user inputs need not be repeated herein.

For a human machine interface (HMI) provided at the likes of an interior rearview mirror assembly, it is useful and preferred that an icon (such as shown in FIG. 12 for a SOS icon and/or ONSTAR® icon and/or phone icon and/or the like) be provided that is readily recognizable by a driver of the vehicle, and especially where touch sensing is involved at and/or near the icon. It is useful and preferable that the icon and the touch sensitive area/region to be touched by the driver to access or activate the feature (or deactivate the feature) coincide or at least be closely adjacent or coincident with one another. However, it is also useful and preferred that a driver of a vehicle viewing the likes of such a touch sensitive input at the interior rearview mirror assembly is not able to readily see through or view through the touch input area or region or zone into the interior of the interior mirror head (such as viewing through the reflective element to within the cavity of the mirror casing). Thus, it is useful and preferred that the likes of the backlighting and other circuitry/mechanicals of the mirror assembly (and internal to the mirror assembly) be at least substantially covert and be substantially hidden or masked from view by the driver, whether or not the icon/touch region is illuminated. By utilizing the interlocking mesh/matrix of electrically conductive, substantially non-light transmitting, traces of the present invention (where a substantial net portion of the touch sensitive region is coated with the likes of a conducting light absorbing metal thin film layer and where at least a significant other portion of the touch sensitive region remains uncoated to allow for light to pass therethrough), the mirror assembly allows that the touch sensitive region be functional and operative as a capacitive sensing/projection touch region while simultaneously allowing and enabling backlighting coincident with and at that same touch sensitive region where the icon that attracts and guides the driver's touch is itself also coincidently disposed thereat.

Figure 24:
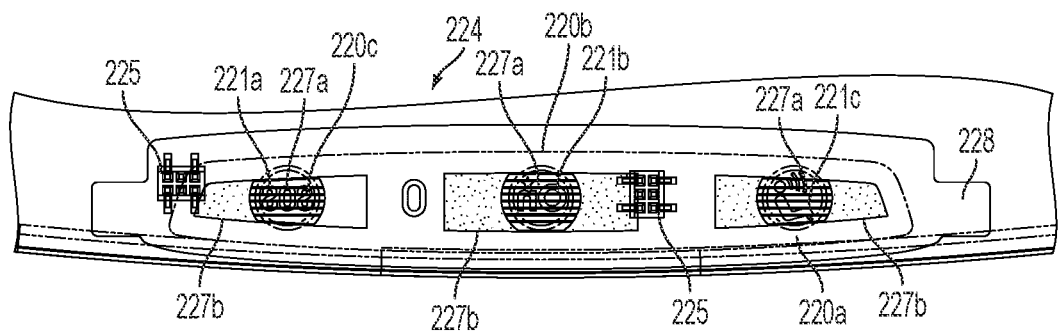
FIG. 24 is an enlarged rear view of the lower touch sensor area of the reflective element of FIG. 23.
Figure 24A:
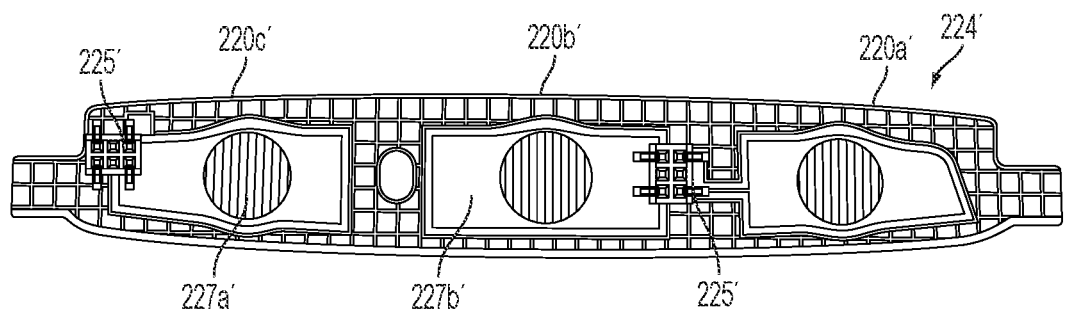
FIG. 24A is another enlarged view of a lower touch sensor area of the reflective element of the present invention.

As indicated in the likes of FIGS. 8 and 11, the plurality of electrically conductive traces that constitute the mesh or grid or array or matrix of conductive traces are themselves electrically conductively interlinked by reason of any one of the traces being in electrical conductivity with all or most all of the other traces at that touch sensitive region (and conductively interlinked with a solid or unmeshed conductive trace at a perimeter region or adjacent to the meshed region), so that a touch by the driver even at a subregion of the electrically conductive trace matrix/array/mesh region enables and causes capacitive touch effectively across the entire electrically conductive matrix/array/mesh trace touch sensitive region. As shown in FIGS. 24 and 24A, each individual trace has electrical conductivity (either directly or indirectly) via electrical connection with other traces (such as solid or unmeshed or less meshed traces) typically disposed or established at either or both sides of the meshed electrically conductive trace region, and the likes of electrical connection (such as via an electrical connector for electrically connecting the respective touch sensitive region to circuitry of the mirror assembly) is made out of view of the driver.

Figure 70:
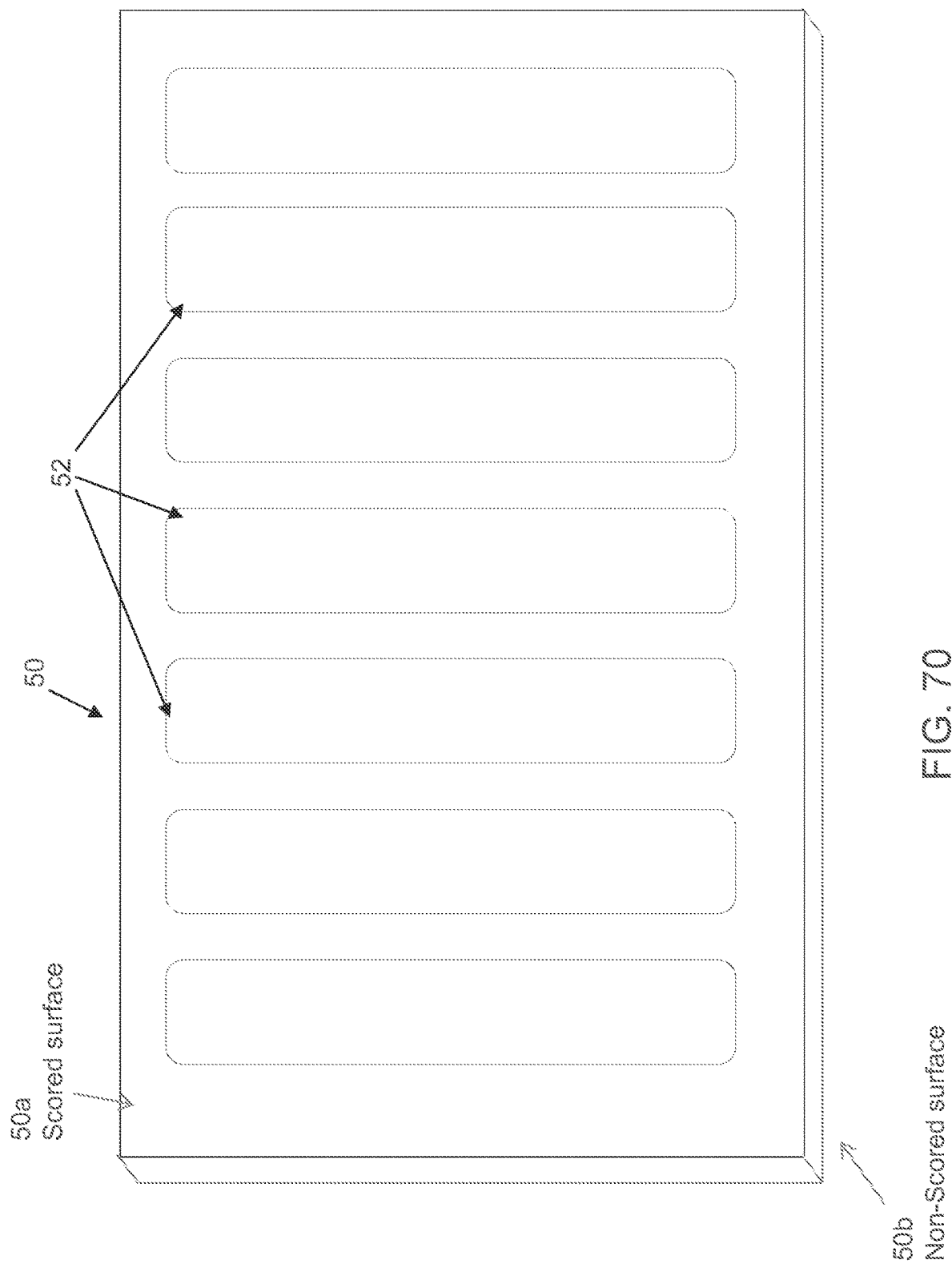
FIG. 70 is a perspective view of a glass sheet that is scored at a surface thereof to score the shapes of the mirror substrates into the surface of the glass sheet.

The glass substrates of the mirror reflective element may be formed via any suitable means. Optionally, and desirably, multiple glass shapes or substrates are cut from a larger sheet of glass (for inside mirrors, typically a larger sheet or lite of flat transparent glass). For example, and with reference to FIG. 70, a large sheet or lite of glass 50 has a first surface 50a and a second surface 50b. In order to cut out individual glass shapes or substrates, the first surface 50a is scored or scribed (such as via any scoring or scribing means, such as a diamond tip scoring device or the like) in the shape desired for the glass shapes or forms 52 for the front or rear glass substrates of a mirror reflective element, and then individual shapes are broken out from the scored large glass sheet or lite by breaking the glass along the scored or scribed lines, as is known in the glass arts.

Figure 71A:
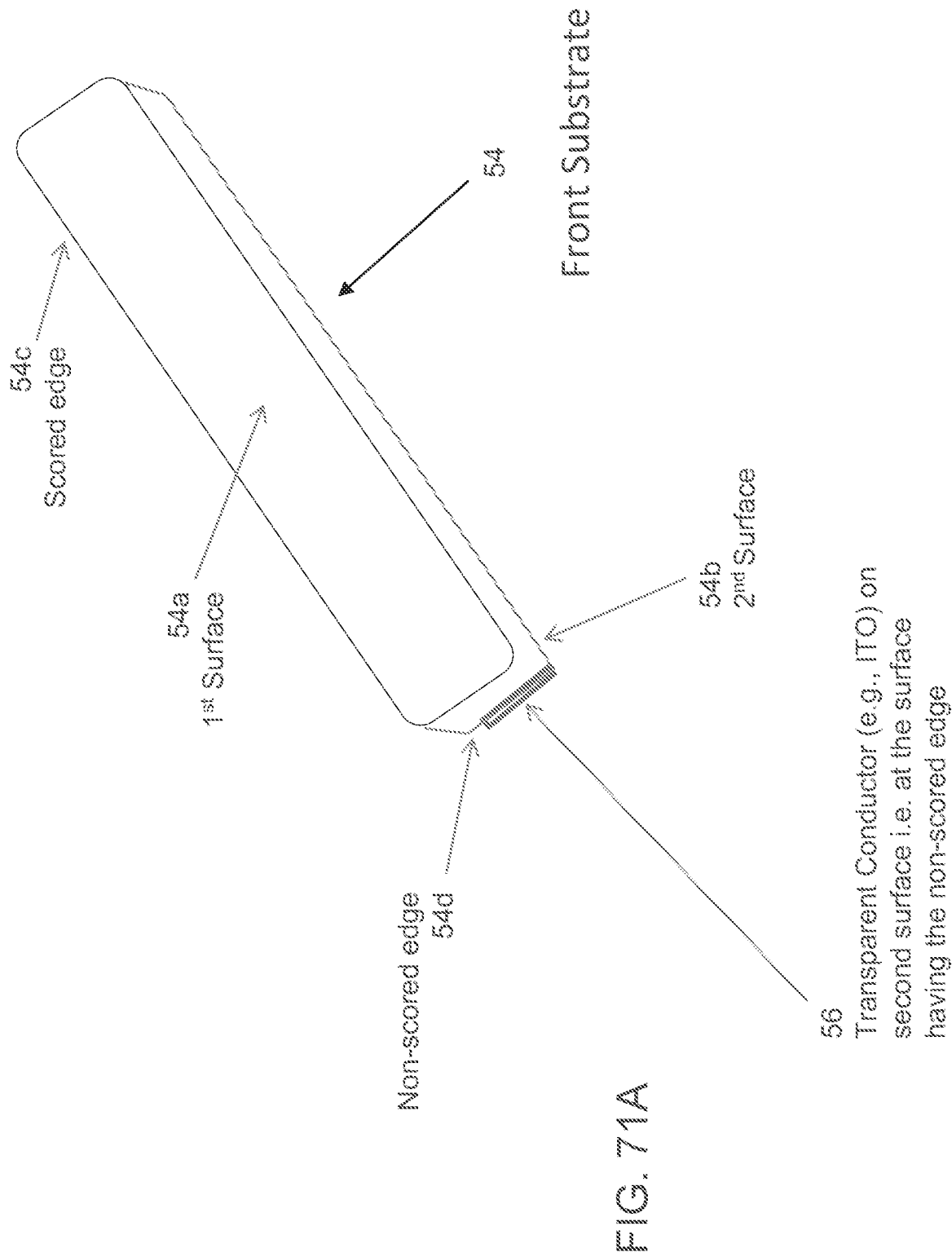
FIG. 71A is a perspective view of a front glass substrate formed from a scored sheet similar to that of FIG. 70.

For example, and with reference to FIG. 71A, a front glass substrate 54 for a mirror reflective element is formed via scoring or scribing a glass sheet, such as discussed above, and breaking out the glass shape or form 52, and optionally at least one of grinding/seaming/polishing one or both of the cut edges of the shapes to establish or form the finished mirror front glass substrate 54. As can be seen in FIG. 71A, the first or front surface 54a of the front glass substrate is the surface that corresponds to the scored surface of the sheet of glass 50 from which front substrate 54 is formed, and thus has a scored edge 54c (that may be ground and polished to provide a desired radius of curvature having water clear transparency) while the second or rear surface 54b of the front glass substrate 54 is the surface that corresponds to the non-scored surface of the sheet of glass 50 and thus has a non-scored edge 54d. The second surface 54b of the front substrate 54 is coated with a transparent conductive coating 56, such as an indium tin oxide (ITO) coating or layer that is sputter deposited onto the second surface 54b of the front substrate 54. The second surface ITO coating may be established at the second surface of the formed shape or substrate or may be established at the surface of the larger sheet or lite of glass before the scribing or scoring process.

Note, it is optional and may be preferable that the larger sheet or lite of flat transparent glass be transparent conductive coated (such as, for example, coated with an ITO coating or the like) on one of its surfaces before the multiple glass shapes or forms 52 are cut therefrom. In such circumstances, it is the non-ITO coated surface or side of the large sheet or lite of glass (typically a bare glass surface) that is scored during the scoring/breakout of the individual glass shapes or forms. This assures that the ITO coated side of the front substrates (i.e., the second surface of the reflective element assembly) has the non-scored edges.

Figure 71B:
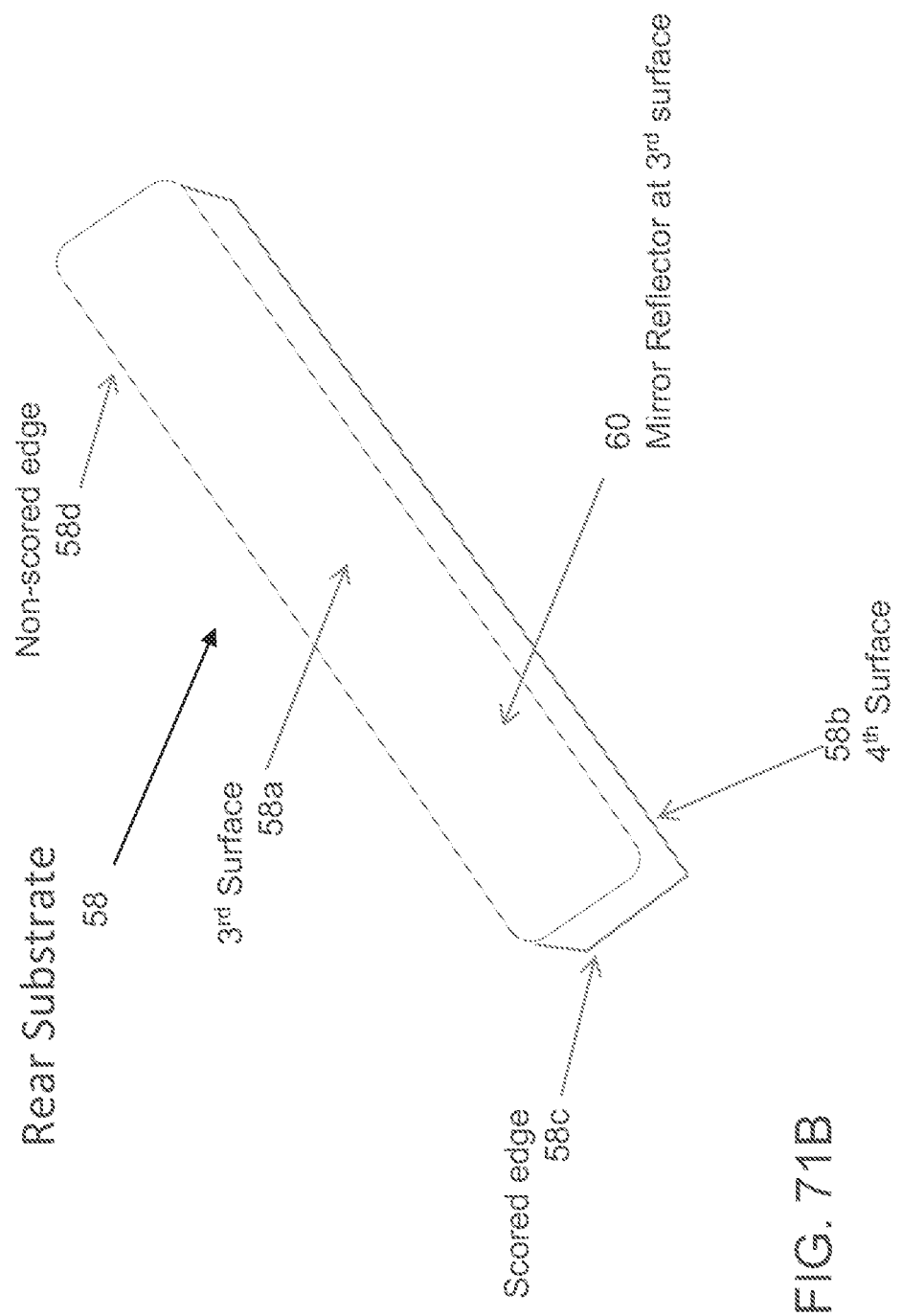
FIG. 71B is a perspective view of a rear glass substrate formed from a scored sheet similar to that of FIG. 70.

Likewise, and with reference to FIG. 71B, a rear glass substrate 58 for a mirror reflective element is formed from scoring or scribing another glass sheet, such as discussed above, and breaking out the glass shape or form 52, and optionally at least one of grinding/seaming/polishing one or both of the cut edges of the shapes to establish or form the finished mirror rear glass substrate 58. As can be seen in FIG. 71B, the third or front surface 58a of the rear glass substrate is the surface that corresponds to the scored surface of the sheet of glass 50 from which rear substrate 58 is formed, and thus has a scored edge 58c, while the fourth or rear surface 58b of the rear glass substrate 58 is the surface that corresponds to the non-scored surface of the sheet of glass 50 and thus has a non-scored edge 58d. The third surface 58a of the rear substrate 58 is coated with a mirror reflector coating 60, such as metallic reflector coating or layer that is sputter deposited onto the third surface 58b of the rear substrate 58. The third surface reflector coating may be established at the third surface of the formed shape or substrate or may be established at the surface of the larger sheet or lite of glass before the scribing or scoring process.

Note, it is optional and may be preferable that the larger sheet or lite of flat transparent glass be mirror reflector coated (such as coated with a metallic mirror reflector coating or the like) on one of its surfaces before the multiple glass shapes or forms 52 are cut therefrom. In such circumstances, it is the reflector coated surface or side of the large sheet or lite of glass that is scored during the scoring/breakout of the individual glass shapes or forms. This assures that the non-reflector coated side of the rear substrates (i.e., the rear or fourth surface of the reflective element assembly) has the non-scored edges.

Figure 72:
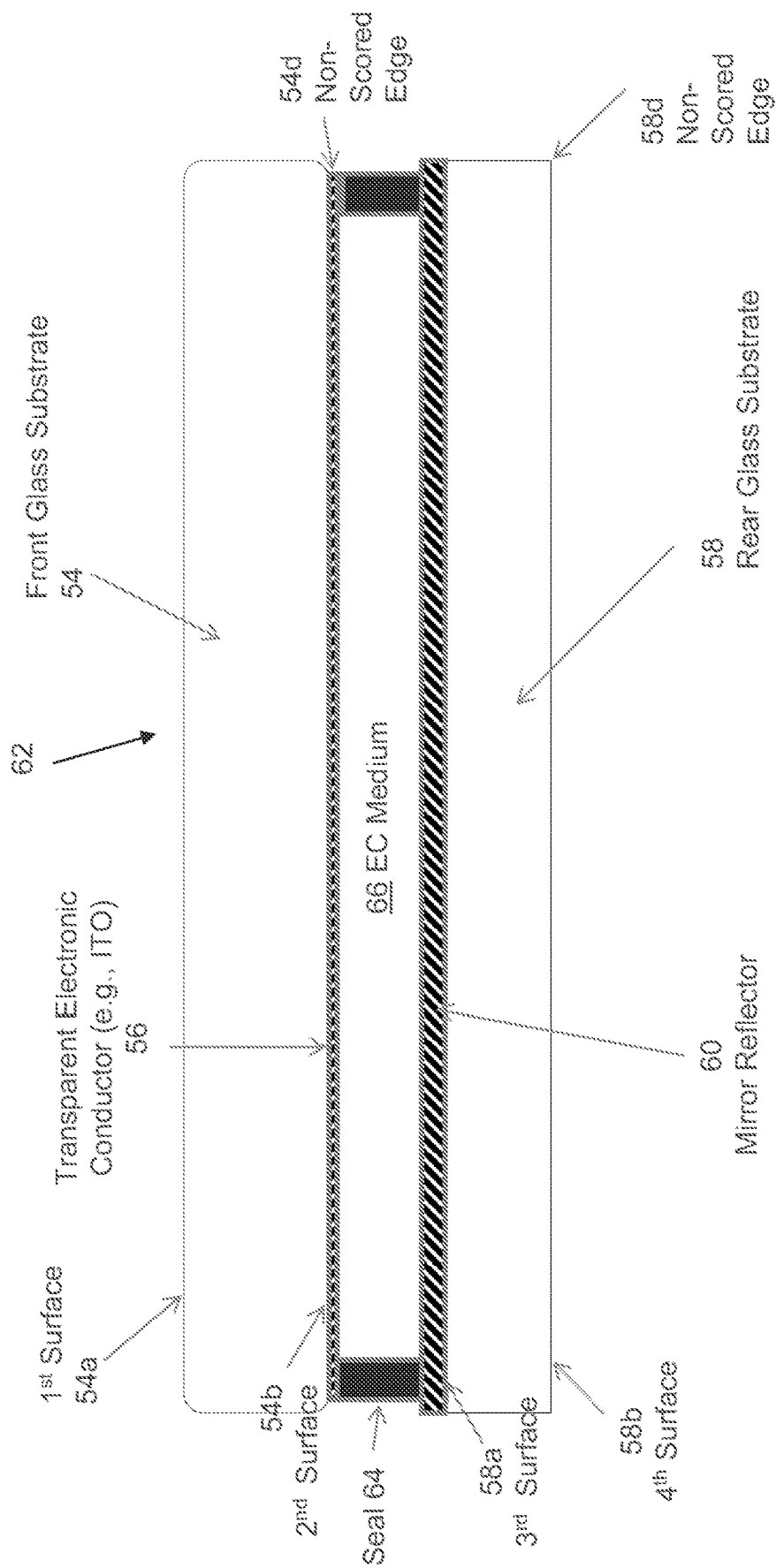
FIG. 72 is a sectional view of a mirror reflective element formed with the front glass substrate of FIG. 71A and the rear glass substrate of FIG. 71B.

Thus, when a mirror reflective element 62 (FIG. 72) is assembled with front substrate 54 and rear substrate 58 joined together by a perimeter seal 64 that surrounds and bounds an electro-optic medium 66 (such as an electrochromic medium or the like), the scored edges 54c, 58c of the substrates 54, 58 are at the front surfaces of the substrates (the surfaces of each substrate that is closer to the driver of the vehicle when the mirror reflective element is normally mounted in a vehicle), and the non-scored edges 54d, 58d of the substrates 54, 58 are at the rear surfaces of the substrates. Such a scoring and assembly process provides both substrates with the scored edges at the front surfaces of the respective substrates (in other words, the first surface and the third surface of the laminate reflective element assembly). This is beneficial because, if there is an impact against the mirror reflective element (such as during a vehicle collision and if the driver or passenger hits their head or other part of their body at the mirror assembly), the front surfaces (with the scored edges) of the substrates are placed in compression while the rear surfaces (with the non-scored edges) of the substrates are placed in tension. Because tiny microfractures or microdefects or stress risers or micro cracks occur at the scored edge of the glass substrate from the scoring or scribing process, the scored edges provide weakened points at the scored edge of the glass substrate that may be more susceptible to cracking or to crack initiation, and especially when placed in tension (glass is typically weak in tension and strong is compression, so the scribed side must be located at the compression side). Thus, by making sure that the scored or scribed edges of the respective front and rear substrates are at the front surfaces of the substrates (the surfaces that will be placed in compression during any impact or collision), the glass substrates have a reduced likelihood of cracking and failing during an impact or collision. Thus, the present invention provides that the scored or scribed edge of the front substrate in a laminate or sandwiched electrochromic construction is at the first surface of the laminate assembly, and the scored or scribed edge of the rear substrate is at the third surface of the laminate assembly or sandwiched electrochromic assembly.

The present invention also provides an enhanced seaming process for seaming the edge of the rear glass substrate (such as with belt sandpaper or even a machine ground "bullnose" edge treatment) by seaming only the end regions of the substrate and leaving the upper and lower edges (the longer dimensioned edges that will be at the upper and lower regions of the mirror reflective element when the mirror reflective element is normally mounted in a vehicle) as raw cut edges. This may be desirable because seaming reduces the bend strength of the glass substrate, as compared to raw cut glass edges (when the scribe side is on the front or third surface of the rear substrate). The raw cut edge is "pristine" and results in the greatest strength, while seaming the cut edge introduces uniform flaws and makes the glass weaker (at the expense of reducing variability in strength). Cut edges are nearly "pristine", and thus stronger than seamed edges. However, the cut edges are also highly vulnerable to damage in day to day processing or usage, and are more prone to handling damage (as compared to a seamed edge), and once such handling damage occurs, the damaged substrate becomes a weaker part than a seamed part. It is envisioned that the substrate may have its end regions seamed (the ends of the part away from the impact area), which may have a reduced effect on the bend strength, such that the center region of the glass substrate has raw cut (non-seamed) edges and thus is very strong and impact resistant.

FMVSS 111 provides requirements for the performance and location of inside and outside rearview mirrors, in order to reduce the number of deaths and injuries that occur when the driver of a vehicle does not have a clear and reasonably unobstructed view to the rear, and ECE Regulation No. 46 provides uniform provisions concerning the approval of devices for indirect vision and of vehicles with regard to the installation of such devices. Such regulations (including other regulations) include specifications as to requirements for a mirror substrate that undergoes bend testing and other strength and/or cracking/breaking testing.

Referring now to FIG. 73, a bend test may be conducted on mirror glass substrates, such as for the front or rear substrates of a mirror reflective element. As can be seen in FIG. 73, the bend test may apply a force at a center region of a front surface of a glass substrate (such as a front or third surface of a rear glass substrate to simulate the type of forces that may be experienced at the reflective element during an impact or collision) that is supported at support locations approximately 113 mm apart, with the force being applied at a rate of 30 mm/minute until the glass breaks, and with the peak applied force recorded for each substrate. In the exemplary test results shown in FIG. 73, rear glass substrates were tested where the front surface or third surface was the scribed or scored surface and the edges were ground or fully hand seamed using a seaming belt (GF 1-5), and rear substrates were tested where the rear surface or fourth surface was the scribed or scored surface and edges were ground or fully hand seamed using a seaming belt (GB 6-10), and rear substrates were tested where the front or third surface was the scribed or scored surface and the edges were raw and with no edge treatment so the substrates were just cut glass (RF 1-5), and rear substrates were tested where the rear or fourth surface was the scribed or scored surface and the edges were raw and with no edge treatment so the substrates were just cut glass (RB 6-10). As can be seen in the test results, the bend strength is much higher when the substrate is scribed on its front or third surface (as compared to scribing at the rear or fourth surface), and the bend strength is higher with raw or unseamed glass when scribed on the front or third surface (as compared to ground substrates with scribing at the front or third surface). However, seaming the edges increases the strength of the glass substrate when the scribed side is the rear or fourth surface of the substrate (but still yields a bend strength that is less than either the seamed or raw samples with the scribed side being the front or third surface of the rear glass substrate).

Thus, the present invention provides a method or system of manufacturing the glass substrates for a mirror reflective element that ensures that the scribed surface of the glass shapes formed from a scribed glass sheet corresponds to the front or first surface of front glass substrates formed from such a scribed glass sheet or the front or third surface of rear glass substrates formed from such a scribed glass sheet. Such a system results in substantially greater bend strengths of the glass substrates to enhance the substrates' ability to withstand an impact, such as may occur during a vehicle collision or the like. The system may ensure the desired scribed surface via any suitable means, such as via particular handling of the substrates from the time they are formed from the glass sheet until they are coated at their coated surfaces (the rear or second surfaces of front substrates and/or the front or third surfaces of rear substrates), or such as via scanning the edges prior to coating the coated surfaces to determine which side or surface of the substrate has the scribed edge and adjusting or flipping the substrate so that the appropriate surface is coated. For applications where the larger glass sheets are ITO coated or mirror reflector coated before the individual glass substrate shapes are cut therefrom, the present invention provides assurances that the appropriate surface of the glass sheet is scribed (such as the non-ITO coated surface for front mirror glass substrates and such as the mirror reflector coated surface for rear mirror glass substrates). The reflective elements manufactured with such substrates thus provide enhanced strength and resistance to cracking or breaking during an impact, and thus provide enhanced and safer mirror assemblies suitable for use at the interior of vehicles.

Although shown and described as scribing the surface of a glass sheet that becomes the front surface of a front substrate or a rear substrate of an electrochromic reflective element, the present invention also provides similarly scribing or scoring a surface of a glass sheet or lite for cutting or forming prismatic substrates for prismatic reflective elements, such that the front surface of the formed individual prismatic substrate has the scribed edge and the mirror reflector coating is established at the non-scribed side or rear surface of the prismatic substrate.

The present invention also provides enhanced glass cutting techniques, such as by providing a glass cutting start/stop point at a desired or preferred location at the perimeter of the formed glass substrate. When cutting the glass, the start/stop point for the scribe and glass nipping is desired to be outside of the center zone or region of the finished glass substrate (in other words, the start/stop point or location should be towards one of the end regions of the glass substrate. This is because, at the start/stop point there is a high probability of a larger glass flare that could be a stress concentration point, and thus it is desirable to move such a stress concentration point away from the center region of the glass substrate.

The present invention also provides a preferred glass computer numerical control (CNC) grinding start/stop point. When grinding the front glass substrate (such as to establish the desired radius of curvature at the forward edge of the substrate) the grinding start/stop point should not be in the center zone. This off-center start-stop point is desired because it is difficult or challenging to have a perfectly tangent start and stop overlap, such that there typically will be a slight point that could result in stress concentrations. Thus, it is desirable to move such a stress concentration point away from the center region of the glass substrate.

The present invention also provides a perimeter seal that may reduce the stress applied to the mirror reflective element by the perimeter seal. For example, a seal may induce stress at the glass substrates each time the seal and substrates go through a heat cure step. Thus, the mirror reflective element may not include a conductive epoxy that may have to go through a second bake step (such as a 150 degree C. bake step or the like), so that the main seal epoxy would not have to endure a second bake step and thus would not experience more shrinkage and thus would not induce more stress at the glass substrates. Optionally, the mirror reflective element may include a soft perimeter seal (such as a silicone seal, a polyurethane seal or a soft UV curable urethane acrylate seal or the like).

Optionally, the mirror reflective element may include a perimeter seal that is wider than a typical perimeter seal, in order to improve the adhesion between the front and rear glass substrates by providing an optimized or enhanced seal band width. Such a construction may help to make the two substrates act or function more like a single unit. Also, if any glass chipping or breakage occurs, such a construction may hold the glass chips better than a thin perimeter seal construction.

Optionally, other means for reducing the flexing or enhancing the strength of the assembled mirror reflective element may be implemented to provide a mirror reflective element that is better suited for impacts and collisions and the like. For example, the mirror reflective element may include an electrochromic medium of the solid polymer matrix (SPM) type (such as utilizing aspects of the reflective element assemblies described in U.S. Pat. Nos. 6,245,262; 5,724,187 and/or 5,668,663, which are hereby incorporated herein by reference in their entireties). We find that utilizing a SPM composition that cures with a high degree of cross linking when cured in situ to form a SPM electrochromic medium helps reduce glass flexing during impacts.

For prismatic and/or electrochromic INFINITY™ mirrors, such as are shown and/or described in U.S. Des. Pat. Nos. D633,423; D633,019; D638,761 and/or D647,017, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. Pat. Nos. 7,253,723 and/or 8,154,418, which are hereby incorporated herein by reference in their entireties, we find that it is preferable that the front substrate be manufactured from double strength (typically around 3.2 mm thickness) soda lime transparent glass, and that the curved or rounded perimeter around the front most edge thereof is ground and polished (so as to be water clear) from the scored edge of a cut substrate/shape. It is also preferable that the opposing edge of the front substrate be beveled or chamfered. We do not find it necessary to bevel and/or chamfer the third surface edge of the rear substrate or the fourth surface edge of the rear substrate, but nevertheless the third surface edge should be the scored edge as cut from a larger flat sheet or lite of glass, as discussed above.

Optionally, and with reference to FIGS. 21-24, a prismatic reflective element 214 includes touch or proximity sensitive user inputs 220 and associated icons (such as icons 221a, 221b, 221c established at an appliqué 228) or the like so a user can readily identify the purpose or function of the user inputs and actuate the appropriate or desired or selected user input. In the illustrated embodiment, the user inputs 220 are disposed at a lower region of the mirror reflective element 214.

As best shown in FIG. 24, the user inputs 220 comprise a circuit pad 224 with electrically conductive traces 227 established at the circuit pad for sensing a touch or proximity at the sensor or input. The conductive traces 227 are established at each touch input area or region 220a, 220b, 220c in a manner that allows light to pass through the touch pad and touch sensor areas to backlight icons 221a, 221b, 221c at an appliqué 228 disposed over or at or in front of the circuit pad 224, such as in a similar manner as discussed above. Optionally, and as shown in FIG. 24, the patterned traces comprise generally horizontal traces or grid lines 227a that span the gap or opening established in the solid or unmeshed or less meshed or more solid trace portion 227b at the substrate 224a at the respective touch areas 220a, 220b, 220c. The circuit pad 224 includes electrical circuitry and connectors 225 at the rear surface of the circuit pad or substrate for electrically connecting to circuitry of and in the mirror assembly that supports the prismatic reflective element assembly 214. As shown in FIG. 24A, the electrical connectors 225 are electrically conductively connected to the solid or unmeshed or less-meshed trace portions 227b (or to conductive traces that are in electrical conductive connection with a respective solid or unmeshed trace portion) so as to provide electrical connection to the meshed portions 227a (which are electrically conductively connected with the respective solid or unmeshed trace portion or portions at either or both sides of the meshed portion)

Optionally, and as shown in FIG. 24A, a touch pad or circuit pad 224' may have generally vertical traces or grid lines 227a' that span the gap or opening established in the solid trace portions 227b' of the circuit pad 224'. The electrical connectors 225' (such as six pin or six terminal connectors or other suitable electrical connectors) are electrically connected to respective traces of the circuit pad. In the illustrated embodiment, one connector 225' is electrically connected to or at the solid trace portion and a perimeter trace portion (that is established around and electrically isolated from the solid trace portion) of one of the touch pads or input areas 220c', while another connector 225' is electrically connected to or at the respective solid trace portions and perimeter trace portions (that are established around and electrically isolated from the respective solid trace portions) of two of the touch pads or input areas

220a', 220b'. The electrical connectors are electrically connected to circuitry of the mirror assembly, such as via an electrical wire or lead or the like, whereby the circuitry is operable to individually detect a touch at one or more of the touch pads or input areas.

Thus, the touch pad or sensor of the present invention comprises copper or conductive traces that can function to detect a touch at the touch pad while also allowing light to pass through a generally central portion of the touch area for backlighting an icon or appliqué at the touch pad. In the illustrated embodiments of FIGS. 20, 24 and 24A, the dark or solid areas on either side of the icon comprises a copper layer (but may be any suitable metallic and/or electrically conductive layer), and the sensor includes copper (or other suitable material) lines or traces that are established horizontally or vertically in front of the icon (which is disposed at the touch pad). The copper lines or thin copper traces are spaced apart and allow light to pass through the touch pad and back light or illuminate the icon for enhanced day time and night time viewing of the touch areas. Although the copper lines or thin traces are shown as horizontally or vertically established, the thin traces may run horizontally or vertically or at any desired or selected or suitable angle (or in a pattern or the like as discussed above), with the total surface area of the touch pad area determining the sensitivity of the touch pad. The copper matrix or mesh traces are conductively connected with the copper solid or less-meshed or non-meshed traces at either or both sides of the mesh traces (or optionally above and/or below the mesh traces) so that the entire touch region is able to sense a touch at the region, either at the icon (where the mesh traces are established) or at either side or adjacent to the icon (where the solid or less-meshed trace or traces is/are established).

The pattern or thickness of the traces and thickness of the gaps between the traces is selected to provide sufficient light to pass therethrough for backlighting the icons of the appliqué while also providing sufficient conductivity and thus sensing sensitivity so as to be able to sense or detect a touch or proximity at the respective touch pad or input when a person's finger approaches and/or touches the appropriate location at the touch area of the reflective element. Other than the areas of the traces that cross the graphics or icons, the areas or portions of the solid or continuous traces are disposed a selected distance from the graphics (such as about 0.5 mm or thereabouts), to allow for positioning and size tolerancing of the graphics at the respective touch sensor. The substrate may comprise any suitable substrate, such as an FR408 board material (such as a board having a thickness of around 5 mil or thereabouts), with no UV blockers or dyes to reduce the light transmission through the substrate and to reduce shifting of color. Such an FR408 material allows for a thin, flexible circuit board or substrate that may be substantially transparent due to its thin construction.

Optionally, it is envisioned that the electrically conductive traces may be established directly at the rear surface of the glass mirror substrate so as to obviate the need for a separate circuit element or board or the like. Optionally, although shown and described as opaque electrically conductive material, it is envisioned that the conductive material of the sensors may comprise a clear or substantially transparent conductive material or coating (such as an ITO coating or the like) established at the circuit element or substrate or at the glass surface of the mirror substrate. In such an application, the transparent conductive traces need not include the mesh traces and may comprise a solid or less-meshed or non-meshed conductive trace at the touch sensitive region or zone, whereby the transparent conductive trace is used to sense the presence of a person's finger or touch at the touch zone, while allowing for light to pass therethrough to illuminate or back light the respective icon at the appliqué or at the front substrate of the mirror reflective element (such as an icon established through an opaque coating at the rear surface of the mirror substrate and at the touch sensor region of the reflective element).

The mesh traces or trace portions facilitate increasing the sensor pad surface area, while locating the sensor directly behind the respective icon that the user will be touching, and allows for increasing the size of the icons without hurting the touch or proximity sensitivity of the sensor or sensors. The sensors and electrically conductive traces may be more sensitive at the continuous trace regions around the icons, but the patterned traces provide sufficient sensing sensitivity at the icons. Generally, it is desirable to provide gaps that are small or relatively small to limit or substantially preclude any shadowing effect at the appliqué when the sensor and icon are backlit.

The electrically conductive traces of the user inputs or touch sensor pads may comprise any suitable conductive material, such as copper traces or the like. For example, the copper traces may be established at a front surface of the sensor substrate at each of the sensing areas or pads, with electrical connectors or pads established at the sensor substrate (such as also at the front surface of the substrate or at the rear of the substrate) for electrically connecting (such as via soldering connectors or wires thereto) to the circuitry of the printed circuit board or circuit element of the mirror assembly when the mirror is assembled. Optionally, other suitable conductive materials may be used for the conductive traces, such as, for example, any suitable conductive metallic material or the like. Optionally, the conductive traces may comprise a transparent conductive material (such as indium tin oxide (ITO) or the like) or may comprise silver nanowires or conductive films with silver nanowires disposed or established therein or the like. Such conductive films may be used in the FPC (flexible printed circuit) construction (whereas some transparent conductive coatings (such as ITO or the like) are not highly suitable for flexible substrate applications) to establish a transparent conductor, and such conductive films may be substantially transparent to allow light to pass therethrough, while providing sufficient sensitivity to the touch sensor or sensor pad. Optionally, the sensor substrate may comprise a substrate with holes or apertures at the icon areas, and with metallic conductive traces (such as copper or the like) disposed and extending across or spanning the holes or apertures to provide sensitivity at the holes in the substrate while the holes allow for light to pass through the substrate (which, in such an embodiment, may comprise a generally opaque or non-light transmitting substrate). The appliqué may provide a diffusing feature as well, particularly in applications where light passes through a hole in the sensor substrate or where the sensor substrate is substantially clear or transparent. Optionally, it is envisioned that the touch sensors may comprise a transparent conductive coating or layer (such as an ITO layer) that wraps around from the rear surface of the mirror substrate to and partially over the front surface of the mirror substrate, such that the capacitive touch sensors may be established at the front surface of the mirror reflective element (and anywhere at the front surface of the mirror reflective element, such as at a peripheral region of the reflective element or a generally central region of the reflective element).

Optionally, the back lighting device may comprise individual light emitting diodes disposed at or behind and generally aligned with the patterned traces and the appliqué icons so that light emanating from an individual light emitting diode passes through the translucent substrate and through the gaps in the respective patterned conductive traces and through the respective icon for viewing by a person viewing the mirror reflective element. It is envisioned that other lighting devices may be used, such as side lighting light pipes or the like that light or illuminate the appliqué icons from the side of the appliqué, whereby light need not pass through the sensor substrate. However, the direct lighting or back lighting of the present invention provides enhanced lighting or backlighting at the icons and, thus, provides enhanced visibility and discernibility of the icons during high ambient lighting conditions.

Thus, the mirror assembly 10 provides a touch or input area 21 at a lower region of the electro-optic reflective element (but it could be elsewhere around or at the reflective element, such as a side region or upper region of the reflective element) and at a region that is devoid of conductive coatings at the surfaces of the front and rear substrates of the electro-optic reflective element 14 (and devoid of the rear substrate itself so that the touch sensor is disposed to the rear of the front substrate and at a cutaway region of the rear substrate). As shown in FIG. 1, the icons of the appliqué 28 are viewable at the touch area 21. In the illustrated embodiment, the icons are white and thus may have enhanced viewability at the opaque appliqué. Optionally, the inputs may be continuously backlit or may be episodically backlit (such as when the vehicle is initially turned on or when a door opens or when the interior lights of the vehicle are activated or the like) to enhance viewability of the inputs so the user can readily see them and discern them. Optionally, the individual user input or touch pad may be backlit when it is actuated to provide a confirmation of the touch being detected by the user input sensor and circuitry. Optionally, and with reference to FIG. 2, the icons 22a, 22b, 22c, at or near the user input area 21 may be backlit in response to a respective user input being actuated or touched (to provide confirmation to the user that the touch was detected and the feature was actuated) and/or the icons 22a, 22b, 22c, 22d may be backlit in response to other inputs or signals.

Thus, the icons may be backlit or illuminated or activated in response to the user touching or actuating a respective one of the user inputs. The icons may remain illuminated for a period of time after actuation (such as a selected time period following actuation of the respective touch sensor) or may be deactivated responsive to an input or triggering event. For example, the mirror assembly circuitry may be in communication with a vehicle bus or network bus of the vehicle, and the icon or icons may be activated responsive to a user's touch or input, and may be deactivated responsive to a vehicle system or function that is communicated to the mirror circuitry via the network bus of the vehicle. For example, the icon or icons may be activated and may remain activated until the vehicle speed reaches a threshold level (such as until the forward speed of travel of the vehicle reaches, for example, about 5 mph or about 8 mph or thereabouts). Such vehicle speed information may be provided via the vehicle bus to allow the icons or indicators to be activated and to remain activated during times when a user may be looking at the mirror for a prolonged period of time (such as when the vehicle is stopped or barely moving), and thus avoids the potential annoyance to the user of the icons being deactivated too soon.

In the illustrated embodiment, reflective element assembly 14 includes indicia formed or established at the user inputs or individual touch pads to indicate to the user what the function of the respective user input is so the user is invited to touch the appropriate area of the touch area or region of the reflective element to activate/control that function. For example, the indicia and user inputs may be established for a telematics system of a vehicle, such as an ONSTAR® system or the like. One of the indicia or icons 21a thus may indicate that a respective or corresponding user input or touch pad 20a is for initiating a telephone call or the like, while another of the indicia or icons 21b may indicate that a respective or corresponding user input or touch pad 20b is for connecting the vehicle communication system or telematics system to a remote service or the like, and another of the indicia or icons 21c may indicate that a respective or corresponding user input or touch pad 20c is for connecting the vehicle communication system or telematics system to an emergency response system or the like. Thus, the user may readily recognize the functions associated with the user inputs and may be invited to touch the appropriate location of the front surface of the reflective element to activate/control the selected or desired function.

Optionally, other forms of input icons (such as of appliqué 28) and display icons (such as of appliqué 40) may be provided or implemented depending on the particular application of the mirror assembly. For example, and with reference to FIG. 13, the user input icons 21a', 21b', 21c' may be backlit or illuminated in different colors (such as white and/or red and/or blue or the like), or, and with reference to FIG. 14, the user input icons 21a", 21b", 21c" may comprise other designs or configurations, depending on the particular application and desired appearance of the mirror assembly. Although shown as providing three user inputs for a telematics system (such as ONSTAR®), clearly the user inputs and icons of the mirror assembly may be provided for control or adjustment or actuation of other functions or features, such as for other types of telematics systems (such as for U-CONNECT™ telematics systems and/or the like), while remaining within the spirit and scope of the present invention.

Thus, the touch element or circuit element provides touch pads or touch sensors that are ergonomically and readily accessible by the driver simply touching or approaching the touch zone of the mirror reflective element and thus the sensor element behind the mirror reflective element. Optionally, the touch sensors may comprise any suitable touch sensing or proximity sensing means, such as, for example, capacitive touch technology, infrared (IR) touch technology, ALSENTIS™ touch systems technology, capacitive sensing technology, field effect technology, HSS technology and/or the like, depending on the particular application of the mirror assembly and user inputs or touch/proximity sensors.

The appliqué or appliqués may be disposed at or established behind the reflective element to render covert the touch sensor and circuit element. Optionally, the appliqué or appliqués may comprise a darkened or opaque appliqué or may comprise a reflective appliqué (that may match or substantially match the spectral reflectance of the mirror reflector as viewed by the driver of the vehicle so that the appliqué is not readily discernible to a person viewing the mirror reflective element when the mirror assembly is normally mounted in the vehicle) that is substantially reflective and partially transmissive of visible light so that the circuit element is rendered covert behind the appliqué.

As shown in FIGS. 1 and 2, the mirror assembly is configured and constructed so as to function as a human machine interface (HMI) for an ONSTAR® telematics system available from General Motors of Detroit, Mich. In the illustrated embodiment, the mirror assembly is configured and constructed so as to be readily recognizable and usable by General Motors' customers that are familiar with or used to interfacing with ONSTAR® via conventional mirror-bezel mounted buttons or the like, such as described in U.S. Pat. Nos. 6,329,925; 7,308,341 and/or 7,289,037, which are hereby incorporated herein by reference in their entireties. The individual icons thus may be the shape and color associated with and expected for known ONSTAR® icons of conventional vehicle applications. Optionally, and such as for white icons as described above, the icons may be backlit via a colored illumination source to provide a desired color touch icon at the touch area. For example, and with reference to FIG. 13, icon 21b' may be backlit or illuminated blue and icon 21c' may be backlit or illuminated red (or other selected color), such as by a blue or red light emitting diode disposed to the rear of the reflective element, and/or such as by a blue or red colored (or other selected color) mask, tape, light transmitting appliqué and/or the like disposed at the reflective element. During normal use of the mirror assembly, the touch pad may be low level illuminated, such as via use of, for example, a white light-emitting LED (or other suitable color) backlighting the touch pad. When the driver then touches at or has his or her finger approximately closely to the touch pad, the intensity of the backlighting LED (backlighting the touch pad) may substantially increase to acknowledge the driver's touch thereat or approach thereto, and concurrently (and after an appropriate debounce to avoid inadvertent triggering) the display icon illumination intensity may also increase or may be actuated to acknowledge/confirm the user's touch at the touch pad. When the phone conversation or event is to be concluded, the driver may retouch the touch pad, whereupon the LED may again increase in intensity to acknowledge the touch/approach at the touch pad, and concurrently (and after an appropriate debounce to avoid inadvertent triggering) the icon illumination intensity may also increase to acknowledge/confirm the user's touch at the touch pad.

Optionally, the icons may comprise white icons that are viewable as white when the backlighting element is unpowered, and when they are backlit, the backlighting elements operate to backlight with white, blue, and red LEDs to give the respective icons 21a', 21b', 21c' colors that confirm the actuation or operation. The display icons in the dimming area may be activated or backlit in response to a sensing by a respective user input. Optionally, the display icons (such as display icons 22a", 22b", 22c" of FIG. 14) may be backlit at vehicle startup (or when a vehicle door is opened or key fob is actuated or the like, or otherwise when one or more interior lights is/are activated), and may then fade out. Optionally, and as shown in FIG. 14, the mirror assembly may include a fault indicator 22d" (such as an "On!" fault indicator of an ONSTAR® system or the like) that is backlit or illuminated or actuated responsive to a fault detection or the like.

Thus, the mirror assembly may include icons established at the primary reflective surface or area of the reflective element, while the user inputs or touch sensors or buttons may be accessed at a lower region of the mirror assembly beyond and below and separate from the EC-active or principal reflecting region of the reflective element. Such a construction avoids or reduces fingerprints or smudges at the outermost glass surface of the reflective element at the principal reflecting region. The icons comprise display on demand type icons or displays and thus are viewable through the mirror reflector and are discernible to a driver viewing the reflective element when the icons are backlit or illuminated, and may be substantially not discernible when not backlit or illuminated. Optionally, a "fault" icon (that indicates to the driver of the vehicle when an error or fault is detected in the telematics system, such as ONSTAR® or U-CONNECT™ or the like, or when the telematics system or user input or touch system is not functioning properly) may be disposed at the primary reflective area and may be viewable through the mirror reflector when backlit (thus providing a display on demand type of display for the fault icon).

Optionally, and such as described in PCT Application No. PCT/US2011/056295, filed Oct. 14, 2011 and published Apr. 19, 2012 as International Publication No. WO 2012/051500, and/or PCT Application No. PCT/US10/51741, filed Oct. 7, 2010 and published Apr. 14, 2011 as International Publication No. WO 2011/044312, which are hereby incorporated herein by reference in their entireties, in order to limit or avoid accidental actuations of one or more of the touch pads or capacitive sensors disposed at and behind the perimeter region of the mirror reflective element when the user is otherwise touching the front surface of the mirror reflective element, such as when wiping or washing the first or front surface of the reflective element or when adjusting the mirror to adjust the rearward field of view at the mirror, it is envisioned that the mirror assembly may include an additional touch or proximity sensitive sensor or switch or means, such as an additional capacitive switch or the like, that is disposed at or behind a portion of the reflective element or behind the rest of the reflective element, such as behind the entire or substantially the entire viewing area of the mirror reflective element (such as behind the entire or substantially the entire electro-optically dimmable area of an electro-optic mirror reflective element or cell). Thus, if the surface of the reflective element at the main viewing or dimming region is being contacted or elsewhere remote from the touch sensor regions, further contact at or near the user input or touch sensor input regions (such as at the lower perimeter region and such as where the icons or graphics are disposed) may be ignored by the touch sensor system. Thus, the system would recognize and respond to a user's touch at one of the touch sensors when the system did not at the same time receive an indication that another region or regions of the mirror reflective element were also being touched by the user (since such multiple touching areas would be indicative of the user cleaning or wiping the reflective element surface or otherwise adjusting the mirror assembly and reflective element).

The reflective element 14 and mirror casing 12 are adjustable relative to the mounting arm or pivot assembly 18 (FIG. 6) to adjust the driver's rearward field of view when the mirror assembly is normally mounted at or in the vehicle. The mirror assembly includes a socket or pivot mount that may receive a ball member of a mounting arm of the pivot assembly or mounting structure 18, such as a double pivot or double ball mounting structure or a single pivot or single ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties). The mounting assembly may have a ball or socket element mounted to or attached to or established at a mirror attachment plate or backing plate (which may optionally include or incorporate circuitry thereat or thereon) that is attached at the rear surface of the mirror reflective element (optionally with a mirror casing disposed over or receiving the attachment plate or with a cap portion of a mirror assembly attaching to the backing plate or the like, such as by utilizing aspects of the mirror assemblies described in U.S. Pat. No. 7,289,037, which is hereby incorporated herein by reference in its entirety), or the mounting assembly may have a ball or socket element mounted to or attached to or established at a portion of the mirror casing (or to an attachment element disposed at or in the mirror casing), where the ball or socket or pivot joint element pivotally attaches to a mounting arm or mounting structure that attaches to an interior portion of the vehicle, such as an inner surface of the vehicle windshield or the like.

In the illustrated embodiment, mounting assembly 18 comprises a double-ball or double-pivot mounting assembly whereby the reflective element and casing are adjustable relative to the vehicle windshield (or other interior portion of the vehicle) about a pair of pivot joints. Mounting assembly 18 includes a base portion or mounting base and a mounting arm, with the reflective element 14 and mirror casing 12 pivotally mounted at one end of mounting arm about a mirror ball pivot joint (such as a ball and socket joint or the like at the rear of the attachment plate) and the mounting arm pivotally mounted at the mounting base at the other end of the mounting arm about another or second mirror ball pivot joint (such as a ball and socket joint or the like) that allows for a driver of the vehicle to which mirror assembly 10 is mounted to adjust the reflective element to adjust the rearward field of view of the driver. Optionally, the mounting assembly may comprise other types of mounting configurations, such as a single-ball or single-pivot mounting configuration or the like, while remaining within the spirit and scope of the present invention.

In the illustrated embodiment, the mounting base is configured to be attached to an interior surface of a vehicle windshield (such as to a mounting button or attachment element adhered to the interior surface of the vehicle windshield). The mounting base may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. The mounting arm may comprise a molded (such as injection molded) polymeric mounting arm or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties).

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932 and/or 8,049,640, and/or U.S. patent application Ser. No. 12/900,063, filed Oct. 7, 2010, now U.S. Pat. No. 8,277,059; and/or Ser. No. 12/752,305, filed Apr. 1, 2010, now U.S. Pat. No. 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or PCT Application No. PCT/US2011/056295, filed Oct. 14, 2011 and published on Apr. 19, 2012 as International Publication No. WO 2012/051500, which are hereby incorporated herein by reference in their entireties (and with electrochromic and prismatic mirrors of such construction are commercially available from the assignee of this application under the trade name INFINITY™ mirror).

In the illustrated embodiment, the interior rearview mirror assembly is designed and constructed as an electrochromic mirror assembly having a front glass substrate, and, such as shown in FIG. 4, with the front glass substrate of the electrochromic laminate element being constructed with its first surface/outermost perimeter edges slanted or beveled or rounded or the like, such as shown/described in U.S. Des. Pat. Nos. D633,423; D633,019; D638,761 and/or D647,017, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are hereby incorporated herein by reference in their entireties, in order to obviate/avoid a sharp edge at the front or outermost perimeter surface of the mirror reflective element and mirror assembly that could potentially hurt/injure an occupant of a vehicle equipped with the interior rearview mirror assembly during an accident.

The mirror casing 12 may comprise any suitable mirror casing, and may comprise a plastic or polymeric molded casing or housing. Optionally, for applications where the perimeter edge region of the front substrate of the mirror reflective element 14 is curved and exposed (such as described in PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are hereby incorporated herein by reference in their entireties), the mirror casing 12 may comprise a metallic finish or high gloss finish or textured finish or the like at least at the forward portion that abuts the rear of the front substrate (or the rear of a prismatic substrate for prismatic mirror applications). The curved or contoured or sculpted finished or polished perimeter regions of the reflective element in such applications appear reflective due to the perimeter band disposed at the rear surface of the front substrate of an electrochromic (or due to the reflector coating at the rear surface of a prismatic reflective element). Thus, it is desirable to form the exterior surface of the mirror casing (at least at or near the forward edge region of the mirror casing that abuts the rear surface of the reflective element substrate) with a finished surface to provide an enhanced aesthetic appearance immediately adjacent and to the rear of the curved transition surface of the reflective element. For example, the mirror casing may be painted or in-mold decorated to create or establish a desired finish or appearance around the forward perimeter region of the casing so as to provide a continuity of appearance at the interface or junction of the mirror casing and reflective element. For example, with an in-mold film approach, the mirror casing may have a reflective appearance or a brushed metallic appearance (such as brushed stainless steel or brushed nickel appearance). Optionally, for example, the mirror casing may comprise an in-mold paint, or the mirror casing may be painted, such as via a high gloss paint and such as in a similar manner as an exterior rearview mirror assemblies, to provide the desired color or appearance. Optionally, the mirror casing may be colored and the mirror mounting assembly may also be colored, or they may be powder coated grey or black or the like, so as to provide a generally uniform appearance. Optionally, the mirror casing may be formed to have an all-around metallic appearance, or may be formed to have a particular finish or texture (such as stippling or patterns or the like formed or established at the outer surface of the mirror casing) impacted or established at the casing, and the textured casing may also be decorated or painted or the like to provide the desired appearance. Thus, the mirror casing may be formed or processed to provide an affirmative carryover of the high gloss/reflective appearance of the exposed polished curved transition surface of the glass substrate of the reflective element to the exterior surface of the mirror casing at least around and along the mirror casing at the junction of the reflective element and mirror casing and at least immediately rearward of the junction of the reflective element and mirror casing. Optionally, the perimeter regions of the mirror casing may be reduced in size/depth so that the casing may be generally not viewable at the rear perimeter of the glass substrate when the mirror assembly is normally mounted in a vehicle and normally viewed by a driver of the vehicle.

Although shown as an electrochromic mirror application, it is envisioned that such touch elements may be suitable for prismatic mirror constructions as well, while remaining within the spirit and scope of the present invention. For example, the user inputs and iconistic touch pads or display areas discussed above may be suitable for use in a prismatic interior rearview mirror assembly, while remaining within the spirit and scope of the present invention. For example, and with reference to FIGS. 25 and 26A-C, a prismatic interior rearview mirror assembly 210 may include a mirror casing 212, a reflective element (such as reflective element 214, discussed above) and toggle mechanism 217 and user inputs 220, such as user inputs disposed behind the reflective element. The user inputs 220 and circuit element 224 are disposed behind associated icons 221a, 221b, 221c, and the icons may be formed at a darkened appliqué 228 (which may optionally be adhered to the circuit element via an adhesive 238), such that fingerprints and/or smudges at the touch areas may be less visible/discernible. The icons may be backlit via one or more light emitting diodes 248 or the like at a circuit element or board 246. The reflective element 214 is attached or adhered at an attachment plate 244, such as via a foam tape or adhesive tape 242 or the like. The user inputs and touch sensors and mirror assemblies may be otherwise similar to the mirror assemblies discussed above, such that a detailed discussion of the mirror assemblies need not be repeated herein. Optionally, display icons of a second appliqué (not shown in FIGS. 25 and 26A-C) may be disposed above the user inputs 220 and touch area 221 and may be illuminated or backlit so as to be displayed on demand for viewing through the reflective element and through the mirror reflector of the prismatic reflective element, such as when a respective one of the user inputs is actuated by the driver of the vehicle.

Figure 26B:
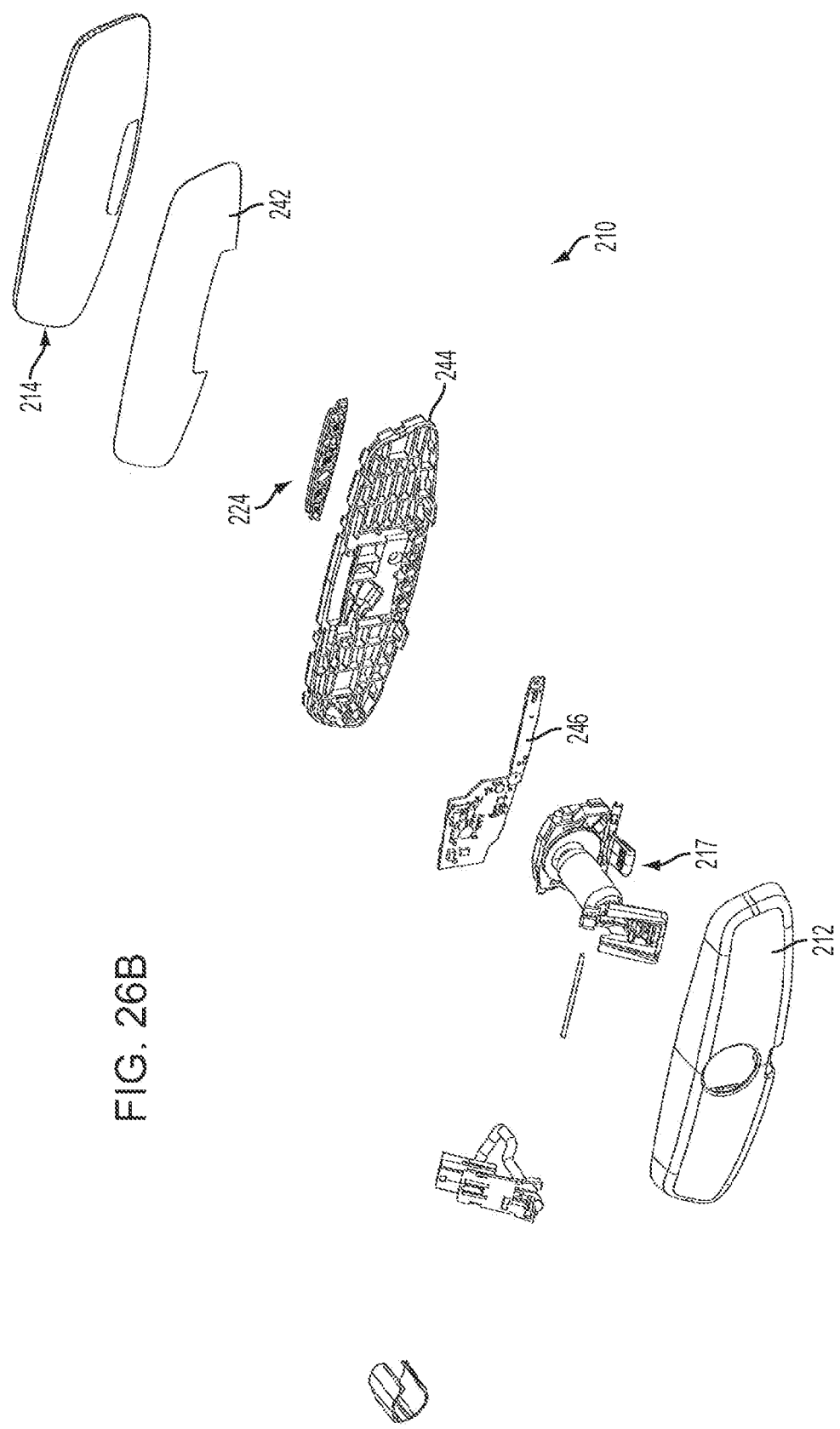
FIG. 26B is another exploded perspective view of the prismatic mirror assembly of FIG. 26A.
Figure 26C:
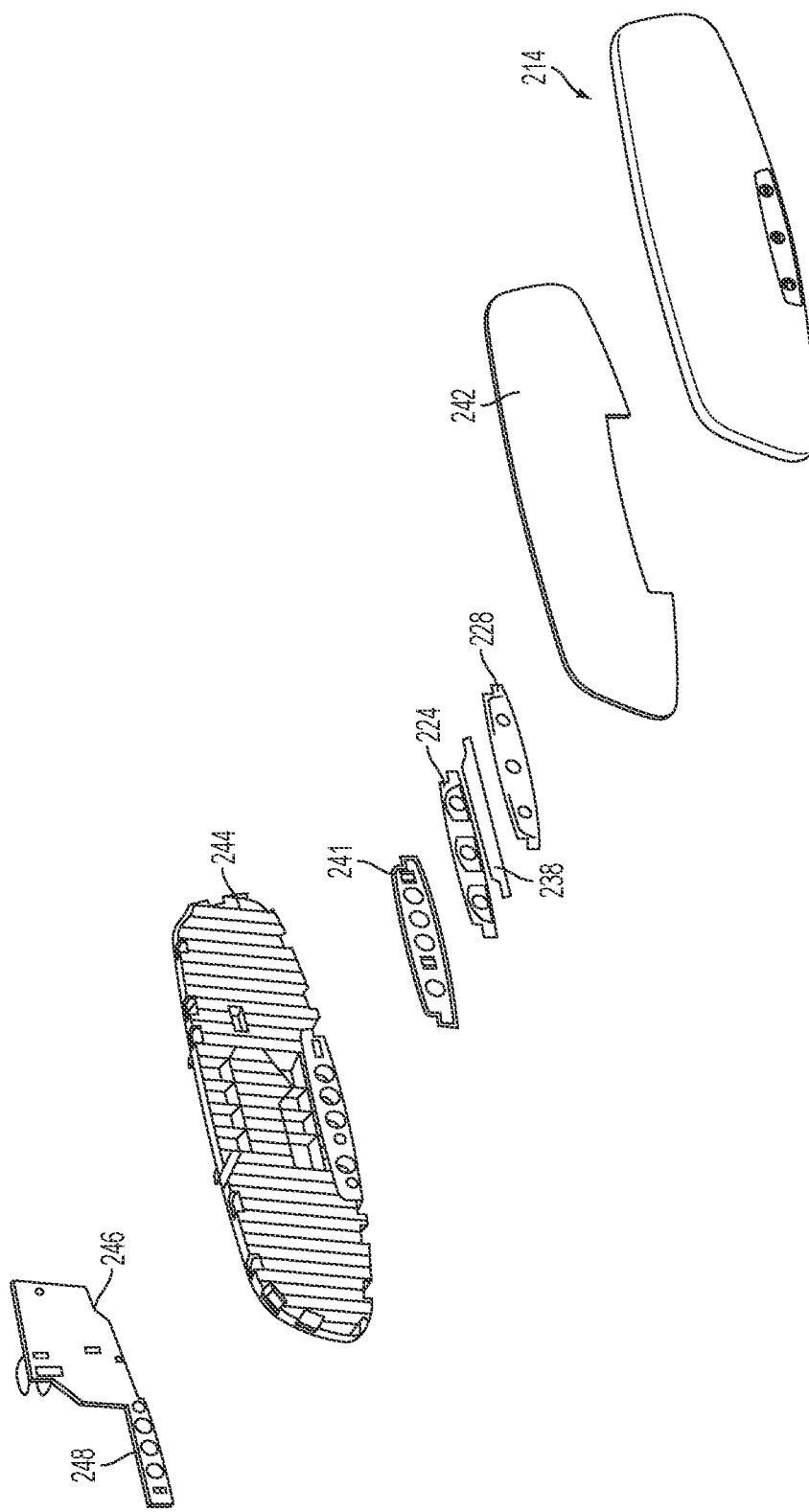
FIG. 26C is an enlarged exploded perspective view of the prismatic mirror assembly of FIGS. 26A and 26B, showing the components of the touch sensor.

In the illustrated embodiment, and as shown in FIG. 26C, mirror assembly 210 includes a rubber or silicone or elastomeric or resilient gasket or pad 241, which is disposed at the rear of the touch sensor 224 and between the touch sensor 224 and the attachment plate 244 when the mirror assembly is assembled together. The gasket 241 is formed with apertures that generally align with the illumination sources 248 and the user inputs 220a, 220b, 220c to allow light to pass therethrough, and the gasket 241 also includes apertures that receive the electrical connectors 225 of the touch sensor, such as in a similar manner as discussed above. Thus, when the connectors 225 (such as a multi-pin socket type of connector) are received in the apertures of the gasket, electrical connection may be made (via insertion of pins or terminals at the circuit board 246 into the respective sockets of the connectors 225) as the touch sensor and reflective element are attached at the attachment plate. The gasket 241 comprises a compressible or resilient material that, when the reflective element and touch sensor are attached at the attachment plate, presses the appliqué 228 and sensor 224 against the rear glass surface of the prismatic reflective element so that the appliqué is substantially flat against the glass and there is reduced air at the appliqué and sensors.

In the illustrated embodiment, the indicia or icons 221a, 221b, 221c and associated user inputs are provided for a telematics system of a vehicle, such as an ONSTAR® system or the like. One of the indicia 221a thus may indicate that a respective or corresponding user input or touch pad is for initiating a telephone call or the like, while another of the indicia 221b may indicate that a respective or corresponding user input or touch pad is for connecting the vehicle communication system or telematics system to a remote service or the like, and another of the indicia 221c (such as a red cross or an "SOS" icon or the like) may indicate that a respective or corresponding user input or touch pad is for connecting the vehicle communication system or telematics system to an emergency response system or the like. Thus, the user may be readily recognize the functions associated with the user inputs and may be invited to touch the appropriate location of the front surface of the reflective element to activate/control the selected or desired function. In the illustrated embodiment, the indicia or icons may be established at an appliqué that is disposed behind a window or area with a background color that demarcates or distinguishes the window or area from the principal reflecting area of the reflective element (such as, for example, a grey background color or the like).

The prismatic mirror assembly may be mounted or attached at an interior portion of a vehicle (such as at an interior surface of a vehicle windshield) via any suitable mounting means, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, published Apr. 8, 2010, which are hereby incorporated herein by reference in their entireties. Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, published Apr. 8, 2010, which are hereby incorporated herein by reference in their entireties.

The icons and associated touch or proximity sensors of the mirror assemblies of the present invention may be used as the actual switch and may utilize multiple technologies. Optionally, for example, the touch proximity sensor may utilize capacitive touch technology, IR touch technology, ALSENTIS™ touch systems technology, capacitive sensing technology, field effect technology, HSS technology and/or the like, depending on the particular application of the mirror assembly and user inputs or touch/proximity sensors. For example, the touch sensor may detect when an electrically conductive object or material enters an electric field at or near the sensor. The sensor, responsive to a voltage applied thereto, may generate an electric field that may emanate through the glass substrate of the mirror reflective element, and when a conductive object or material enters the field, the sensor detects the change and generates an output signal indicative of the detected touch or proximity of the object or finger. Optionally, and desirably, the sensor may provide a digital output indicative of the sensing of the object or touch. Optionally, and desirably, the touch sensors may be operable over wide temperature ranges, such as between, for example, −40 and +120 degrees C., making it suitable for automotive applications.

Within the scope of the present invention, various touch or proximity technologies, including surface capacitance touch, projection (projected) capacitance touch, resistive touch, infrared (IR) touch (where an IR beam or the like is interrupted and/or sensed), surface acoustic wave (SAW) touch, and close field effect touch, as are commonly known in the touch sensor art. Such touch sensors may utilize aspects of the user input systems described in U.S. Pat. No. 8,154,418 and/or PCT Application No. PCT/US2011/056295, filed Oct. 14, 2011 and published Apr. 19, 2012 as International Publication No. WO 2012/051500, and/or PCT Application No. PCT/US10/51741, filed Oct. 7, 2010 and published Apr. 14, 2011 as International Publication No. WO 2011/044312, U.S. Pat. No. 7,360,932 and/or U.S. patent application Ser. No. 12/091,525, filed Apr. 25, 2008 and published Jan. 15, 2009 as U.S. Pat. Pub. No. US-2009-0015736; Ser. No. 11/239,980, filed Sep. 30, 2005 and published Jun. 15, 2006 as U.S. Pat. Pub. No. US-2006-0125919; and/or Ser. No. 12/576,550, filed Oct. 9, 2009 and published Apr. 15, 2010 as U.S. Pat. Pub. No. US-2010-0091394, which are hereby incorporated herein by reference in their entireties.

Optionally, the user inputs or touch sensors of an electro-optic or prismatic mirror assembly may comprise reconfigurable user inputs, such that in one situation or setting, the user inputs provide one feature or function (or set of features or functions, such as, for example, for control and operation of a telematics system) and in another situation or setting, the user inputs provide a second different feature or function (or set of features or functions, such as, for example, for control and operation of a universal garage door opening system, such as a vehicle based garage door opening system of the types described in U.S. Pat. Nos. 6,396,408; 6,362,771; 7,023,322 and/or 5,798,688, which are hereby incorporated herein by reference in their entireties). Thus, when the system is set for one type of operation, a person touching a particular area of the touch sensitive region of the mirror reflective element assembly may actuate a particular or selected function, and when the system is set for another type of operation, a person touching the same particular area of the touch sensitive region of the mirror reflective element assembly may actuate a different function. For example, and with reference to FIG. 1, when the telematics function is selected for the user inputs 21a, 21b, 21c, actuation of the user inputs controls the telematics system in accordance with the indicator displayed at the respective user input or touch region. When it is desired to control, for example, a garage door opener of the vehicle, the user may actuate or toggle a selection input or touch sensor (not shown), whereby the operation of the user inputs 21a, 21b, 21c is changed or reconfigured to control the garage door opener of the vehicle, so that when, for example, a user presses input 21a, the garage door opener system generates the appropriate signal for opening the garage door that is associated with that input.

The user inputs thus may be selected or toggled for other features or functions to provide multiple functions at the mirror assembly with only a small number (such as three or four) of user inputs or touch sensors. The functions of the user inputs may be selected by the user, such as via actuation of another user input or toggle or switch (such as a fourth user input or touch sensor (not shown) in FIG. 1), whereby the user may toggle between the two (or more) sets of functions associated with the user inputs or touch sensors. Thus, for example, a single reconfigurable user input or sensor may be disposed at each touch region, whereby the user inputs may be reconfigured to provide a selected or appropriate output via actuation of a selection input or toggle switch or the like (such as responsive to an additional or fourth button or input or switch/toggle). Optionally, each of the touch sensitive regions may comprise or may be associated with two (or more) separate and distinct inputs or sensors disposed at each touch location, whereby the operation of a selected one of the separate inputs or sensors may be selected or controlled via actuation of a selection input or toggle switch or the like (such as responsive to actuation of an additional or fourth button or input or switch/toggle).

Optionally, the selection or toggle function may be achieved via appropriate actuation of one or more of the reconfigurable user inputs. For example, a user may press and hold one of the existing inputs for a period of time (or may press/actuate the user input or sensor a predetermined number of times (such as two or more actuations within one second (or more or less) or the like) to change/reconfigure the functions of the user inputs, or the user may press a predetermined combination of inputs or sensors at one time to change/reconfigure the functions of the user inputs.

Optionally, the backlit icons 22a, 22b, 22c (FIG. 2) may be changed to show or indicate the selected function of the respective user input or touch sensor, so that the user is cognitively aware of the function of the user inputs when the user is actuating one or more of the user inputs. Optionally, the backlighting of the user inputs may be changed to indicate the different functions of the user inputs. For example, when backlit in white or other color, the inputs may operate to control the telematics system, but when backlit in red or other color, the inputs may operate to control the garage door opener system (or other system or accessory of the vehicle). In such an application, the icons at the user inputs may be generic so that the color or appearance change (in response to the selected function or functions) is readily perceived and understood by the user. Optionally, two icons may be provided for each user input, with one icon representing the telematics function of the user input and illuminating when the respective user input is actuated when the user inputs are in the telematics mode, and another icon (which may be disposed above or below the first icon or to either side of the first icon, but still generally above the respective user input) representing the garage door opening function (or other function) of the user input and illuminating when the respective user input is actuated when the user inputs are in the garage door opener mode (or other mode).

Thus, the present invention may provide multiple controls or functions of the user inputs or sensors at a reduced cost and at a reduced size (by avoiding having to add additional touch sensors and associated circuitry for six or nine (or more or less) control features). It is envisioned that the telematics functions of the user inputs would be the default function, and the icons may reflect the appropriate telematics function for the respective inputs or sensors. Optionally, if the telematics system is not used (such as when a user or vehicle owner does not subscribe to the system or does not renew their subscription), the system may be reconfigurable to allow the user select and set the garage door opener function (or other function) as the default function of the user inputs or touch sensors. The mirror assembly and user input system thus is able to switch between two (or more) features while utilizing the same three (or more or less) user inputs or touch sensors or buttons.

Other mirror and user input designs or configurations may be contemplated for a mirror assembly that incorporates touch sensors or proximity sensors in accordance with the present invention. For example, the mirror assembly may include a plastic molding that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, such as described in U.S. Pat. Nos. 7,255,541; 7,289,037; 7,360,932 and/or 8,049,640, and/or U.S. patent application Ser. No. 12/752,305, filed Apr. 1, 2010, now U.S. Pat. No. 8,529,108, which are hereby incorporated herein by reference in their entireties. Optionally, for example, the mirror assembly may include a reflective element with a beveled or rounded or curved front perimeter of the glass substrate that may be exposed to, contactable by and viewable by the driver of the vehicle when the interior rearview mirror assembly is normally mounted in the vehicle, such as described in U.S. Des. Pat. Nos. D633,423; D633,019; D638,761 and/or D647,017, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are hereby incorporated herein by reference in their entireties. Optionally, the mirror assembly may include a conventional bezel, such as described in U.S. Pat. No. 7,224,324, which is hereby incorporated herein by reference in its entirety.

Figure 27:
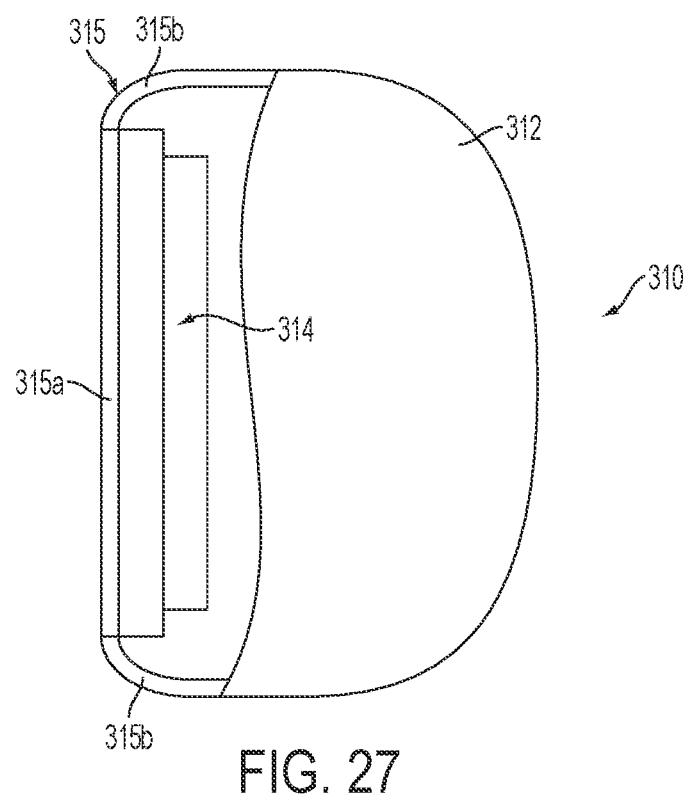
FIG. 27 is a sectional view of another rearview mirror assembly of the present invention, with a transparent cover or substrate disposed at the front surface of the reflective element.

Optionally, for example, and with reference to FIG. 27, a mirror assembly 310 may include a mirror casing 312 and a reflective element 314 (such as an electrochromic reflective element, such as shown in FIG. 27, or such as a prismatic reflective element), with a bezel portion 315 disposed at the front edge portion of the mirror casing 312, and with the bezel portion 315 including a transparent cover panel or substrate 315a disposed at the front surface of the reflective element (and such as by utilizing aspects of the mirror assemblies described in International Publication No. WO 2011/044312, published Apr. 14, 2011, and/or PCT Application No. PCT/US2011/056295, filed Oct. 14, 2011 and published on Apr. 19, 2012 as International Publication No. WO 2012/051500, which are hereby incorporated herein by reference in their entireties). The transparent cover 315a may comprise a plastic substrate that is disposed over the glass substrate of the reflective element and that is integrated with the plastic bezel casing portion 315. For example, the bezel portion 315 may comprise an opaque perimeter portion 315b (such as a black or chrome or colored plastic portion or the like) disposed along and around the perimeter of the reflective element 314, with a transparent cover portion 315a integrally formed or molded with the perimeter portion 315b, such that the bezel portion 315 encompasses the front of the reflective element and substantially houses or encases the reflective element at the rear mirror housing or casing 312.

Optionally, such as for electrochromic mirror applications, the transparent cover portion 315a may include a perimeter border band or opaque portion about and along its perimeter region, such that the cover portion 315a provides a hiding layer that functions to hide or conceal or render covert the perimeter seal of the reflective element (such that the reflective element may be manufactured without such a perimeter band established at and along the perimeter region of the second or rear surface of the front or first substrate). For example, the opaque bezel portion 315b may overlap the perimeter region of the reflective element to provide the opaque border band around or along the perimeter region of the reflective element. The bezel portion 315 may attach to the mirror casing 312 via any suitable attaching means, such as by utilizing aspects of the mirror assemblies described in PCT Application No. PCT/US2011/056295, filed Oct. 14, 2011 and published on Apr. 19, 2012 as International Publication No. WO 2012/051500, and/or U.S. provisional applications, Ser. No. 61/554,017, filed Nov. 1, 2011; and/or Ser. No. 61/543,492, filed Oct. 5, 2011, which are hereby incorporated herein by reference in their entireties. The reflective element 314 may be attached at a back plate attached at the mirror casing 312 or may be attached at the bezel portion 315, depending on the particular application of the mirror assembly.

Optionally, other bezel and/or glass substrate constructions may be selected or implemented to provide a curved or beveled perimeter edge at and around the periphery of the reflective element, while remaining within the spirit and scope of the present invention. With reference to FIGS. 30-39, various bezel and glass substrate shapes are shown that provide such a curved or beveled periphery at the reflective element and/or bezel of the mirror assemblies of the present invention.

Figure 30:
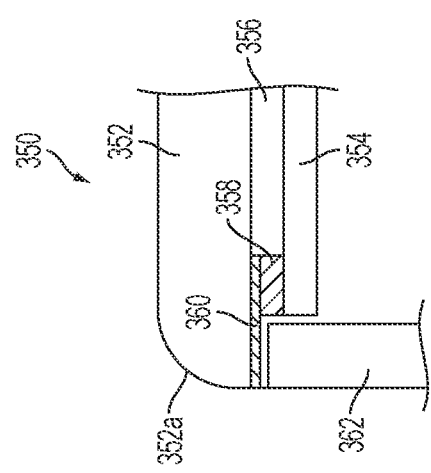

For example, and with reference to FIGS. 30-34, a mirror assembly may include an electrochromic reflective element 350 having a front substrate 352 and a rear substrate 354 and an electrochromic medium 356 disposed therebetween and bounded by a perimeter seal 358. Optionally, an opaque perimeter hiding layer or band 360 may be disposed at the rear surface of the front substrate to render covert the mirror casing 362 and perimeter seal 358 to a person viewing the reflective element from inside the vehicle when the mirror assembly is normally mounted in the vehicle. As shown in FIG. 30, the front substrate 352 has a rounded or curved perimeter edge region 352*a* that provides or establishes the curved transition between the front surface of the front substrate and the side surface of the mirror casing. Optionally, and with reference to FIG. 31, a bezel portion 364 may provide or include a rounded or curved perimeter edge region 364*a* that provides or establishes the curved transition between the front surface of the front substrate of an electrochromic reflective element and the side surface of the mirror casing. Optionally, and with reference to FIG. 32, the bezel portion 364' may be partially curved and the perimeter edge region 352*a*' of the front substrate 352' of an electrochromic reflective element may be partially curved so that the bezel portion and the edge region of the front substrate cooperate or combine to provide or establish the curved transition between the front surface of the front substrate and the side surface of the mirror casing (so that the radius or curved transition region is split or shared between the bezel and the perimeter region of the front substrate). Optionally, and with reference to FIG. 33, the bezel portion 364" may partially overlap a beveled edge region 352*a*" of the front substrate 352" of an electrochromic reflective element, with the bezel portion 364" providing or establishing the curved transition between the front surface of the front substrate and the side surface of the mirror casing, and with the rear of the overlapping bezel portion optionally being configured or shaped to correspond to and receive the beveled edge region of the front substrate. In such an embodiment, the perimeter seal 358" may be disposed so as to be generally behind the overlapping bezel portion to render covert the perimeter seal so that a perimeter hiding layer or opaque perimeter band may not be included. Optionally, and with reference to FIG. 34, a thin bezel or cover portion 366 may partially overlap a perimeter region of a front substrate 352'" of an electrochromic reflective element, such as at a notch or recess 352*b*'" established at the front surface of the front substrate and along the perimeter region of the front surface of the front substrate (and with the recess 352*b*'" receiving the overlapping cover portion therein such that an outer surface 366*a* of the cover portion is generally flush with or generally coplanar with the front surface of the front substrate). In such an embodiment, the perimeter seal 358'" may be disposed so as to be generally behind the overlapping cover portion to render covert the perimeter seal so that a perimeter hiding layer or opaque perimeter band may not be included.

Figure 35:
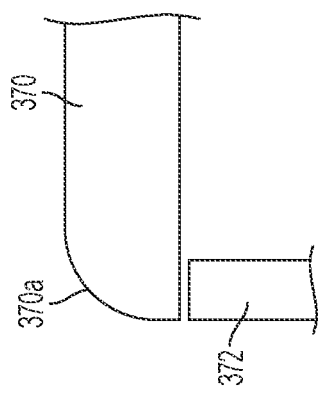

Optionally, and with reference to FIGS. 35-39, a mirror assembly may include a prismatic reflective element having a prismatic or wedge-shaped glass substrate with a reflector coating or layer at its rear surface. As shown in FIG. 35, the prismatic substrate 370 has a rounded or curved perimeter edge region 370*a* that provides or establishes a curved transition between the front surface of the prismatic substrate and the side surface of the mirror casing 372. Optionally, and with reference to FIG. 36, a bezel portion 374 may provide or include a rounded or curved perimeter edge region 374*a* that provides or establishes the curved transition between the front surface of a prismatic substrate and the side surface of the mirror casing. Optionally, and with reference to FIG. 37, the bezel portion 374' may be partially curved and the perimeter edge region 370*a*' of a prismatic substrate 370' may be partially curved so that the bezel portion and the edge region of the prismatic substrate cooperate or combine to provide or establish the curved transition between the front surface of the prismatic substrate and the side surface of the mirror casing (so that the radius or curved transition region is split or shared between the bezel and the perimeter region of the prismatic substrate). Optionally, and with reference to FIG. 38, the bezel portion 374" may partially overlap a beveled edge region 370*a*" of a prismatic substrate 370", with the bezel portion 374" providing or establishing the curved transition between the front surface of the prismatic substrate and the side surface of the mirror casing, and with the rear of the overlapping bezel portion optionally being configured or shaped to correspond to and receive the beveled edge region of the prismatic substrate. Optionally, and with reference to FIG. 39, a thin bezel or cover portion 376 may partially overlap a perimeter region of the front surface of a prismatic substrate 370'", such as at a notch or recess 370*b*'" established at the front surface of the prismatic substrate and along the perimeter region of the front surface of the prismatic substrate (and with the recess 370*b*'" receiving the overlapping cover portion therein such that an outer surface 376*a* of the cover portion is generally flush with or generally coplanar with the front surface of the prismatic substrate).

Figure 40:
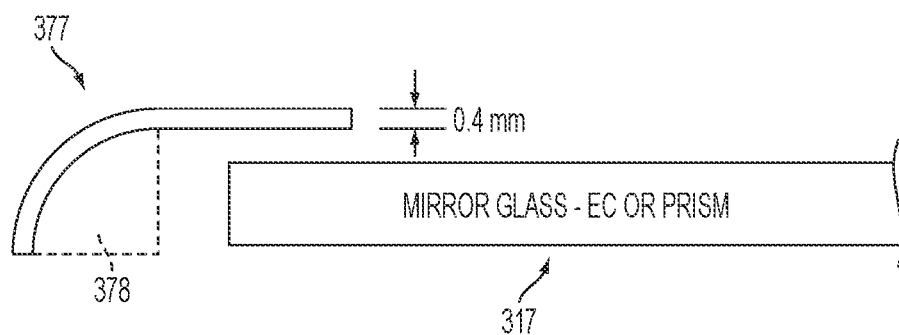
FIG. 40 is a sectional view of another mirror assembly showing a flat bezel that slightly overlaps the front surface of the glass mirror substrate.

Optionally, and with reference to FIG. 40, a thin flat bezel or cover element 377 may partially overlap a perimeter region of the front surface of the mirror substrate 317 (such as a front substrate of an electro-optic or electrochromic reflective element or such as a prismatic substrate of a prismatic reflective element). The bezel element 377 comprises a thin (such as about 0.4 mm thick or thereabouts) element that is curved to provide a curved or rounded outer perimeter region around the mirror substrate 317 (and may have a filler element or attaching element 378 disposed at the inner region of the curved element for attaching the bezel element to the mirror casing). The bezel element 377 may comprise a molded polymeric or plastic element or a stamped metallic material, or may be overmolded with selected features. The bezel element overlaps a perimeter region of the generally planar front surface of the mirror substrate (and may be adhered to the front surface of the mirror substrate) and (because of the thin or low profile of the bezel element) provides a nearly flush appearance to a person viewing the mirror assembly when the mirror assembly is normally mounted in a vehicle. Optionally, the flat or thin bezel element may be finished via any suitable manner to provide the desired appearance and/or texture and/or reflectivity and/or the like at the bezel element and around the periphery of the mirror substrate.

Clearly, other shapes and configurations of the front substrate of an electrochromic reflective element or a prismatic substrate of a prismatic reflective element and/or a bezel or mirror casing or cover portion may be implemented to provide or establish the curved transition between the front surface of the front substrate or prismatic substrate and a side surface of the mirror casing, while remaining within the spirit and scope of the present invention (and such as by utilizing aspects of the mirror assemblies described in U.S. Des. Pat. Nos. D633,423; D633,019; D638,761 and/or D647,017, and/or PCT Application No. PCT/US2011/056295, filed Oct. 14, 2011 and published on Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are all hereby incorporated herein by reference in their entireties). The reflective element may be disposed at and/or attached at the bezel or mirror casing or cover element via any suitable means, such as adhesive or snap together construction or molding of the bezel or casing or element at least partially at or over the perimeter regions of the reflective element.

Optionally, the reflective element (such as a reflective element having a curved or rounded or beveled front perimeter edge region, such as discussed above) may be truncated or cut and a portion of a bezel (such as a bezel or mirror casing portion having a similarly curved or rounded or beveled front perimeter region) may be disposed at the cut portion or portions of the reflective element, in order to provide a partially exposed bezel at the front of the reflective element. For example, and with reference to FIGS. 41A-42, a mirror assembly 380 includes a mirror reflective element 382 (such as an electrochromic mirror reflective element or prismatic mirror reflective element or the like) and a front mirror casing portion or bezel portion 384 that is partially exposed to a person viewing the front of the mirror (such as a driver of a vehicle viewing the mirror assembly when the mirror assembly is normally mounted in the vehicle) at side regions of the mirror reflective element and mirror assembly. In the illustrated embodiment, the mirror reflective element 382 has curved or rounded upper and lower front perimeter edge regions 382a, 382b and cut or non-rounded side regions 382c, while the front mirror casing portion or bezel portion 384 partially receives the reflective element therein and has side portions 384a that abut the side regions 382c of the mirror reflective element 382, with the side portions 384a having curved or rounded front perimeter edge regions 384b that are curved or rounded in a similar manner or shape or form as the upper and lower front perimeter edge regions 382a, 382b of mirror reflective element 382. Thus, the front surface 384c of the side bezel portion 384a is generally coplanar with the front surface 382d of the mirror reflective element at the side regions, and the curved perimeter edge regions 382a, 382b and 384b are substantially similar and have substantially similar profiles at the junction between the bezel portion and reflective element, so that the side bezel portions 384a generally correspond to the profile and surfaces of the reflective element at the cut side regions of the mirror reflective element. The front mirror casing portion or bezel portion may be attached at a rear mirror casing portion 386 (FIG. 41B) or the mirror casing and side bezel portions may be unitarily formed as a single unitary mirror casing.

Figure 42:
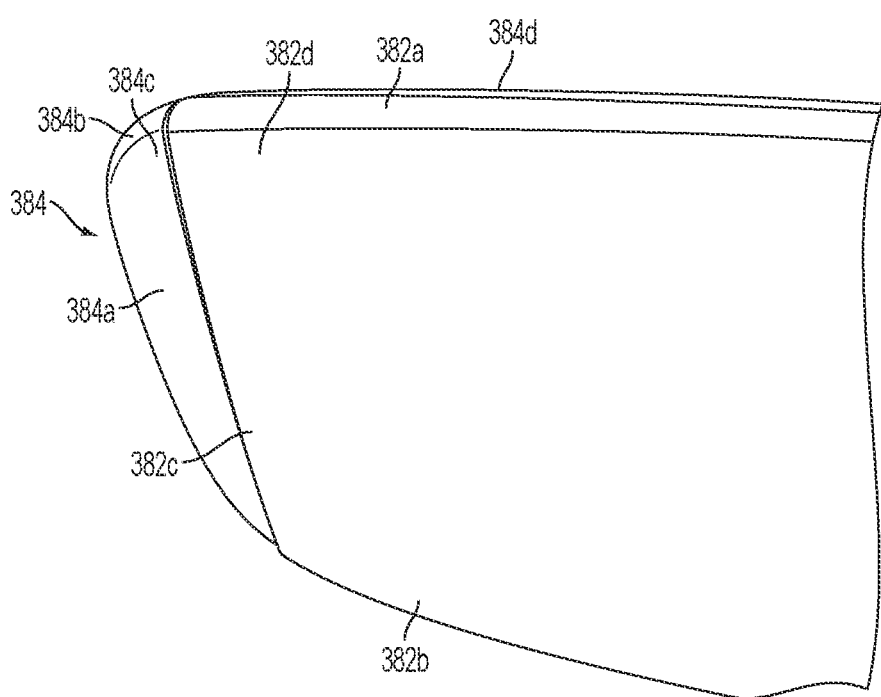
FIG. 42 is an enlarged front perspective view of a side region of the reflective element and attachment element of the mirror assembly of FIGS. 41A and 41B.
Figure 45B:
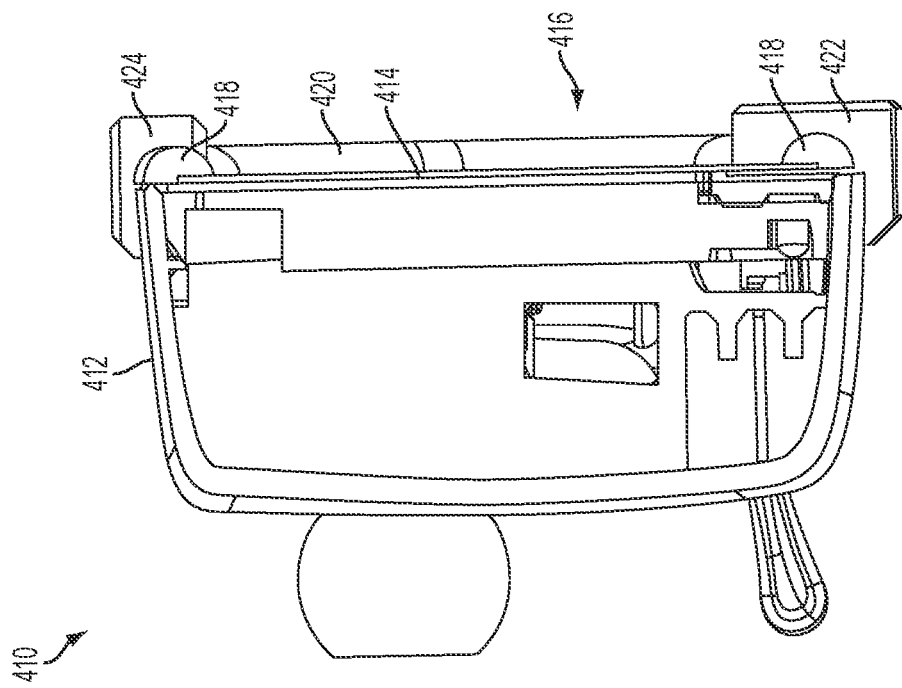
FIG. 45B is another sectional view of the mirror assembly of FIGS. 43-45.
Figure 45A:
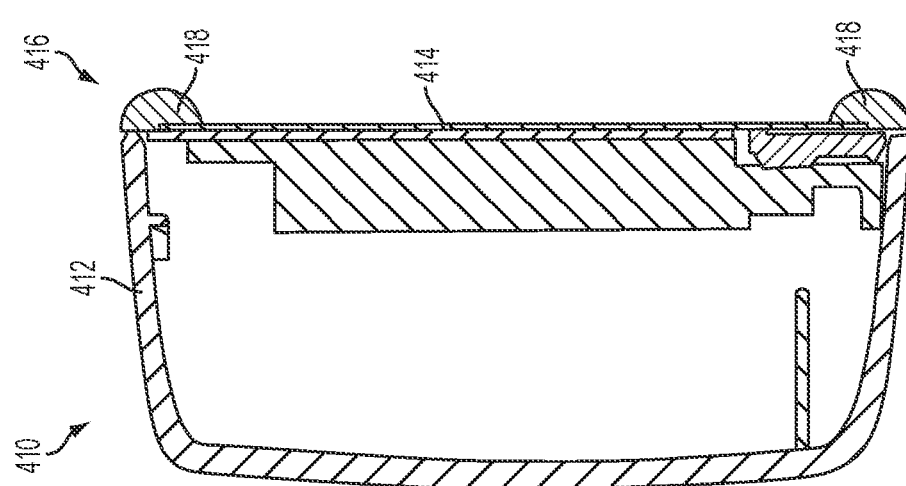
FIG. 45A is a sectional view of the mirror assembly, taken generally along the line A-A in FIG. 45.

Optionally, and as shown in FIGS. 41A-42, the bezel portion 384 may have a rear portion 384d that abuts against the rear surface of the reflective element (such as against a perimeter rear surface region of a front substrate of an electrochromic reflective element or such as against at least a perimeter rear surface region of a prismatic substrate of a prismatic reflective element), so as to partially receive the reflective element between the side bezel portions 384a of the bezel portion 384. The side bezel portions 384a (and/or the other portions of the bezel) may have a different appearance or colored or metallic appearance to contrast the mirror reflective element or to generally match the mirror reflective element, in order to provide the desired appearance for the mirror assembly. Optionally, the side bezel portions 384a (and optionally the rear bezel portion 384d) may have a metallic appearance or may be selectively colored (such as to customize the mirror reflective element for an individual's desire or taste or to generally match or contrast a vehicle trim/lighting color scheme or the like) to provide an enhanced aesthetic appearance for the mirror assembly. Optionally, one or more user inputs (such as touch sensors or buttons or switches or the like) may be disposed at the side bezel portions so that the user touches the side bezel portions to actuate or control one or more accessories and thus does not have to touch the mirror reflective element to actuate or control the accessory or accessories. Clearly, the mirror assembly may include other user inputs, such as touch sensors at or behind the front substrate of the reflective element, such as discussed above.

Optionally, for example, a touch sensitive element for a mirror assembly of the present invention can be a capacitive type or a resistive type or an inductive type, such as are known in the touch panel arts, including such as disclosed in U.S. Pat. Nos. 3,798,370; 4,198,539; 4,661,655; 4,731,508; 4,822,957; 5,045,644; 6,001,486; 6,087,012; 6,627,918; 6,787,240 and/or 7,224,324, and U.S. patent application Ser. No. 09/946,228, filed Sep. 5, 2001 and published Mar. 14, 2002 as U.S. Pat. Publication No. US2002/0031622; and/or Ser. No. 10/744,522, filed Dec. 23, 2003 and published Jul. 15, 2004 as U.S. Pat. Publication No. US2004/0137240, and/or U.S. provisional application Ser. No. 60/244,577, filed Oct. 31, 2000, which are hereby incorporated herein by reference in their entireties. Also, the touch inputs of the present invention do not necessarily require physical contact between the driver's finger and touch sensitive element. Close approach of the driver's finger (or a stylus or other touch/proximity means) to the touch sensitive surface may suffice to achieve a touch input. This can thus be by non-contacting input or by contacting input by a variety of means such as thermal or pyro detection, capacitive or inductive detection, resistive sensing, electromagnetic disturbance sensing or the like. Optionally, a reading of the fingerprint of the person touching the mirror reflector can be taken to verify identity of the person and so authorize particular actions in response (such as turning on the vehicle ignition, such as to start the engine, conducting a remote banking transaction, identifying a person for the purpose of setting vehicle accessories such as seat position, mirror position, climate control, audio system controls, ride system, and the like to the particular setting preferred by that individual person such as is common in vehicle memory systems). The touch sensitive elements or user actuatable selector elements may be responsive to a change in at least one of heat, electrical capacitance, electrical inductance or electrical resistance or the like due to at least close approachment of a human finger, and the mirror assembly may include a plurality of display elements at a plurality of display locations, with a display element of the plurality of display elements being associated with a respective one of the touch sensitive elements. The display element may be selectively activated or backlit by activation of the respective touch sensitive element, and optionally display information desired by a user may be generated in response to the touch sensitive elements being actuated by the user, with such display information being displayed at or near or above the display elements. The display location of the display element and the location of the respective touch sensitive element may be local one another or co-located such that a cognitive relationship between the display element and the respective touch sensitive element is established.

The user actuatable inputs of the present invention may be operable to control any of the accessories of or associated with the mirror assembly and/or accessory module or the like. Optionally, the mirror assembly and/or accessory module and/or console or the like may include other user inputs or actuating devices, without affecting the scope of the present invention. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, which are hereby incorporated herein by reference in their entireties, or such as proximity sensors of the types described in U.S. Pat. Nos. 7,224,324; 7,249,860 and/or 7,446,924, and/or PCT Application No. PCT/US03/40611, filed Dec. 19, 2003 and published on Jul. 15, 2004 as PCT Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and 6,369,804, which are hereby incorporated herein by reference in their entireties, and/or the like, while remaining within the spirit and scope of the present invention.

Thus, the mirror reflective element assembly may include icons or indicia and respective user inputs to indicate to the user the function or functions associated with the respective user inputs or touch pads or areas. The icons may be present and viewable and discernible all the time and/or may be backlit icons, and may be branded or colored by the telematics supplier. Optionally, the icons may be part of a video mirror with a video display screen disposed behind the reflective element (and with the icons displayed by the video display screen and viewable through the transflective mirror reflector of the video mirror reflective element assembly), or the icons may be dedicated icons created by transmissive holes or areas or windows, such as with backlighting at the icon and icon area. Optionally, for example, the icons may comprise one or more colored masks disposed at the rear surface of the reflective element, with one or more white LEDs backlighting the colored mask to backlight the icons. Optionally, the icons may, when backlit, be viewable through the third surface transflective mirror reflector of the mirror reflective element, or the icons may be formed or established behind a hole or window created or formed at and through the third surface mirror reflector in front of where the icon is disposed, with a colored pattern or icon or indicia disposed at or formed or established at the fourth or rear surface of the reflective element and corresponding and/or coinciding with the hole formed at least partially through the third surface reflector, so the user may view through the hole or window and see the icon (which may be backlit or otherwise illuminated if desired). Optionally, a strip of icons or indicia may be disposed at the rear of the reflective element or a liquid crystal display (LCD) may be disposed at the rear of the reflective element to display the icons at the respective areas and at or near the respective user inputs or touch pads established at the perimeter band. The icons thus may be reconfigurable icons as part of a video display screen of a video mirror or may be fixed icons, such as backlit fixed icons established at the rear of the reflective element. The icons are formed or established or displayed at or near the respective user inputs or touch pads and thus are local to and cognitively associated with the respective user inputs or touch pads.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,855,755; 7,274,501; 7,255,451; 7,195,381; 7,184,190; 7,046,448; 5,668,663; 5,724,187 and/or 6,690,268, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include a perimeter lighting feature or ring that provides illumination (such as a low intensity illumination or glow) around the periphery of the reflective element (such as by utilizing aspects of the mirror assemblies described in U.S. patent application Ser. No. 13/644,593, filed Oct. 4, 2012, and published Apr. 11, 2013 as U.S. Publication No. US-2013-0088884, which is hereby incorporated herein by reference in its entirety). For example, and with reference to FIGS. 43-45B, an interior rearview mirror assembly 410 for a vehicle includes a mirror casing or housing or shroud or cap or holder 412, a reflective element 414 positioned at a front portion of the mirror casing 412 and a lighting system or device 416 operable to provide illumination at and behind and generally around the periphery of the reflective element 414. Mirror assembly 410 is adjustably mounted to an interior portion of a vehicle (such as to an interior surface of a vehicle windshield or a headliner of a vehicle or the like) via any suitable mounting structure or mounting configuration or assembly, such as a single ball or pivot mounting configuration or a double ball or pivot mounting configuration or the like.

In the illustrated embodiment, the lighting device or system 416 comprises one or more illumination sources (such as two or more light emitting diodes (LEDs)) and a light directing element or light guiding element 418, 420 (such as a plastic or polymeric light pipe or light directing element). Optionally, and desirably, the light device 416 includes an illumination source at each side or side perimeter portion of the reflective element, such that individual activation of one of the illumination sources will illuminate the perimeter ring or portion of that particular side or periphery portion of the reflective element, while illumination or activation of both illumination sources will illuminate or provide illumination around the entire or substantially the entire periphery of the reflective element. The lighting device provides a rearward facing light element (facing rearward with respect to the vehicle when the mirror assembly is normally mounted in the vehicle) around the perimeter of the mirror reflective element that emits light around (and optionally through) the perimeter of the mirror glass of the interior rearview mirror assembly.

In the illustrated embodiment, the lighting device comprises a bezel portion that is disposed around the periphery of the front substrate of the reflective element and that overlaps or encompasses the front or first surface of the reflective element (which may be a prismatic or electrochromic reflective element or the like). The bezel portion or lighting device may be attached at the reflective element and/or the mirror casing via any suitable means, such as by adhering to the front surface of the reflective element (such as by utilizing aspects of the mirror assemblies described in U.S. Pat. No. 7,360,932, which is hereby incorporated herein by reference in its entirety), and/or such as by snapping or otherwise attaching to an open face of the mirror casing, such as utilizing aspects of the mirror assemblies described in U.S. patent application Ser. No. 13/644,593, filed Oct. 4, 2012, and published Apr. 11, 2013 as U.S. Publication No. US-2013-0088884, which is hereby incorporated herein by reference in its entirety. Thus, illumination provided by the lighting device illuminates the bezel portion or structure and is visible from both the sides and front of the mirror assembly so that both halves of the light ring are visible to the driver and passengers of the vehicle. Optionally, the light ring may be operable to emit different colors and/or may be intermittently operable or flashed, so as to use color codes and/or blinking to indicate to the driver certain warnings or statuses or the like. Optionally, the two halves or portions can be lit or illuminated independently to display side-specific warnings.

For example, the lighting device may comprise two separate light pipes and/or diffusers or the like (such as light pipes disposed along and within a thin perimeter bezel portion so that, when the illumination sources (which may be disposed at one of the ends of each of the light pipes) are activated, the illumination is provided along the respective bezel portion to provide a glow or illumination of the bezel portion). For example, The light ring or lighting strip or the like may each comprise a light pipe or light directing element having a translucent outer wall or surface, such that illumination directed along the lighting strip is viewable through the translucent wall of the lighting strip, whereby the lighting strip glows or is diffusely illuminated along the respective perimeter portion of the reflective element of the mirror assembly. The outer wall of the lighting strip may comprise a black plastic material (or may comprise any suitable or desired or selected color or material) so that, when the illumination sources are not activated, the lighting device appears to be similar to a normal or conventional bezel portion of a mirror assembly.

The two separate light pipes enable lighting each half of the mirror reflective element perimeter portion independently. Use of colored or color-changing lighting elements or blinking/flashing light may be used to indicate different statuses, such as vehicle or safety system statuses, such as indicators relating to blind zone monitoring (where one side of the mirror may be illuminated to indicate detection of an object at that side of the vehicle and at or approaching the blind zone at that side of the vehicle), reverse assist (where one or both sides of the mirror may be illuminated to indicate object detection during a reversing maneuver of the vehicle), lane departure (where one side of the mirror may be illuminated to indicate that it is not safe to change lanes to a side lane adjacent that side of the vehicle, such as responsive to the driver actuating a turn signal at that side of the vehicle), safety belt warning (where the driver or passenger side of the mirror may be illuminated to indicate that the driver or passenger is not wearing their seatbelt), proximity alert (where one side of the mirror may be illuminated to indicate detection of an object at that side of the vehicle), parking assist (where one or both sides of the mirror may be illuminated to indicate detection of an object at the respective side of the vehicle during a parking maneuver of the vehicle), security alarm status (where one or both sides of the mirror may be illuminated to indicate that a security system is activated and/or to indicate detection of an intruder or the like). Optionally, the illumination source (such as a colored or variable colored light emitting diode or the like) may be adjusted to provide customization of colors, such as for a default state and for customizable warnings. Optionally, it is envisioned that the illumination source or sources may be operable responsive to a music or audio input or the like, whereby the illumination sources may provide a music-controlled mood lighting mode or the like.

The functional capabilities of the lighting device should meet the desired or required functional requirements of the OEM and any regulation requirements. The lighting device provides a means of illuminating the perimeter of the mirror reflective element of the interior rearview mirror assembly and allows for customized light colors. For example, the illumination feature may operate in conjunction with or corresponding to a selected custom color for the interior lighting of the vehicle (such as MYCOLOR® offered by Ford Motor Company), whereby the illumination color emitted by the illumination source or sources or lighting element of the interior rearview mirror assembly may be selected or customized by the user to a desired color or color combination. The colored illumination scheme may be selected to match the lighting scheme of the vehicle in which the mirror assembly is mounted or the owner of the vehicle may separately select a color scheme to customize or personalize the interior rearview mirror assembly (such as by utilizing aspects of the mirror assemblies described in U.S. Pat. Nos. 7,626,749; 7,255,451; 7,289,037, which are hereby incorporated herein by reference in their entireties).

Optionally, the lighting device may include an active dual blind zone monitoring device that provides a visual alert (by illuminating an appropriate side of the mirror) that is generally in the driver's forward field of view (and optionally the mirror assembly or alert system may provide an audible alert and/or tactile and/or haptic alert as well). Such a visual indication in the driver's forward field of view limits the need to look away from road. Optionally, the lighting device may function in conjunction with a reverse assist system. For example, the lighting device may illuminate either or both sides of the mirror responsive to detection of an object rearward of the vehicle during a reversing maneuver. Such an alert may be in conjunction with a video display (and optional graphic overlays or alert highlighting) at the interior rearview mirror assembly that is operable to display video images captured by a rearward facing camera of the vehicle.

The lighting device of the present invention thus may include two lighting strips or light pipes or illumination elements disposed along the respective half or perimeter portion of the mirror reflective element. Each lighting strip 418, 420 is associated with a respective illumination source. The illumination sources may be disposed behind the reflective element (such as at a circuit element or circuit board of the mirror assembly) and may emit light that passes through the reflective element to an end region or receiving portion of the respective lighting strip. Optionally, the illumination sources may be disposed at the front of the reflective element (such as at a housing portion or cap portion 422 or 424 of the lighting device) and may emit light that at an end region or receiving portion of the respective lighting strip. In such a configuration, the lighting device may comprise a self-contained lighting device or unit that may be attached at the mirror assembly, such as during manufacture of the mirror assembly or optionally as an aftermarket device (where the lighting device may replace the mirror bezel or may be disposed over the mirror bezel or may provide a bezel to a frameless or bezelless mirror assembly). Power and/or control to the lighting device may be provided via any suitable means, such as via electrical connections of the types described in U.S. Pat. No. 7,360,932, which is hereby incorporated herein by reference in its entirety. Optionally, the lighting device may be connected to a power source and/or a control at the mirror assembly and optionally may be connected to a vehicle network bus or communication bus (such as a CAN bus or a LIN bus or the like) so that the lighting device may receive signals from or associated with other vehicle systems or the like, such as vehicle system status signals and/or the like).

The lighting device system 416 thus provides illumination at a perimeter region of the mirror assembly to provide circumferential or peripheral illumination at the reflective element and/or mirror casing for viewing by the driver of the vehicle. The illumination device or system is preferably operable to provide a low light level or intensity or "glow" at the periphery of the mirror assembly and in a desired or selected color to enhance the appearance of the mirror assembly. Optionally, the lower cap portion 422 of the lighting device 416 may include additional illumination sources or indicators 422a, 422b (or may have apertures or windows or light transmitting portions that allow for illumination emanating from the respective light source to be viewable at the lower cap portion 422 when the light source or sources is/are activated) to provide further indicators at the mirror assembly.

Thus, light emitted by the illumination sources is directed by the respective light strip or light directing element 418, 420 along the respective perimeter edge region of the reflective element to provide a circumferential light ring about and around the reflective element 414 of the mirror assembly 410. Optionally, the light directing element or ring may be selectively operable or solely operable to only illuminate along a selected perimeter region (such as along a lower perimeter region, whereby the illumination provided by the light directing element may function as an interior accent/console light that would be less noticeable to the driver (so the driver would not directly view the light source, just the illumination below the mirror assembly, such as at the instrument panel or a center stack area or the like). Optionally, the light system and light strip or light directing element may include an icon or graphic or logo thereat (such as an icon or logo or graphic that is laser etched, sodablasted or masked or otherwise established at a portion of the light strip or the end or cap portions of the lighting device), so that, when the illumination source or sources are activated, the icon or graphic or logo is viewable by and discernible to a person viewing the interior rearview mirror assembly.

Figure 46:
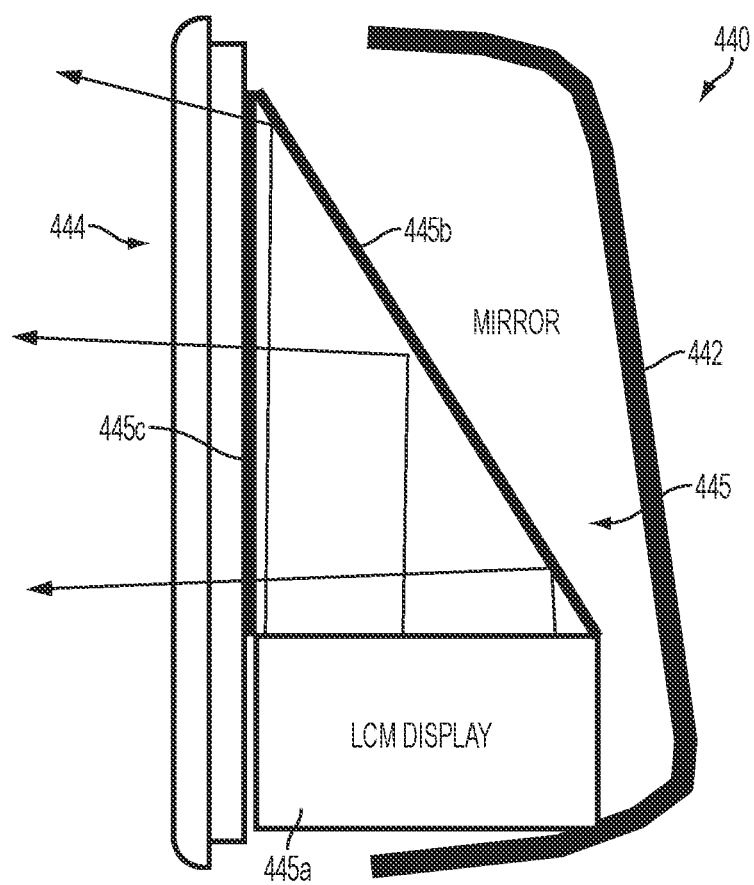
FIGS. 46-49 are sectional views of other mirror assemblies, showing display systems for displaying images and/or information through the reflective elements in accordance with the present invention.

Optionally, the mirror assembly may include a display device or module that is operable to display information through the reflective element, with the display device projecting or emitting light that is directed or reflected towards the rear of the reflective element so as to be viewable through the reflective element, such as by utilizing aspects of the mirror assemblies described in U.S. Pat. No. 7,046,448, which is hereby incorporated herein by reference in its entirety. For example, and with reference to FIG. 46, an interior rearview mirror assembly 440 may include a mirror casing 442 and a reflective element 444 (such as an electrochromic reflective element or prismatic reflective element or the like) and a display device 445. In the illustrated embodiment, display device 445 comprises a backlit display screen 445a (such as a LCM display screen) that, when backlit by a plurality of illumination sources (such as a plurality of light emitting diodes or the like) emits or projects illumination in a direction generally along or parallel to the rear surface of the reflective element, whereby the emitted illumination is reflected towards the reflective element via an angled mirror element or reflecting element 445b. The mirror assembly may include a projection film or the like 445c, such as, for example, a VIKUITI® rear projection film or the like, disposed at the rear surface of the reflective element 444, such that reflected information or image that is reflected by the reflecting element 445b passes through the film 445c and through the reflective element 444 for viewing by the driver of the vehicle when the mirror assembly is normally mounted in the vehicle and when the driver is normally operating the vehicle and/or viewing the mirror assembly in the vehicle.

Figure 48:
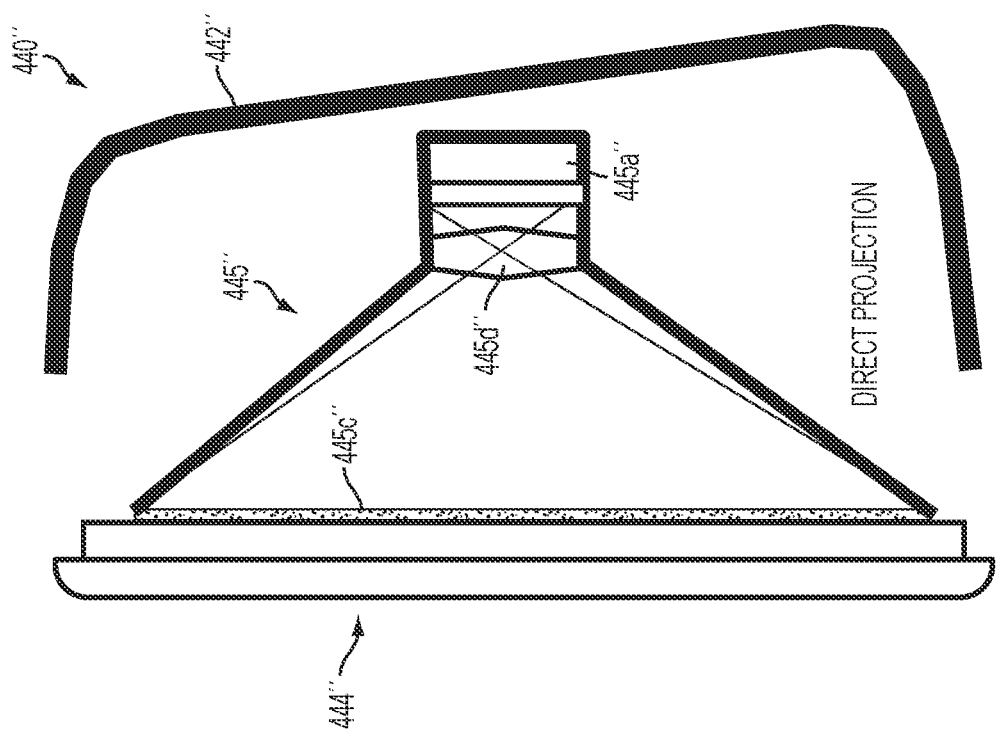
Figure 47:
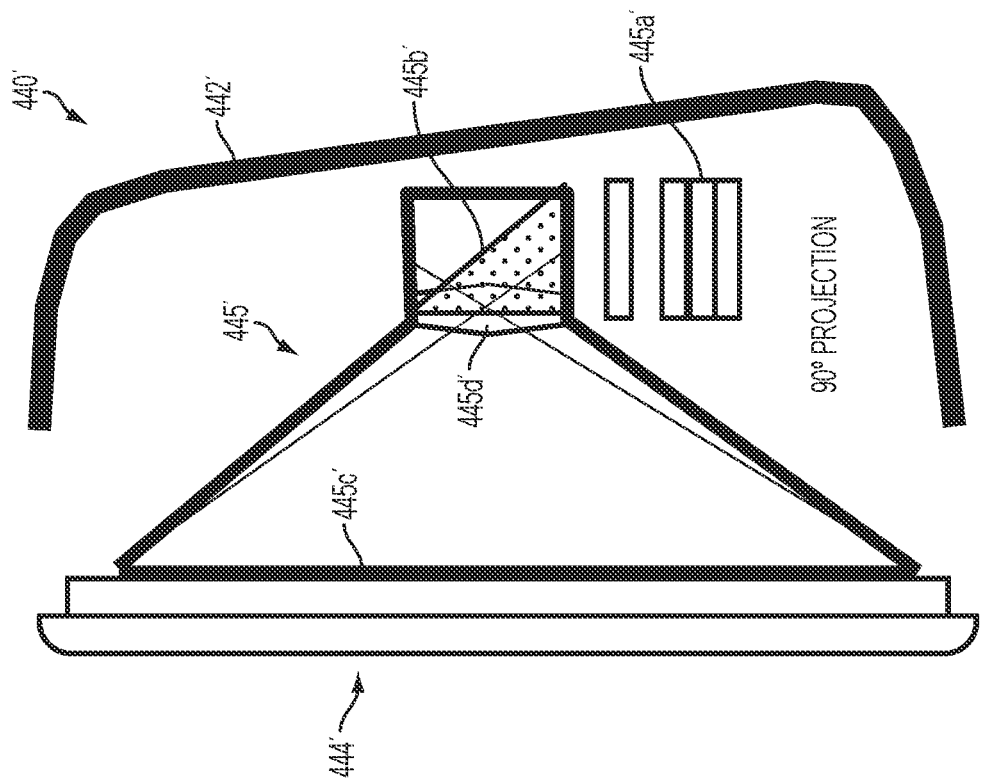

Optionally, and with reference to FIG. 47, an interior rearview mirror assembly 440' may include a mirror casing 442' and a reflective element 444' (such as an electrochromic reflective element or prismatic reflective element or the like) and a display device 445'. In the illustrated embodiment, display device 445' comprises a backlit display screen or projecting device or element 445a' (such as a LCM display screen) that, when backlit by a plurality of illumination sources (such as a plurality of light emitting diodes or the like) emits or projects illumination in a direction generally along or parallel to the rear surface of the reflective element, whereby the emitted illumination is reflected towards the reflective element via an angled mirror element or reflecting element 445b', and whereby the reflected images are focused via a lens or optic element 445d' to project the images towards the rear surface of the reflective element (where the reflective element 445b' and the optic element 445d' may be incorporated in a housing or casing at the output end of the projecting device 445a'). The mirror assembly may include a projection film or the like 445c', such as, for example, a VIKUITI® rear projection film or the like, disposed at the rear surface of the reflective element 444', such that reflected information or image that is reflected by the reflecting element 445b' and directed/focused via optic element 445d' passes through the film 445c' and through the reflective element 444' for viewing by the driver of the vehicle when the mirror assembly is normally mounted in the vehicle and when the driver is normally operating the vehicle and/or viewing the mirror assembly in the vehicle. Optionally, the projecting element and reflecting element and optic element and the like may be incorporated into a projector module 447', such as shown in FIG. 48, while remaining within the spirit and scope of the present invention.

Figure 49:
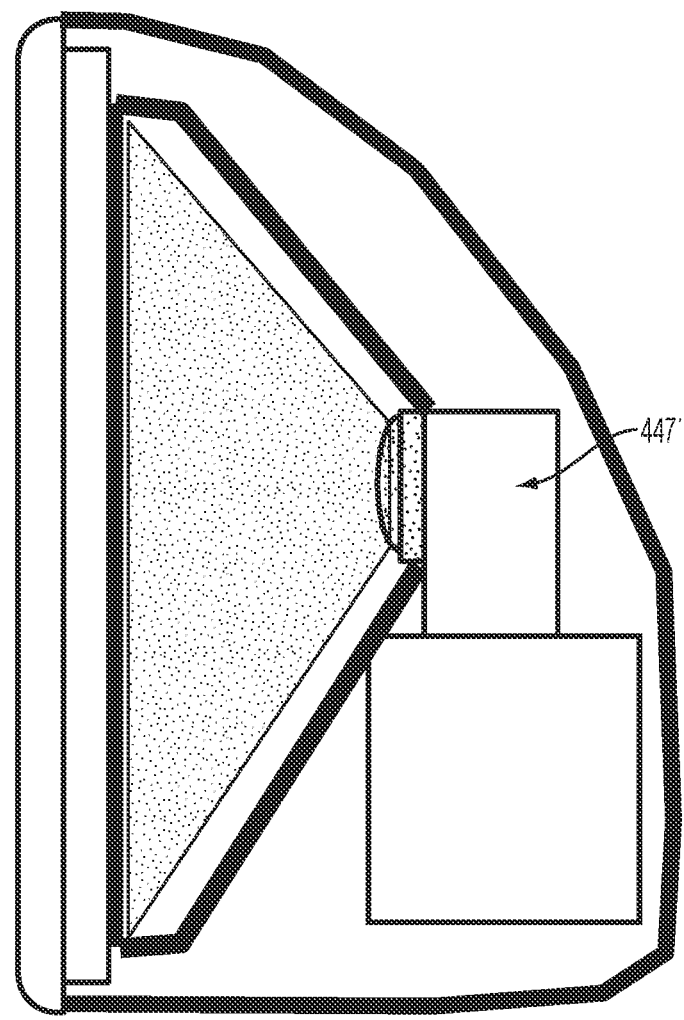

Optionally, and with reference to FIG. 49, an interior rearview mirror assembly 440" may include a mirror casing 442" and a reflective element 444" (such as an electrochromic reflective element or prismatic reflective element or the like) and a display device or projection module 445". In the illustrated embodiment, display device 445" comprises a backlit display screen or projecting device or element 445a" (such as a LCM display screen) that, when backlit by a plurality of illumination sources (such as a plurality of light emitting diodes or the like) emits or projects illumination in a direction generally towards the rear of the reflective element, whereby the projected images are focused via a lens or optic element 445d" to project/focus the images towards the rear surface of the reflective element (where the projecting element 445a" and the optic element 445d" may be incorporated in a housing or casing). The mirror assembly or projection module may include a projection film or the like 445c", such as, for example, a VIKUITI® rear projection film or the like, disposed at the rear surface of the reflective element 444", such that projected information or image that is directed/focused via optic element 445d" passes through the film 445c" and through the reflective element 444" for viewing by the driver of the vehicle when the mirror assembly is normally mounted in the vehicle and when the driver is normally operating the vehicle and/or viewing the mirror assembly in the vehicle.

Figure 50A:
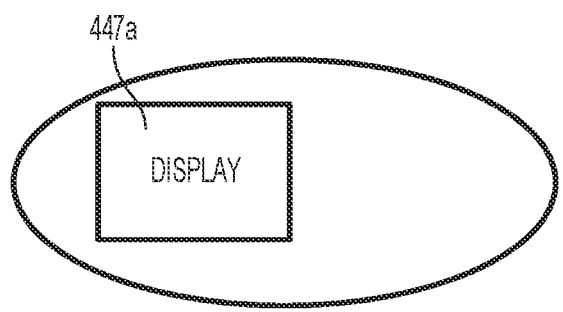
FIGS. 50A-D are plan view schematics of other mirror assemblies, showing different types of display systems for displaying images and/or information through the reflective elements in accordance with the present invention.
Figure 50B:
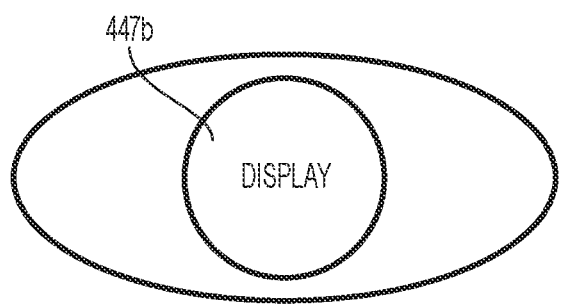
Figure 50C:
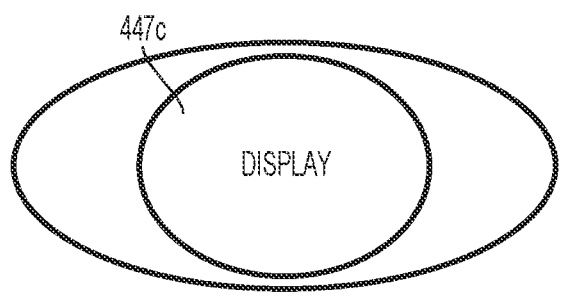
Figure 50D:
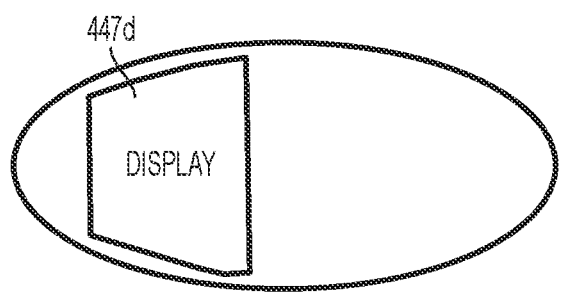

The images projected towards and through the reflective element may comprise any suitable or desired size or shape or location, depending on the particular application of the mirror assembly and desired appearance of the display. For example, and with reference to FIGS. 50A-D, the images may be displayed through the reflective element 444 as a rectangular display or image 447a (FIG. 50A) at a side region or central region of the reflective element, or as a circular or oval display or image 447b, 447c (FIGS. 50B and 50C) at a central or side region of the reflective element, or as a trapezoid-shaped or non-rectangular-shaped display or image 447d (FIG. 50D) at a side or central region of the reflective element. The projection devices of the present invention allow for different sizes and shapes and locations of the displayed images at the reflective element, depending on the particular application of the display devices and mirror assemblies, and may allow for a smaller sized display device while providing a desired size for the displayed images.

Optionally, the mirror assembly or mirror mounting assembly or system may include an energy absorbing device or element to improve the safety of the interior rearview mirror assembly, such as on impact during a collision of the vehicle. The energy absorbing device functions to absorb energy on impact to reduce or substantially preclude or eliminate glass breakage of the interior mirror assembly during a vehicle collision or sudden stop or impact. The energy absorbing device or element may comprise any suitable element that functions to absorb energy when there is an impact at the front of the rearview mirror assembly or at the reflective element of the rearview mirror assembly.

Figure 51:
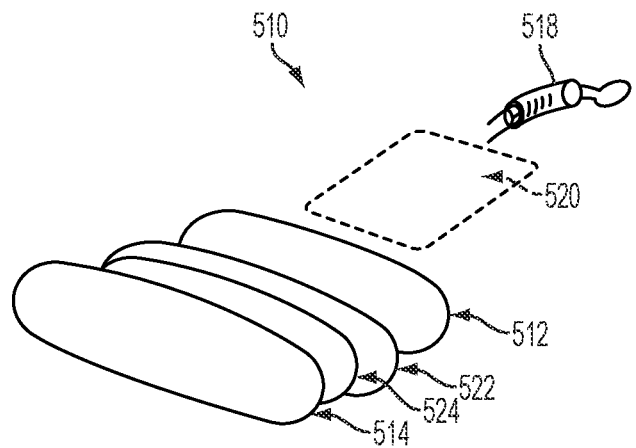
FIG. 51 is an exploded perspective view of an interior rearview mirror assembly, with an energy absorbing device in accordance with the present invention.

For example, and with reference to FIG. 51, an interior rearview mirror assembly 510 includes a reflective element 514 positioned at a front portion of a mirror housing or casing 512, and is adjustably mounted at an interior portion of a vehicle (such as to an interior surface of a vehicle windshield or a headliner of a vehicle or the like) via a mounting structure or mounting configuration or assembly 518. An energy absorbing device or element 520 is provided between the mounting configuration (or as part of the mounting configuration) and the mirror reflective element and the energy absorbing device functions to absorb energy when there is a sudden movement or acceleration of the reflective element relative to the interior portion of the vehicle at which the mirror assembly is attached (such as responsive to an impact with the reflective element of the mirror assembly by an object or occupant within the vehicle during a vehicle collision). The mirror assembly 510 may include a housing or backplate 522 and/or an anti-scatter tape or foam 524 that is disposed between the reflective element and the backplate, and may also include the rear mirror casing or mirror housing 512, depending on the particular application of the mirror assembly.

Figure 52A:
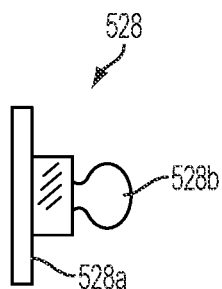
FIG. 52A is a side elevation of a mirror back plate and pivot element having energy absorbing capabilities in accordance with the present invention.
Figure 52B:
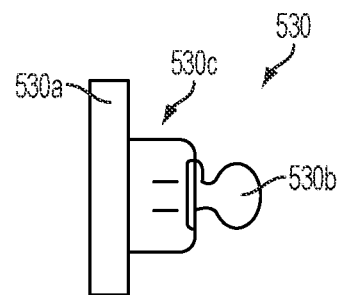
FIG. 52B is a side elevation of another mirror back plate and pivot element having energy absorbing capabilities in accordance with the present invention.
Figure 52C:
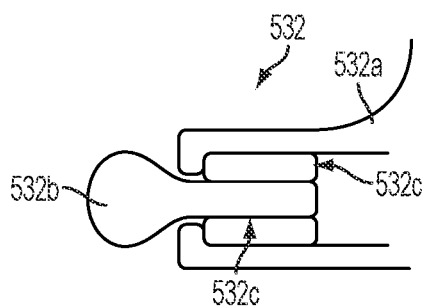
FIG. 52C is a side elevation of another mirror back plate and pivot element having energy absorbing capabilities in accordance with the present invention.
Figure 52D:
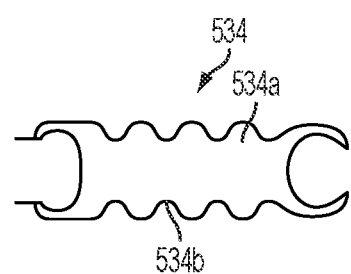
FIG. 52D is a side elevation of a mirror mounting arm or tube having energy absorbing capabilities in accordance with the present invention.

The energy absorbing device 520 may comprise any suitable device or element that functions to absorb energy during a sudden acceleration of the reflective element relative to the interior portion of the vehicle at which the mirror assembly is mounted. The energy absorbing device 520 may comprise a component of the mounting structure or may be incorporated in the mounting structure and/or mirror backplate and/or mirror housing. For example, and with reference to FIG. 52A, an energy absorbing device 528 may comprise a thin wall attachment plate 528a that has the ball stud or mirror mounting ball element 528b disposed thereat (for pivotally mounting the mirror head to a mirror mounting arm of the mounting structure), and that may have an energy absorbing material disposed in a cavity of the energy absorbing device to further enhance the absorbing of energy during an impact. Optionally, for example, and with reference to FIG. 52B, an energy absorbing device 530 may comprise an attachment plate 530a that has a ball stud or mirror mounting ball element 530b (and the plate may be overmolded over a portion of the ball stud), and that may include a thin shear plate 530c at the joint of the ball stud and attachment plate, so that the shear plate may move or shear responsive to a threshold impact at the mirror reflective element or mirror head of the mirror assembly, so that the mounting structure shears before the mirror reflective element breaks. Optionally, for example, and with reference to FIG. 52C, an energy absorbing device 532 may comprise a ball stud 532b that is movably received in a housing 532a (such as a housing at a base or mirror mount that attaches the mirror assembly at the interior portion of the vehicle or such as a housing at an attachment plate or backplate that attaches at the rear of the mirror reflective element or the like), with an energy absorbing material 532c that limits movement of the ball stud relative to the housing and that absorbs energy as the ball stud is moved relative to the housing, such as responsive to a threshold impact at the mirror reflective element or mirror head of the mirror assembly. Optionally, for example, and with reference to FIG. 52D, an energy absorbing device 534 may comprise a mounting arm or tube 534a of the mounting structure (that may pivotally attach to a ball stud at one or both ends thereof). The mounting arm or tube 534a may comprise a collapsible feature (such as a collapsible material and/or creases or grooves or weakened areas 534b that facilitate crumpling or collapsing of the arm responsive to a threshold impact at the mirror reflective element or mirror head of the mirror assembly. Other means for absorbing energy during or responsive to a threshold impact at the mirror reflective element or mirror head of the mirror assembly may be implemented while remaining within the spirit and scope of the present invention.

Optionally, a breakaway ball stud (such as with two ball brackets) may be provided that is insert molded to the attachment plate or toggle, and the breakaway ball stud may include a feature that may shear during impact and collapse into the part, thereby absorbing some of the impact energy. Optionally, features to limit or prevent the ball from detaching from the mirror altogether may be also or otherwise included, such as a barb on the innermost end of the ball stud or the like.

Optionally, the mirror assembly may include a collapsible attachment plate or toggle, which provides a feature around the insert molded ball stud that may be made to collapse permanently during impact to absorb some impact energy. In such a construction, it may be beneficial to incorporate an impact absorbing material or foam, such as, for example, a Bayer Bayfill EA2204L material or the like. The foam may be used to fill the void created by a collapse zone, and the mirror construction may increase the system stiffness by potentially casting the foam around the plastic collapse features, preferably while not degrading vibration stability or flex during adjustment, while still allow for the desired collapsing.

Optionally, the mirror assembly may include a breakaway screw mount, such as a special gib (or dovetail) design that is just as robust relative to force from the set screw, but has features designed to start a crack during impact. Thus, during impact, the gib cracks and the mirror fully detaches from the windshield. With such a construction, the mirror may detach from the windshield before the mirror glass cracks.

Figure 52E:
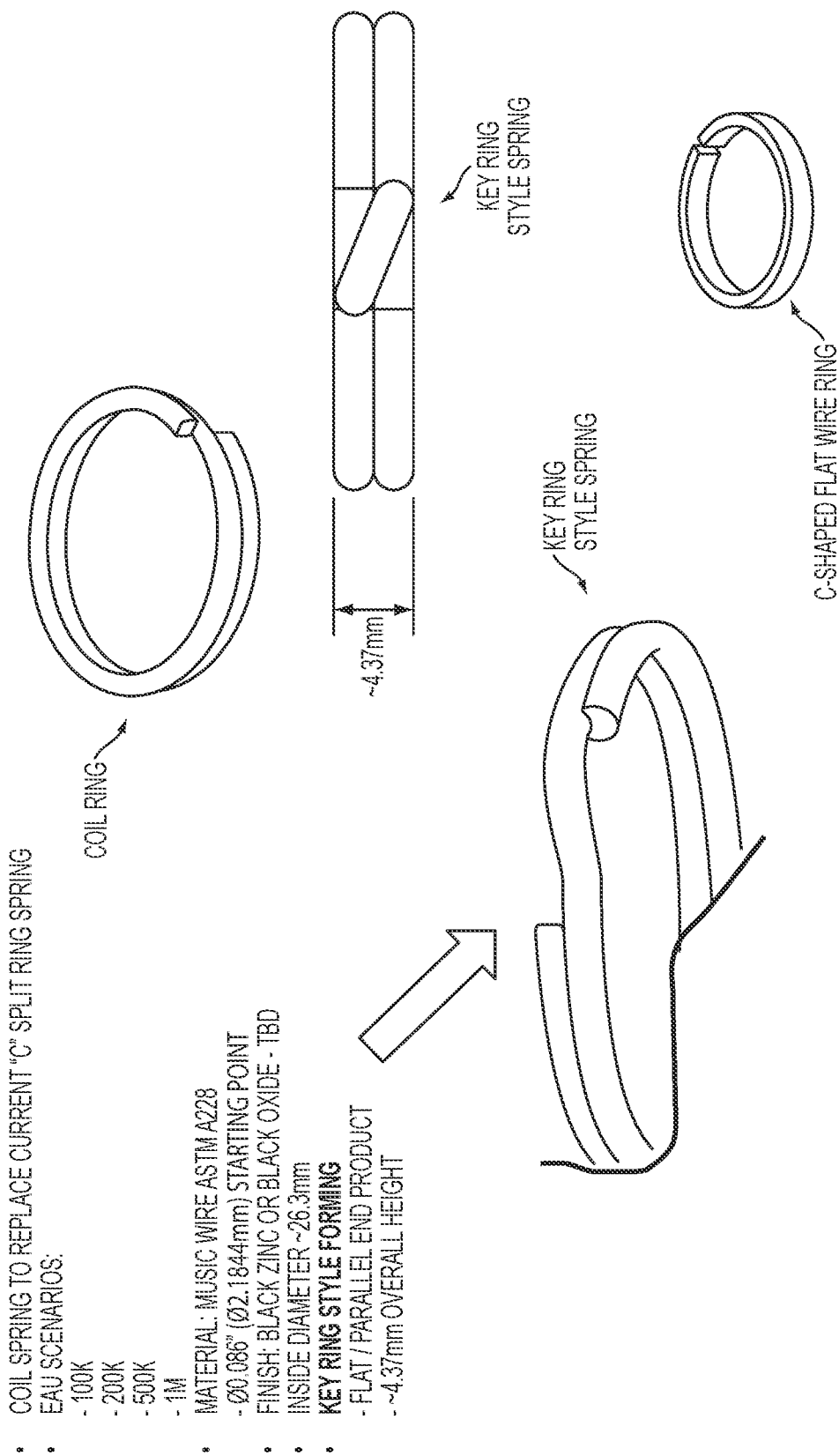
FIG. 52E are images of springs for use in a mounting assembly in accordance with the present invention.

Optionally, a ball-in-socket type of mounting configuration may be used to provide a single or double pivot joint mounting assembly for pivotally or adjustably mounting the mirror assembly at an interior portion of a vehicle, such as at an in-cabin surface of a vehicle windshield. Typically, such a ball-in-socket type of mounting configuration includes a flat wire C-shaped ring which provides a compression spring for creating the adjustment torque. Optionally, it is envisioned that a standard coil spring may be used to provide the desired torque, but such a coil spring has a non-flat end surface where multiple coils are stacked, such as where the terminal ends of the coiled metal are stacked. Such stacking may require tooling changes as this makes the coiled spring taller overall than the flat wire spring. Thus, the present invention provides a "key ring" style spring (FIG. 52E) that solves this issue so that no tooling modifications are required, and makes the assembly more consistent because the equipment can now push on a flat surface at the ends of the spring.

Figure 53:
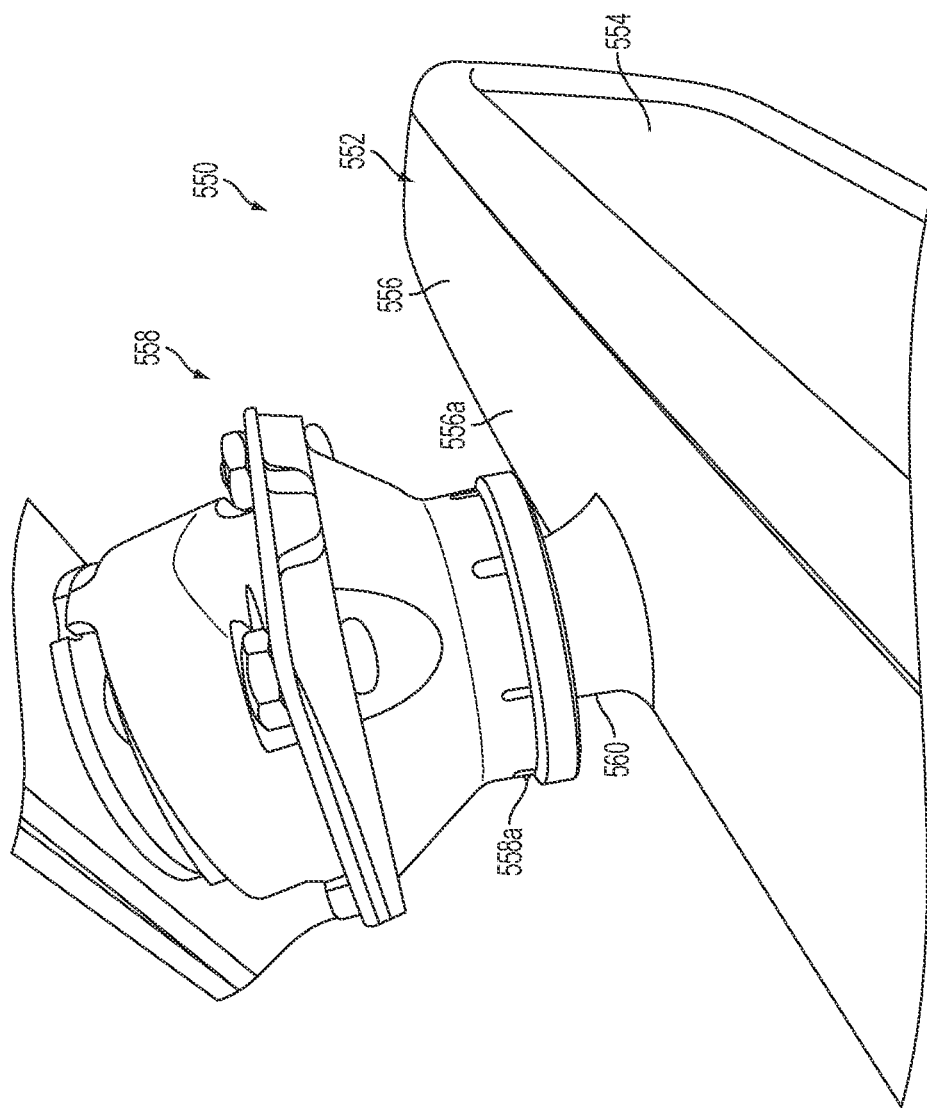
FIG. 53 is a perspective view of a mirror mounting assembly for pivotally attaching a mirror head at an interior portion of a vehicle via a pivot joint at an upper region of the mirror head in accordance with the present invention.

Although shown and described as having a mounting structure (such as a single or double ball/pivot mounting structure) that attaches at the mirror head and protrudes from or through the rear of the mirror casing, it is envisioned that a mounting structure may attach elsewhere at the mirror head, such as at an upper region of the mirror head. For example, and with reference to FIG. 53, an interior rearview mirror assembly 550 comprises a mirror head 552 having a reflective element 554 positioned at a front portion of a mirror housing or casing 556, with the mirror head adjustably mounted at an interior portion of a vehicle (such as to an interior surface of a vehicle windshield or a headliner of a vehicle or the like) via a mounting structure or mounting configuration or assembly 558 that pivotally attaches the mirror head to the interior portion of a vehicle via attachment at an upper region 556a of the mirror casing. In the illustrated embodiment, the attachment element or ball stud or pivot element 560 of the mirror head 552 is attached to or formed with the mirror casing 556 and protrudes generally upwardly therefrom, where it is pivotally received in a amounting arm or receiving element or pivot socket 558a to pivotally attach the mirror head to the mounting structure. By providing the pivot attachment at the upper region of the mirror casing (and exterior of the mirror casing), the mirror assembly may have additional room or space within the mirror casing for housing additional content, such as additional circuitry and/or accessories and/or the like. Optionally, the pivot attachment may protrude from and be exterior of other regions or portions of the mirror casing, while providing enhanced interior space within the mirror casing, while remaining within the spirit and scope of the present invention.

Thus, the mirror reflective element assembly may comprise an electro-optic (such as electrochromic) reflective element or a prismatic reflective element. After the reflective element is coated and assembled, the reflective element is typically inspected to make sure that the curvature of the glass is within appropriate tolerance levels and that the uniformity of the reflective coatings is within appropriate tolerance levels and, for electrochromic reflective elements that have two spaced apart and joined substrates, that the uniformity of the spatial relationship of the substrates is within appropriate tolerance levels. Optionally, an imaging sensor or camera (such as a pixelated imaging array or the like) can be used in inspecting the reflective element assemblies and determining whether or not they are within the desired or appropriate tolerances.

Figure 55:
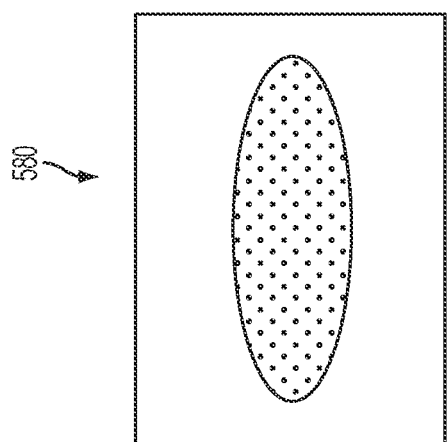
FIG. 55 is a schematic of a reflected image captured by the camera of the mirror inspection system of claim 54.
Figure 54:
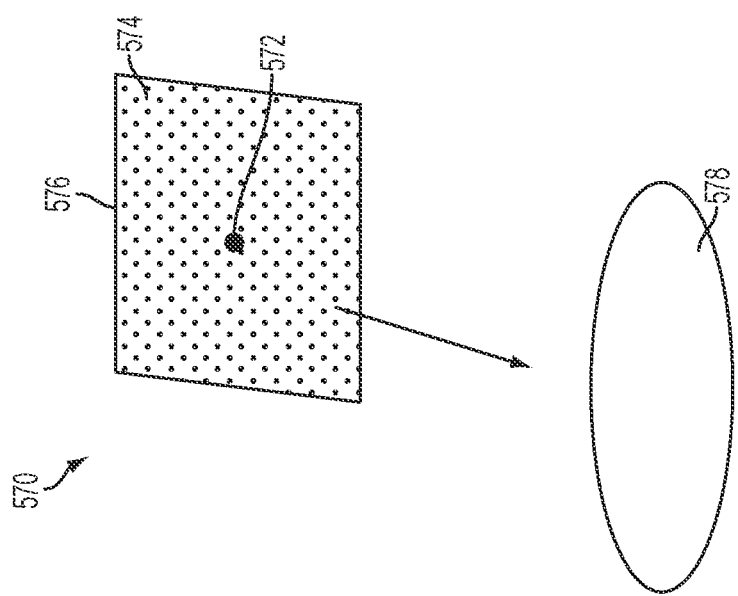
FIG. 54 is a schematic of a mirror inspection system for inspecting mirror reflective elements in accordance with the present invention.

For example, and with reference to FIGS. 54 and 55, an inspection system 570 may include an imaging sensor or camera 572, which may be used with an array or matrix of illumination sources or lighted points or spots 574 on a grid board 576, whereby a reflective element 578 may be positioned in front of the grid board 576 (with the camera 572 disposed at a generally central region of the grid board). For example, the reflective element may be fixedly supported at a fixture or the like to position each reflective element at a substantially precise or known distance and location relative to the fixed camera and lighted or backlit grid board. When the points or spots or dots on the grid board are illuminated or backlit, the illumination points are reflected by the fixtured reflective element and the reflected image is captured by the camera 572. An exemplary captured image 580 is shown in FIG. 55, showing an image of the reflective element and the reflected grid of light spots or dots.

An image processor is operable to process images captured by the camera to determine whether or not the reflected image of the light pattern or grid is within the desired or appropriate tolerance levels (such as by comparing a position of each reflected light dot in the captured image with an expected position for the respective light dots as reflected by an acceptable or substantially flawless mirror). For example, the reflected image is processed and analyzed for distortion and spatial relationship to determine the flatness and matching of the two substrates of an electrochromic reflective element assembly. The inspection method or system of the present invention thus provides enhanced detection of even minor imperfections or irregularities and can detect slight changes or differences between the reflective elements by processing and analyzing the reflected light grid. When one or more of the light dots in the captured reflected image is/are not where it should be in the captured reflected image, the system can detect such an irregularity and determine if it is within or outside of a desired quality tolerance level.

Thus, the mirror reflective element assembly may comprise an electro-optic reflective element assembly, such as an electrochromic reflective element assembly, with a frameless construction. The reflective element assembly may provide a low profile reflective element assembly, with a 6 mm perimeter band (such as a chrome band or the like) disposed around its periphery, and with the band being wider or waisted at the user input or touch zone or area (and with an aperture or window established therethrough at the touch input zone or area). The reflective element may utilize aspects of the mirror assemblies disclosed in U.S. Pat. Nos. 7,224,324 and/or 7,110,156, and/or U.S. Des. Pat. Nos. D493,131 and/or D493,394, which are all hereby incorporated herein by reference in their entireties. The telematics icons or indicia or graphics (or other icons or indicia depending on the particular application of the mirror assembly) may be displayed or viewable to a person viewing the reflective element assembly when the reflective element assembly is normally mounted in the vehicle. Optionally, for example, the icons may be displayed or backlit so as to have a brightness or intensity of at least about 1500 $cd/m^2$ during daytime or higher ambient lighting conditions and/or at least about 80 $cd/m^2$ during nighttime or lower ambient lighting conditions (such as responsive to a photosensor or the like at the mirror assembly). The user input indicators or individual touch pads may be established at an appliqué disposed to the rear of the reflective element assembly, and may be backlit by one or more white LEDs or the like, with a target intensity or brightness of at least about 5 $cd/m^2$ fixed brightness (such as for night viewing, whereby the low intensity backlighting of the individual touch pads may be washed out or partially washed out during daytime lighting conditions).

The mirror assembly of the present invention may be mounted at or to the interior portion of the vehicle (such as to an in-cabin surface of the vehicle windshield) via any suitable mounting means, such as a single ball mounting configuration or double ball mounting configuration. The electrical connection of the mirror circuitry to circuitry or wiring of the vehicle may be via any suitable electrical connection. For example, a standard CCC 10 pin harness connection may be made at the circuitry of the mirror assembly when the mirror assembly is normally mounted in the vehicle. Optionally, a single printed circuit board may be disposed at the rear of the reflective element and may include the capacitive switches or sensors and the backlighting LEDs for the icons and/or other circuitry associated with the user inputs and features/functions. Optionally, the mirror assembly may include a fault indicator or alert indicator (such as a red LED or the like and such as disposed at or between the icons) to indicate to the user when an error or fault is detected in the telematics system or user input or touch system. Optionally, the telematics system and mirror reflective element assembly may provide an indication that the system is functioning properly, such as via a green LED or the like at or near the icons. Optionally, when a user touches an individual touch pad to activate one of the user inputs or touch sensors, the green LED may flash to confirm actuation of that user input. Optionally, the system may provide a delay in activating or controlling the selected feature of the touched individual touch pad to ensure that a proper touch was made by the user. Optionally, the telematics input lines may be fed to a microcontroller or control circuit while the LEDs are powered via a separate high current power supply. The green LED and the red LED or fault indicator may be viewable at or through the same aperture or window (such as a window established between two adjacent touch sensors, such as shown in FIG. 21).

Optionally, the mirror assembly may include a display device, such as a video display screen, disposed behind the mirror reflective element and viewable, when activated, through the mirror reflector and reflective element by the driver of the vehicle when the driver is normally operating the vehicle. The display screen may be operable to display video images, such as images captured by one or more cameras of the vehicle, such as video images captured by a rear backup camera of vehicle, whereby the rearward images are displayed for viewing by the driver of the vehicle during a reversing maneuver. The display screen may display other images from one or more other cameras, and/or may display information or the like, for viewing by the driver or occupant of the vehicle.

Optionally, the display device or display screen or system may be in communication with an on-board diagnostics system of the vehicle (such as via a wire connection to the diagnostics system or port or via a wireless communication associated with the diagnostics system), whereby the display screen may display vehicle system information or status or accessory information or status or the like. For example, the display screen or system may be operable to display real time engine data, such as coolant temperature, oil pressure, engine RPMs, mass air flow rate, intake manifold pressure, throttle position, combustion mixture, engine component operation and status, battery voltage, battery and charging system information, climate control information and/or the like. The displayed information may be reconfigurable or selectable, and may be configured or selected by the driver to display the desired vehicle status or features, in order to provide the driver with information of interest to the driver and to not provide the driver with information that is not of interest or is of less interest to the driver. Optionally, the display screen or system may be operable to display various driving parameters or features to assist the driver in knowing how economically the driver is driving and to assist the driver in improving the fuel economy of the vehicle by adjusting his or her driving habits. For example, the display screen or system may provide a driving score based on acceleration, braking and speed variations to help the driver drive the vehicle in the most economical way for that particular vehicle and/or driving conditions. The display screen or system may also or otherwise provide average fuel economy data, fuel consumption data, trip/odometer data and/or the like, such as may be provided by conventional vehicle-based trip computers. Optionally, the display screen or system may be operable to display fault conditions or status reports on various vehicle systems or accessories, and may be operable to decode diagnostic engine trouble or fault codes so that the user can, for example, see why the "check engine" light or warning was activated, and may allow the user to reset the warning light or alert if desired or appropriate. Optionally, the display screen or system may provide other information or images pertaining to various vehicle accessories or systems, and may be adjusted or reconfigured by the driver or user to display selected features.

The video display screen device or module of the mirror assembly or display system of the present invention may comprise any suitable type of video screen and is operable to display images in response to an input or signal from a control or imaging system. For example, the video display screen may comprise a multi-pixel liquid crystal module (LCM) or liquid crystal video display (LCD), preferably a thin film transistor (TFT) multi-pixel liquid crystal video display (such as discussed below), or the video screen may comprise a multi-pixel organic electroluminescent video display or a multi-pixel light emitting diode (LED) video display, such as an organic light emitting diode (OLED) or inorganic light emitting video diode display or the like, or an electroluminescent (EL) video display or the like. For example, the video display screen may comprise a video screen of the types disclosed in U.S. Pat. Nos. 7,855,755; 7,734,392; 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 13/023,750, filed Feb. 9, 2011, now U.S. Pat. No. 8,890,955; Ser. No. 10/538,724, filed Jun. 13, 2005 and published Mar. 9, 2006 as U.S. Pat. Pub. No. US-2006-0050018; Ser. No. 11/226,628, filed Sep. 14, 2005 and published Mar. 23, 2006 as U.S. Pat. Pub. No. US-2006-0061008; Ser. No. 12/091,525, filed Apr. 25, 2008 and published Jan. 15, 2009 as U.S. Pat. Pub. No. US-2009-0015736; Ser. No. 12/091,525, filed Apr. 25, 2008 and published Jan. 15, 2009 as U.S. Pat. Pub. No. US-2009-0015736; Ser. No. 12/578,732, filed Oct. 14, 2009 and published Apr. 22, 2010 as U.S. Pat. Pub. No. US-2010-0097469; Ser. No. 09/585,379, filed Jun. 1, 2000, now abandoned; and/or Ser. No. 10/207,291, filed Jul. 29, 2002, now abandoned, and/or PCT Application No. PCT/US10/47256, filed Aug. 31, 2010, which are all hereby incorporated herein by reference in their entireties.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,338,177; 7,274,501; 7,195,381; 6,690,298; 5,668,663 and/or 5,724,187, and/or in U.S. patent application Ser. No. 11/226,628, filed Sep. 14, 2005 and published Mar. 23, 2006 as U.S. Pat. Pub. No. US-2006-0061008; and/or Ser. No. 12/091,525, filed Jul. 15, 2008 and published Jan. 15, 2009 as U.S. Pat. Pub. No. US-2009-0015736, which are all hereby incorporated herein by reference in their entireties. Optionally, the prismatic reflective element may comprise a display on demand or transflective prismatic element (such as described in U.S. Pat. Nos. 7,274,501 and/or 7,338,177, which are hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897 and 5,796,094, and/or U.S. patent application Ser. No. 10/534,632, filed May 11, 2005 and published Aug. 3, 2006 as U.S. Pat. Pub. No. US-2006-0171704, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, a rear camera, such as a rear backup video camera/imager or the like (such as a camera and system of the types described in U.S. Pat. Nos. 5,550,677; 5,670,935; 6,498,620; 6,222,447 and/or 5,949,331, which are hereby incorporated herein by reference in their entireties), may be disposed at the vehicle and may have a rearward field of view rearward of the vehicle for capturing images rearward of the vehicle such as for driver assistance during a reversing maneuver of the vehicle or the like. Because such a rear camera has a rearward field of view, the rearward facing camera may be operable to capture images of rearwardly approaching or following vehicles that are behind the vehicle equipped with the rearward facing camera when the vehicle so equipped is driving forwardly along the road or highway. It is envisioned that an image processor or controller (such as an EYEQ™ image processing chip available from Mobileye Vision Technologies Ltd. of Jerusalem, Israel, and such as an image processor of the types described in PCT Application No. PCT/US10/25545, filed Feb. 25, 2010 and published Sep. 2, 2010 as International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing. Using principles of the systems described in U.S. Pat. No. 5,550,677, which is hereby incorporated herein by reference in its entirety, the system may operate to independently control any one or more of the interior rearview mirror assembly and the exterior rearview mirror assemblies of the equipped vehicle, such as based on the intensity and location of glare light detected by the camera and image processor. Such a rear reversing or backup camera and controller can also operate to detect the ambient light level present at the vehicle and may adjust the dimming of the mirror system accordingly, and/or may adjust other displays, lighting and/or accessories of the vehicle in accordance with and responsive to the ambient light detection by the rear backup camera (or by other cameras on the vehicle that view exterior to the vehicle). Such glare detection and ambient light detection and image processing of image data captured by a rear backup assist camera of the vehicle may obviate the need for a separate glare sensor elsewhere at the vehicle, such as at or in the interior rearview mirror assembly of the vehicle or the like. Such image processing and such a mirror control system may utilize aspects of the imaging systems described in U.S. Pat. Nos. 5,550,677; 5,670,935; 5,760,962; 6,201,642; 6,396,397; 6,498,620; 6,097,023; 5,877,897 and 5,796,094, which are hereby incorporated herein by reference in their entireties.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092 and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, which are all hereby incorporated herein by reference in their entireties. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly.

Optionally, it is envisioned that aspects of the present invention may be suitable for an interior rearview mirror assembly that comprises a prismatic mirror assembly or a non-electro-optic mirror assembly (such as a generally planar or optionally slightly curved mirror substrate) or an electro-optic or electrochromic mirror assembly. For example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are hereby incorporated herein by reference in their entireties), that can benefit from the present invention.

Optionally, any and/or all of the electrically powered accessories of the vehicle may be powered via the power source of the vehicle and may be connected to a control and/or the power source when the mirror assembly is installed in the vehicle (such as via electrical connection to a vehicle wiring harness or the like). Optionally, the mirror assembly may include a battery or independent power source for powering one or more of its electrical accessories. Optionally, the mirror assembly may include one or more ultrathin battery. Such an ultrathin battery may be very thin and can be readily packaged within the mirror head (such as a rechargeable, about 0.3 mm thick, Organic Radical Battery (ORB), which is a flexible ultrathin battery that can be recharged quickly, and which is being developed by NEC Corp. of Tokyo, Japan). Such an ultrathin battery may be useful to, for example, refresh a video screen display as a supplement to the vehicle power, and/or may power the EC/LCD dimming of the mirror reflective element and/or the like. The battery may be readily packaged within the mirror head and can be recharged via the vehicle power source.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The interior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. patent application Ser. No. 10/538,724, filed Jun. 13, 2005 and published Mar. 9, 2006 as U.S. Pat. Pub. No. US-2006-0050018; and/or Ser. No. 12/091,525, filed Apr. 25, 2008 and published Jan. 15, 2009 as U.S. Pat. Pub. No. US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. patent application Ser. No. 10/538,724, filed Jun. 13, 2005 and published Mar. 9, 2006 as U.S. Pat. Pub. No. US-2006-0050018, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. patent application Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. patent application Ser. No. 11/239,980, filed Sep. 30, 2005 and published Jun. 15, 2006 as U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4 wd/2 wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and PCT and U.S. patent applications being commonly assigned to Donnelly Corporation and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; 7,004,606 and/or 7,720,580, and/or U.S. patent application Ser. No. 10/534,632, filed May 11, 2005 and published Aug. 3, 2006 as U.S. Patent Publication No. US-2006-0171704; Ser. No. 12/091,359, filed Jun. 10, 2008 and published Oct. 1, 2009 as U.S. Pat. Pub. No. US-2009-0244361; and/or Ser. No. 12/377,054, filed Feb. 10, 2009 and published Aug. 26, 2010 as U.S. Pat. Pub. No. US-2010-0214791, and/or PCT Application No. PCT/US08/78700, filed Oct. 3, 2008 and published Apr. 9, 2009 as International Publication No. WO 2009/046268, and/or PCT Application No. PCT/US08/76022, filed Sep. 11, 2008 and published Mar. 19, 2009 as International Publication No. WO 2009/036176, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005 and published Aug. 3, 2006 as U.S. Pat. Pub. No. US-2006-0171704; and/or Ser. No. 12/091,359, filed Oct. 27, 2006 and published Oct. 1, 2009 as U.S. Pat. Pub. No. US-2009-0244361, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Optionally, the mirror assembly may include or incorporate or receive a module that provides for upgradeable HMI between consumer electronics and the automotive systems and/or mirror systems, such as by utilizing aspects of the mirror assemblies and systems described in International Publication No. WO 2011/028686, published on Mar. 10, 2011, which is hereby incorporated herein by reference in its entirety. Such an upgradeable system may provide the prerequisite items for an HMI video, tactile feedback or haptic feedback, keyboard and sound, both sent and received via video and audio inputs and outputs. A replaceable module may provide interface to various consumer electronics (such as consumer hand held devices and the like), and the module can be replaced to provide connectivity or communication with different consumer electronics. The module may connect to circuitry or the like at the interior rearview mirror assembly, or may be disposed/connected elsewhere in the vehicle. The present invention thus provides upgradeability of the mirror assembly or vehicle systems for different or new consumer electronics, which typically change and are improved or enhanced at a faster pace than the vehicle systems. The replaceable module may also provide an interface to an intelligent home system (such as a garage door opening system or vehicle starting system, which may allow for a person to start their car from inside their home and via a home-based system). The replaceable module thus may be readily changed or replaced to keep the vehicle compatible with consumer electronics as the consumer electronics are upgraded.

Optionally, aspects of the mirror assemblies discussed above may be incorporated in or associated with an exterior rearview mirror assembly that is configured for mounting at a side region of a vehicle. Optionally, an exterior rearview mirror assembly of the present invention may comprise dual actuators and dual pivot axes for adjusting a mirror head and reflective element relative to a side of a vehicle at which the mirror assembly is mounted. For example, and with reference to FIGS. 56-58B, an exterior rearview mirror assembly 610 comprises a reflective element 612 (such as a generally planar or bent reflective element and such as an electrochromic reflective element or a flat glass or curved glass reflective element, such as a flat or curved reflective element having a single flat or planar or curved or convex curved glass substrate or having two flat or curved substrates or the like) that is attached at a rear attaching portion 614*a* of a mirror head housing 614. In the illustrated embodiment, the reflective element is adhered at a rear attaching surface of the mirror head housing, with the front perimeter edge regions of the reflective element being curved or rounded or beveled to provide a smooth or continuous transition between the generally planar front surface of the reflective element and the side walls or surfaces of the mirror housing, such as in a similar manner as discussed above with respect to the interior rearview mirror assemblies.

Figure 56:
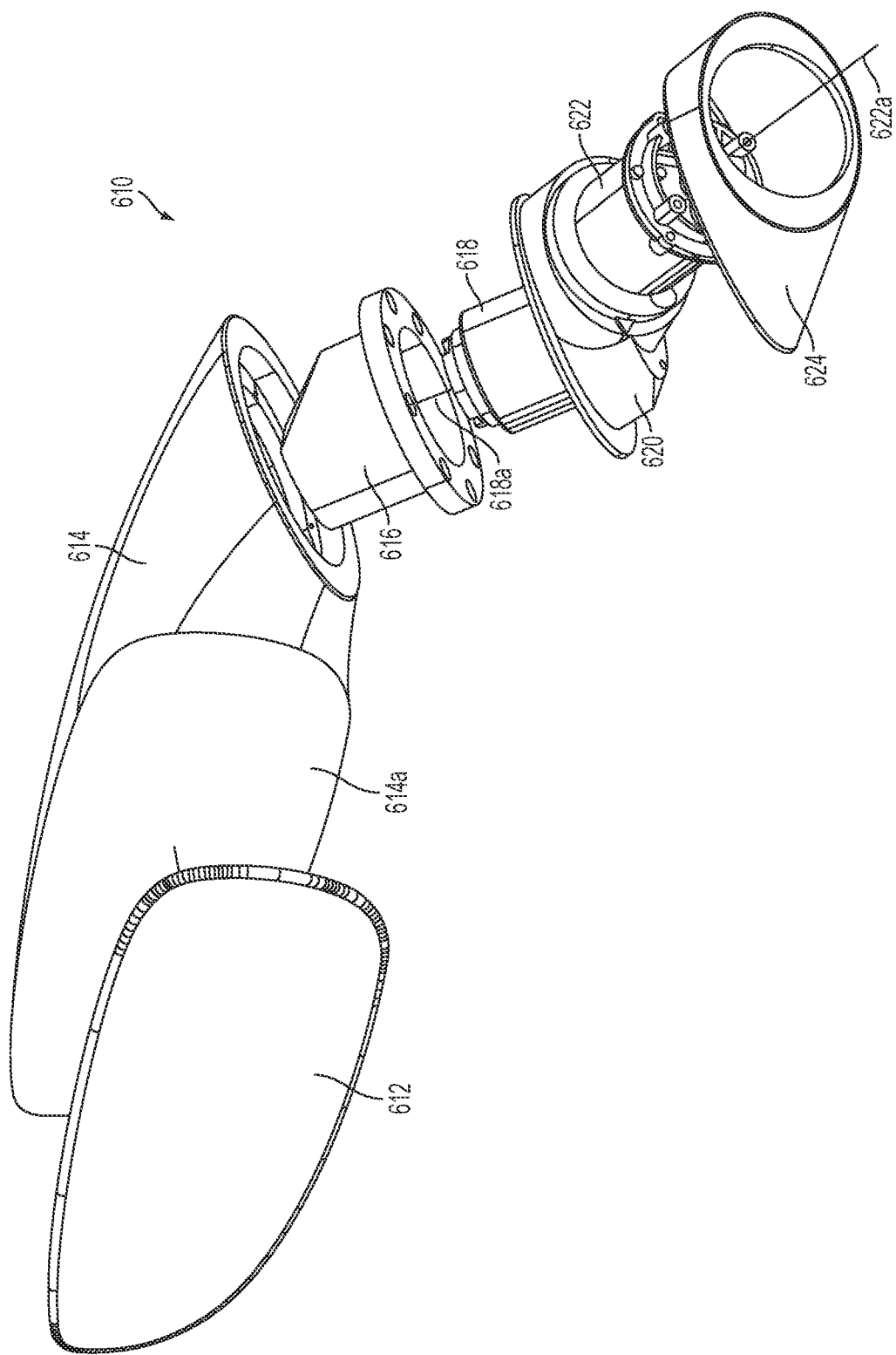
FIG. 56 is an exploded perspective view of an exterior rearview mirror assembly in accordance with the present invention.
Figure 56A:
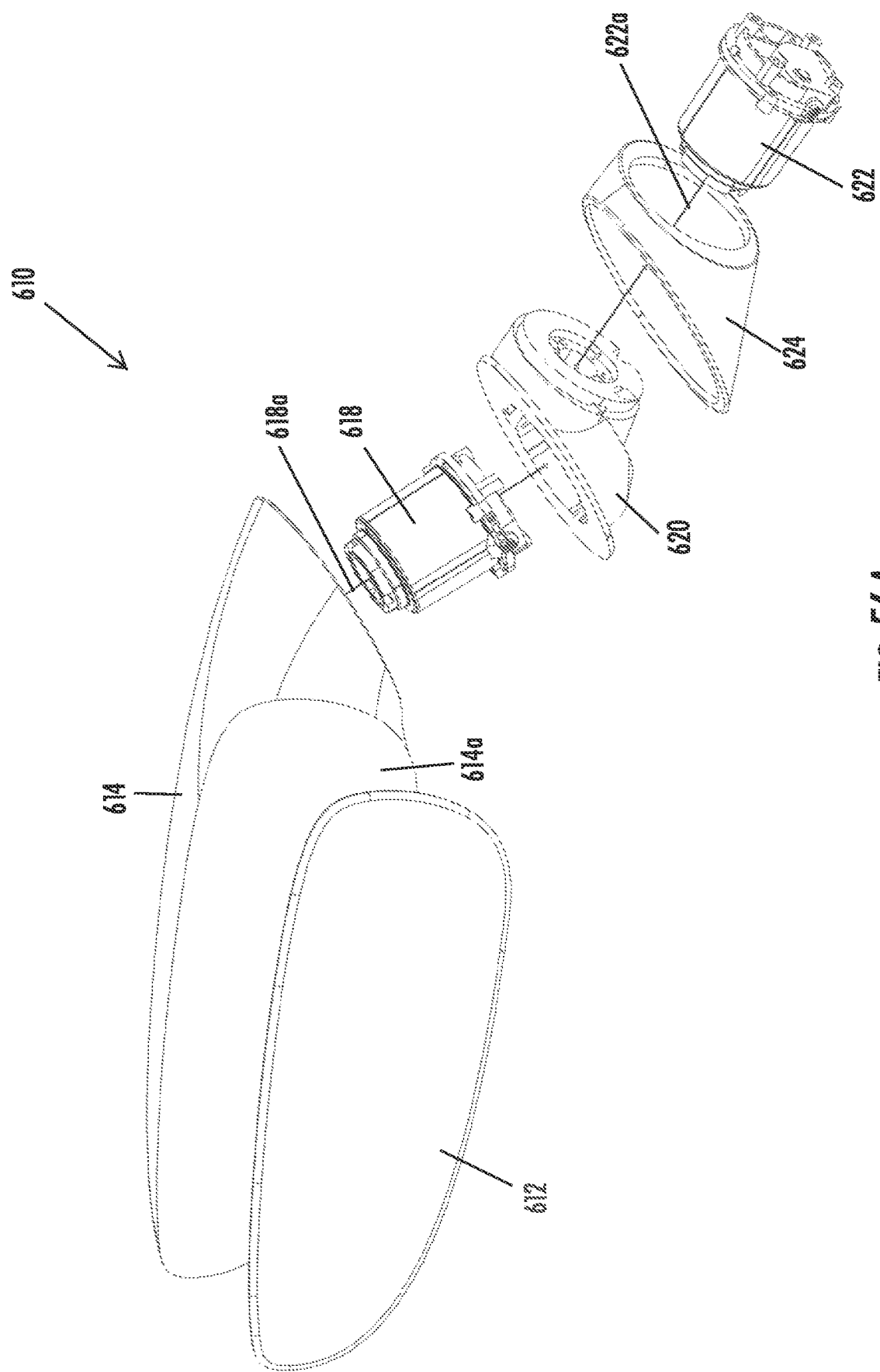

As shown in FIGS. 56, 56A and 56B, mirror head housing 614 is attached at an inner bracket or mounting element 616 that is attached at a first actuator 618, whereby rotational driving of the first actuator 618 imparts a rotation of bracket 616 and mirror head housing 614 about a first pivot axis 618$a$. First actuator 618 is attached to or mounted at an outer bracket 620 or movable portion of the mirror assembly that is mounted to or attached to a second actuator 622, which is attached at or disposed at or in an outer cover 624, whereby rotational driving of second actuator 622 imparts of rotation of bracket 620 and first actuator 618 and bracket 616 and mirror head housing 614 about a second pivot axis 622$a$. The outer cover 624 is disposed at or attached to or mounted at the side portion of the vehicle (and pivotally or rotatably mounted thereat, such as via the actuator 622) when the actuator 622 or non-movable portion of the exterior mirror assembly is normally mounted at the side of the vehicle.

When so mounted, the mirror head is adjustable about the first and second axes (via selective actuation of one or both actuators) to adjust the rearward field of view for the driver of the vehicle. For example, and with reference to FIG. 57, when the second actuator 622 is selectively operated to rotate or pivot outer bracket 620 relative to the side of the vehicle, the mirror head housing 614 is pivoted about the second pivot axis 622$a$ to vertically adjust the rearward field of view for the driver of the vehicle (such as, for example, within about a +/−15 degree range of pivotal adjustment). Also, and with reference to FIGS. 58A and 58B, when the first actuator 618 is selectively operated to rotate or pivot inner bracket 616 relative to outer bracket 620, the mirror head housing 614 is pivoted about the first pivot axis 618$a$ to laterally adjust the rearward field of view (such as, for example, within about a +/−60 degree range of pivotal adjustment). The pivot axes may be angled relative to one another to provide the desired cooperative pivoting of the mirror head and reflective element relative to the side of the vehicle at which the mirror assembly is mounted. For example, the pivot axes may be angled relative to one another at an angle of at least about 15 degrees or at least about 30 degrees or more, such as an angle of up to about 90 degrees, depending on the particular application of the mirror assembly. The operation of the actuators and the operational speed of the actuators may be selected to provide the desired adjustment of the mirror head and reflective element depending on the particular relative angle of the pivot axes and/or the angle of the second pivot axis 622$a$ relative to the side of the vehicle and/or the angle of the first pivot axis 618$a$ relative to the second pivot axis and/or relative to the side of the vehicle.

Because of the angled relationship of the axes of rotation of the actuators and the angled interface or mounting interface of the mirror head housing 614 and outer cover 624, the first and second actuators may be operated together or cooperatively operated to laterally adjust the rearward field of view while maintaining a generally constant tip angle (and without also vertically adjusting the rearward field of view of the reflective element). Thus, when the mirror has been adjusted so that the reflective element has the desired vertical adjustment (via operation of the second actuator 622), a user may laterally adjust the mirror to laterally adjust the rearward field of view of the reflective element, whereby both actuators 618 and 622 may operate to pivot the mirror head about both pivot axes 618$a$, 622$a$ so that the mirror head is pivoted toward or away from the side of the vehicle while limiting vertical adjustment of the rearward field of view of the reflective element. For example, and as can be seen with reference to FIG. 58B, if the mirror head 614 is pivoted about pivot axis 622$a$ in the direction A, then the outer cover 624 may concurrently be pivoted about pivot axis 618$a$ in the direction B, such that the mirror head may have limited or reduced vertical adjustment as it is laterally adjusted relative to the side of the vehicle (so that the mirror head is moved generally in the direction C in FIG. 58B).

Optionally, and desirably, the actuators 618, 622 may operate at different speeds to provide the desired or selected lateral adjustment with limited vertical adjustment (and/or to provide a desired or selected vertical adjustment with limited lateral adjustment and/or to provide a desired or selected vertical and lateral adjustment). The actuators may be controlled by a control or control system that receives an input from a user actuatable device (such as a directional keypad or joystick control common for controlling known exterior mirror actuators) and that may automatically control one or both of the actuators at the desired directions and/or speeds to provide the desired or selected adjustment of the mirror head and reflective element. The control may be operable to determine the appropriate adjustment speeds and degree of adjustment for the actuators to provide the desired adjustment in a manner that appears (to a person viewing the mirror assembly during a lateral adjustment of the mirror head) to be a smooth lateral adjustment of the mirror reflective element. The selected or appropriate speeds and adjustment ranges or angles may vary depending on the particular application of the mirror assembly, such as the particular angle of the side of the vehicle at which the mirror assembly is mounted, and/or the interface angle of the mirror head and outer cover (relative to the angle of the side of the vehicle) and/or the relative angle between the pivot axes of the two actuators (it is envisioned that, at least for some embodiments, the tip or vertical adjustment actuator may run at a slower speed than the lateral adjustment actuator to provide a smooth adjustment of the mirror reflective element and rearward field of view).

Figure 58A:
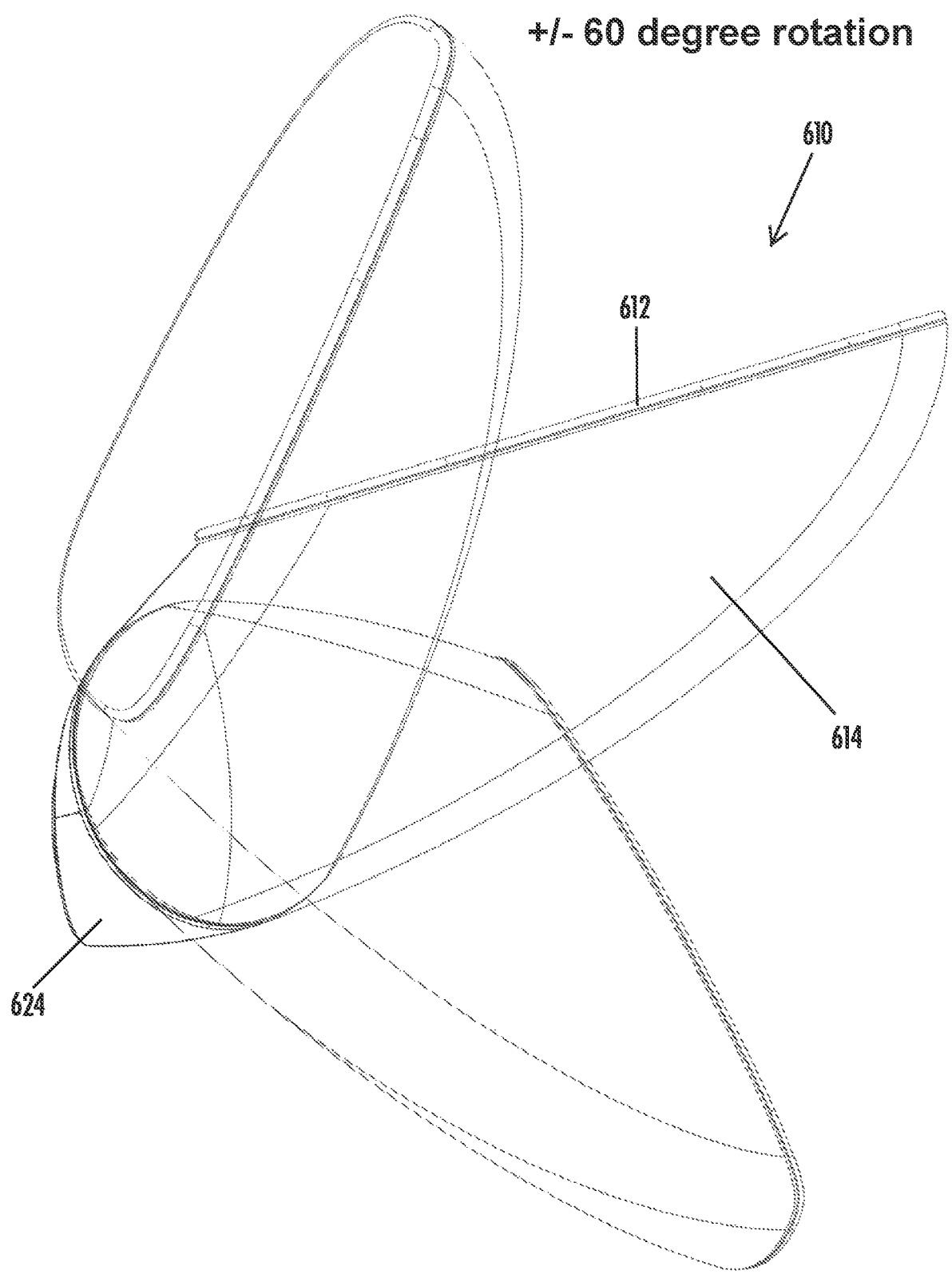
FIG. 58A is a top perspective view of the exterior rearview mirror assembly of FIG. 56, showing the rotation of the mirror head via pivotal movement about a first pivot axis of the mirror assembly.
Figure 58C:
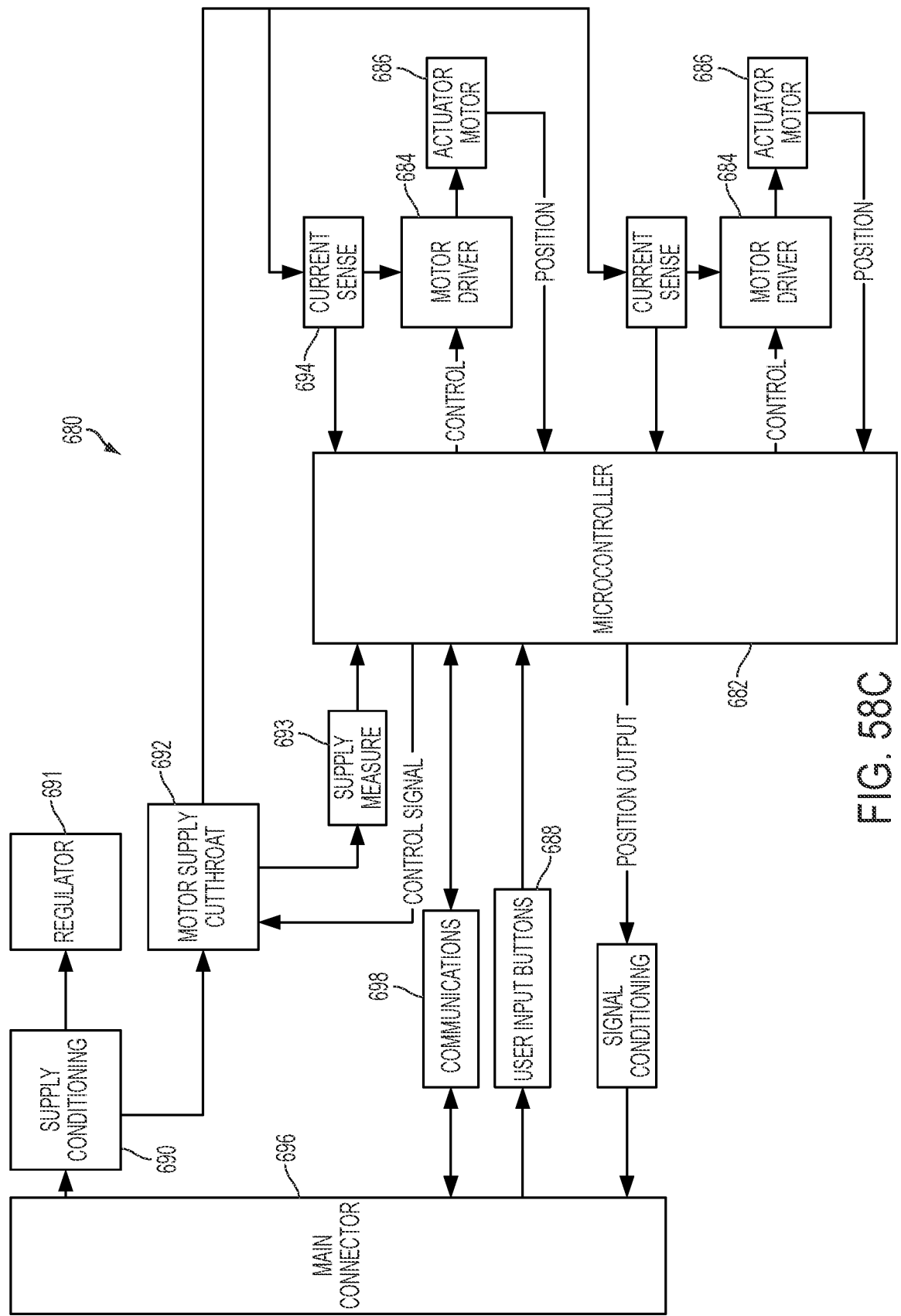
FIG. 58C is a schematic of a control system for controlling operation of the actuators of the exterior rearview mirror assembly of the present invention.
Figure 61:
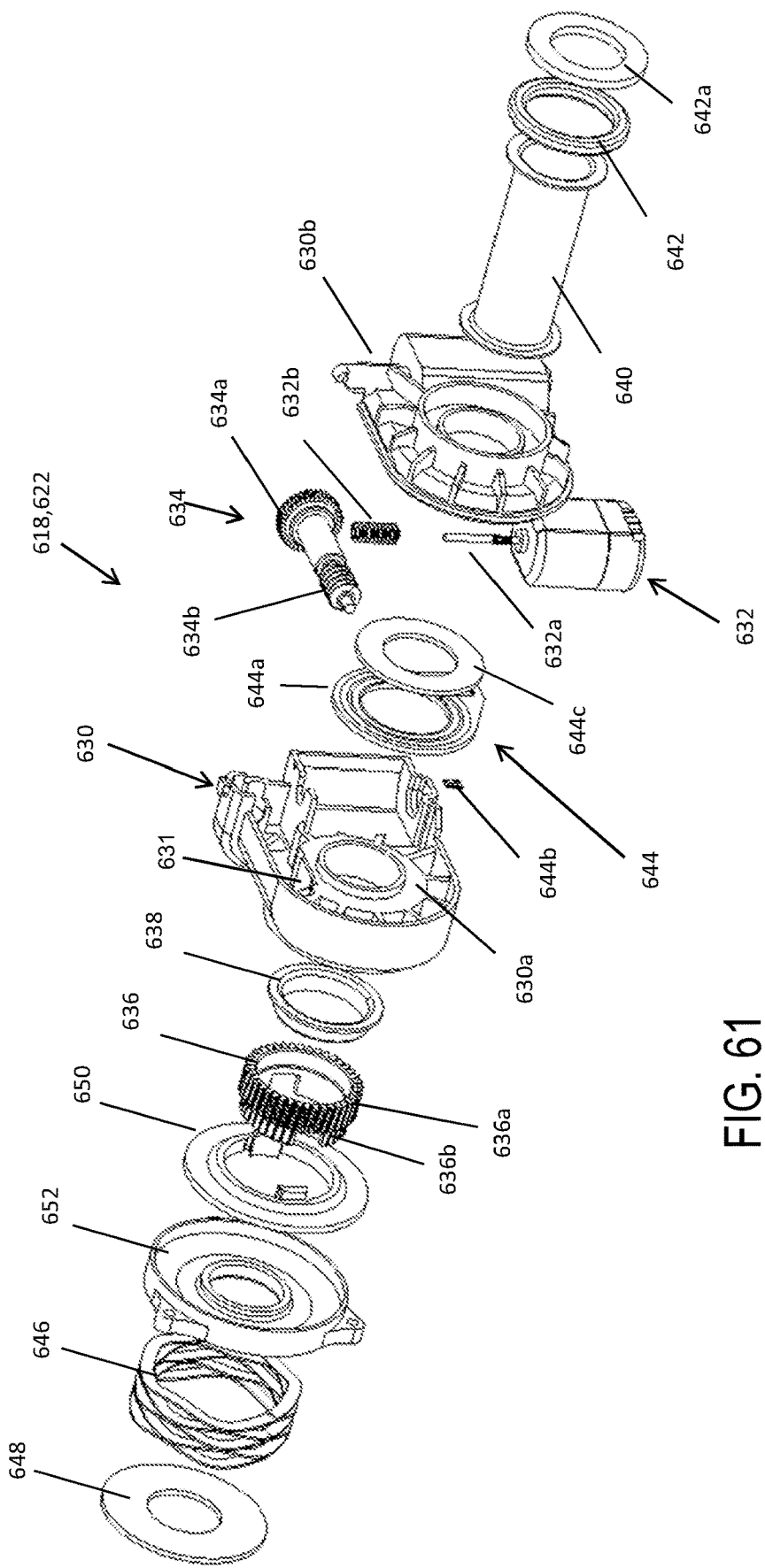
FIG. 61 is an exploded perspective view of the actuator of FIGS. 60A-C.

The control of the mirror assembly may be provided via any suitable control system. For example, and with reference to FIG. 58C, a control system 680 is operable to control the actuator motors to adjust the mirror head housing and the reflective element, such as in response to one or more user inputs. Control system 680 includes a controller 682 (such as a microcontroller or microprocessor or the like), which is operable to control the motor drivers 684 and actuator motors 686 responsive to one or more user inputs or buttons or switches 688. Controller 682 receives a position signal from each of the actuator motors so that the controller knows the position or angle or degree of rotation of each motor of the mirror assembly. As shown in FIG. 58C, the control system 680 includes a supply conditioning element or device 690, a regulator 691, a motor supply cutthroat 692, a supply measure 693 in communication with the controller 682 and a current sensor 694 in communication with the controller, the motor supply cutthroat and each of the motor drivers.

The configuration or architecture of the control system for the exterior rearview mirror assembly is such that the specific mechanical implementation (i.e. the relative planes of motion of each actuator) is separated from the vehicle control systems (and thus the control system of the exterior mirror assembly may plug into an electrical connector or main connector 696 of the vehicle (such as via a multi-pin connector or plug-and-socket type connector or the like), such as when the exterior rearview mirror assembly is mounted at an exterior portion of a vehicle during assembly of the vehicle. The necessary knowledge of the mechanical implementation is fully contained within the control system of the mirror assembly itself. This ensures that the vehicle control systems need not change for every application. This allows a greater degree of design and styling flexibility without affecting the vehicle control systems.

The controller board incorporates a controller or microcontroller that is responsible for overall mirror system control and status monitoring. The motion command input is received by the microcontroller either via the user input buttons or toggle or switch 688 (such as for controlling up, down, left, right, fold and deploy motions and/or the like) or from another vehicle module via the communications block 698, typically either a LIN or CAN bus or the like. The controller interprets the input or command and activates each motor driver accordingly. The control signal to each motor driver is pulse width modulated (PWM) to regulate the speed of each motor and thereby each axis of motion in the mirror assembly.

The speed of each motor is determined algorithmically based on the mechanical configuration of the mirror assembly. In this manner, the mirror assembly can move in a typical fashion regardless of the axis orientation. As the actual speed of each motor is dependent on the supplied driving voltage as well as the ambient temperature of the system, the controller measures those parameters and further algorithmically adjusts the pulse width of the control signal. As an additional input, position feedback can be utilized to directly measure the position and speed of each actuator and relative to each axis of rotation. These attributes can be used by the controller to further adjust the pulse width supplied to each motor driver. Optionally, the mirror assembly and/or control circuitry may operate the actuator or actuators at 12 volts or the like during normal operation, and may include a booster circuit that is operable to operate the actuator at a higher power or voltage (such as at 24 Volts or the like) for increased speed during a powerfold operation (where the mirror head is pivoted about both axes to fold or move so as to be generally along the side of the vehicle).

This feedback enables real-time adjustment of the motion of the mirror head about each axis of rotation to provide highly accurate and repeatable motion over time and wear during the life cycle of the rearview mirror assembly. The control system is configured to also provide a memory system for the mirror assembly, such as for vehicle applications that include such memory systems. The vehicle module responsible for the memory system typically provides a reference voltage and ground and reads back a scaled version of the reference voltage. The controller in the exterior rearview mirror assembly provides these scaled voltages via the position output signals. These signals are algorithmically calculated from the position feedback read from each actuator and are scaled to the provided reference voltage.

The exterior rearview mirror assembly of the present invention thus provides for adjustment of the rearward field of view at the rearview mirror via adjustment or operation of two actuators having different or non-co-axial axes of rotation. For example, and as shown in FIG. 59, the exterior mirror assembly 610 has the mirror head housing 614 pivotally attached at the outer cover 624 via the first actuator 618, whereby rotational driving of the first actuator 618 imparts a rotation of mirror head housing 614 about the first pivot axis 618*a* relative to the outer cover 624. The outer cover 624 is pivotally attached at the side of the vehicle via the second actuator, whereby rotational driving of second actuator 622 imparts rotation of outer cover 624 and mirror head housing 614 the a second pivot axis 622*a*. The outer cover 624 is disposed at or attached to or mounted at the side portion of the vehicle (and pivotally or rotatably mounted thereat, such as via the actuator 622) when the exterior mirror assembly is normally mounted at the side of the vehicle.

As shown in FIGS. 60A-62, actuator 618, 622 (the first actuator 618 is preferably similar in construction and components as the second actuator 622, so they are described as a common actuator below) comprises a housing or bracket 630 that houses or receives the drive motor 632 therein. In the illustrated embodiment, an output shaft 632*a* (with a worm gear 632*b* attached thereat) of the drive motor 632 is rotatably drivable (via actuation of the drive motor 632 in the selected or appropriate direction) to rotatably drive a combination gear element 634, which, in turn, rotatably drives an output gear 636 at the housing 630 and at a gear bushing 638. In the illustrated embodiment, the gear element 634 has a gear element 634*a* that engages worm gear 632*b* and a worm gear element 634*b* that engages a first gear element 636*a* of output gear 636 (such as through an opening or aperture 631 at a center housing portion 630*a* of housing 630, with the gear bushing 638 and first gear element 636*a* of output gear 636 received in or nested in the center housing portion 630*a* and the worm gear 634*b* disposed outboard of the center housing portion 630*a* and at the aperture 631). A rivet tube 640 extends through housing 630 and receives or extends through a bearing washer 642*a* and a bearing 642 at one end (where a housing cover 630*b* is attached to contain or house the motor and other components with the housing 630). A memory system 644 is disposed between the bearing washer 642*a* and the gear bushing 638. Rivet tube 640 extends through or receives a spring 646 and spring washer 648 at the other end of the tube 640, with a clutch plate 650 and an adapter plate 652 disposed between the spring 646 and the housing 630.

When the exterior rearview mirror assembly 610 is assembled and mounted at a vehicle, the housing 630 of second actuator 622 may be attached or affixed at the side portion of the vehicle. The outer cover 624 has an attachment plate or receiver 654 (FIG. 59) that receives the spring 646 and spring washer 648 therein and that interfaces with and attaches to the adapter plate 652 (such as via a snap together connection or via one or more fasteners or the like, or the adaptor plate and the mirror bracket or attachment plate may be combined and the rivet tube may hold the parts together instead of fasteners or the like). When assembled and mounted in this manner, rotational driving of drive motor 632 of second actuator 622 imparts rotation of the output gear 636, which, in turn, rotatably drives the clutch plate 650, which rotatably drives the adapter plate 652 and thus the receiver 654 and outer cover 624 relative to the actuator housing 630 and the side of the vehicle. Likewise, when the exterior rearview mirror assembly 610 is assembled, the housing 630 of the first actuator 618 may be attached or affixed at the mirror housing 614 and the attachment plate or receiver 654 may be attached or affixed at the outer cover 624, such that rotational driving of drive motor 632 of first actuator 618 imparts rotation of the output gear 636, which, in turn, rotatably drives the clutch plate 650, which rotatably drives the adapter plate 652 and thus the receiver 654 and outer cover 624 relative to the actuator housing 630 and the mirror housing 614. The adapter plate 652 is press fit at the rivet tube 640 such that rotation of the adapter plate imparts a corresponding rotation of the rivet tube, which rotates via bearing 642 relative to the housing cover portion 630b and housing 630.

Figure 62:
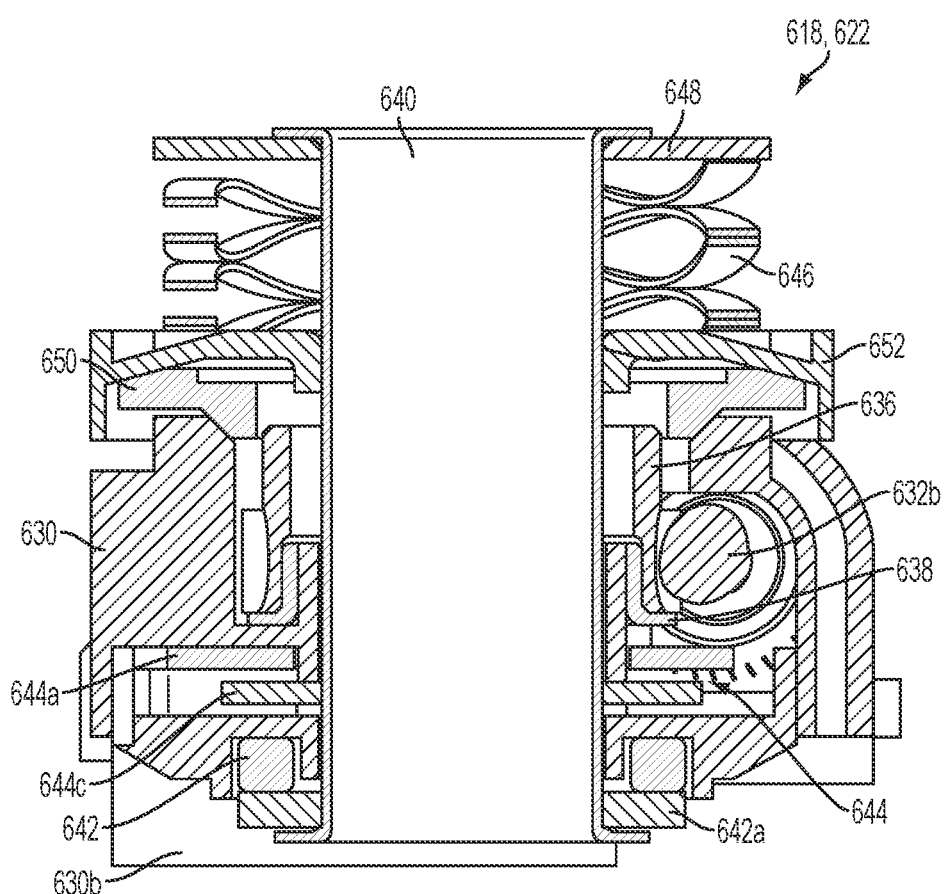
FIG. 62 is a sectional view of the actuator of FIGS. 60A-C.
Figure 64:
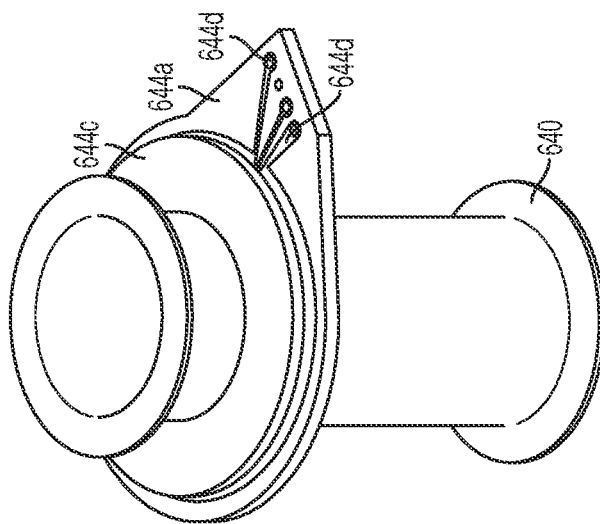
FIG. 64 is an enlarged perspective view of a memory element of the actuator of FIGS. 60A-C.
Figure 63:
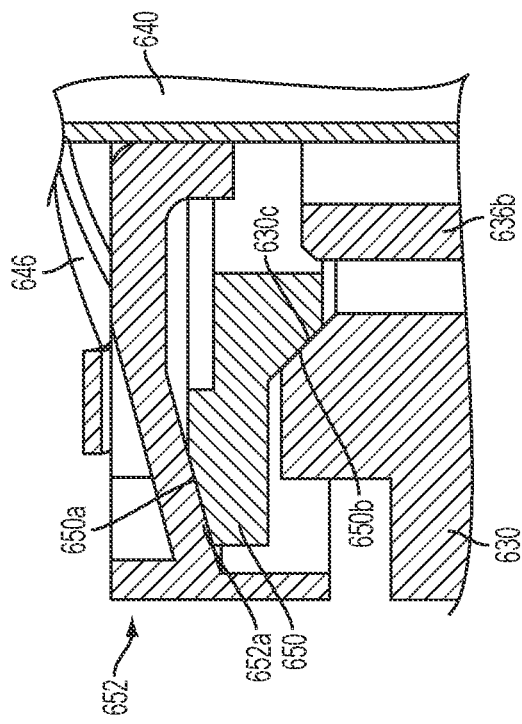
FIG. 63 is an enlarged sectional view of a clutch element of the actuator of FIG. 62.

As best shown in FIGS. 62 and 63, the actuator comprises a clutch system at the adapter plate 652, the clutch plate 650 and the housing 630. As shown in FIG. 63, the adapter plate 652 has a manual clutch surface 652a that engages a corresponding clutch surface 650a of the clutch plate, and the clutch plate 650 includes another clutch surface 650b that engages a stabilization clutch surface 630a of the housing 630. Thus, during electrical operation of the motor 632, the output gear 636 drives the clutch plate 652, which slides against the clutch surface 630c of the actuator housing 630.

Such a clutch assembly or system provides a reduced or zero-backlash output that has enhanced vibrational stability. During manual operation of the mirror assembly (such as if a user manually grasps and rotates the mirror), the manual clutch surface 652a of the adapter plate 652 slides against the clutch surface 650a of the clutch plate 650, while the clutch plate 650 is held steady by the gear train when the motor is not actuated. The mirror assembly can thus be manually adjusted about either axis, whereby the clutch slips to allow for such manual adjustment and for a breakaway function or feature. Optionally, the mirror assembly may be manually controlled and operated by providing manual controls for the pivoting about the pivot axes of the mirror assembly to adjust the rearward field of view of the mirror reflective element.

In the illustrated embodiment, the exterior rearview mirror assembly uses two angled clutch surfaces to improve the lateral and rotational stability of each of the first and second actuators. As can be seen in FIG. 63, the stabilization clutch surfaces 630c, 650b are disposed or established radially inward from the manual clutch surfaces 650a, 652a, and are configured at a sharper or steeper or increased angle relative to the manual clutch surfaces. The increased angle and reduced diameter of the stabilization clutch surfaces reduces the minimum output torque required by the drive mechanism to electrically adjust the mirror while still allowing for a heavy manual adjustment effort and spring load (to reduce the possibility of unintentional manual adjustments of the mirror assembly, such as via mild bumping of the mirror head or the like).

Figure 63A:
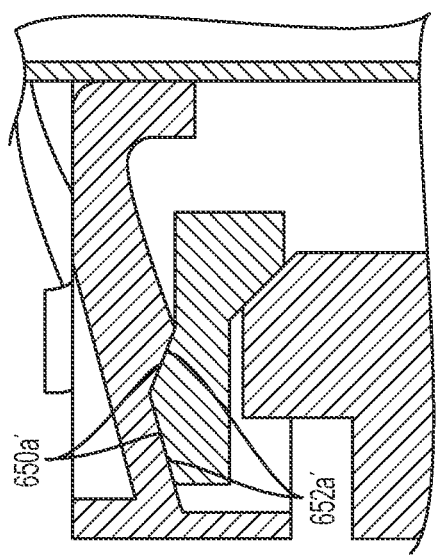
FIG. 63A is another enlarged sectional view of a clutch element of the actuator, showing optional clutch engaging surfaces for the actuator.

Although shown and described as having the angled clutch surfaces 650a, 652a shown in FIG. 63, other shaped or contoured clutch surfaces may be implemented while remaining within the spirit and scope of the present invention. For example, the clutch surfaces may have dual surfaces or non-planar engaging surfaces or the like. For example, and with reference to FIG. 63A, the clutch surface 650a' may comprise a dual angled surface that engages a correspondingly formed clutch surface 652a'. Other shapes and configurations of the clutch surfaces may be implemented while remaining within the spirit and scope of the present invention.

The actuator may include a memory system, such as a contact memory system or a non-contact memory system or the like. In the illustrated embodiment, the actuator includes memory system 644, which comprises a memory circuit element or circuit board 644a, a memory wiper or element 644b and a memory wiper holder 644c, which are disposed at the housing 630 and between the housing 630 and the and an end cover element 630b of the housing 630 (such as best seen in FIG. 62). The memory wiper holder 644c, memory wiper 644b and adapter plate 652 are press fit or secured to the rivet tube 640, so they all rotate together as a single construction, while the memory circuit board 644a is fixed at the housing 630 and thus does not rotate with the memory wiper holder and wiper when the actuator is actuated. As the adapter plate 652 is rotated relative to the housing 630 (via rotational driving of the drive motor 632), the rivet tube 640 rotates and the memory wiper 644b attached at the memory wiper holder 644c is thus swept along circuitry traces or carbon ink traces 644d on the memory circuit board 644a (such as two concentric traces disposed around the memory circuit board). Responsive to such sweeping of the memory wiper 644b, circuitry determines the degree of rotation of the adapter plate or element relative to the housing based on the location of the memory wiper (which may contact both traces and thus may close a circuit or provide a jumper between the traces so that circuitry that is electrically connected to the traces can determine the location of the memory wiper along the traces) along the circuit traces (which have terminals at each end thereof for connection to circuitry that is operable to determine where along the traces the wiper is located at any given time).

Thus, the memory system 644 is operable to determine the degree of rotation of the mirror head relative to the outer housing and the degree of rotation of the outer housing relative to the side of the vehicle, and the system may provide a memory selection function so a driver of the vehicle may save a particular mirror setting, such as in a similar manner with conventional memory mirror systems. Thus, when a driver of the vehicle later selects the saved setting, one or both actuators 618, 622 operate to set the mirror head at the appropriate position or orientation relative to the outer housing and to set the outer housing at the appropriate position or orientation relative to the side of the vehicle, in order to provide the desired or selected rearward field of view to the driver of the vehicle.

Figure 64A:
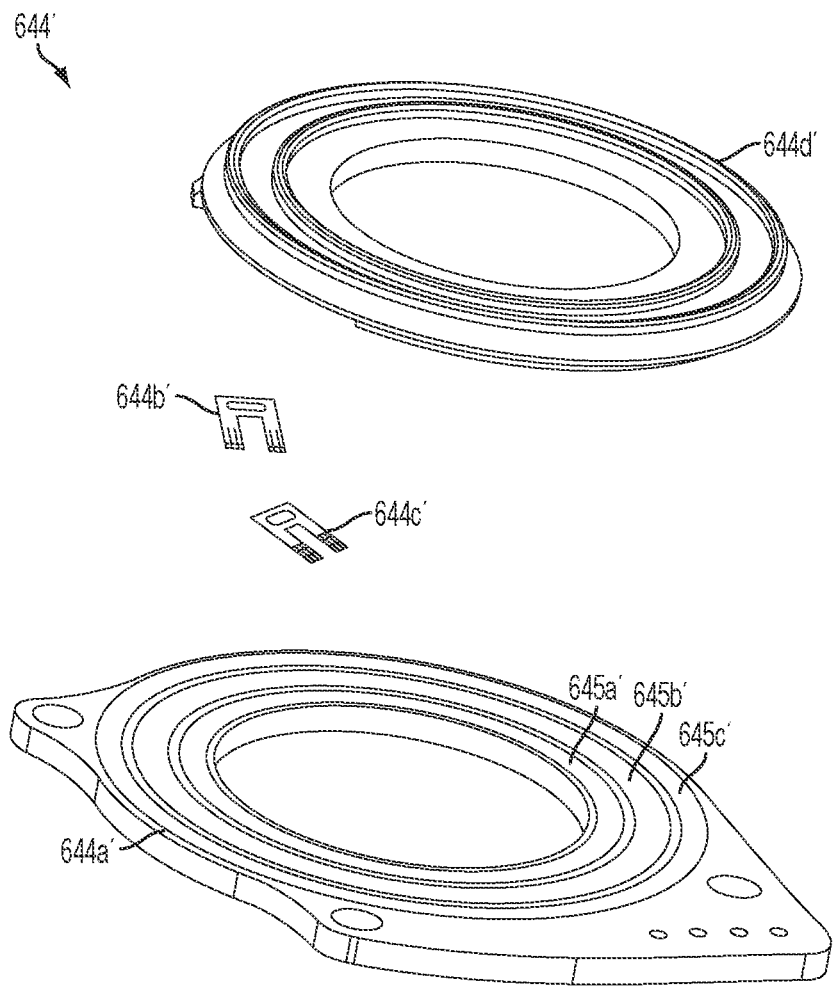
FIG. 64A is an exploded perspective view of a memory device of the mirror assembly of the present invention.
Figure 64B:
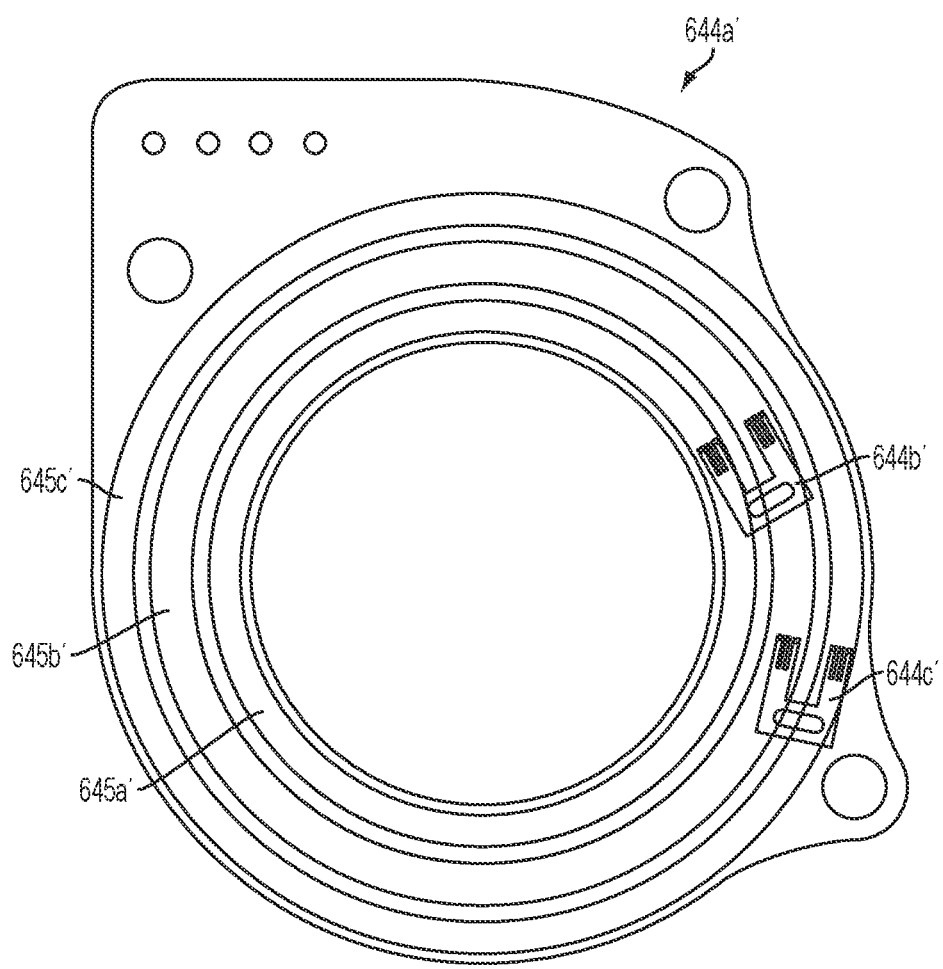
FIG. 64B is a plan view of the contact rings of the memory device of FIG. 64A established at the circuit element of the mirror assembly, shown with the contacts disposed thereat.

Optionally, and with reference to FIGS. 64A and 64B, a memory system 644' comprises a memory circuit element or circuit board 644a', a pair of memory wipers or contacts or elements 644b', 644c' and a memory contact holder 644d', which are disposed at the housing and between the housing and the and the end cover element of the housing (not shown in FIGS. 64A and 64B, but similar to the components shown in FIG. 62). The memory contact holder 644d', memory contacts 644b', 644c' and the adapter plate are press fit or secured to the rivet tube, so they all rotate together as a single construction, while the memory circuit board 644a' is fixed at the housing and thus does not rotate with the memory wiper holder and wiper when the actuator is actuated, such as in a similar manner as discussed above.

Memory system 644' comprises an absolute position feedback system that provides an unrestricted 360 degree planar movement of an element or actuator (such as either or both actuators 618, 622). The rotational position of the actuator is provided via three concentric rings 645a', 645b', 645c' fabricated on the printed circuit board 644a' and optionally constructed using a resistive ink. The innermost ring 645a' and outermost ring 645c' are constructed by printing the resistive ink over a copper trace. The copper trace provides a low impedance path in parallel with the resistive element, electrically shorting the resistance of the ink. The center ring 645b' is constructed by printing the resistive ink directly on the PCB substrate and on two small copper pads located about 180 degrees relative to each other. The length of the pads (along the arc of the circumference) is very narrow. The width of the pads is approximately equal to the width of the ring. These pads provide an electrical connection to center ring 645b'. One of these pads is connected to ground while the other is connected to a positive reference voltage. This construction creates two resistors in parallel, each occupying about half of the circumference of center ring 645b'. As shown in FIG. 64B, bridging the gap between inner ring 645a' and center ring 645b' is a contact 644b' and bridging the gap between center ring 645b' and outer ring 645c' is a contact 644c'. The contacts 644b', 644c' comprise metallic elements that are each constructed to create a highly conductive and flexible contact surface that rides on the resistive ink surface of the rings. Each metal contact on center ring 645b' applies the voltage sensed at the contact point on center ring 645b' onto the opposing ring (such as inner ring 645a' for contact 644b' and outer ring 645c' for contact 644c').

The metal elements are placed at an angle relative to each other that is significantly less than 180 degrees and significantly more than zero degrees, such as at an angle of around 45 degrees or more or less. The arrangement of contact 644b' and contact 644c' ensures that there is a unique voltage pair at every position in the 360 degrees of rotation of the actuator. In this manner, the absolute position of the actuator can be determined algorithmically by reading the sensed voltages at each of the inner ring 645a' and the outer ring 645c'. Motion direction can be determined algorithmically by repeatedly reading the sensed voltages over time and determining which voltage leads the other as movement occurs. Motion velocity can be determined algorithmically by repeatedly reading the sensed voltages over time and determining the rate of change of the voltage amplitude.

Thus, the memory system is operable to determine the position of the actuator at all times during operation of the mirror assembly. Each of the actuators includes a respective memory system so that the control of the mirror assembly can determine the degree of rotation of each of the actuators at any time, and can thus determine the position or orientation or plane of the mirror reflective element at any time. If 360 degree motion is not needed, a single memory wiper and simpler carbon trace may be utilized to provide the appropriate memory function. Optionally, to limit rotation of the mirror head and/or the outer cover, one or more mechanical stops or elements may be provided (such as via molding a stop feature onto the mirror head and mirror base or cover, so that the molded features collide or engage to limit rotation of the mirror head within a desired or appropriate range of motion.

Figure 65A:
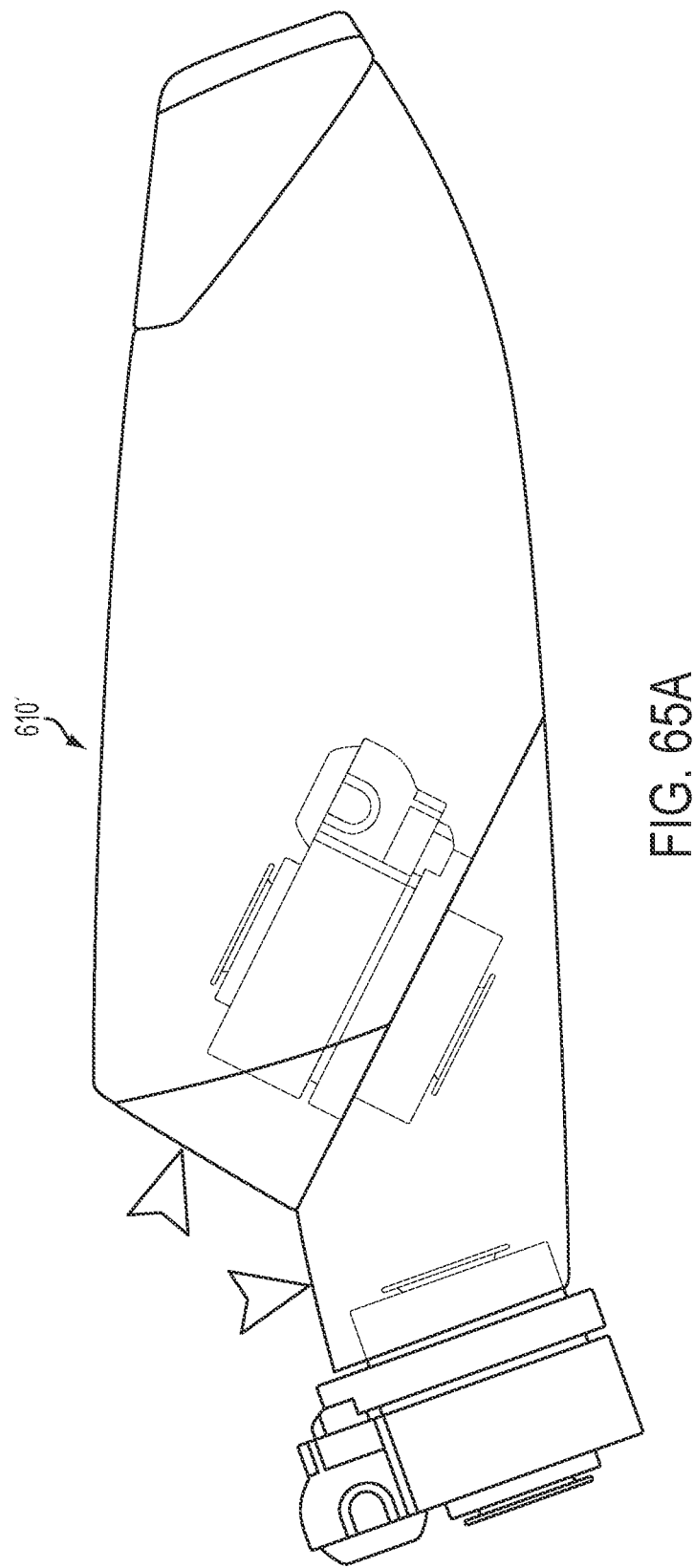
FIG. 65A is a plan view of another exterior rearview mirror assembly in accordance with the present invention.
Figure 65B:
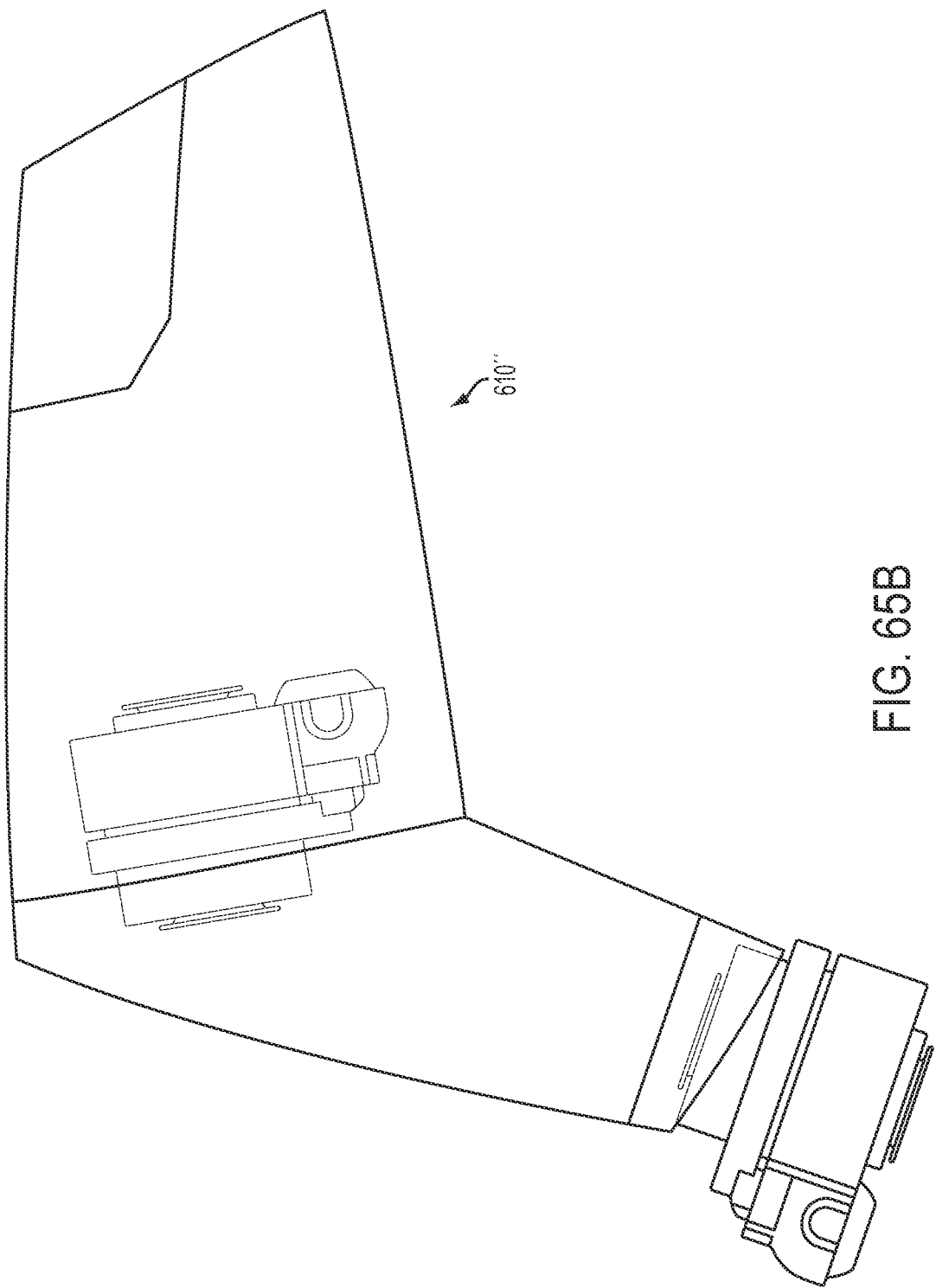
FIG. 65B is a plan view of another exterior rearview mirror assembly in accordance with the present invention.

Optionally, other mirror constructions are envisioned within the scope of the present invention. For example, the angle of misalignment of the pivot axes of the first and second actuators may vary or may be selected depending on the particular application of the mirror assembly. Such different pivot axes may be varied to accommodate different interface angles between the outer cover and the side of the vehicle and/or different interface angles between the mirror housing and the outer cover, depending on the particular application of the mirror assembly. For example, and with reference to FIG. 65A, an exterior rearview mirror assembly 610' may have a greater angle between the axes of rotation of the actuators, while, and such as shown in FIG. 65B, an exterior rearview mirror assembly 610" may have an angle between the axes of rotation of the actuator that approaches 90 degrees or thereabouts. Clearly, other constructions and configurations are contemplated for mirror assemblies within the scope of the present invention.

Optionally, although the exterior mirror assemblies described above are shown with the axes of rotation of the actuators at a non-orthogonal angle (such as an obtuse angle) relative to one another, it is envisioned that an exterior mirror assembly may have two or more actuators providing different axes of rotation. For example, a third actuator and pivot axis may be added to achieve a more complex motion of the mirror head relative to the side of the vehicle (such as by utilizing a modular actuator or the like), and with the three (or more) actuators cooperatively operating at the same or different speeds to provide the desired movement or adjustment of the mirror head.

Figure 66B:
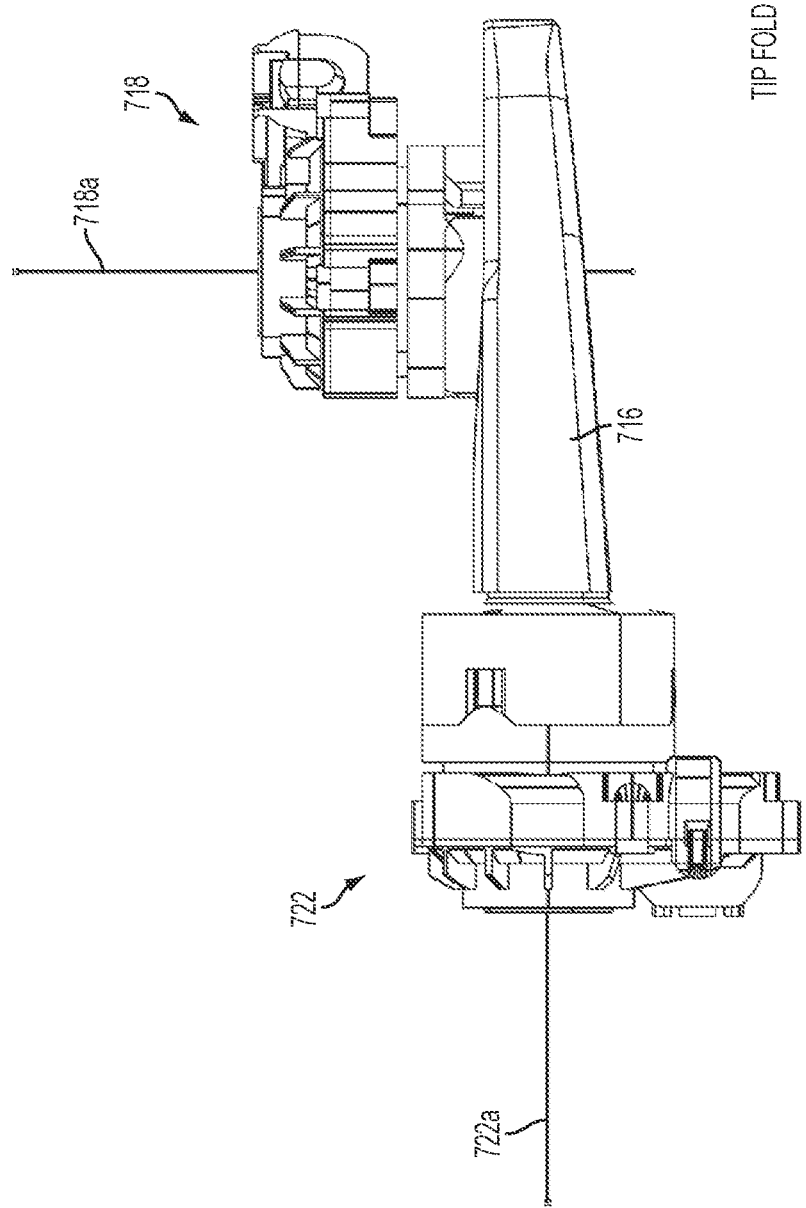
Figure 66D:
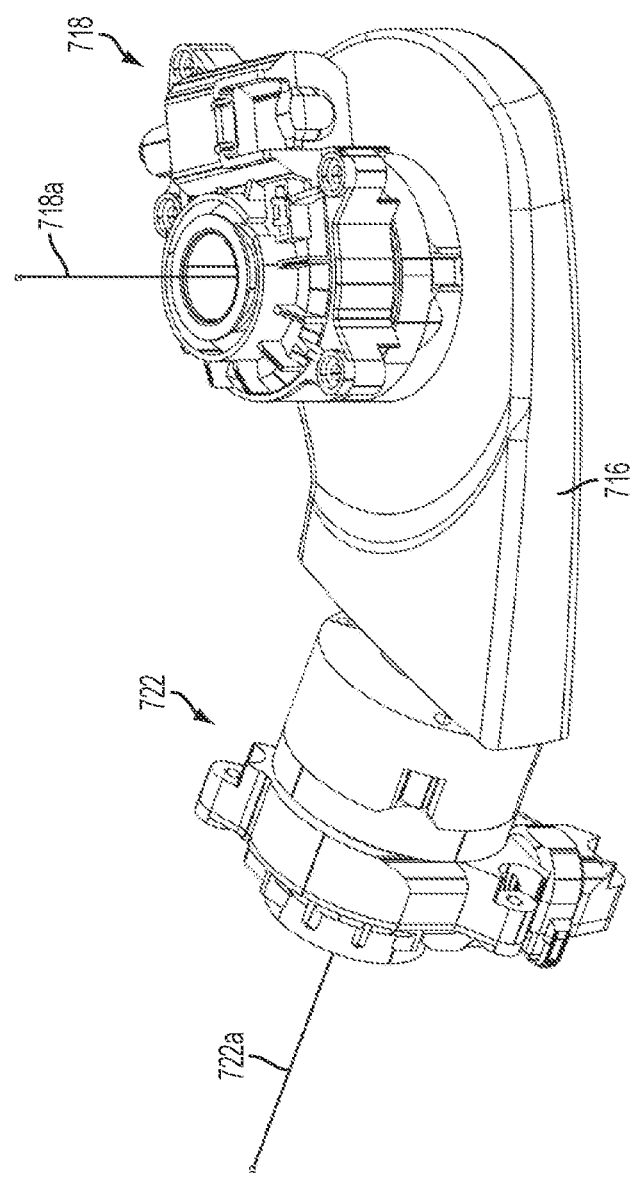

Optionally, it is further envisioned that an exterior mirror assembly may have two actuators with generally orthogonal axes of rotation while remaining within the spirit and scope of the present invention. For example, and with reference to FIGS. 66A-D, an exterior mirror assembly 710 comprises a reflective element (such as a generally planar or bent reflective element and such as an electrochromic reflective element or a flat glass or curved glass reflective element, such as a flat or curved reflective element having a single flat or planar or curved or convex curved glass substrate or having two flat or curved substrates or the like) that is attached at a rear attaching portion of a mirror head housing 714. Mirror head housing 714 is pivotally attached at a mounting arm or element 716 via a first or outer actuator 718 (FIGS. 66B and 66D), whereby rotational driving of the first actuator 718 imparts a rotation of mirror head housing 716 about a first pivot axis 718a relative to mounting arm 716. First actuator 718 is attached to or mounted at an outer end of mounting arm or element 716, which in turn is pivotally mounted at a sail mount of a vehicle via a second or inner actuator 722, which is configured to be attached at or disposed at or in the sail mount at a side of a vehicle, whereby, when so attached at the vehicle, rotational driving of second actuator 722 imparts a rotation of mounting arm 716 and first actuator 718 and mirror head housing 714 about a second pivot axis 722a. The second actuator 722 is disposed at or attached to or mounted at the side portion or sail mount of the vehicle when the exterior mirror assembly is normally mounted at the side of the vehicle.

In the illustrated embodiment, the pivot axis 722a is generally horizontal and extends laterally at the side of the vehicle and the pivot axis 718a is generally vertical when the exterior mirror assembly is normally mounted at the side of the vehicle. Thus, rotation of mounting arm 716 about pivot axis 722a imparts a rotation of mirror head housing 714 and the reflective element in an upward and downward direction to provide vertical tilting of the mirror reflective element, and rotation of mirror head housing 714 about pivot axis 718a imparts a rotation of the reflective element about the vertical axis to provide lateral adjustment of the field of view and to provide folding in and out of the mirror head.

Thus, when the mirror assembly 710 is mounted at the sail mount or side of the vehicle, the mirror head is adjustable about the first and second axes (via selective actuation of one or both actuators) to adjust the rearward field of view for the driver of the vehicle. For example, when the second actuator 722 is selectively operated to rotate or pivot mounting arm 716 relative to the side of the vehicle, the mirror head housing 714 is pivoted about the second pivot axis 722a to vertically adjust the rearward field of view for the driver of the vehicle. Also, when the first actuator 718 is selectively operated to rotate or pivot mirror head housing 714 relative to mounting arm 716, the mirror head housing 714 is pivoted about the first pivot axis 718a to laterally adjust the rearward field of view (such as, for example, within about a +/−60 degree or more range of pivotal adjustment).

Because of the generally orthogonal angled relationship of the axes of rotation of the actuators, the first and second actuators may be operated separately or together or cooperatively operated to vertically and/or laterally adjust the rearward field of view. Thus, when the mirror has been adjusted so that the reflective element has the desired vertical adjustment (via only operation of the second actuator 722), a user may laterally adjust the mirror to laterally adjust the rearward field of view of the reflective element (via only operation of the first actuator 718). In such an embodiment, the actuators 718, 722 may be independently operated to adjust the mirror field of view vertically and/or laterally, whereby the mirror assembly need not include a controller that coordinates the speed and/or actuation of the actuators to provide the desired or selected field of view. For example, the user input or toggle at the interior of the vehicle may control or adjust the first or outer actuator when moved or adjusted laterally or side-to-side (such as by the driver of the vehicle) and may control or adjust the second or inner actuator when moved up/down or fore/aft, and may control both actuators together (and at the same speed or optionally at different speeds if desired) when moved diagonally.

Figure 67B:
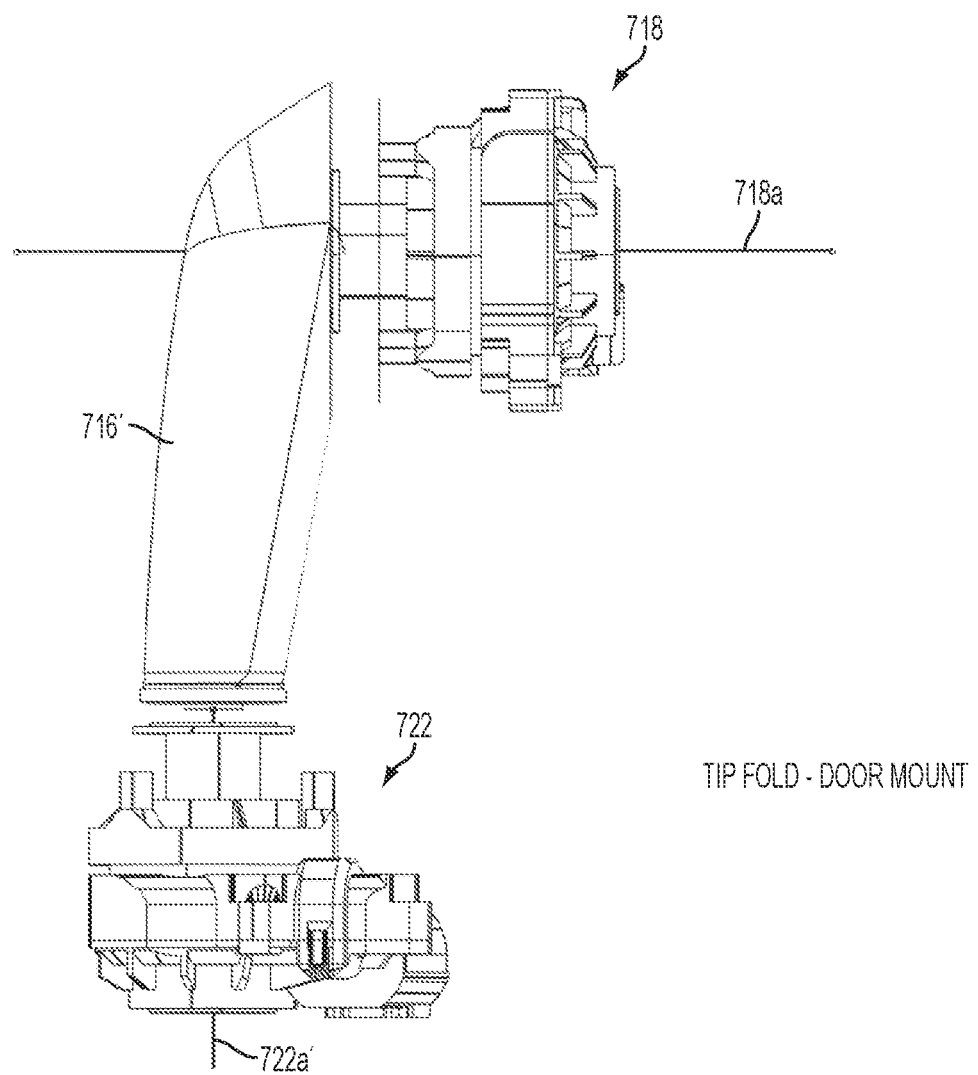
Figure 67C:
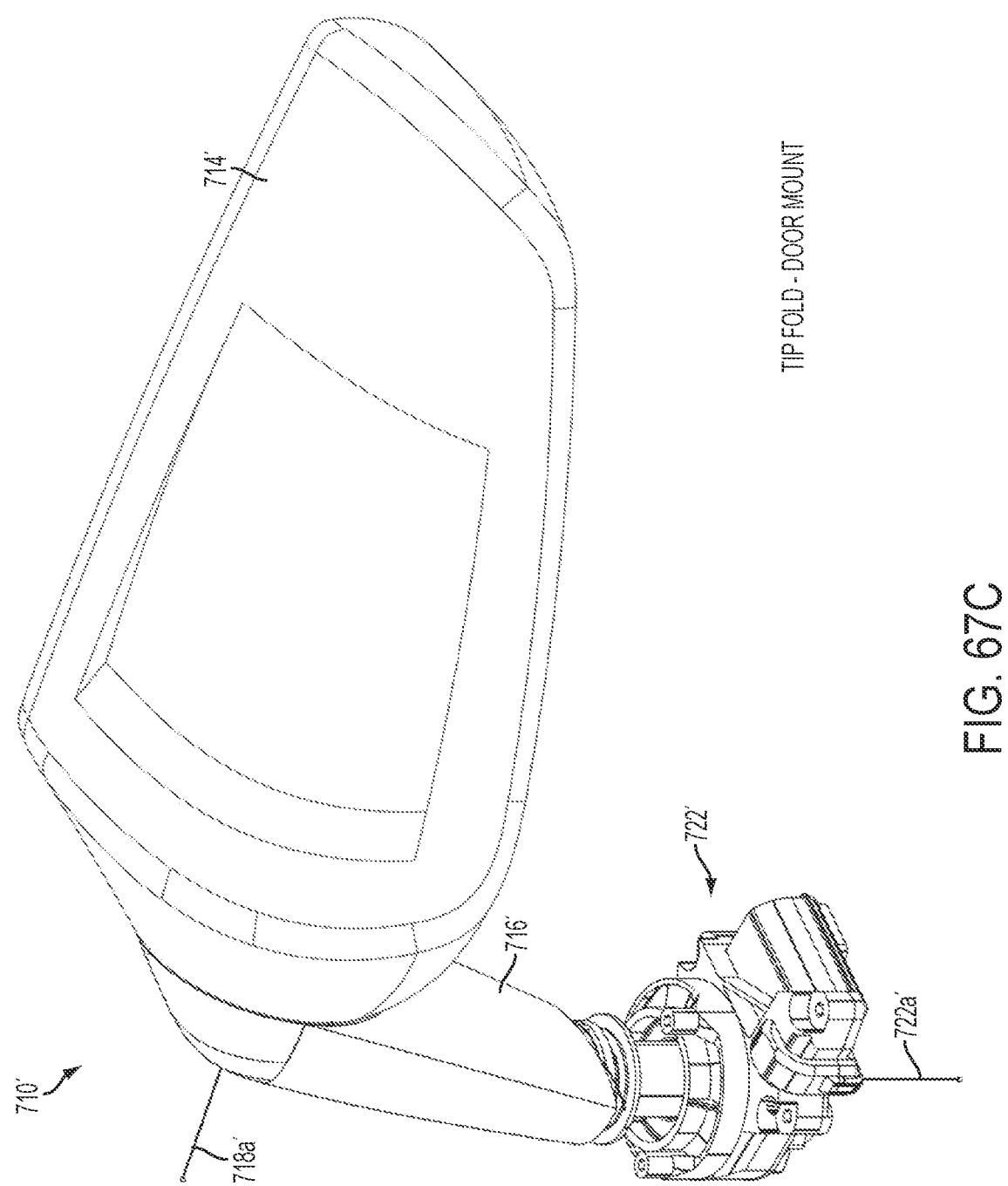
Figure 67D:
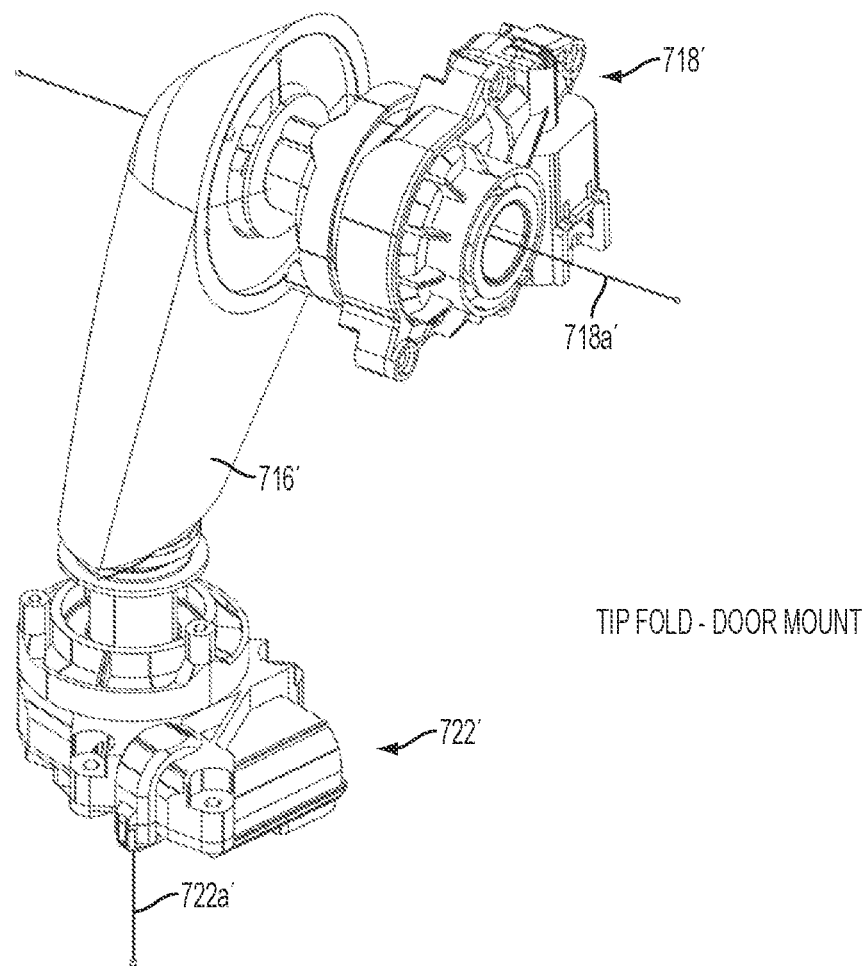

In the illustrated embodiment of FIGS. 66A-D, the mirror assembly is configured to mount at the side of the vehicle, such as at a sail mount region or at the door of the vehicle, with the axis of rotation 722*a* of the second actuator 722 extending generally horizontally and laterally at the side of the vehicle when the mirror assembly is normally mounted at the side of a vehicle. Optionally, and with reference to FIGS. 67A-D, a mirror assembly 710' may be mounted at a side of the vehicle so that the axis of rotation 722*a'* of the second actuator 722' is generally vertical (and the axis of rotation 718*a'* of the first actuator 718' (FIGS. 67B and 67D) is generally horizontal and extends generally laterally) when the mirror assembly is normally mounted at the side of a vehicle, such as at a door mount of the vehicle or the like. In the illustrated embodiment, the mirror head housing 714' is pivotally attached at a mounting arm or element 716' via the first or outer actuator 718', whereby rotational driving of the first actuator 718' imparts a rotation of mirror head housing 716' about the generally horizontal first pivot axis 718*a'* relative to mounting arm 716'. First actuator 718' is attached to or mounted at an upper end of mounting arm or element 716', which in turn is pivotally mounted at a door mount of a vehicle via the second or inner actuator 722', which is configured to be attached at or disposed at or in the door mount at a side of a vehicle, whereby, when so attached at the vehicle, rotational driving of second actuator 722' imparts a rotation of mounting arm 716' and first actuator 718' and mirror head housing 714' about the generally vertical second pivot axis 722*a'*. Thus, the mirror assembly 710' may function similar to mirror assembly 710, discussed above, but with the outer or upper or first actuator providing the vertical adjustment of the mirror head and reflective element and the inner or lower or second actuator providing the lateral adjustment of the mirror head and reflective element.

Optionally, the multi-axis actuating mechanism, such as the dual actuator mechanisms described above, of the present invention may be incorporated into a mounting/attachment device/element/unit that attaches or mounts at a side of a vehicle at a location where conventional exterior sideview mirrors are typically disposed, and is actuatable to adjust, via a support arm or structure, an attachment element or bracket (that is disposed at a distal end of the support arm or structure from the side of the vehicle) about multiple degrees of freedom with respect to the side of the vehicle in order that the rearward field of view of a mirror reflective element supported by, and adjusting in tandem with, the bracket can be adjusted by the actuating mechanism via the support arm structure to allow the driver to adjust his or her rearward and/or sideward field of view. The attachment device thus may be mounted at the side of the vehicle, and a selected or appropriate mirror reflective element (that may comprise an electro-optic mirror reflective element or a non-electro-optic or fixed reflectance mirror reflective element) and mirror casing may be readily attached to the attachment element or bracket (and optionally the mirror casing may be attached at the mirror reflective element itself), so that both the reflective element and the mirror casing move in tandem, whereby the mounting device may adjust the attachment element and the mirror head attached thereto about multiple axes relative to the side of the vehicle to adjust the rearward field of view of the driver of the vehicle and/or to pivot or fold the mirror head along the side of the vehicle or the like. Thus, a common or standard or universal mounting/attaching device may be mounted at or attached at the side of the vehicle and may adjust an attachment element or bracket (which may have a reflective element and mirror casing or structure attached thereto) inward/outward, forward/rearward, up/down and rotationally about multiple axes of rotation (such as about pitch, yaw and roll axes or about a generally vertical axis and/or other axes non-coaxial with the first or generally vertical axis or the like) with respect to the side of the vehicle at which it is mounted and the ground plane at the vehicle.

Figure 68:
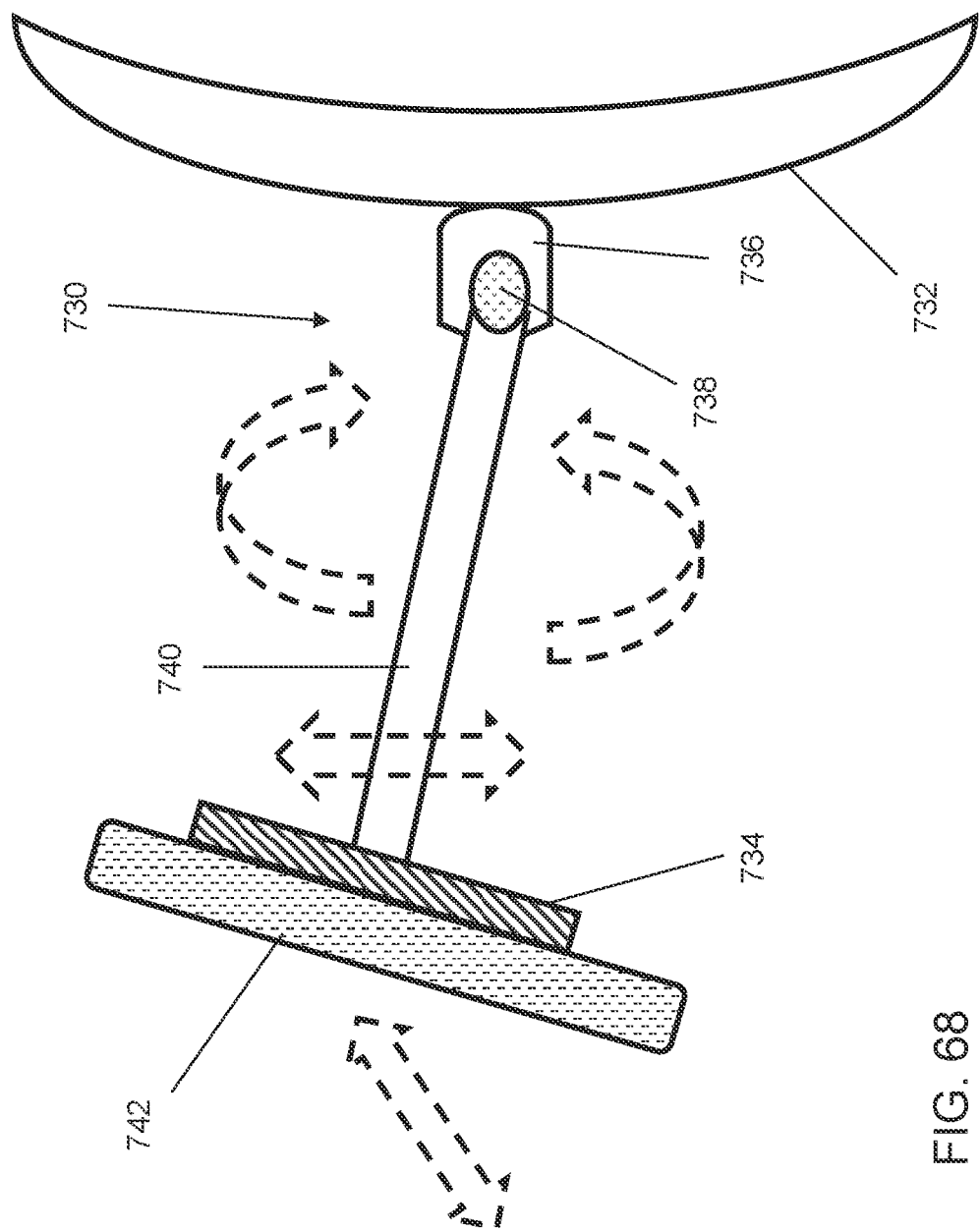
FIG. 68 is a schematic of an exterior rearview mirror system in accordance with the present invention.

For example, and with reference to FIG. 68, an adjustment device or mounting device or actuator device 730 may be attached at a side 732 of a vehicle (such as at a driver or passenger side vehicle door or window or the like) and may include one or more actuators that are operable to provide multiple degrees/axes of freedom of adjustment of an attachment plate or bracket 734 relative to the vehicle side 732. The mounting or attaching device 730 may include an attachment element or structure 736 for attaching at the vehicle, and the attachment structure 736 may house or support one or more actuators 738 for adjusting a support arm or structure 740 relative to the vehicle side 732. The actuators may be cooperatively operable similar to the dual actuators of the mirror assemblies described above or may otherwise provide multiple axes of adjustment of the attachment plate and mirror head (such as, for example, a ball actuator that may rotate or pivot the mounting arm or structure 740 in a three dimensional manner at the side of the vehicle). For example, the arm may be pivoted up/down and forward/rearward and any directions in between, and the arm may be rotated about its longitudinal axis to further adjust the arm and the attachment element and the reflective element relative to the side of the vehicle (thus providing independent and/or cooperative pitch, yaw and roll adjustment of the reflective element relative to the side of the vehicle).

As shown in FIG. 68, the attachment element or bracket 736 is disposed at the outer or distal end of the support arm or structure 740, and a mirror reflective element 742 (which typically includes a backing plate or backplate and a heater pad disposed at a rearward surface of the reflective element) may be attached to the attachment element or bracket 736. Thus, adjustment of the support arm or structure causes a corresponding tandem adjustment of the attachment element 736 and of the mirror reflective element 742 to adjust the rearward field of view of the driver of the vehicle and/or to provide a powerfold function for the mirror reflective element. Optionally, and desirably, a mirror casing or shell 744 (FIG. 68A) may be readily attached at the mirror attachment element or bracket or to the mirror reflective element itself in order to provide the desired or appropriate appearance or styling of the exterior rearview mirror at the side of the vehicle and to provide mechanical protection of the reflective element and the like from environmental exposure. The mirror casing or shell may be attached via any suitable means, such as via snapping one or more casing portions at the rear of the mirror reflective element and/or bracket. When so attached, the mirror casing or shell moves in tandem with the tandem movement of the mirror reflective element 742 and attachment element 736 via adjustment of the support arm by the actuator or actuators of the attachment device.

Thus, a vehicle manufacturer may elect for at least a subset of its vehicle nameplates/models, a standardized attachment element and/or bracket and/or backplate and/or support arm (such as a standardized or common or universal mounting or actuator device), and then may attach a selected or appropriate reflective element and housing to the attachment element or bracket or backplate. The selected reflective element may be selected or customized for that particular vehicle nameplate or body style or optional mirror content (or for a vehicle model within a vehicle nameplate), and may provide the selected or desired or appropriate size and shape and type of reflective element for that particular vehicle. Similarly, the mirror casing or housing or shell may be selected and may be attached at the mirror reflective element or at the attachment element or the like of the mounting device, in order to provide the selected or desired or appropriate size and shape and color and styling of the exterior rearview mirror assembly for that particular vehicle. Optionally, the mirror casing may be customizable for the particular vehicle line or style or for the particular vehicle in accordance with the customer's preferences. Thus, in accordance with this aspect of the present invention, a standardized set of actuator device/support arm/attachment plate may be utilized across all vehicle models of a vehicle nameplate (such as, for example, all of the vehicle models of the Lincoln nameplate) of a vehicle manufacturer (such as, for example, Ford Motor Company), whereby different customized or selected mirror reflective elements and mirror casings may be selected for particular models (such as, for example, one design for the MKZ model and another design for the MKT model) for that nameplate of that vehicle manufacturer.

The mounting device and mirror reflective element and mirror casing may utilize any suitable attachment or mounting means, and may utilize aspects of the mirror assemblies and door assemblies of the types described in U.S. Pat. Nos. 7,289,037; 6,669,267 and/or 6,616,314, which are hereby incorporated herein by reference in their entireties. For example, the mirror casing may be provided as a clamshell construction or may constructed so that it first attaches to the mirror reflective element and the support arm is received through an aperture in the mirror casing to attach at the rear of the reflective element. When the mounting device and the mirror reflective element and mirror casing are so mounted at the side of a vehicle, the actuator or actuators of the mounting device is/are operable to move the mounting arm and attachment element or bracket (and the reflective element and mirror casing attached thereat) about multiple axes to provide the desired three dimensional adjustment of the mirror reflective element at the side of the vehicle (such as up/down and forward/rearward pivotable movement and clockwise and counterclockwise rotational movement about multiple axes, such as movement or adjustment about the pitch, yaw and roll axes). Thus, relative to the fulcrum point of the actuator device (at or near the side of the vehicle), the mirror reflective element can be moved so as to be in multiple orientations/planes at the side of the vehicle so that the driver can select his/her desired/required sideward and rearward field of view.

Figure 68A:
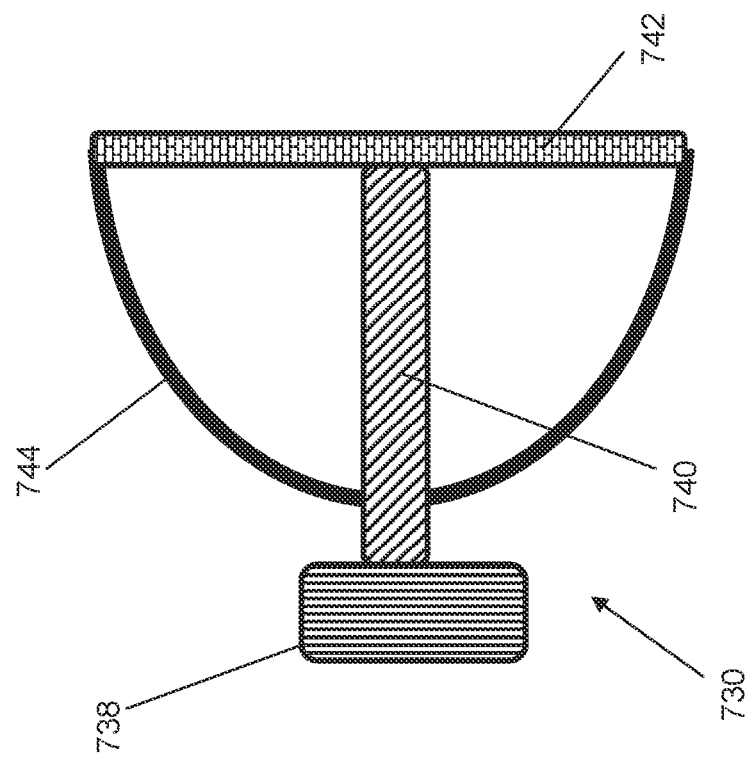
FIG. 68A is a side view schematic of the exterior rearview mirror system of FIG. 68.
Figure 68B:
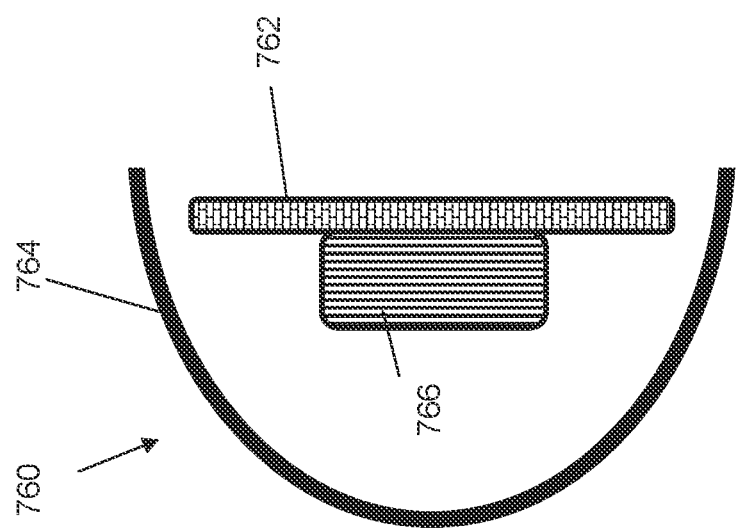
FIG. 68B is a side view schematic of a known construction of an exterior rearview mirror assembly.

A typical known exterior mirror construction 760 is shown in FIG. 68B, where the mirror reflective element 762 is disposed in or housed in a mirror casing 764 (and is inboard of the open end of the mirror casing and not attached thereto) and is adjustable relative to the mirror casing via a mirror actuator 766, which is also disposed in the mirror casing and occupies space behind the reflective element and within the cavity of the mirror casing. Also, all of the wiring for powering the mirror actuator and (if applicable) the electro-optic mirror reflective element and/or heater pad needs to be routed into the mirror head for powering the actuator and the like, thereby requiring complicated wire management to route the wires into the mirror casing and around and to the mirror actuator. In contrast to such known constructions, the present invention provides a mirror assembly that has the reflective element 742 disposed at and attached to or otherwise fixed relative to the mirror casing 744, such that, during adjustment, the reflective element and mirror casing move in tandem about the fulcrum of the mounting device at or near the side of the vehicle. As can be seen with reference to FIG. 68A, such a construction allows for space within the mirror casing that previously was occupied by the mirror actuators of known or conventional mirror assemblies. Such a construction may also ease the wire management of any wires needed to power the reflective element and/or heater pad and/or any accessory disposed at the mirror head, since the space within the mirror casing may be substantially open or unoccupied by the likes of a mirror actuator.

By eliminating the conventional actuators commonly used in conventional exterior rearview mirror assemblies to date, opportunities arise to provide additional electronic content in the exterior rearview mirror (such as at the areas where the conventional actuators used to reside). Thus, for example, the exterior rearview mirror may include various electronic accessories therein or thereat, and may include the likes of bus connectors, such as an Ethernet terminal or the like. Optionally, for example, and such as shown in FIG. 68D, a camera or camera module 746 (such as a rearward facing camera and/or a downward facing camera and/or a sideward facing camera and/or a forward facing camera) may be installed or included in or at the exterior rearview mirror assembly, such as at or in the mirror casing or shell 744″ (which may comprise any suitable and optionally asymmetrical construction or design), and may be provided as a modular unit camera that may be readily included and electrically connected or plugged in at the mounting device when the mirror reflective element and/or mirror casing are attached at the mounting device (such as by utilizing aspects of the vision systems described in U.S. Pat. Nos. 8,017,898; 8,262,268; 5,760,962 and/or 5,550,677, which are hereby incorporated herein by reference in their entireties). The attaching device 730 and support arm 740 for the reflective element 742 in FIG. 68D may be similar to those described above or may be constructed for the particular application or applications of the attaching device. Thus, a camera module (preferably comprising a lens system, a CMOS photosensor array and associated logic and control circuitry, and such as by utilizing aspects of the cameras described in U.S. Pat. Nos. 5,550,677; 5,760,962; 6,396,397; 6,097,023; 5,877,897 and 5,796,094, which are hereby incorporated herein by reference in their entireties) may be procured from an automotive camera module manufacturer and provided to the exterior sideview mirror manufacturer and configured to be received at the exterior rearview mirror assembly in an orientation that correctly sets the desired field of view of the received camera module. Ancillary electronics and/or required power sources/signal sources, including bus (such as CAN or LIN bus) interfaces/connectors, may be at least partially provided by the exterior mirror manufacturer itself, and may be incorporated into the configuration/construction of the exterior mirror assembly, thereby reducing the cost and complexity of the procured camera module.

Figure 68C:
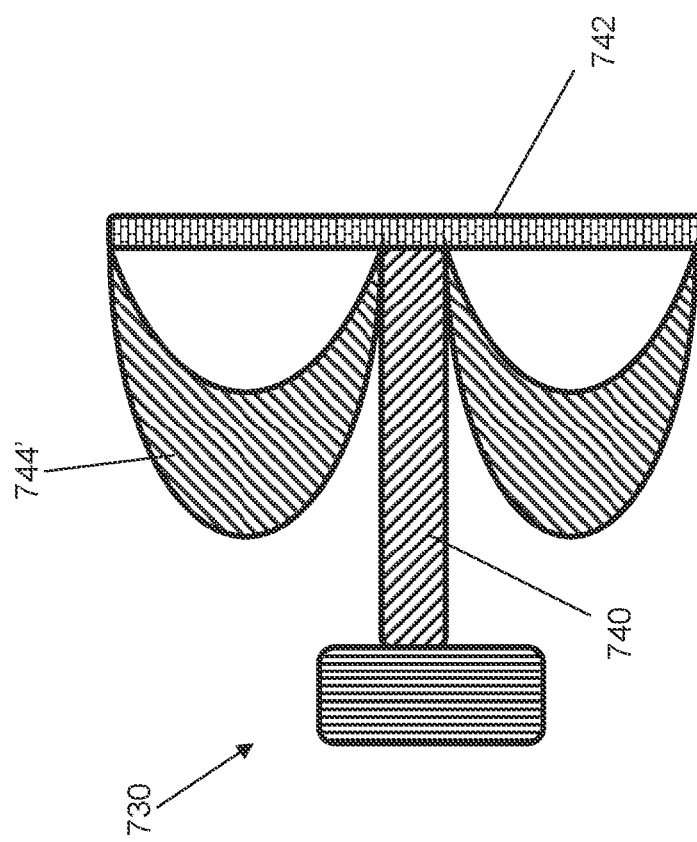
FIG. 68C is a side view schematic of another exterior rearview mirror system of the present invention.

Also, because, with the present invention, there is no longer a need for a mirror head with an actuator disposed therein, the shape of the mirror casing or housing (as presented to the wind flow as the vehicle drives in a forward direction of travel) need not follow traditional aerodynamic lines, and may effectively follow a shape that optimizes aerodynamic flow and minimizes the likes of eddy currents and turbulence in the air flow as experienced as the vehicle is driven forwardly on a road. For example, and with reference to FIG. 68C, a mirror casing 744' may be provided at the reflective element 742 (which is attached at the distal end of the mounting arm or structure 740 of the mounting device 730), with the mirror casing selectively shaped or styled for the particular application, whereby the mirror casing may or may not have the typical mirror casing shape and typical interior cavity rearward of the reflective element, such as typically provided in known exterior mirror constructions. As illustrated in FIGS. 68A, 68C and 68D, the disposition of the mirror reflective element to the exterior mirror casing/shell may preferably be such as described in U.S. Pat. No. 8,049,640 and/or in PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, which are hereby incorporated herein by reference in their entireties.

Thus, the exterior rearview mirror assembly of the present invention provides a frameless exterior or sail mount mirror assembly that has the actuators at the mounting arm or structure of the mirror assembly and not within the mirror housing and not attached at the rear of the reflective element. The actuators adjust the mirror head and the reflective element in tandem (and do not adjust the reflective element relative to the mirror casing). The dual actuator (or multiple degrees of freedom actuator or actuators) of the exterior rearview mirror assembly or system of the present invention thus provides a mirror head that can be any shape and that does not require space in the mirror head for conventional actuators that operate to adjust or orient the reflective element relative to the mirror housing or casing. The mirror reflective element can be adhered or otherwise fixedly attached at a surface or mounting portion of the mirror head, and the mirror head can be any shape (such as generally flat or having a narrow or thin profile or the like) depending on the particular application of the mirror assembly and the vehicle manufacturer's design preferences. The mirror assembly of the present invention thus allows for inclusion of other accessories (such as turn signal indicators, blind spot indicators, lights, displays and/or the like) in the mirror head, without concerns of interference with conventional actuators disposed in the mirror head and at and behind the mirror reflective element. The exterior rearview mirror assembly and/or actuators may utilize aspects of the exterior rearview mirror assemblies described in U.S. Pat. Nos. 7,722,199; 7,314,285; 7,267,449; 7,159,992; 7,104,663; 7,093,946; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999 and/or 5,703,731, and/or U.S. patent applications, U.S. patent application Ser. No. 13/249,433, filed Sep. 30, 2011, now U.S. Pat. No. 8,764,256, Ser. No. 13/023,747, filed Feb. 9, 2011, now U.S. Pat. No. 8,915,601, Ser. No. 11/504,353, filed Aug. 15, 2006 and published Jan. 4, 2007 as U.S. Publication No. 2007/002477, and/or Ser. No. 13/663,542, filed Oct. 30, 2012, now U.S. Pat. No. 9,067,541, and/or U.S. provisional application Ser. No. 61/645,959, filed May 11, 2012, which are all hereby incorporated herein by reference in their entireties.

The exterior rearview mirror assembly of the present invention thus provides for a mirror head with a reflective element fixedly disposed thereat, such that additional content and/or enhanced styling may be readily achieved at the mirror head without concerns of space behind the reflective element (such space is typically taken up by a mirror reflective element actuator, which is not included in the exterior rearview mirror assembly of the types described above). Optionally, for example, the technology of the present invention allows for new technology or content to be readily added to and mounted into the mirror head. For example, the mirror head may include a camera disposed behind the reflective element, and/or the mirror head may include a display screen (such as a liquid crystal display screen or the like) disposed behind the reflective element and/or the mirror head may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,058,977; 7,944, 371; 7,492,281; 6,198,409; 5,929,786; 5,786,772; 7,581, 859; 6,227,689; 6,582,109; 5,371,659; 5,497,306; 5,669, 699; 5,823,654; 6,176,602; 6,276,821; 7,748,856; 7,255, 451; 7,195,381; 6,717,712; 7,126,456; 6,315,419; 7,097,312 and/or 6,522,451, and/or U.S. patent application Ser. No. 12/187,725, filed Aug. 7, 2008, now U.S. Pat. No. 8,786, 704, and/or PCT Application No. PCT/US2006/018567, filed May 16, 2006 and published Nov. 23, 2006 as International Publication No. WO 2006/124682, which are hereby incorporated herein by reference in their entireties).

Optionally, the reflective element may comprise a frameless reflective element, such as the types marketed as a prismatic or electrochromic INFINITY™ mirror, such as are shown and/or described in U.S. Des. Pat. Nos. D633,423; D633,019; D638,761 and/or D647,017, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. Pat. Nos. 7,253,723 and/or 8,154,418, which are hereby incorporated herein by reference in their entireties. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, and with reference to FIGS. 69A and 69B, an exterior rearview mirror reflective element assembly 660 may include one or more indicators 662 disposed at a perimeter region of the mirror reflective element 660, such as for providing a blind spot indicator or lane change warning or the like to the driver of the vehicle equipped with the mirror assembly and/or for providing a turn signal indicator for drivers of other vehicles to the side and/or rear of the equipped vehicle (such as by utilizing aspects of the indicators described in U.S. Pat. Nos. 7,255,451 and/or 7,195,381, which are hereby incorporated herein by reference in their entireties). Reflective element assembly 660 comprises an electrochromic reflective element having a front substrate 664 and a rear substrate 666 with an electrochromic medium 668 sandwiched therebetween and in an interpane cavity 670 bounded by a perimeter seal 672. The rear surface 664b of the front substrate 664 has a transparent conductive coating or layer 674 disposed thereat and the front surface 666a of the rear substrate 666 has a metallic mirror reflective layer or layers 675 disposed thereat. An opaque or reflective or substantially non-light-transmitting perimeter band or hiding layer 676 is disposed around the periphery of the rear surface 664b of the front substrate 664 to hide or conceal the perimeter seal 672 when a person views the reflective element assembly from the front surface 664a of the front substrate 664.

In the illustrated embodiment, the indicator 662 comprises an organic light emitting diode (OLED) disposed in an OLED cavity 670a established at a perimeter region of the reflective element assembly and outboard of the EC cavity 670, with the OLED cavity 670a bounded by an outer seal portion 672a of the perimeter seal 672 and an inner seal portion 672b of the perimeter seal 672. The seal 672 thus may be dispensed around the periphery of the reflective element assembly and may be dispensed around the OLED cavity to define and seal the OLED cavity 670a and to isolate the OLED cavity from the EC cavity 670. Optionally, and as shown in FIGS. 69A and 69B, the perimeter band 676 may be made wider at the OLED indicator 662 to hide or conceal the perimeter band portions that circumscribe the OLED cavity 670. A window 676a is established (such as via laser ablation or etching or the like) through the perimeter band 676 at the OLED indicator 662 and OLED cavity 670a so that illumination emanating from the OLED indicator 662, when powered or activated or energized, is viewable through the window 676a at the perimeter band 676.

The OLED indicator 662 is operable to illuminate responsive to electrical power applied thereto. The OLED material is an SPM-like material that may be filled into the separate cavity and that is illuminated when powered, with the glass conductive coatings configured to allow for separate electrification of the electrochromic medium and the OLED indicator. For example, and as shown in FIG. 69B, a delineation line or isolation line 675a may be established through mirror reflective layer or layers 675 to electrically isolate a principal reflecting region or portion 675b of the mirror reflective layer or layers 675 and an outboard OLED portion or region 675c of the mirror reflective layer or layers 675. Thus, the OLED indicator 662 may be electrically powered (such as via an electrical connection made at the third surface reflective layers at or near the OLED cavity) separately from the electrochromic medium 668 (which may be electrically powered via an electrical connector at a busbar or the like along a perimeter region of the rear substrate). Although described herein as comprising an OLED indicator, it is envisioned that the indicator may comprise any suitable material that may glow or emit light when energized or powered, while remaining within the spirit and scope of the present invention. Also, although shown and described as comprising an electrochromic reflective element assembly having an electrochromic medium, it is envisioned that the reflective element (with an indicator such as described above) may comprise other types of reflective elements or reflective element assemblies, such as other electro-optic reflective element assemblies or a liquid crystal reflective element assembly or the like, while remaining within the spirit and scope of the present invention.

Optionally, a compass display (such as a compass display disposed at or in an interior rearview mirror assembly of a vehicle or a console or instrument panel of a vehicle or an exterior rearview mirror of a vehicle) may be operable (such as responsive to a GPS system or a compass sensor or sensors or the like) to display a directional heading of the vehicle, and may display one or two alphanumeric characters (such as N, E, S, W, NE, SE, SW, NW) to inform the driver of the vehicle the general direction that the vehicle is heading. Such cardinal and inter-cardinal compass headings provide a general indication of the vehicle directional heading within eight distinct directional bands of about 45 degrees (for example, true north+/−about 22.5 degrees, northeast+/−about 22.5 degrees, east+/−about 22.5 degrees and so on). In some applications, it is desirable to provide a more accurate compass display that may provide an indication of the vehicle heading within sixteen distinct bands or directional headings or 22.5 degree bands or ranges, such as by using three alphanumeric characters (such as N, NNE, NE, ENE, E, ESE, SE, SSE, S, SSW, SW, WSW, W, WNW, NW, NNW, and, for example, with "N" being displayed when the vehicle heading is true north+/−about 11.25 degrees). Such three character displays require a larger compass display and additional lighting elements or display character elements.

The present invention provides a compass display that is operable to display a sixteen point vehicle heading direction via a two character alphanumeric display. Thus, the compass display is operable to display the vehicle directional heading within sixteen approximately 22.5 degree bands or regions while utilizing only two alphanumeric characters. The octant or cardinal and primary inter-cardinal display headings (N, NE, E, SE, S, SW, W, NW, N) are displayed with either single characters or cardinal directions (N, E, S, W) or the two characters or inter-cardinal directions (NE, SE, SW, NW) with both characters having a constant or uniform intensity and/or color. When the vehicle is heading in a direction that is between two cardinal and primary inter-cardinal directional headings (such as in a north-north-easterly direction between north and northeast), the compass display may display "NE", but with the "N" at a greater intensity (or optionally a different color) than the "E", and when the vehicle is heading in a direction that is between north and east but further east (such as in an east-north-easterly direction), the display may display "NE", but with the "E" at a greater intensity (or optionally a different color) than the "N". The increased intensity of one of the characters provides an indication of the directional headings between adjacent cardinal and inter-cardinal headings, without resort to a third character of the display.

Figure 74A:
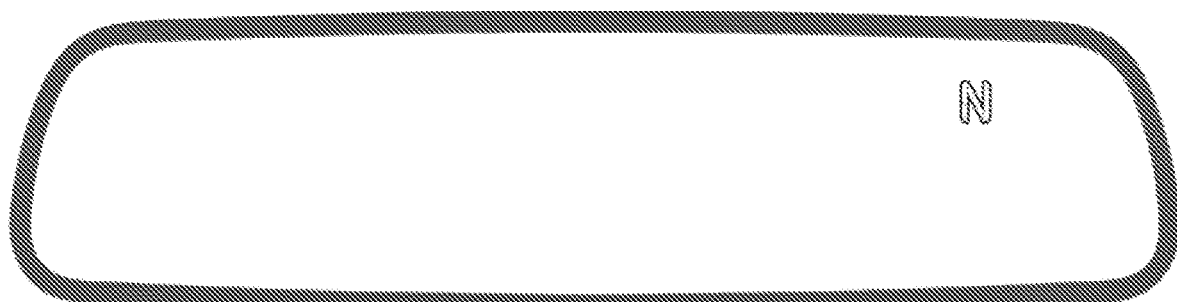
FIGS. 74A-E are plan views of another interior rearview mirror assembly having a compass display in accordance with the present invention.
Figure 74B:
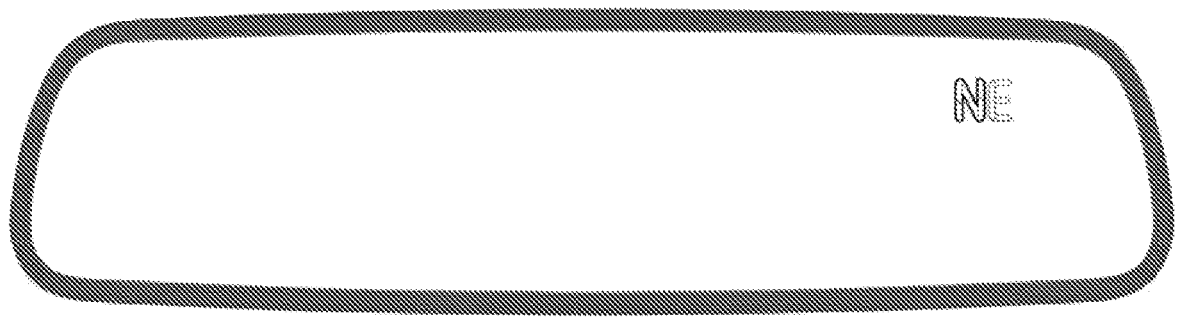
Figure 74C:
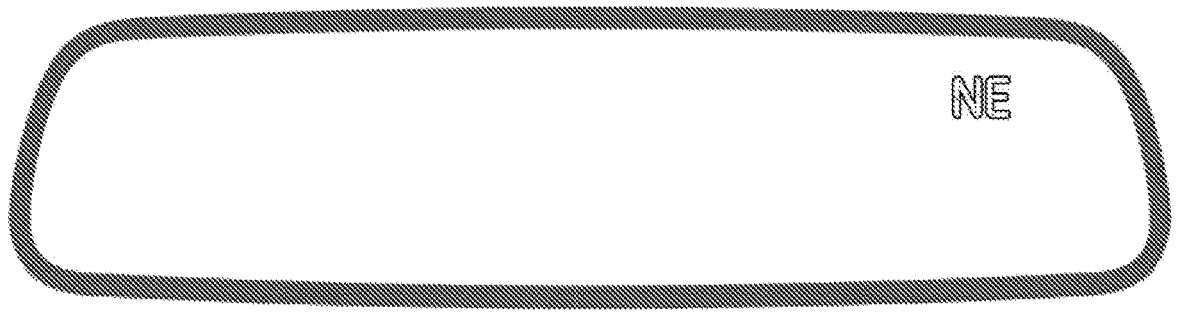
Figure 74D:
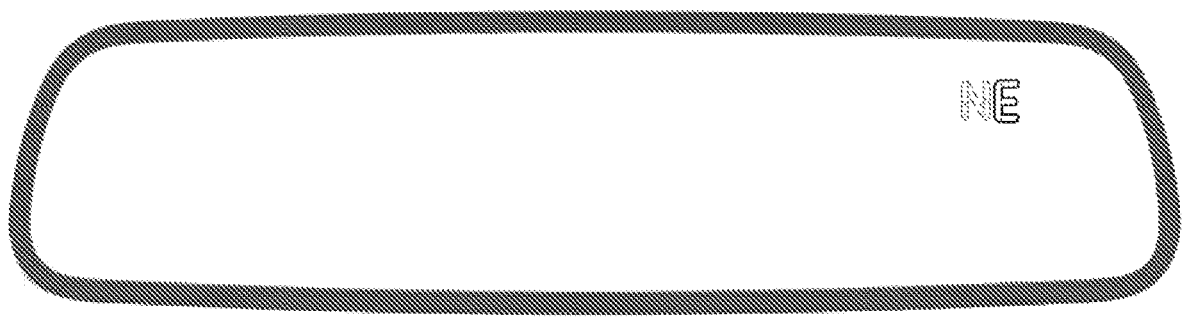
Figure 74E:
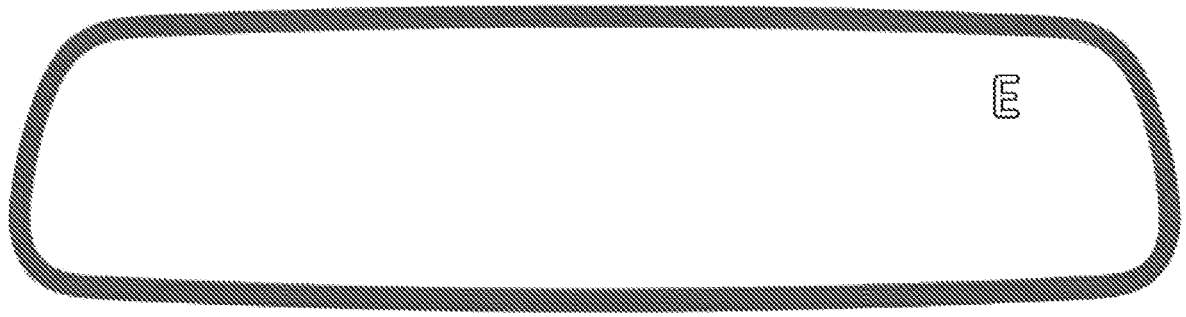

For example, and with reference to FIGS. 74A-F, when a vehicle is being driven in a generally northern direction (and within about 11.25 degrees in either direction of true north), the compass display displays "N", such as shown in FIG. 74A (and would display an "E", "S" or "W" when driven in a direction that is within about 11.25 degrees in either direction of true east, south or west, respectively). As the vehicle directional heading changes towards east, the compass display will display "NE", with the "N" being at a greater intensity than the "E" (such as shown in FIG. 74B), when the vehicle heading is more than about 11.25 degrees east of north and less than about 33.75 degrees east of north (i.e., within about a 22.5 degree band that is representative of a north-north-east heading of the vehicle). As the vehicle directional heading changes further towards east (so that the heading is more than about 33.75 degrees east of north and less than about 56.25 degrees east of north, such that the directional heading is representative of a northeast inter-cardinal heading of the vehicle), the compass display will continue to display "NE", but with the "N" and "E" displayed at generally the same intensity (such as shown in FIG. 74C). As the vehicle directional heading changes further towards east (so that the heading is more than about 56.25 degrees east of north and less than about 78.75 degrees east of north, such that the directional heading is representative of an east-north-east heading of the vehicle), the compass display will continue to display "NE", but with the "E" being displayed at a greater intensity than the "N" (such as shown in FIG. 74D). As the vehicle directional heading changes further towards true east (so that the heading is more than about 78.75 degrees east of north and less than about 101.25 degrees east of north or about 11.25 degrees south of east, such that the directional heading is representative of an east heading of the vehicle), the compass display will display the cardinal directional heading "E" (such as shown in FIG. 74E). Similar intensity and display variations will occur with vehicle headings between east and south and between south and west and between north and west.

Figure 74F:
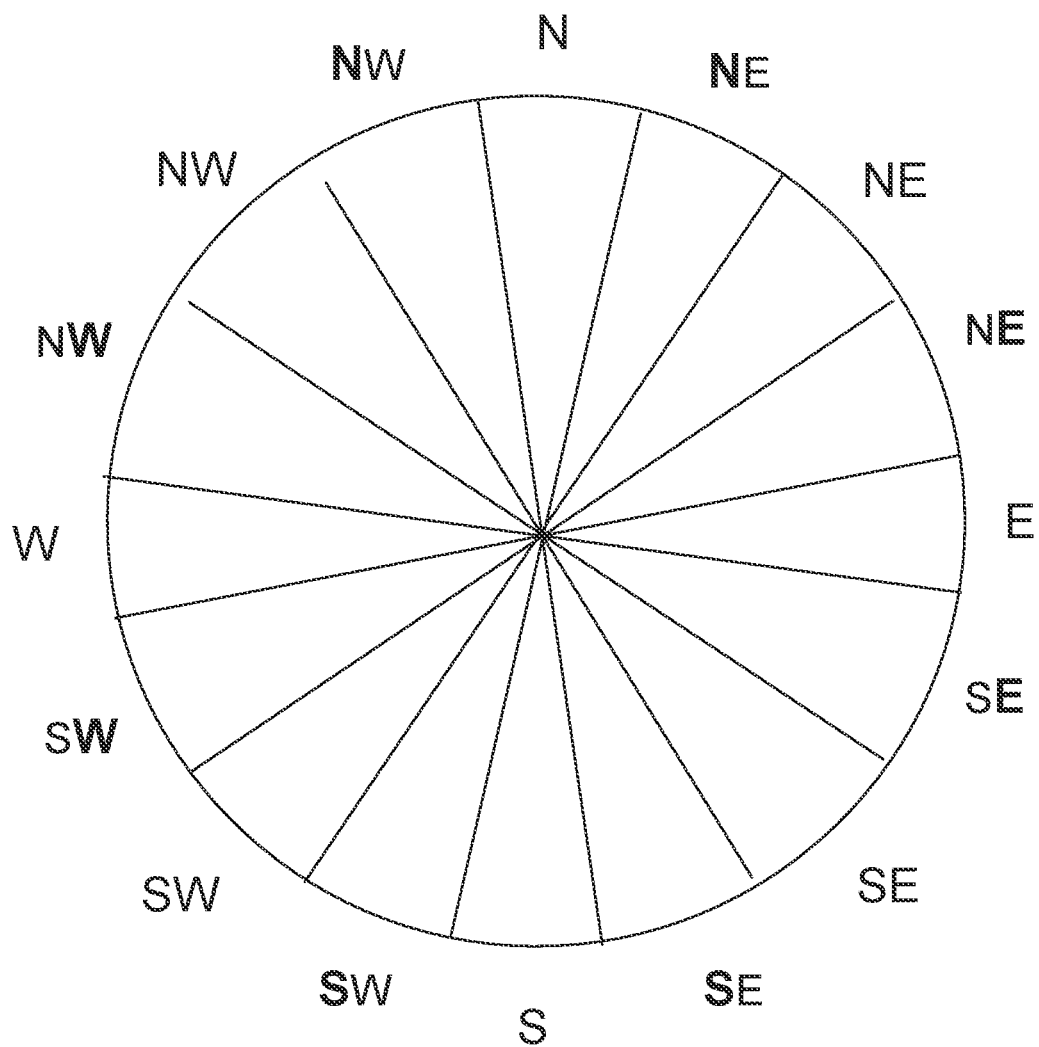
FIG. 74F is a schematic showing exemplary compass display characters for each of sixteen directional headings in accordance with the present invention.

Thus, the present invention provides a two character directional heading compass display that varies the intensity (and/or optionally varies the color or font or size or shape or type style, such as italics or bold or underlined) of one of the characters of the display relative to another of the characters of the display to provide sixteen point directional heading display so that the driver of the vehicle has a more accurate vehicle heading display. For example, the primary direction indicator (such as the "N" when the vehicle is traveling in a generally north-northeast direction, such as shown in FIG. 74B) may be displayed in a higher intensity or brighter color or a larger size (such as shown in FIG. 74F) or a bolder font or in italics or may be flashed or modified or moved, or the characters of the display may be displayed with any other suitable indication or highlighting of one character as compared to the other (when the vehicle is traveling generally in a directional heading between a cardinal heading and an inter-cardinal heading), such that the driver readily recognizes and understands that the vehicle is heading generally in that particular direction. Optionally, although discussed above and shown in FIG. 74F as having each directional heading band or range be the same degrees (such as 22.5 degrees), it is envisioned that some of the directional ranges may be larger/smaller, depending on the particular application (for example, the primary N, E, S, W headings could have a larger range or band size, so that the "N", for example, may be displayed when the vehicle is traveling within +/−15 degrees of true north or the like, while the directional displays for directions between the cardinal and inter-cardinal headings are provided over a smaller band or heading range).

The compass display may be incorporated in an interior rearview mirror assembly and may comprise a display-on-demand compass display that is viewable, when activated, through a transflective mirror reflector of the mirror reflective element, or may comprise a compass display that is disposed at or behind a window established through the mirror reflector of the mirror reflective element, such that the compass display, when activated, is viewable through the window of the reflective element. Optionally, the compass display may be provided by a video display, such as a backlit video display screen, such as a backlit thin film transistor (TFT) video display screen that is backlit by a plurality of white light-emitting light emitting diodes or the like, wherein the video display may be operable to selectively display video images, such as video images captured by a camera of the vehicle, such as a rearward facing camera of the vehicle, whereby the video display screen may be operable to display rearward images responsive to the vehicle being maneuvered in a reversing direction. The compass display may utilize aspects of the compass displays described in PCT Application No. PCT/US2011/056295, filed Oct. 14, 2011 and published Apr. 19, 2012 as International Publication No. WO 2012/051500, and/or U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent Publication No. EP 0 1043566, published Oct. 11, 2000, and/or U.S. patent application Ser. No. 11/226,628, filed Sep. 14, 2005 and published Mar. 23, 2006 as U.S. Publication No. 2006/0061008, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly configured for mounting at an exterior portion of a vehicle, said exterior rearview mirror assembly comprising:

a mounting arm;

wherein a mirror head is at one end of said mounting arm, and wherein an attachment portion is at a distal other end of said mounting arm, said attachment portion of said mounting arm configured for attachment at an exterior portion of a vehicle equipped with said exterior rearview mirror assembly;

wherein, with said attachment portion of said mounting arm of said exterior rearview mirror assembly attached at the exterior portion of the equipped vehicle, said mirror head is movable relative to said mounting arm;

an exterior mirror reflective element fixedly attached at said mirror head;

wherein the exterior mirror reflective element comprises an outermost side and an innermost side, with the outermost side of the exterior mirror reflective element separated from the innermost side of the exterior mirror reflective element by a thickness dimension of the exterior mirror reflective element;

wherein the outermost side of the exterior mirror reflective element is closer to a driver of the equipped vehicle than the innermost side of the exterior mirror reflective element when said attachment portion of said mounting arm of said exterior rearview mirror assembly is attached at the exterior portion of the equipped vehicle;

wherein the outermost side of the exterior mirror reflective element is exposed to and is viewable by the driver of the equipped vehicle and is contactable when said attachment portion of said mounting arm of said exterior rearview mirror assembly is attached at the exterior portion of the equipped vehicle;

wherein the exterior mirror reflective element comprises a mirror reflector-coated glass substrate;

wherein the mirror reflector-coated glass substrate of the exterior mirror reflective element comprises a front surface and an opposing rear surface, and wherein the front surface is separated from the rear surface by a thickness dimension of the mirror reflector-coated glass substrate forming a perimeter circumferential edge that circumscribes the mirror reflector-coated glass substrate and that spans between the front and rear surfaces;

wherein the outermost side of the exterior mirror reflective element comprises the front surface of the mirror reflector-coated glass substrate;

wherein said mirror head comprises an attachment plate having a front side and a rear side, with the front side of the attachment plate separated from the rear side of the attachment plate by a thickness dimension of the attachment plate;

wherein the innermost side of the exterior mirror reflective element is attached at the front side of the attachment plate;

wherein, with said attachment portion of said mounting arm of said exterior rearview mirror assembly attached at the exterior portion of the equipped vehicle, the exterior mirror reflective element moves in tandem with movement of said mirror head relative to said mounting arm when the driver of the equipped vehicle operates an electrically-operable actuator disposed at said exterior rearview mirror assembly that moves said mirror head to adjust the rearward view provided by the exterior mirror reflective element to the driver viewing the exterior mirror reflective element;

wherein the attachment plate of said mirror head comprises wall structure that extends from the front side of the attachment plate;

wherein, with the innermost side of the exterior mirror reflective element attached at the front side of the attachment plate, the wall structure that extends from the front side of the attachment plate circumferentially circumscribes and spans the perimeter circumferential edge of the mirror reflector-coated glass substrate;

wherein the wall structure that extends from the front side of the attachment plate does not encroach onto and does not overlap the front surface of the mirror reflector-coated glass substrate of the exterior mirror reflective element;

wherein the wall structure that extends from the front side of the attachment plate of said mirror head comprises a curved outermost surface that is exposed to and is viewable by the driver of the equipped vehicle and that is contactable when said attachment portion of said mounting arm of said exterior rearview mirror assembly is attached at the exterior portion of the equipped vehicle;

wherein the wall structure that extends from the front side of the attachment plate is molded from a polymeric material; and wherein the wall structure that extends from the front side of the attachment plate of said mirror head lacks a sharp edge that is contactable when said attachment portion of said mounting arm of said exterior rearview mirror assembly is attached at the exterior portion of the equipped vehicle.

2. The exterior rearview mirror assembly of claim 1, wherein the wall structure that extends from the front side of the attachment plate of said mirror head abuts the perimeter circumferential edge that circumscribes the mirror reflector-coated glass substrate of the exterior mirror reflective element.

3. The exterior rearview mirror assembly of claim 1, wherein the front surface of the mirror reflector-coated glass substrate of the exterior mirror reflective element is generally flush with the curved outermost surface of the wall structure that extends from the front side of the attachment plate of said mirror head.

4. The exterior rearview mirror assembly of claim 1, wherein the curved outermost surface of the wall structure that extends from the front side of the attachment plate of said mirror head curves to a less-curved portion of the wall structure of the attachment plate of said mirror head.

5. The exterior rearview mirror assembly of claim 1, wherein the curved outermost surface of the wall structure that extends from the front side of the attachment plate of said mirror head comprises at least a portion having a radius of curvature of at least 2.5 mm.

6. The exterior rearview mirror assembly of claim 1, wherein a metallic mirror reflective layer is coated onto the front surface of the mirror reflector-coated glass substrate.

7. The exterior rearview mirror assembly of claim 6, wherein the metallic mirror reflective layer comprises chromium.

8. The exterior rearview mirror assembly of claim 1, wherein a metallic mirror reflective layer is coated onto the rear surface of the mirror reflector-coated glass substrate.

9. The exterior rearview mirror assembly of claim 8, wherein the metallic mirror reflective layer comprises chromium.

10. The exterior rearview mirror assembly of claim 1, wherein the front surface of the mirror reflector-coated glass substrate of the exterior mirror reflective element comprises a front curved surface and the rear surface of the mirror reflector-coated glass substrate of the exterior mirror reflective element comprises a correspondingly-curved rear curved surface separated from the front curved surface by a thickness dimension of the mirror reflector-coated glass substrate.

11. The exterior rearview mirror assembly of claim 10, wherein said exterior rearview mirror assembly comprises a breakaway exterior rearview mirror assembly.

12. The exterior rearview mirror assembly of claim 11, wherein said exterior rearview mirror assembly comprises a powerfold exterior rearview mirror assembly.

13. The exterior rearview mirror assembly of claim 12, wherein said attachment portion of said mounting arm of said exterior rearview mirror assembly is configured for mounting at a door of the equipped vehicle.

14. The exterior rearview mirror assembly of claim 10, wherein said mirror head houses a camera module, said camera module comprising a lens system and a CMOS photosensor array.

15. The exterior rearview mirror assembly of claim 1, wherein the mirror reflector-coated glass substrate of the exterior mirror reflective element comprises a planar glass substrate, and wherein the front surface of the mirror reflector-coated glass substrate of the exterior mirror reflective element comprises a front planar surface and the rear surface of the mirror reflector-coated glass substrate of the exterior mirror reflective element comprises a rear planar surface separated from the front planar surface by a thickness dimension of the planar glass substrate.

16. The exterior rearview mirror assembly of claim 15, wherein said exterior rearview mirror assembly comprises a breakaway exterior rearview mirror assembly.

17. The exterior rearview mirror assembly of claim 16, wherein said exterior rearview mirror assembly comprises a powerfold exterior rearview mirror assembly.

18. The exterior rearview mirror assembly of claim 16, wherein said attachment portion of said mounting arm of said exterior rearview mirror assembly is configured for mounting at a door of the equipped vehicle.

19. The exterior rearview mirror assembly of claim 18, wherein a heater pad is disposed between the innermost side of the exterior mirror reflective element and the front side of the attachment plate.

20. The exterior rearview mirror assembly of claim 18, wherein the innermost side of the exterior mirror reflective element is adhesively attached at the front side of the attachment plate.

* * * * *